US012529976B2

(12) United States Patent
Itabashi

(10) Patent No.: US 12,529,976 B2
(45) Date of Patent: Jan. 20, 2026

(54) IMAGE FORMING APPARATUS HAVING MOVABLE SHUTTERS FOR OPENING AND CLOSING TONER INLETS AND OUTLETS

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 61 days.

(21) Appl. No.: 18/425,103

(22) Filed: Jan. 29, 2024

(65) Prior Publication Data

US 2024/0168400 A1 May 23, 2024

Related U.S. Application Data

(63) Continuation of application No. PCT/JP2022/028715, filed on Jul. 26, 2022.

(30) Foreign Application Priority Data

Jul. 30, 2021 (JP) ................................ 2021-125069
Jul. 30, 2021 (JP) ................................ 2021-125070

(51) Int. Cl.

*G03G 15/08* (2006.01)
*G03G 15/01* (2006.01)
*G03G 21/12* (2006.01)

(52) U.S. Cl.

CPC ..... *G03G 15/0189* (2013.01); *G03G 15/0808* (2013.01); *G03G 15/0844* (2013.01);
(Continued)

(58) Field of Classification Search

CPC ........... G03G 15/0189; G03G 15/0808; G03G 15/0891; G03G 21/12; G03G 2215/067;
(Continued)

(56) References Cited

U.S. PATENT DOCUMENTS

2004/0052560 A1* 3/2004 Ishii ..................... G03G 21/105 399/360
2005/0226656 A1* 10/2005 Tsuda ................. G03G 15/0872 399/258

(Continued)

FOREIGN PATENT DOCUMENTS

JP 3-49559 U 5/1991
JP 2009-251483 A 10/2009

(Continued)

OTHER PUBLICATIONS

International Search Report issued in related International Application No. PCT/JP2022/028715, Sep. 27, 2022.

(Continued)

*Primary Examiner* — Stephanie E Bloss
*Assistant Examiner* — Laura Roth
(74) *Attorney, Agent, or Firm* — Merchant & Gould P.C.

(57) ABSTRACT

An image forming apparatus includes a main housing, an intermediate transfer belt, a development device, a toner box, and a pipe. The development device includes a development housing having an inlet through which toner is received, and a development roller rotatable about a development axis. The development device is detachably attachable to the main housing. The toner box is detachably attachable to the main housing and contains toner therein. The pipe has a pipe opening through which toner is provided to the development device. The development device is positioned below the intermediate transfer belt. The toner box is positioned above the intermediate transfer belt. In a state where the development device is attached to the main housing, the inlet of the development housing is opposed to the pipe opening and is configured to receive toner delivered by the pipe.

18 Claims, 56 Drawing Sheets

(52) U.S. Cl.
CPC ..... *G03G 15/0879* (2013.01); *G03G 15/0891* (2013.01); *G03G 21/12* (2013.01); *G03G 15/0872* (2013.01); *G03G 15/0893* (2013.01); *G03G 2215/067* (2013.01); *G03G 2215/0827* (2013.01); *G03G 2215/0888* (2013.01)

(58) Field of Classification Search
CPC ... G03G 2215/0827; G03G 2215/0888; G03G 15/08; G03G 21/16; G03G 15/0893; G03G 15/0872; G03G 15/0879; G03G 15/0844; G03G 2215/0822; G03G 2215/0668; G03G 2215/0665
See application file for complete search history.

(56) References Cited

U.S. PATENT DOCUMENTS

| | | | | |
|---|---|---|---|---|
| 2008/0260432 | A1* | 10/2008 | Ohyama | G03G 15/0856 399/258 |
| 2010/0040391 | A1 | 2/2010 | Uno | |
| 2011/0222871 | A1 | 9/2011 | Suzuki et al. | |
| 2011/0229209 | A1 | 9/2011 | Takaya et al. | |
| 2011/0236074 | A1* | 9/2011 | Maeda | G03G 15/0893 399/256 |
| 2016/0147181 | A1* | 5/2016 | Inoue | G03G 15/0879 399/27 |
| 2016/0282759 | A1 | 9/2016 | Matsumoto et al. | |
| 2019/0187603 | A1 | 6/2019 | Soda | |
| 2020/0089160 | A1 | 3/2020 | Fujii et al. | |

FOREIGN PATENT DOCUMENTS

| | | | |
|---|---|---|---|
| JP | 2010-44183 | A | 2/2010 |
| JP | 2011-197442 | A | 10/2011 |
| JP | 2011-215588 | A | 10/2011 |
| JP | 2016-184043 | A | 10/2016 |
| JP | 2017-156551 | A | 9/2017 |
| JP | 2019-82642 | A | 5/2019 |
| JP | 2019-109326 | A | 7/2019 |
| JP | 2020-42244 | A | 3/2020 |
| WO | 2019/088469 | A1 | 5/2019 |
| WO | 2020/040814 | A1 | 2/2020 |

OTHER PUBLICATIONS

International Preliminary Report issued in related International Application PCT/JP2022/028715, Jan. 18, 2024.

* cited by examiner

IMAGE FORMING APPARATUS HAVING MOVABLE SHUTTERS FOR OPENING AND CLOSING TONER INLETS AND OUTLETS

REFERENCE TO RELATED APPLICATIONS

This application is a continuation application of International Application No. PCT/JP2022/028715 filed on Jul. 26, 2022 which claims priority from Japanese Patent Application Nos. 2021-125069 and 2021-125070 filed on Jul. 30, 2021. The disclosures of these applications are incorporated herein by reference in their entirety.

BACKGROUND ART

An image forming apparatus known in the art includes a main housing, an intermediate transfer belt, a development device, a toner box, a toner supplying device, and a pipe. The development device has a development roller rotatable about a development axis that extends in an axial direction. The toner box and the toner supplying device are positioned above the intermediate transfer belt, and the development device is positioned below the intermediate transfer belt. Toner from the toner box is supplied to the toner supplying device, and then to the development device through the pipe. The development device has an inlet for receiving toner delivered by the pipe.

SUMMARY

In the above-described image forming apparatus, the development device is not installable into and removable from the main housing in the axial direction. However, if the development device were installable into and removable from the main housing in such an image forming apparatus, it would be necessary to smoothly supply toner from the pipe to the development device.

Thus, in an image forming apparatus in which a development device is installable into and removable from a main housing in an axial direction, it would be desirable to smoothly supply toner from a pipe to a development device.

In one aspect, an image forming apparatus disclosed herein includes a main housing, an intermediate transfer belt, a development device, a toner box, and a pipe. The development device includes a development housing having an inlet through which toner is received, and a development roller rotatable about a development axis extending in an axial direction. The development device is detachably attachable to the main housing in the axial direction. The toner box is detachably attachable to the main housing in the axial direction. The toner box contains toner therein. The pipe has a pipe opening through which toner is provided to the development device. The development device is positioned below the intermediate transfer belt, and the toner box is positioned above the intermediate transfer belt. The inlet of the development housing is opposed to the pipe opening, and the inlet of the development housing is configured to receive toner delivered by the pipe in a state where the development device is attached to the main housing.

According to this configuration in which the development device is installable into and removable from the main housing in the axial direction, since the inlet of the development device and the pipe opening of the pipe are opposed to each other when the development device is attached to the main housing, toner can be smoothly supplied from the pipe to the development device.

The development device may include a first shutter movable between a first open position to open the inlet and a first closed position to close the inlet, which first shutter is configured to move from the first closed position to the first open position in a state where the development device is attached to the main housing and the inlet is opposed to the pipe opening.

According to this configuration, by opening and closing the inlet with the first shutter, it is possible to supply toner from the pipe to the development device or to stop supplying toner from the pipe to the development device.

The main housing may have a development opening through which the development device is allowed to pass. When the development device is attached to the main housing, the first shutter may be positioned farther, than the development roller, from the development opening in the axial direction.

The image forming apparatus may further include a waste toner box configured to contain toner therein. The development housing may include an outlet through which toner is discharged to the waste toner box in a state where the development device is attached to the main housing and a second shutter movable between a second open position to open the outlet and a second closed position to close the outlet, which second shutter is configured to move from the second closed position to the second open position in a state where that the development device is attached to the main housing and the inlet is opposed to the pipe opening.

According to this configuration, by opening and closing the outlet with the second shutter, it is possible to discharge toner from the development device to the waste toner box or to stop discharging toner from the development device to the waste toner box.

The inlet may face upward, and the outlet may face downward.

According to this configuration, toner can be smoothly received in and discharged from the development device.

The main housing may have a development opening through which the development device is allowed to pass. When the development device is attached to the main housing, the second shutter may be positioned farther, than the development roller, from the development opening in the axial direction.

The image forming apparatus may further include a controller which is configured to move the first shutter from the first closed position to the first open position in a state where the second shutter is positioned in the second closed position, and to move the second shutter from the second closed position to the second open position in a state where the first shutter is positioned in the first closed position.

According to this configuration, since the first shutter and the second shutter are restrained from being open at the same time, fresh toner supplied from the pipe to the development device can be restrained from being discharged from the outlet.

The main housing may have a development opening through which the development device is allowed to pass. The development device may further include a first auger configured to convey toner in the development housing in the axial direction toward the development opening in a state where the development device is attached to the main housing and a second auger configured to convey toner in the development housing in the axial direction away from the development opening in a state where the development device is attached to the main housing.

The development housing may further include a partition wall positioned between the first auger and the second auger, which partition wall includes a feed port through which toner conveyed by the first auger is allowed to pass and a return port through which toner conveyed by the second auger is allowed to pass.

According to this configuration, toner can be circulated inside the development device 70.

The development device may further include a third shutter movable between a third open position to open the return port and a third closed position to close the return port.

According to this configuration, since the third shutter restricts passage of deteriorated toner through the return port when deteriorated toner contained in the development device is discharged, deteriorated toner can be smoothly discharged.

The image forming apparatus may further include a controller which is configured to move the first shutter from the first closed position to the first open position on the condition that the second shutter is positioned in the second closed position and the third shutter is positioned in the third open position, and to move the second shutter from the second closed position to the second open position and the third shutter from the third open position to the third closed position on the condition that the first shutter is positioned in the first closed position.

The image forming apparatus may further include a photosensitive drum positioned under the intermediate transfer belt, wherein the waste toner box is positioned below the photosensitive drum.

The image forming apparatus may further include a scanner configured to project light to expose a surface of the photosensitive drum, wherein at least a part of the waste toner box overlaps at least a part of the scanner as viewed in the axial direction.

The first shutter may include a protrusion. The image forming apparatus may further include a pipe shutter movable between a fourth open position to open the pipe opening and a fourth closed position to close the pipe opening, which pipe shutter has a hole in which the protrusion is fitted.

According to this configuration, the development housing can be positioned in place relative to the pipe via the first shutter and the pipe shutter.

The image forming apparatus may further include a sub-tank positioned between the toner box and the pipe, wherein the sub-tank includes a conveyance member for conveying toner supplied from the toner box to the pipe.

The image forming apparatus may further include a first sensor configured to detect presence or absence of toner in the sub-tank.

The image forming apparatus may further include a second sensor configured to detect presence or absence of toner in the pipe.

According to this configuration, the amount of toner in the development device can be known indirectly.

The second sensor may be positioned above a lower end of the development roller.

According to this configuration, since toner is in contact with the development roller when the second sensor is detecting toner, toner contained in the development device can be reliably brought into contact with the development roller.

The main housing may have a development opening through which the development device is allowed to pass. The pipe may be positioned farther, than the intermediate transfer belt, from the development opening in the axial direction.

The intermediate transfer belt may overlap the pipe as viewed in the axial direction.

The inlet may be opposed to the pipe opening in a state where the development device is attached to the main housing and the development housing is positioned in place relative to the main housing.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
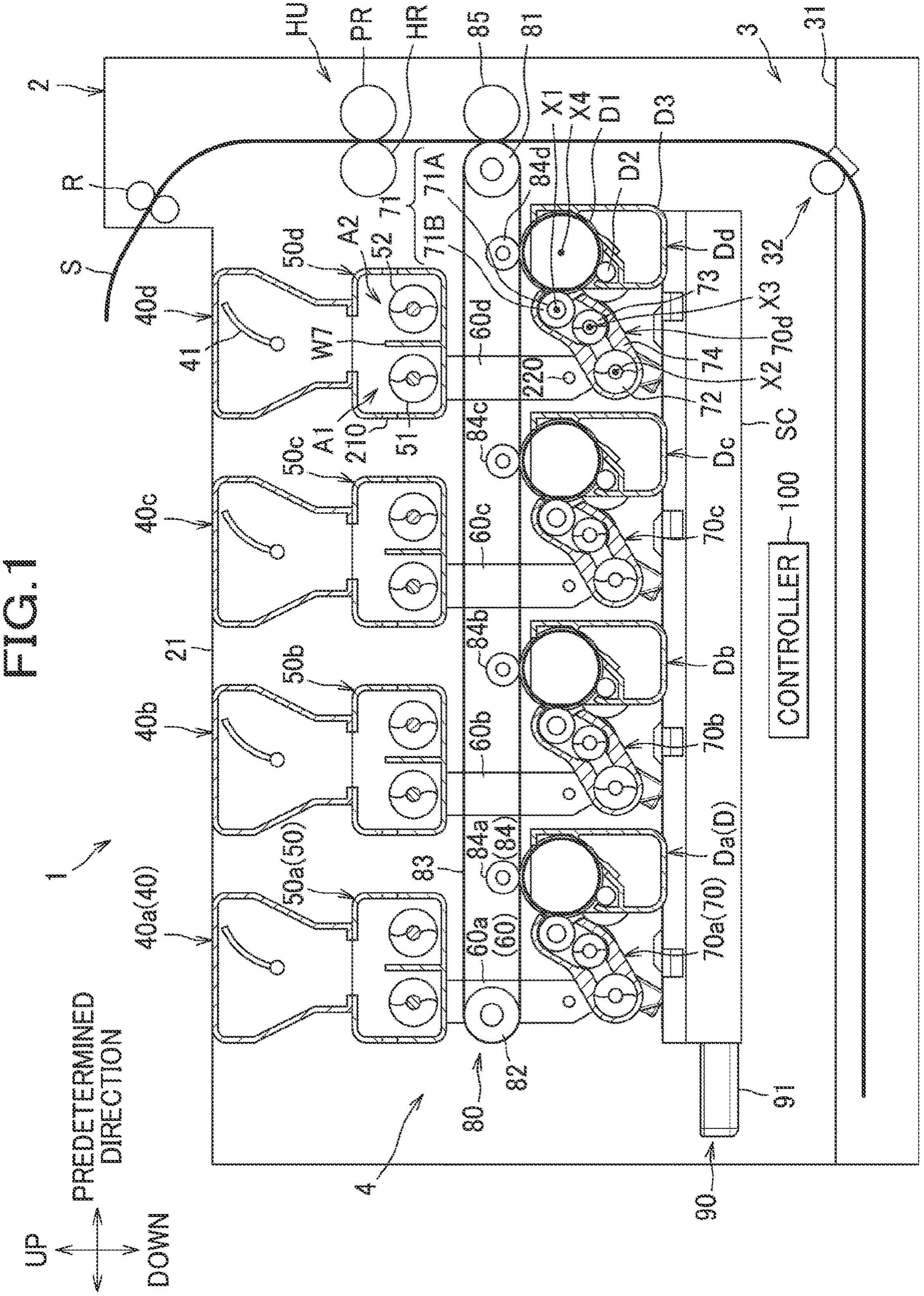
FIG. 1 is an illustration of a multicolor printer.

The first embodiment of the present disclosure will be described in detail referring to the drawings where appropriate.

As shown in FIG. 1, a multicolor printer 1 as an example of an image forming apparatus includes a main housing 2, an image forming unit 4, and a controller 100. The image forming unit 4 forms an image on a sheet S.

The main housing 2 includes an output tray 21, a sheet feeder unit 3, an ejection roller R, and four sub-tanks 50 (50*a*, 50*b*, 50*c*, 50*d*).

The output tray 21 is positioned on top of the main housing 2. The sheet S is ejected onto the output tray 21.

The sheet feeder unit 3 is positioned in a lower part of the main housing 2. The sheet feeder unit 3 includes a feed tray 31 and a supply roller mechanism 32. The feed tray 31 is installable into and removable from the main housing 2. The supply roller mechanism 32 conveys the sheet S from the feed tray 31 to the image forming unit 4.

The ejection roller R ejects the sheet S from the main housing 2 onto the output tray 21.

The image forming unit 4 includes four toner boxes 40 (40*a*, 40*b*, 40*c*, 40*d*), four pipes 60 (60*a*, 60*b*, 60*c*, 60*d*), four development devices 70 (70*a*, 70*b*, 70*c*, 70*d*), four drum units D (Da, Db, Dc, Dd), a scanner SC, a transfer unit 80, a fixing unit HU, and a waste toner box 90.

The toner boxes 40 are container-shaped members that contain toner. The four toner boxes 40*a*, 40*b*, 40*c*, 40*d* each contain toner of a different color. The toner boxes 40 are positioned above an intermediate transfer belt 83 which will be described later. Each toner box 40 includes an agitation member 41 for agitating toner. The agitation member 41 is an agitator. The agitation member 41 may also be an auger. The toner boxes 40 are attachable to and removable from the main housing 2 in an axial direction shown in FIG. 2. Specifically, each toner box 40 is attachable to and removable from the corresponding sub-tank 50 which is a part of the main housing 2 in the axial direction.

The sub-tanks 50 are container-shaped members to which toner is supplied from the toner boxes 40. The sub-tanks 50 are positioned between the toner boxes 40 and the intermediate transfer belt 83 in the up-down direction. The sub-tanks 50 are positioned between the toner boxes 40 and the pipes 60. Each sub-tank 50 has a first end and a second end positioned apart from each other in the axial direction. Each toner box 40 is positioned at the first end of the corresponding sub-tank 50 when the toner box 40 is attached to the sub-tank 50. The capacity of the sub-tank 50 is greater than the capacity of the toner box 40. The capacity of the sub-tank 50 is greater than the capacity of the development device 70. In this specification, capacity refers to an amount of toner (maximum amount of toner) containable in a container-shaped member such as the toner box 40, the sub-tank 50, and the development device 70.

The dimension of the sub-tank 50 in the axial direction is greater than the dimension of the toner box 40 in the axial direction. Specifically, the dimension of the sub-tank 50 in the axial direction is equal to or greater than three times the dimension of the toner box 40 in the axial direction.

Each sub-tank 50 has a supply port H1 and a discharge port H2. Toner is supplied from each toner box 40 to the corresponding sub-tank 50 through the supply port H1 and is discharged from the sub-tank 50 to the corresponding pipe 60 through the discharge port H2. The supply port H1 faces upward. The supply port H1 is positioned on the top surface of the sub-tank 50. Herein, "upward" may be any direction with an upward component and may, for example, include an oblique upward direction.

The discharge port H2 is spaced apart from the supply port H1 in the axial direction. Specifically, the supply port H1 is positioned at the first-end side of the sub-tank 50. The discharge port H2 is positioned at the second-end side of the sub-tank 50. The discharge port H2 faces downward. The discharge port H2 is positioned on a bottom surface of the sub-tank 50. Herein, "downward" may be any direction with a downward component and may, for example, include an oblique downward direction.

Each sub-tank 50 includes a first sensor 210 that detects the presence or absence of toner in the sub-tank 50. The first sensor 210 is an optical sensor including a light emitter and a light receiver. The light emitter emits light in a predetermined direction shown in the drawings. The light receiver receives light emitted from the light emitter. The predetermined direction is perpendicular to the axial direction and to the up-down direction. The first sensor 210 is positioned between the supply port H1 and the discharge port H2 in the axial direction.

The distance from the first sensor 210 to the discharge port H2 is greater than the distance from the first sensor 210 to the supply port H1 in the axial direction. Specifically, a space inside the sub-tank 50 on the supply-port-side of the first sensor 210 is capable of containing toner of an amount equal to toner containable in one toner box 40. A space inside the sub-tank 50 on the discharge-port-side of the first sensor 210 is capable of containing toner of an amount equal to toner containable in two toner boxes 40.

Referring back to FIG. 1, each sub-tank 50 includes a first conveying member 51 and a second conveying member 52. The first conveying member 51 and the second conveying member 52 are members that convey toner supplied from the corresponding toner box 40 to the corresponding pipe 60. The first conveying member 51 and the second conveying member 52 convey toner in the axial direction. The first conveying member 51 and the second conveying member 52 are arranged side-by-side in the predetermined direction.

In this embodiment, the first conveying member 51 and the second conveying member 52 are augers. The first conveying member 51 and the second conveying member 52 may also be agitators. Any number of conveying members may be provided, including, for example, one.

Each sub-tank 50 further includes a partition wall W7. The partition wall W7 divides a space inside the sub-tank 50 into a space A1 including the first conveying member 51 and a space A2 including the second conveying member 52. The partition wall W7 is positioned between the first conveying member 51 and the second conveying member 52 in the predetermined direction. The spaces A1, A2 are connected in the vicinity of the discharge port H2. Thus, toner in the space A1 can be conveyed to the discharge port H2 by the first conveying member 51, and toner in the space A2 can be conveyed to the discharge port H2 by the second conveying member 52. The first sensor 210 is positioned above the upper end of the partition wall W7.

The pipes 60 are tubular members that deliver toner in the toner boxes 40 to the development devices 70. Specifically, each pipe 60 delivers toner in the corresponding sub-tank 50 to the corresponding development device 70. Each pipe 60 extends from the corresponding sub-tank 50 to the corresponding development device 70. Toner in each toner box 40 is supplied to the corresponding development device 70 via the sub-tank 50 and the pipe 60.

Figure 2:
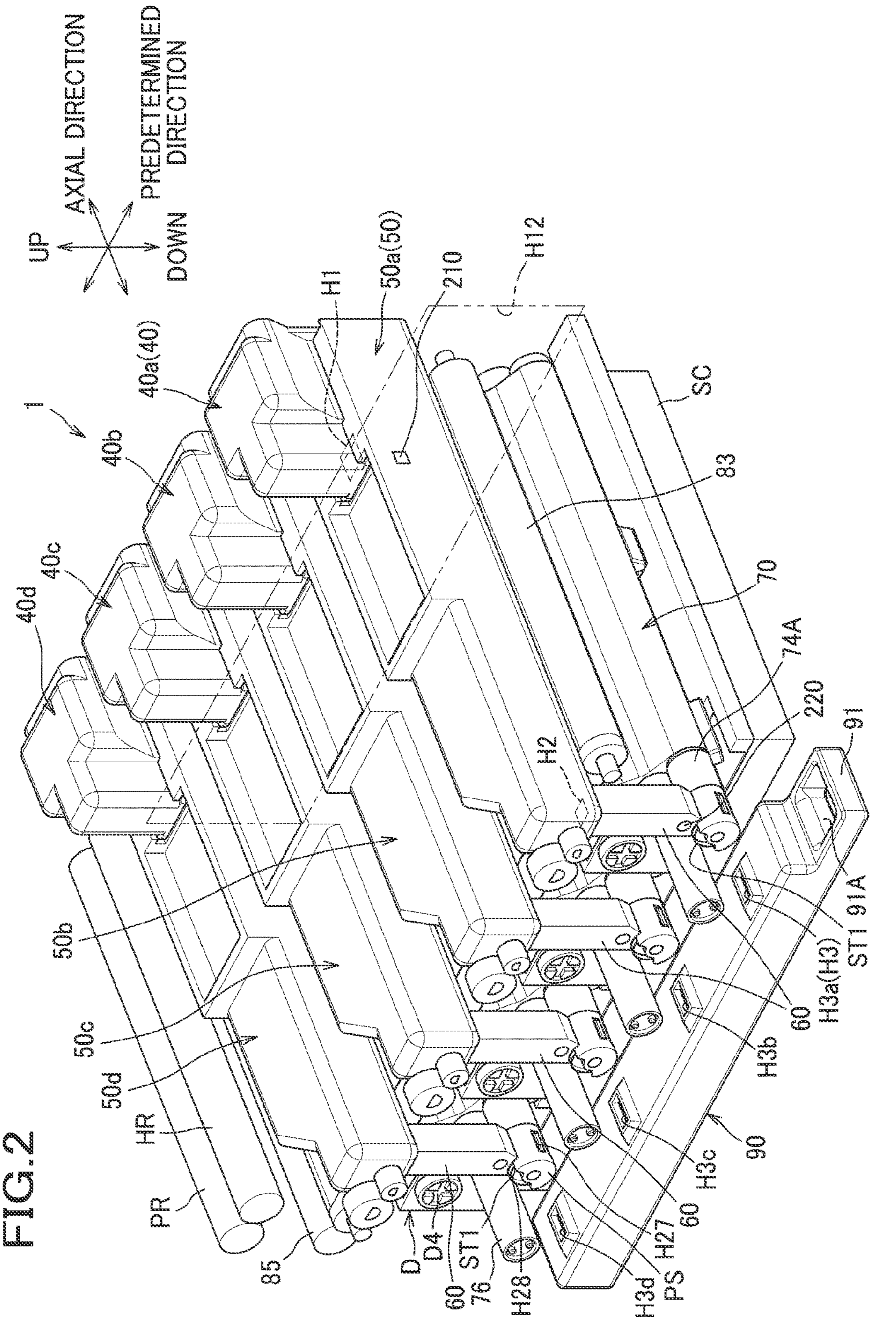
FIG. 2 is a perspective view of a structure inside a main housing of the multicolor printer.

Each pipe 60 includes a second sensor 220 that detects the presence or absence of toner in the pipe 60. The second sensor 220 is an optical sensor including a light emitter and a light receiver. The light emitter emits light in the axial direction. The light receiver receives light emitted from the light emitter. The second sensor 220 is positioned above a lower end of a development roller 71 and below an upper end of the development roller 71. Specifically, light emitted from the light emitter passes through a position above the lower end and below the upper end of the development roller 71. As shown in FIG. 2, each pipe 60 is positioned farther than the intermediate transfer belt 83 from a second opening H12, in the axial direction. The second opening H12 is an example of a development opening which will be described later. The intermediate transfer belt 83 is positioned between the pipes 60 and the second opening H12 in the axial direction.

Figure 5:
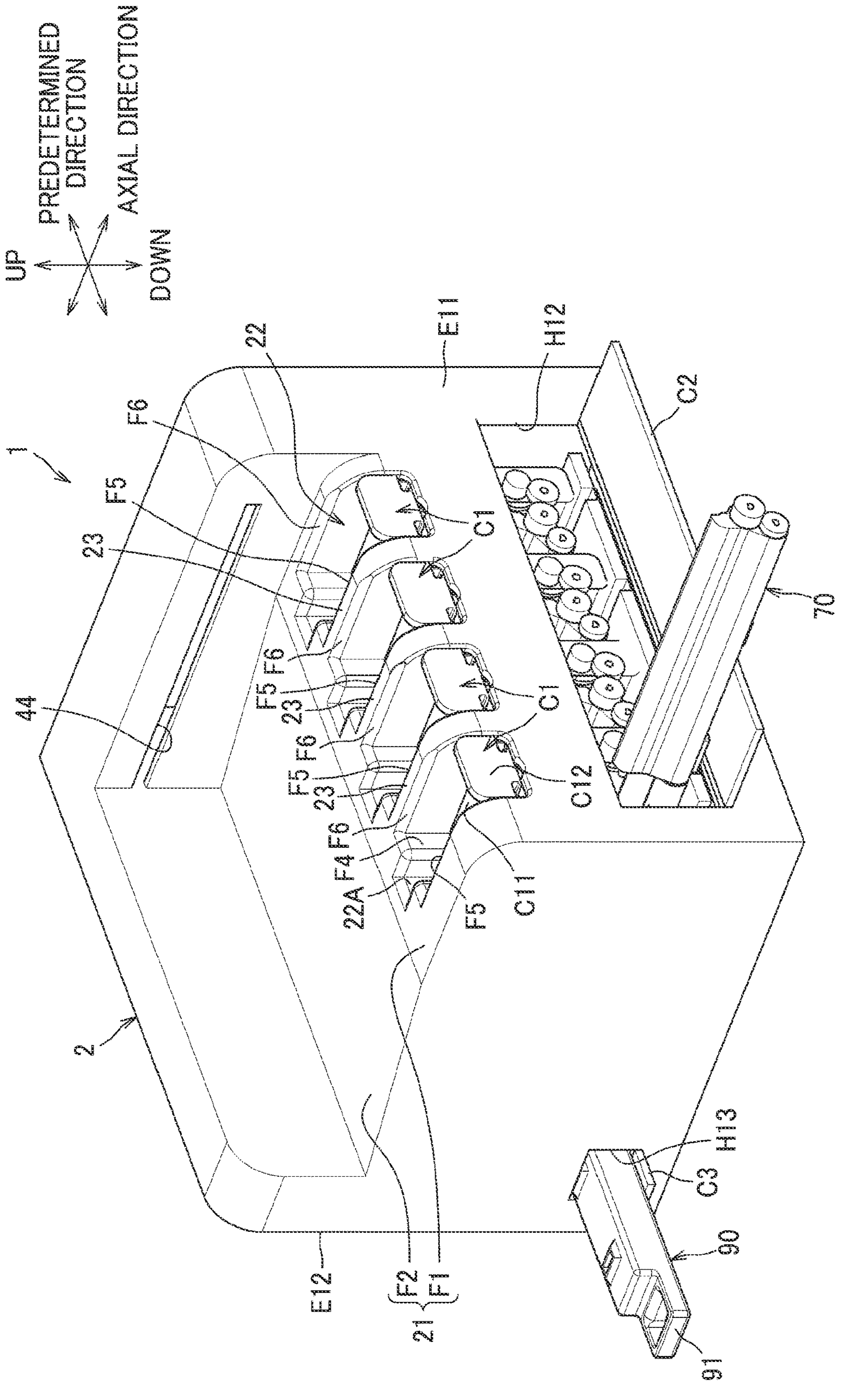
FIG. 5 is a perspective view showing a development device and a waste toner box being removed from the main housing.

The development devices 70 are positioned under the intermediate transfer belt 83. As shown in FIG. 5, the development devices 70 are installable into and removable from the main housing 2 in the axial direction through the second opening H12. Referring back to FIG. 1, each development device 70 includes a development roller 71, a first auger 72, a second auger 73, and a housing 74. The development roller 71 includes a development roller shaft 71A and a roller body 71B covering a portion of an outer periphery of the development roller shaft 71A.

The development method of the present embodiment is a two-component development method. The development roller shaft 71A is, for example, a metal shaft including a magnet. The roller body 71B is, for example, a metal raw pipe. The development method may also be a one-component development method. In this case, the development roller shaft 71A is, for example, a metal shaft, and the roller body 71B is, for example, a cylindrical part made of rubber.

Figure 6A:
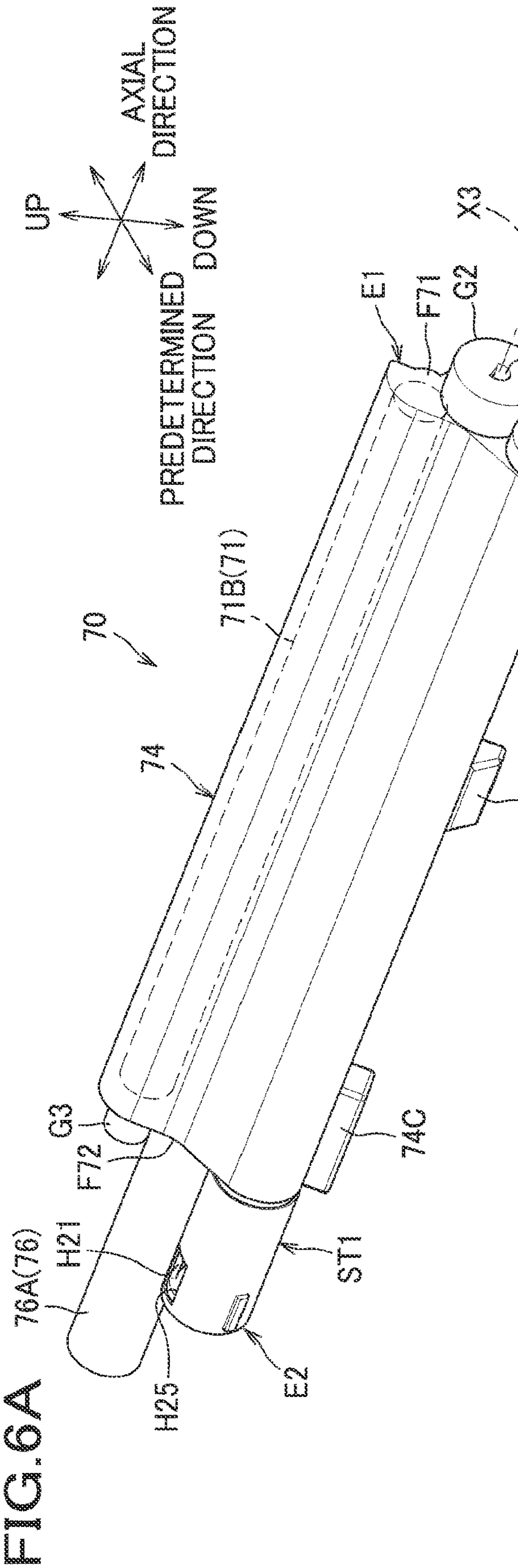
FIGS. 6A and 6B are perspective views of the development device.

The housing 74 houses the roller body 71B of the development roller 71, the first auger 72, the second auger 73, and toner. The housing 74 has a first end E1 and a second end E2 positioned apart from each other in the axial direction (FIG. 6A). The development roller 71 is rotatable about a development axis X1 extending in the axial direction. The first auger 72 and the second auger 73 are members that convey toner supplied from the pipe 60 to the development roller 71. The first auger 72 is rotatable about a first auger axis X2 extending in the axial direction. The second auger 73 is rotatable about a second auger axis X3 extending in the axial direction.

The drum units D are positioned under the intermediate transfer belt 83. Each drum unit D is arranged side-by-side with the corresponding development device 70 in the predetermined direction. The drum unit D is installable into and removable from the main housing 2 in the axial direction through the second opening H12 which will be described later. The drum unit D includes a photosensitive drum D1, a charger roller D2 that charges the photosensitive drum D1, and a drum frame D3 that houses a portion of the photosensitive drum D1 and the charger roller D2. The photosensitive drum D1 is rotatable about a drum axis X4 extending in the axial direction.

The scanner SC is positioned below the drum units D. The scanner SC emits laser light toward each of the photosensitive drums D1.

The transfer unit 80 is positioned between the sub-tanks 50 and the development devices 70 in the up-down direction. The transfer unit 80 includes a drive roller 81, a follower roller 82, an intermediate transfer belt 83, four primary transfer rollers 84 (84*a*, 84*b*, 84*c*, 84*d*), and a secondary transfer roller 85.

The intermediate transfer belt 83 is an endless belt. The intermediate transfer belt 83 overlaps the pipes 60 as viewed in the axial direction. Specifically, the intermediate transfer belt 83 overlaps the pipes 60 when projected in the axial direction.

The primary transfer rollers 84 are positioned to face an inner surface of the intermediate transfer belt 83. The intermediate transfer belt 83 is sandwiched between the primary transfer rollers 84 and the photosensitive drums D1.

The secondary transfer roller 85 is positioned to face an outer surface of the intermediate transfer belt 83. The intermediate transfer belt 83 is sandwiched between the secondary transfer roller 85 and the drive roller 81.

The fixing unit HU is positioned above the intermediate transfer belt 83. The fixing unit HU includes a heating roller HR and a pressure roller PR. The pressure roller PR is pressed against the heating roller HR.

In the image forming unit 4, first, a surface of each photosensitive drum D1 is charged by the corresponding charger roller D2. Then, the scanner SC projects light to expose the surface of each photosensitive drum D1 and thereby form an electrostatic latent image thereon.

Subsequently, each development roller 71 supplies toner to the electrostatic latent image formed on the corresponding photosensitive drum D1 to thereby form a toner image on the photosensitive drum D. The toner image on the photosensitive drum D1 is then transferred onto the intermediate transfer belt 83.

The toner image on the intermediate transfer belt 83 is transferred onto the sheet S when the sheet S passes through between the intermediate transfer belt 83 and the secondary transfer roller 85. Thereafter, the toner image on the sheet S is fixed on the sheet S at the fixing unit HU. The sheet S is then ejected onto the output tray 21 by the ejection roller R.

As shown in FIG. 2, the waste toner box 90 is a container-shaped member capable of containing toner. The development devices 70 are capable of discharging deteriorated toner therein to the waste toner box 90. Specifically, each development device 70 has a discharge port (not shown) for discharging toner to the waste toner box 90, and a shutter (not shown) for opening and closing the discharge port. The main housing 2 has passages for discharging toner from the development devices 70 to the waste toner box 90.

As shown in FIG. 1, the waste toner box 90 is positioned below the photosensitive drums D1. Specifically, the waste toner box 90 is positioned below the development devices 70 and the drum units D. As shown in FIGS. 1 and 2, a part of the waste toner box 90 overlaps a part of the scanner SC as viewed in the axial direction. The waste toner box 90 has four openings H3 (H3*a*, H3*b*, H3*c*, H3*d*) and a handle 91. The openings H3 are openings for receiving toner discharged from the development devices 70.

The handle 91 has a hole 91A in which a user can hook his/her finger. The hole 91A is a through hole extending in the up-down direction. The hole 91A may also be a blind hole. As shown in FIG. 5, the waste toner box 90 is installable into and removable from the main housing 2 in the predetermined direction.

Figure 3:
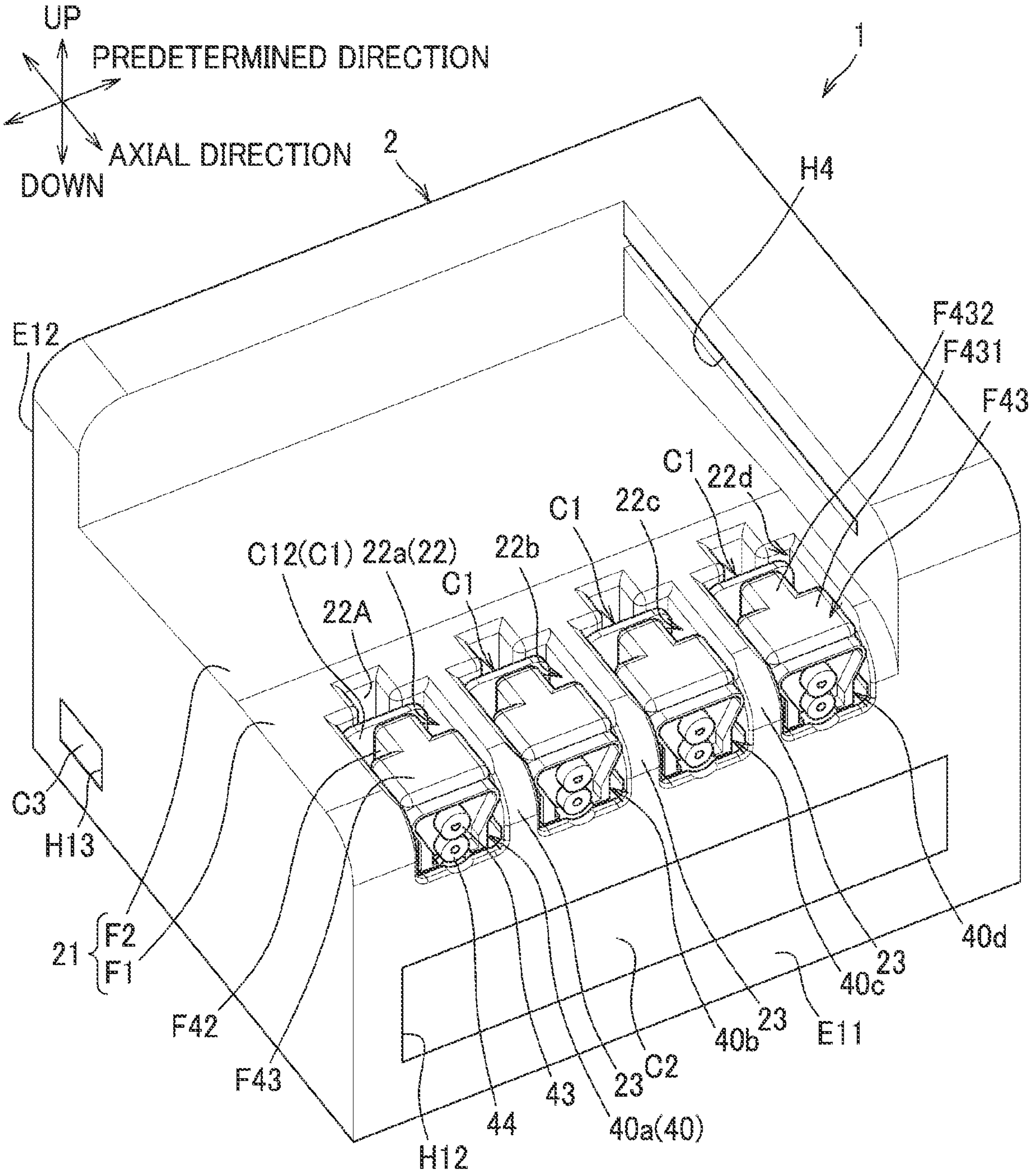
FIG. 3 is a perspective view of the multicolor printer with toner boxes attached to sub-tanks.

As shown in FIGS. 3 and 5, the main housing 2 has a sheet ejection opening H4, four box-housing recesses 22 (22*a*, 22*b*, 22*c*, 22*d*), a second opening H12 as an example of a development opening, and a third opening H13. The sheet ejection opening H4 is an opening for ejecting the sheet S outside the main housing 2. Specifically, the sheet ejection opening H4 is an opening for ejecting the sheet S onto the output tray 21.

The sheet ejection opening H4 is positioned above the output tray 21. The sheet ejection opening H4 extends in the axial direction and has a first end and a second end positioned apart from each other in the axial direction. Each box-housing recess 22 has a first end and a second end positioned apart from each other in the axial direction, and a first side and a second side positioned apart from each other in the predetermined direction. The first end of the sheet ejection opening H4 is positioned between the first ends and the second ends of the box-housing recesses 22.

The output tray 21 has a first supporting surface F1 and a second supporting surface F2. The first supporting surface F1 and the second supporting surface F2 are surfaces for supporting the sheet S ejected through the sheet ejection opening H4. The first supporting surface F1 is perpendicular to the up-down direction. The first supporting surface F1 is positioned between the second supporting surface F2 and the second opening H12 in the axial direction. The second supporting surface F2 is inclined relative to the first supporting surface F1 such that the farther from the first supporting surface F1 in the axial direction, the lower the second supporting surface F2.

Figure 4:
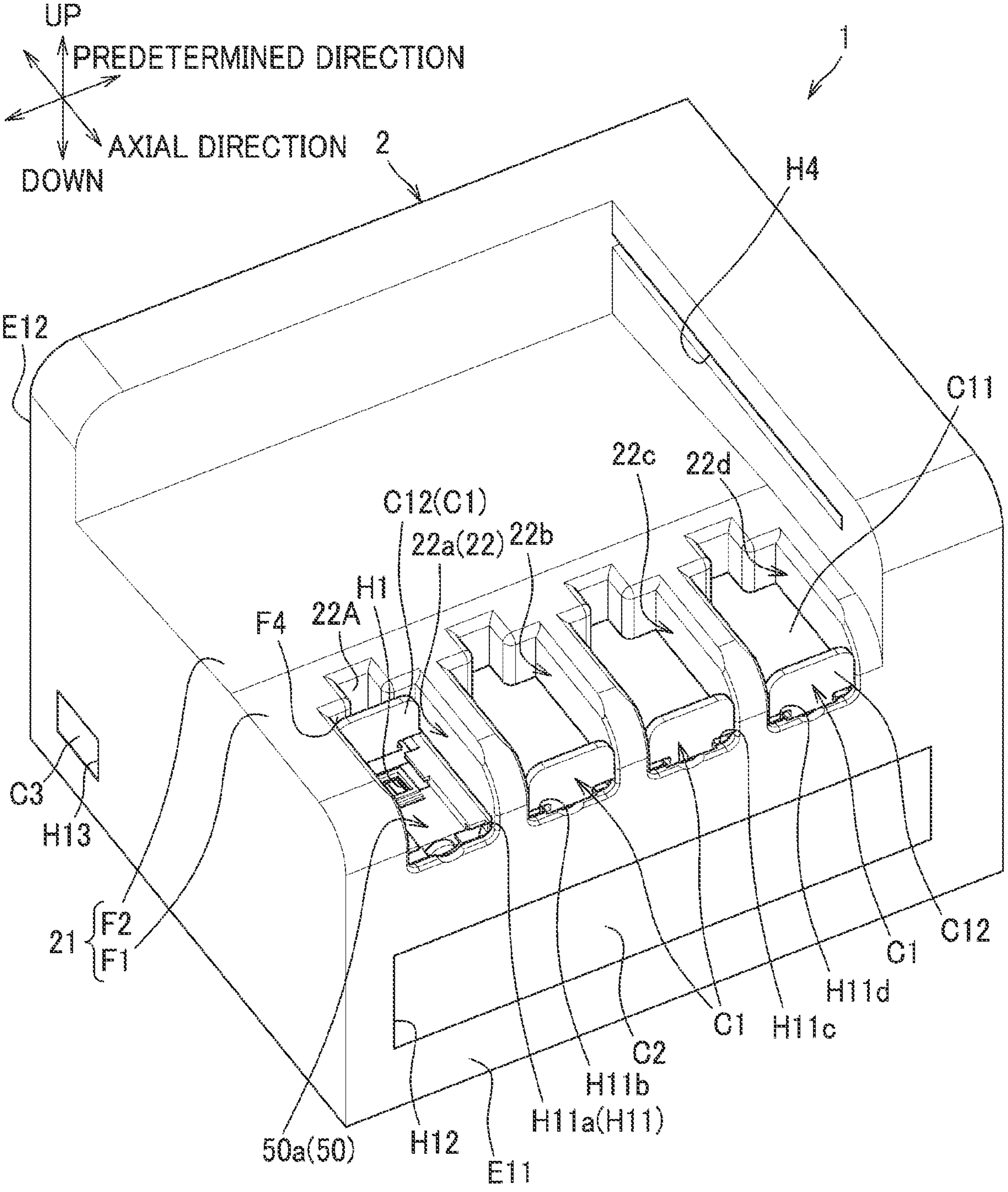
FIG. 4 is a perspective view of the multicolor printer without the toner boxes attached to the sub-tanks.

As shown in FIGS. 3 and 4, the box-housing recesses 22 are recesses for housing the toner boxes 40 attached to the sub-tanks 50. The four box-housing recesses 22*a*, 22*b*, 22*c*, 22*d* are spaced apart and arranged side-by-side in the predetermined direction. Each box-housing recess 22 is downwardly recessed from the first supporting surface F1. As shown in FIG. 4, each box-housing recess 22 has a first opening H11. Specifically, the main housing 2 has four first openings H11 (H11*a*, H11*b*, H11*c*, H11*d*) positioned at positions corresponding to the bottoms of the four box-housing recesses 22*a*, 22*b*, 22*c*, 22*d*.

The first openings H11 are openings for exposing supply ports H1 to the outside of the main housing 2. Each first opening H11 allows a part of the corresponding toner box 40 to pass therethrough. The toner box 40 can be attached to the sub-tank 50 through the first opening H11.

As shown in FIG. 3, a top surface F43 of each toner box 40 attached to the corresponding sub-tank 50 is positioned in a position corresponding to the first supporting surface F1 in the up-down direction. Specifically, when the toner boxes 40 are attached to the sub-tanks 50, the top surfaces F43 of the toner boxes 40 are approximately flush with the first supporting surface F1. Accordingly, when the toner boxes 40 are attached to the sub-tanks 50, the top surfaces F43 of the toner boxes 40 contact the sheet S ejected from the sheet ejection opening H4.

As shown in FIG. 5, the second opening H12 is an opening through which the development devices 70 can pass. In other words, the second opening H12 is an opening through which the development devices 70 are allowed to pass. The second opening H12 opens in the axial direction. The third opening H13 is an opening through which the waste toner box 90 can pass. In other words, the third opening H13 is an opening through which the waste toner box 90 is allowed to pass. The third opening H13 opens in the predetermined direction.

The multicolor printer 1 further includes a first cover C1, a second cover C2 as an example of a development cover, and a third cover C3. The first cover C1 is a cover for opening and closing the supply port H1 and the first opening H11. The first cover C1 is provided for each of the four sub-tanks 50*a*, 50*b*, 50*c*, 50*d*.

The first cover C1 is slidable in the axial direction relative to the main housing 2, between a closed position shown in FIG. 5 and an open position shown in FIG. 3. When the first cover C1 is positioned in the closed position, the first cover C1 closes the supply port H1 and the first opening H11. When the first cover C1 is positioned in the open position, the supply port H1 and the first opening H11 are opened. The first cover C1 is attached to the main housing 2. The first cover C1 is positioned in an upper part of the main housing 2.

The first cover C1 includes a cover portion C11 and a handle portion C12. The cover portion C11 covers the first opening H11. The handle portion C12 protrudes upward from the cover portion C11. Each box-housing recess 22 further has an opposing surface F4 and a recess 22A. The opposing surface F4 is opposed to the handle portion C12 in the axial direction. The recess 22A is recessed from the opposing surface F4. The recess 22A opens upward and toward the handle portion C12. The handle portion C12 is positioned closer to the opposing surface F4 when the first cover C1 is positioned in the open position than when the first cover C1 is positioned in the closed position.

The second cover C2 is a cover for opening and closing the second opening H12. The second cover C2 is rotatable relative to the main housing 2 about a lower end thereof. The main housing 2 has a first end E11 and a second end E12 positioned apart from each other in the axial direction. The second cover C2 is positioned at the first end E11 of the main housing 2.

The third cover C3 is a cover for opening and closing the third opening H13. The third cover C3 is rotatable relative to the main housing 2 about a lower end thereof.

As shown in FIG. 5, the main housing 2 further has a first box-guiding surface F5, a second box-guiding surface F6, and three partitions 23. The first box-guiding surface F5 and the second box-guiding surface F6 are surfaces for guiding the toner box 40. The first box-guiding surface F5 and the second box-guiding surface F6 are provided in each of the four box-housing recesses 22*a*, 22*b*, 22*c*, 22*d*. The first box-guiding surface F5 and the second box-guiding surface F6 are positioned at upper ends of each box-housing recess 22. The first box-guiding surface F5 is positioned at the first side of the box-housing recess 22. The second box-guiding surface F6 is positioned at the second side of the box-housing recess 22. The first box-guiding surface F5 and the second box-guiding surface F6 are inclined such that the surfaces F5, F6 come closer to each other as the surfaces F5, F6 extend downward.

As shown in FIG. 3, each partition 23 is disposed between two toner boxes 40 arranged side-by-side in the predetermined direction. The top surface of each partition 23 forms a part of the first supporting surface F1.

Figure 6B:
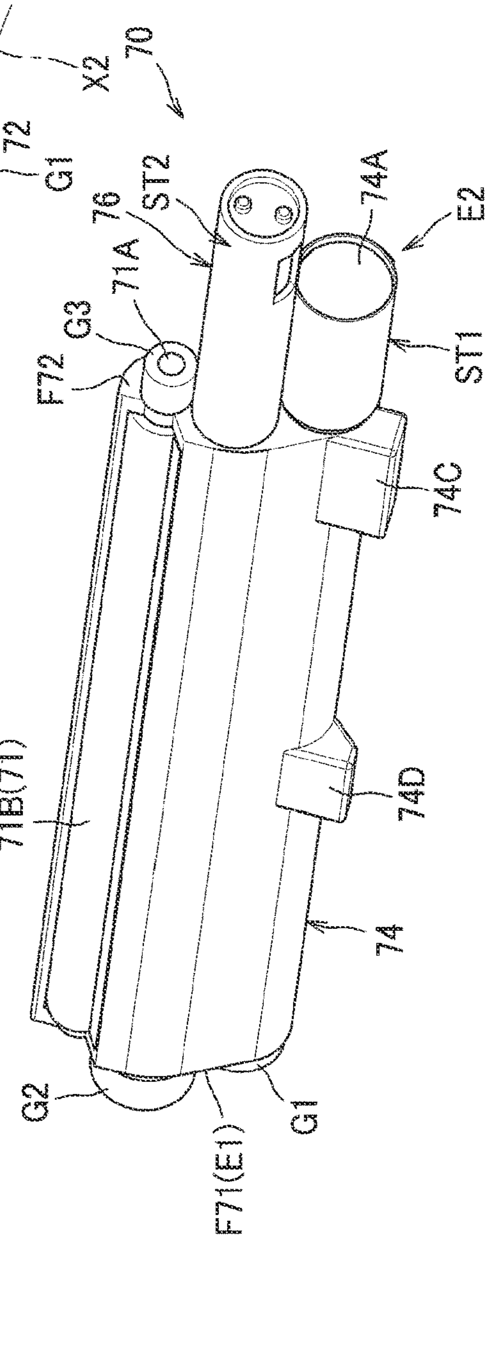
Figure 7:
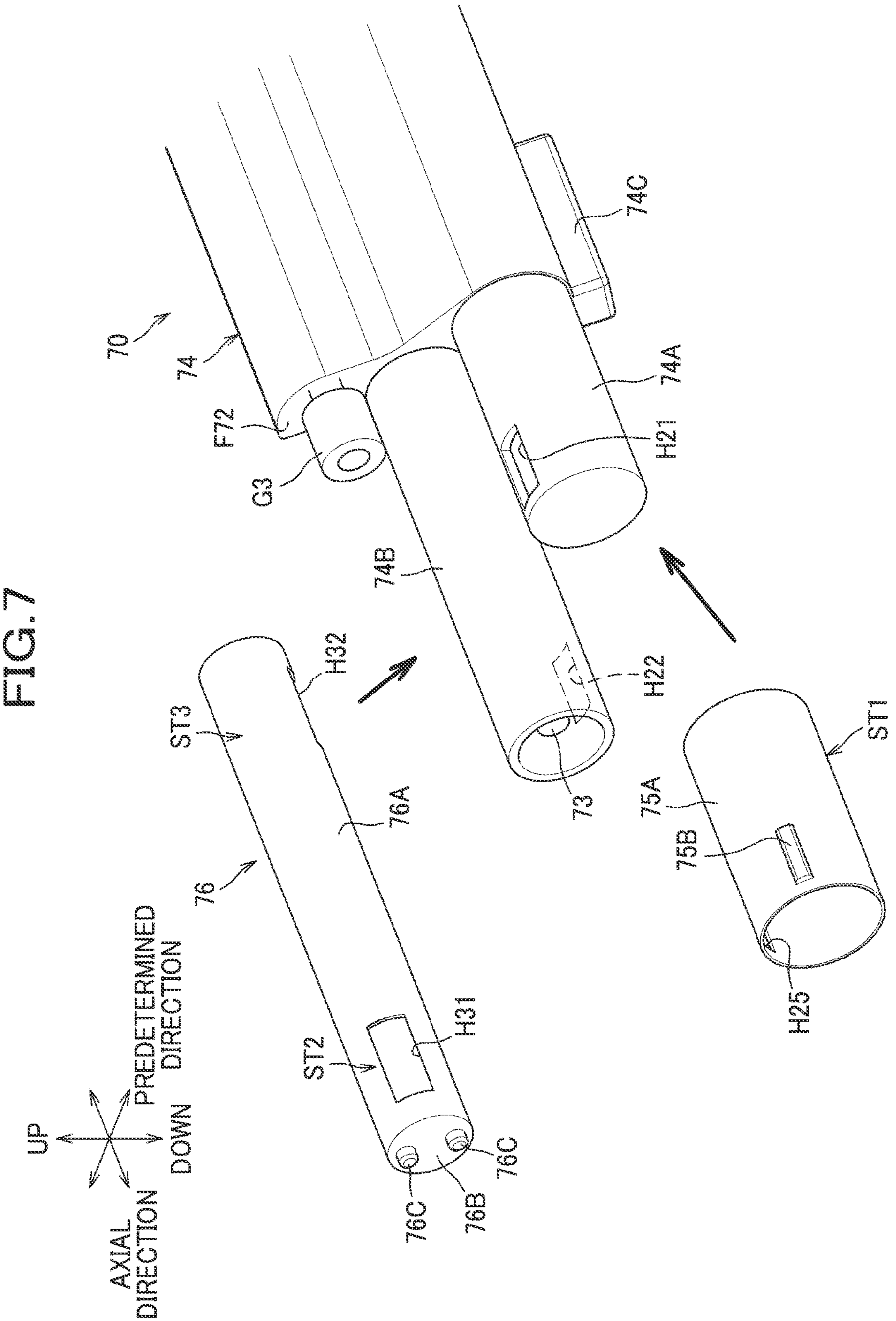
FIG. 7 is an exploded perspective view showing the relationship between a first shutter, a shutter unit and a housing of the development device.

As shown in FIGS. 6A and 6B, the development device 70 further includes a first shutter ST1, a shutter unit 76, a first gear G1, a second gear G2, and a development gear G3. As shown in FIG. 7, the housing 74 has a first surface F71 (FIGS. 6A and 6B), a second surface F72, a first cylindrical portion 74A, a second cylindrical portion 74B, a first development protrusion 74C, and a second development protrusion 74D (FIGS. 6A and 6B).

The roller body 71B of the development roller 71 is positioned between the first surface F71 and the second surface F72 in the axial direction. As shown in FIG. 11B, when the development device 70 is attached to the main housing 2, the second surface F72 is positioned farther, than the development roller 71, from the second opening H12. Referring back to FIGS. 6A and 6B, the first gear G1 and the second gear G2 are positioned at the first surface F71. The first shutter ST1, the shutter unit 76, the development gear G3, the first cylindrical portion 74A, and the second cylindrical portion 74B are positioned at the second surface F72.

In this embodiment, the first surface F71 corresponds to the first end E1 of the housing 74. The second surface F72, the first cylindrical portion 74A, and the second cylindrical portion 74B correspond to the second end E2 of the housing 74.

As shown in FIG. 7, the first cylindrical portion 74A and the second cylindrical portion 74B protrude from the second surface F72 in the axial direction. The dimension of the second cylindrical portion 74B is greater than the dimension of the first cylindrical portion 74A in the axial direction.

The first cylindrical portion 74A has an inlet H21. The inlet H21 is an opening for receiving toner delivered from the pipe 60 when the development device 70 is attached to the main housing 2. The inlet H21 faces upward when the development device 70 is attached to the main housing 2. The first cylindrical portion 74A is capable of containing toner therein. The inlet H21 is positioned between an outlet H22 which will be described later and the second surface F72.

The second cylindrical portion 74B has an outlet H22. The outlet H22 is an opening for discharging toner into the waste toner box 90 when the development device 70 is attached to the main housing 2. The outlet H22 faces downward when the development device 70 is attached to the main housing 2.

As shown in FIGS. 6A and 6B, the first development protrusion 74C and the second development protrusion 74D are spaced apart and arranged side-by-side in the axial direction. The first development protrusion 74C is positioned between the second development protrusion 74D and the first shutter ST1 in the axial direction. The dimension of the first development protrusion 74C is greater than the dimension of the second development protrusion 74D in the axial direction. The development roller 71 is positioned between the second opening H12, and the pipe 60 (FIG. 2) and the inlet H21 (FIG. 2).

Figure 10A:
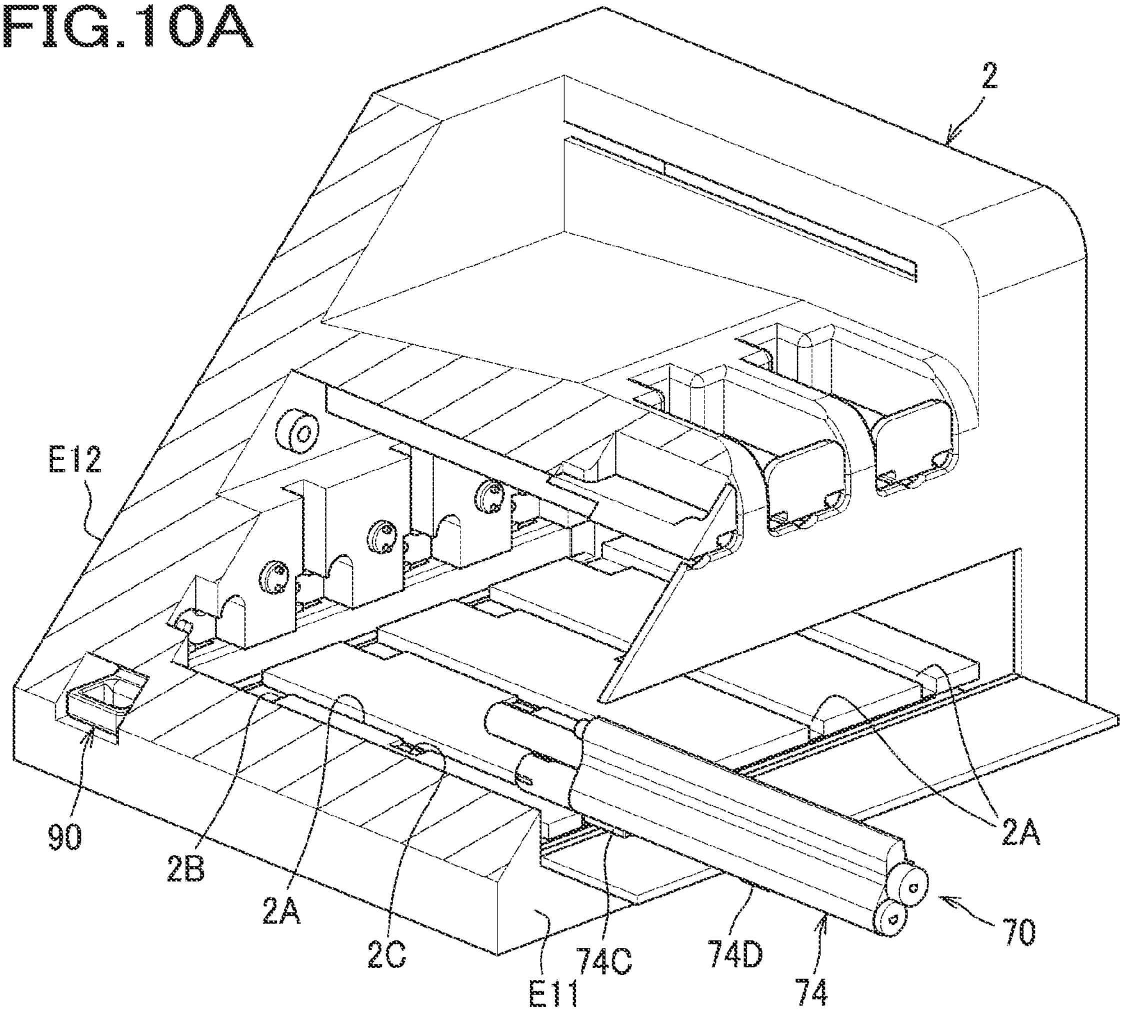
FIG. 10A is a perspective view showing the development device passing through a second opening of the main housing when the development device is being installed.

As shown in FIG. 10A, the main housing 2 has a guide groove 2A for guiding the development device 70 in the axial direction. One guide groove 2A is provided for each of the four development devices 70*a*, 70*b*, 70*c*, 70*d*. The guide grooves 2A open upward. The first development protrusion 74C and the second development protrusion 74D are allowed to enter the corresponding guide groove 2A.

Figure 10B:
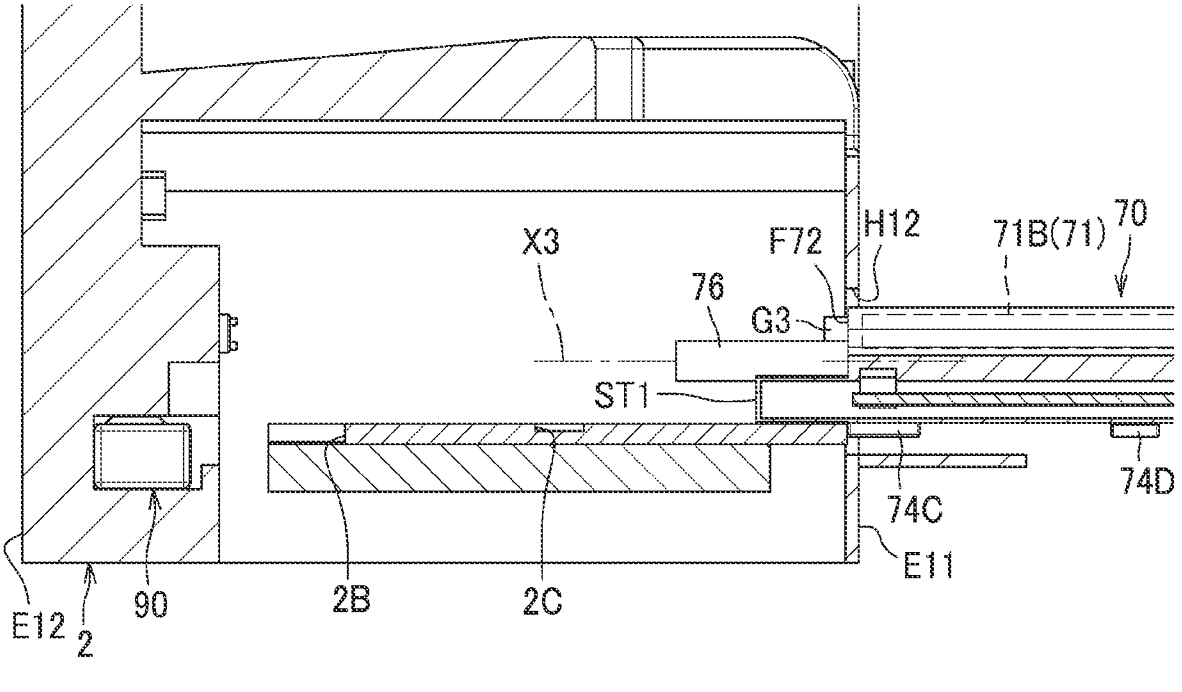
FIG. 10B is a cross-sectional view showing the development device passing through the second opening of the main housing when the development device is being installed.

Each guide groove 2A has a first recess 2B and a second recess 2C on a side (one side in the predetermined direction) thereof. The first recess 2B and the second recess 2C open upward and into the guide groove 2A. As shown in FIG. 10B, the second recess 2C is positioned between the first recess 2B and the second opening H12 in the axial direction. The dimension of the first recess 2B is greater than the dimension of the second recess 2C in the axial direction.

The dimension of the first recess 2B is greater than the dimension of the first development protrusion 74C in the axial direction. The dimension of the second recess 2C in the axial direction is smaller than the dimension of the first development protrusion 74C in the axial direction, and greater than the dimension of the second development protrusion 74D in the axial direction. Since the dimension of the second recess 2C is smaller than the dimension of the first development protrusion 74C in the axial direction, the first development protrusion 74C is restrained from getting caught in the second recess 2C when the development device 70 is moved along the guide groove 2A in the axial direction.

As shown in FIG. 11B, when the development device 70 is attached to the main housing 2, the first development protrusion 74C is positioned within the boundaries of the first recess 2B in the axial direction. When the development device 70 is attached to the main housing 2, the second development protrusion 74D is positioned within the boundaries of the second recess 2C in the axial direction. Herein, “when the development device 70 is attached to the main housing 2” refers to the development device 70 being positioned in an installed position in the axial direction, as shown in FIG. 11B. Further, “installed position” refers to the axial position of the development device 70 during an image forming process.

Figure 12A:
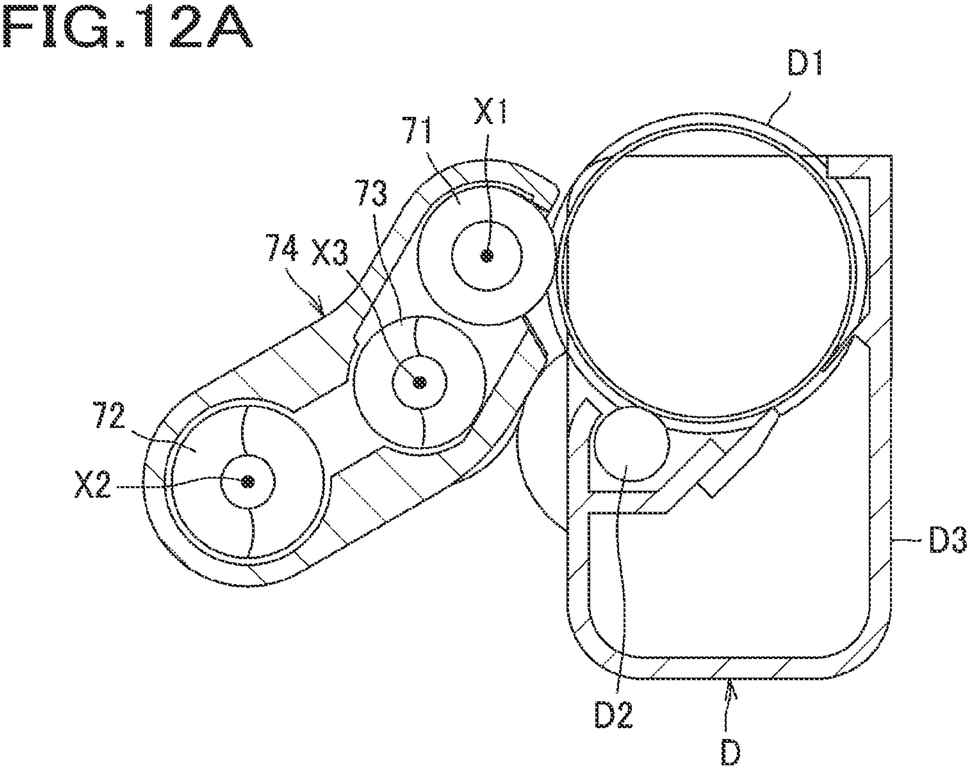
FIG. 12A is an illustration showing the housing positioned in a contact position.
Figure 12B:
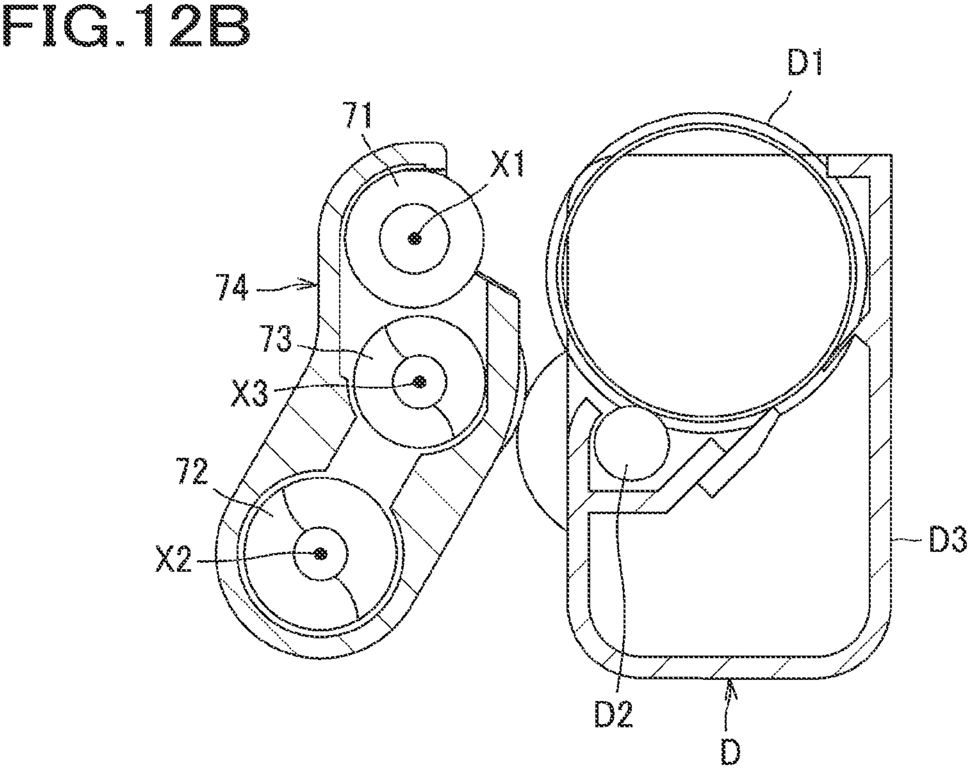
FIG. 12B is an illustration showing the housing positioned in a separated position.

The housing 74 is rotatable about the second auger axis X3 when the development device 70 is attached to the main housing 2. Specifically, the housing 74 is rotatable between a contact position shown in FIG. 12A and a separated position shown in FIG. 12B. When the housing 74 is positioned in the contact position, the development roller 71 is in contact with the photosensitive drum D1. When the housing 74 is positioned in the separated position, the development roller 71 is separated from the photosensitive drum D1.

Figure 13A:
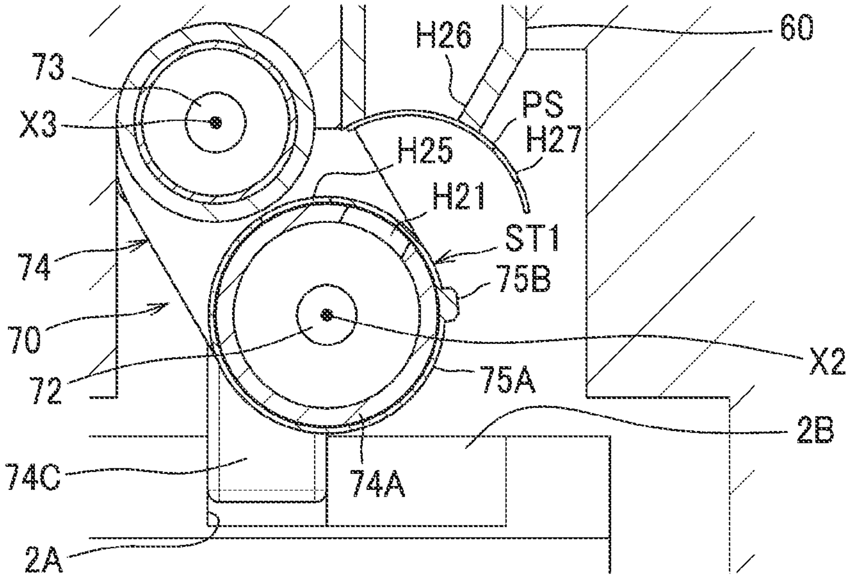
FIG. 13A is an illustration showing the relationship between the first shutter and a pipe shutter where the housing is positioned in the separated position and the first shutter and the pipe shutter are both closed.
Figure 13B:
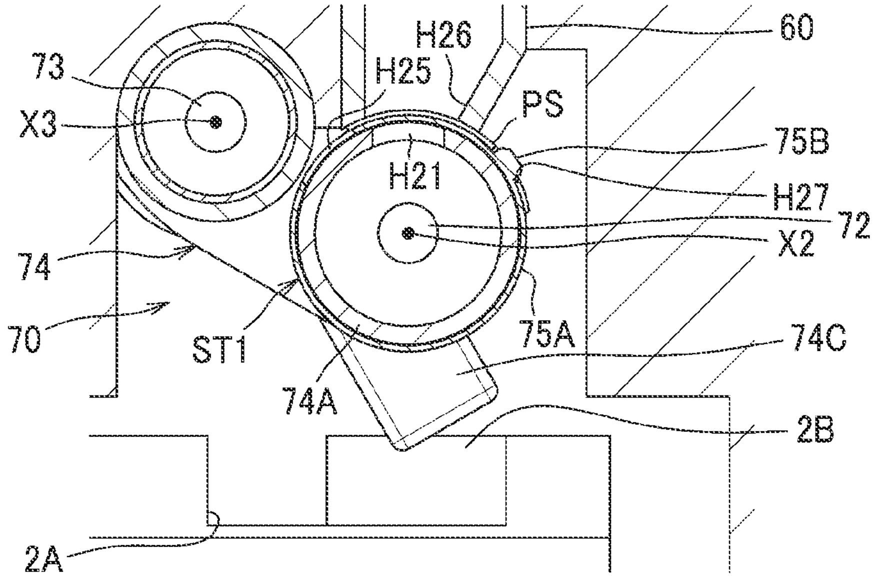
FIG. 13B is an illustration showing the relationship between the first shutter and the pipe shutter where the housing is positioned in the contact position and the first shutter and the pipe shutter are both closed.
Figure 13C:
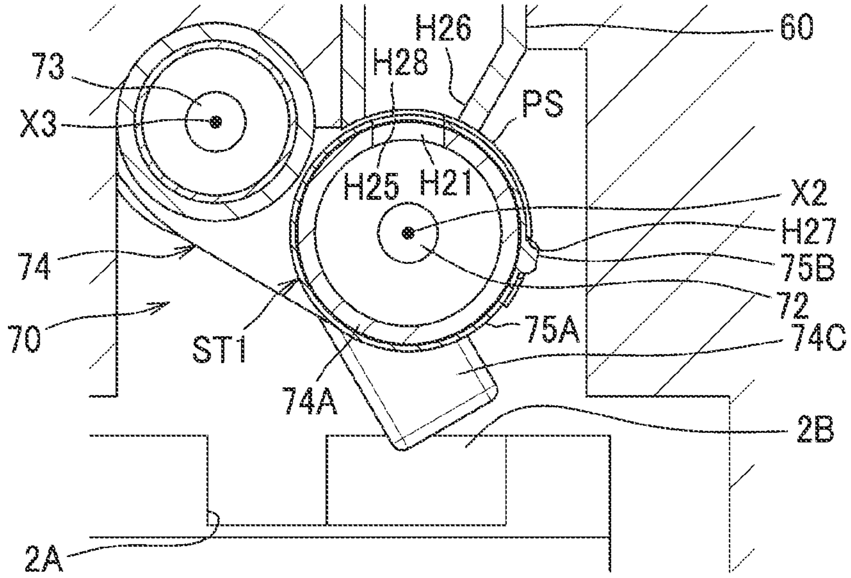
FIG. 13C is an illustration showing the relationship between the first shutter and the pipe shutter where the housing is positioned in the contact position and the first shutter and the pipe shutter are both open.

As shown in FIGS. 13A to 13C, the first development protrusion 74C is allowed to move in the first recess 2B when the housing 74 rotates. Further, although not shown in the drawings, the second development protrusion 74D is allowed to move in the second recess 2C when the housing 74 rotates. The development device 70 is thereby allowed to rotate without interfering with the main housing 2.

Figures 8A, 8B:
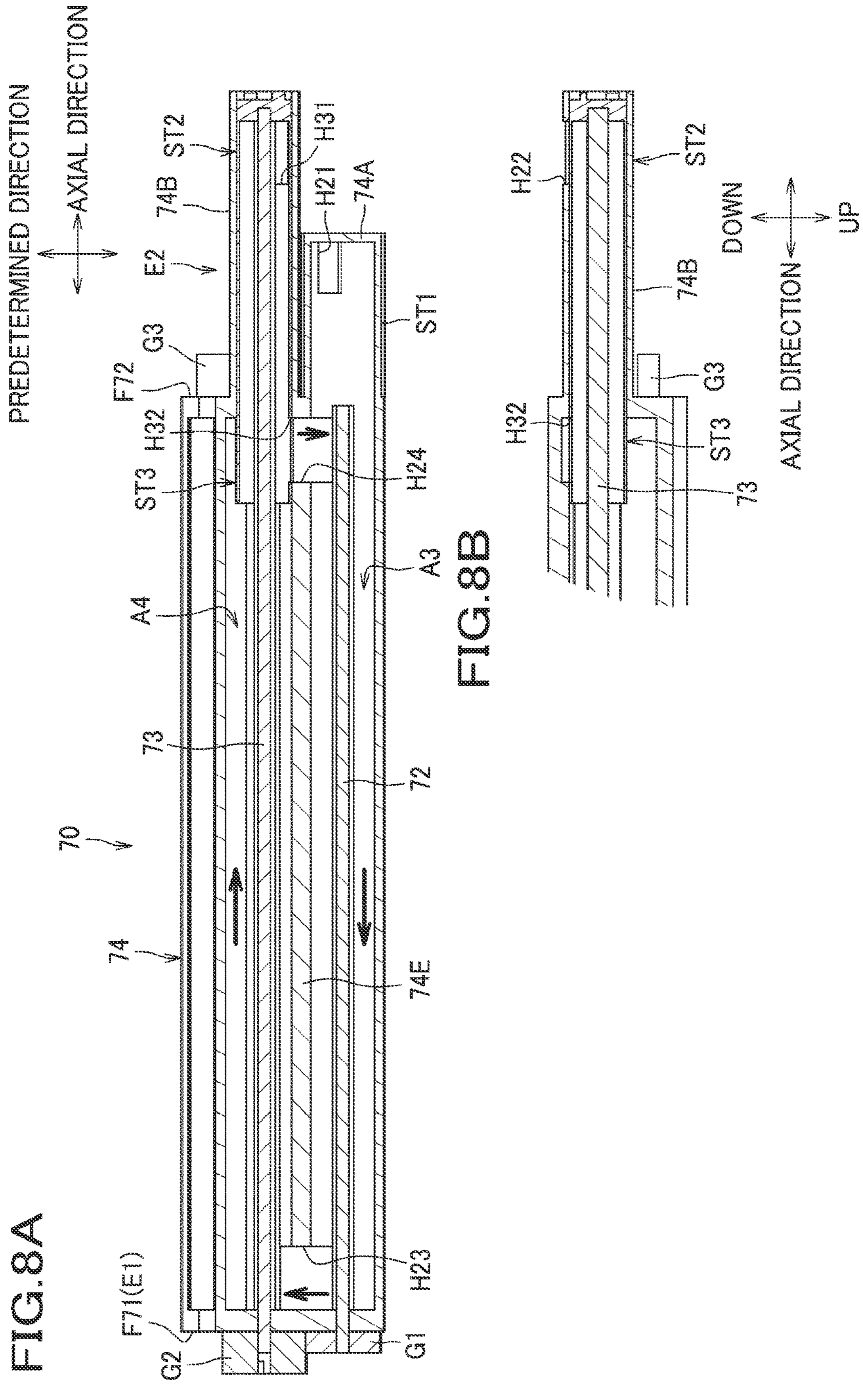
FIGS. 8A and 8B are cross-sectional views of the development device with a second shutter closed and a third shutter open.

As shown in FIGS. 8A and 8B, the housing 74 further includes a partition wall 74E. The partition wall 74E is a wall that divides a space inside the housing 74 into a first space A3 including the first auger 72 and a second space A4 including the second auger 73. Herein, only the rotation axis of the first auger 72 and the rotation axis of the second auger 73 are shown in the drawings and helical blades are omitted.

The first auger 72 conveys toner in the axial direction from the second end E2 of the housing 74 toward the first end E1 of the housing 74. The second auger 73 conveys toner in the axial direction from the first end E1 of the housing 74 toward the second end E2 of the housing 74. In other words, the first auger 72 conveys toner in the axial direction toward the second opening H12 (see FIG. 2) when the development device 70 is attached to the main housing 2. The second auger 73 conveys toner in the axial direction away from the second opening H12 when the development device 70 is attached to the main housing 2.

The partition wall 74E is positioned between the first auger 72 and the second auger 73. The partition wall 74E has a feed port H23 and a return port H24. The feed port H23 is an opening through which toner conveyed by the first auger 72 is allowed to pass. The return port H24 is an opening through which toner conveyed by the second auger 73 is allowed to pass.

The feed port H23 and the return port H24 are connected to the first space A3 and to the second space A4. The feed port H23 is positioned at an end of the partition wall 74E closer to the first surface F71 in the axial direction. The return port H24 is positioned at an end of the partition wall 74E closer to the second surface F72 in the axial direction.

As shown in FIGS. 6A, 6B and 7, the first shutter ST1 is a shutter for opening and closing the inlet H21. The first shutter ST1 is movable between a first open position to open the inlet H21 and a first closed position to close the inlet H21.

The first shutter ST1 includes a base portion 75A and a protrusion 75B. The base portion 75A is shaped as a cylinder. The base portion 75A is fitted on the outer periphery of the first cylindrical portion 74A. The base portion 75A is rotatable relative to the first cylindrical portion 74A. The base portion 75A is rotatable about the first auger axis X2. The base portion 75A has a hole H25.

As shown in FIG. 13C, when the first shutter ST1 is positioned in the first open position, the hole H25 is aligned with the inlet H21. As shown in FIG. 13B, when the first shutter ST1 is positioned in the first closed position, the hole H25 is positioned away from the inlet H21 in the circumferential direction of the first cylindrical portion 74A.

As shown in FIG. 13A, the pipe 60 has a pipe opening H26 for delivering toner to the development device 70. As shown in FIG. 13C, the inlet H21 is opposed to the pipe opening H26 when the development device 70 is attached to the main housing 2 and the housing 74 is positioned in place in the contact position relative to the main housing 2.

The multicolor printer 1 further includes a pipe shutter PS for opening and closing the pipe opening H26. The pipe shutter PS is movable between a fourth open position shown in FIG. 13C and a fourth closed position shown in FIG. 13B. When the pipe shutter PS is positioned in the fourth open position, the pipe opening H26 is opened. When the pipe shutter PS is positioned in the fourth closed position, the pipe shutter PS closes the pipe opening H26. A drive force from a motor (not shown) mounted to the main housing 2 causes the pipe shutter PS to rotate.

The pipe shutter PS is shaped as an arc that follows the outer peripheral surface of the first shutter ST1. As shown in FIG. 13C, the pipe shutter PS has a hole H27 and an opening H28.

The hole H27 is a hole in which the projection 75B of the first shutter ST1 is fitted. When the projection 75B is fitted in the hole H27, the pipe shutter PS is rotatable about the first auger axis X2 together with the first shutter ST1.

When the projection 75B is fitted in the hole H27, the first cylindrical portion 74A is positioned in place relative to the pipe 60 via the first shutter ST1 and the pipe shutter PS. Thus, the first shutter ST1 is movable between the first closed position and the first open position on the condition that the development device 70 is attached to the main housing 2, the first cylindrical portion 74A is positioned in place relative to the pipe 60, and the inlet H21 is opposed to the pipe opening H26.

The opening H28 is an opening that opens the pipe opening H26 (refer also to FIG. 2). The opening H28 is aligned with the hole H25 of the first shutter ST1 when the projection 75B is fitted in the hole H27. Thus, the opening H28 is aligned with the hole H25 regardless of the position of the pipe shutter PS.

As shown in FIG. 7, the shutter unit 76 includes a base portion 76A, a bottom wall 76B, and two protrusions 76C. The base portion 76A is a cylindrical part. The base portion 76A is fitted into the second cylindrical portion 74B and is in contact with an inner circumferential surface of the second cylindrical portion 74B. The base portion 76A is rotatable relative to the second cylindrical portion 74B. The base portion 76A is rotatable about the second auger axis X3.

The bottom wall 76B is positioned at an end (one end in the axial direction) of the cylindrical base portion 76A. The bottom wall 76B covers an opening of the second cylindrical portion 74B. The protrusions 76C protrude from a side of the bottom wall 76B opposite to the base portion 76A. A drive force from a motor (not shown) mounted to the main housing 2 is transmitted to the protrusions 76C. The drive force from the motor thereby causes the shutter unit 76 to rotate.

Herein, the motor of the shutter unit 76 may be a motor different from the motor of the pipe shutter PS. Alternatively, the shutter unit 76 and the pipe shutter PS may be driven individually by a common motor using a clutch.

The base portion 76A has a first hole H31 and a second hole H32. The first hole H31 is a hole that opens the outlet H22 of the housing 74. The second hole H32 is a hole that opens the return port H24 (see FIGS. 8A and 8B) of the housing 74. The cylindrical part of the base portion 76A including the first hole H31 is the second shutter ST2. The cylindrical part of the base portion 76A including the second hole H32 is the third shutter ST3. That is, in this embodiment, the second shutter ST2 and the third shutter ST3 are formed integrally in one piece.

Figure 9A:
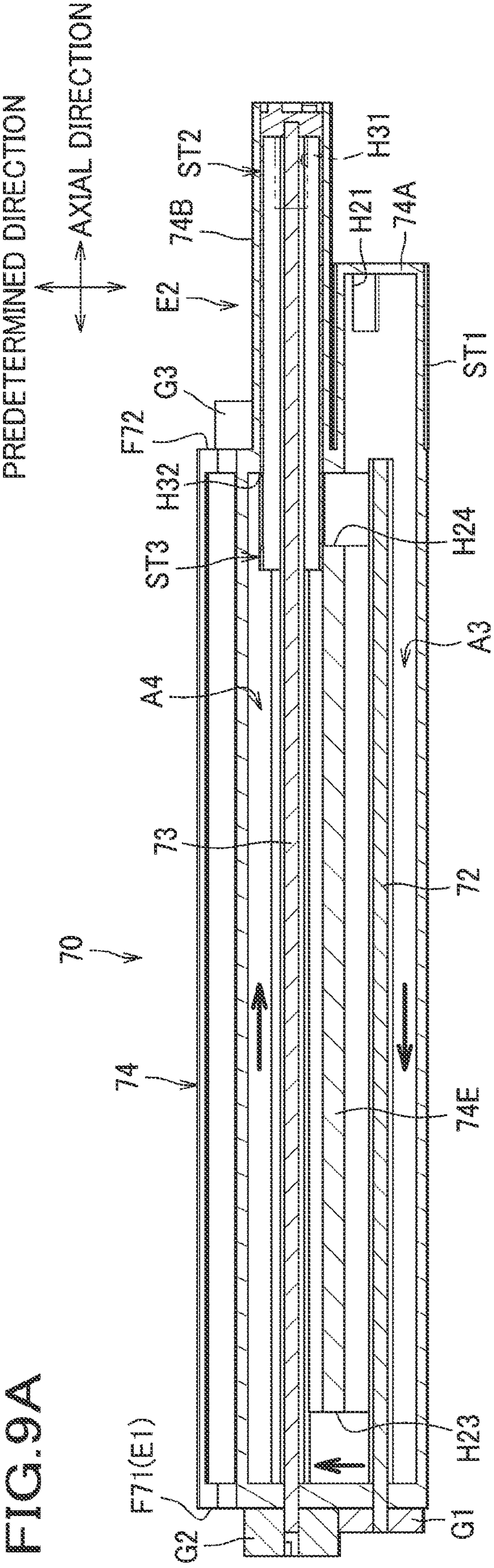
FIGS. 9A and 9B are cross-sectional views of the development device with the second shutter open and the third shutter closed.
Figure 9B:
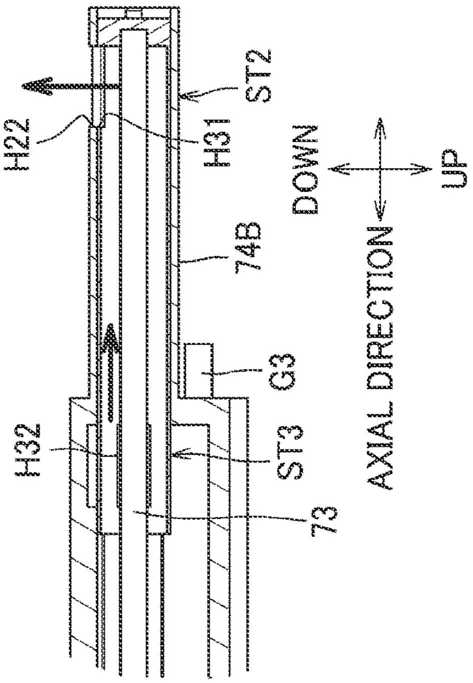
Figure 14A:
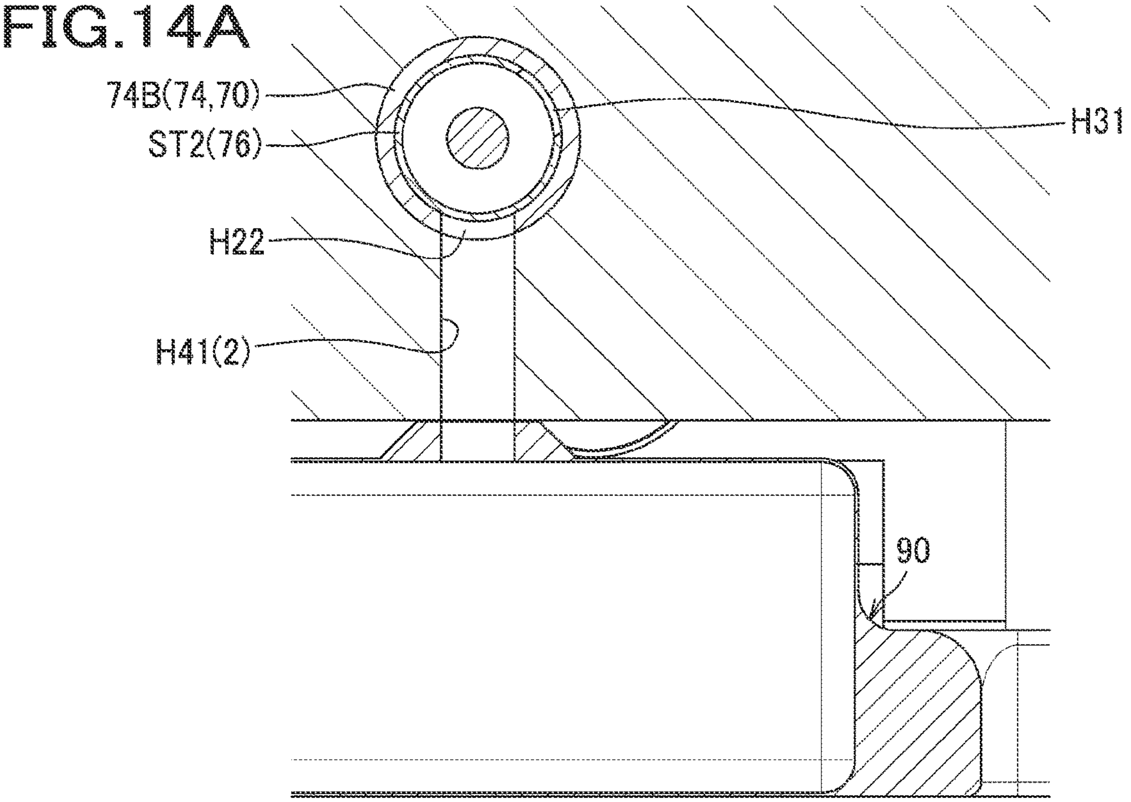
FIG. 14A is an illustration showing the second shutter in a closed state.
Figure 14B:
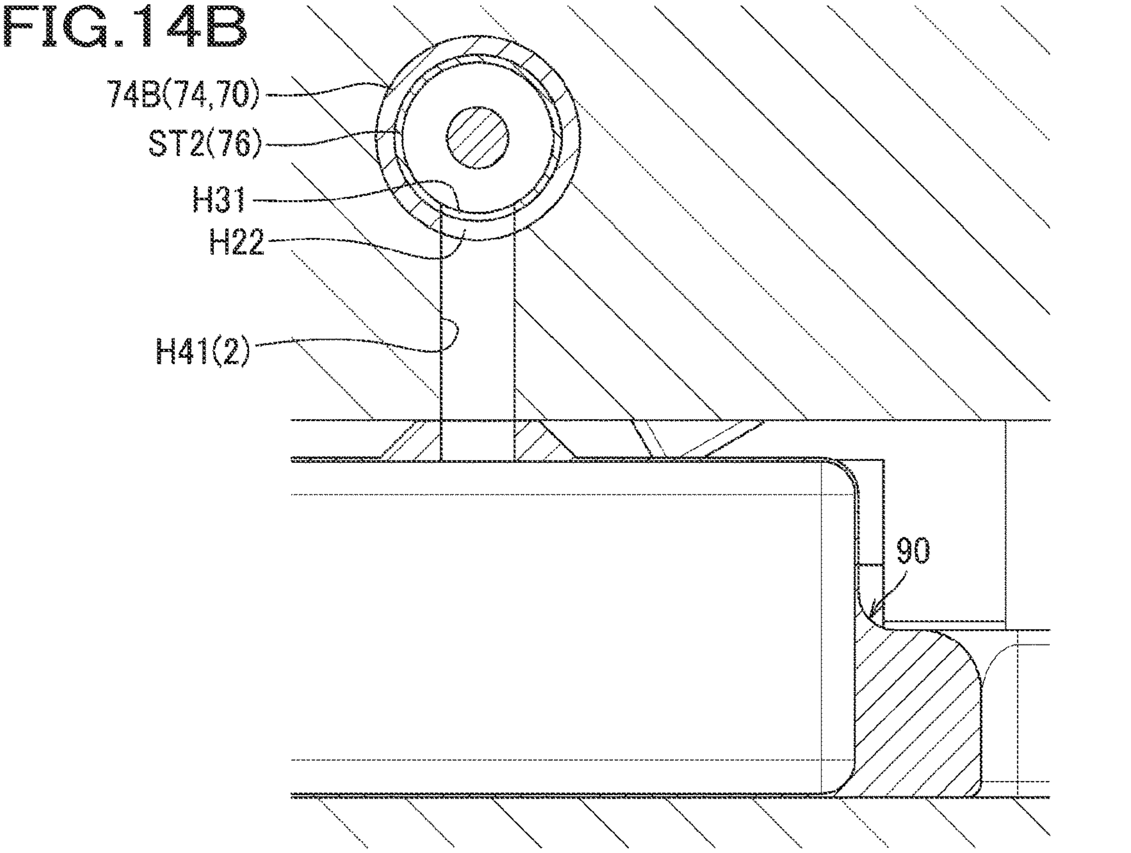
FIG. 14B is an illustration showing the second shutter in an open state.

The second shutter ST2 is movable between a second closed position shown in FIGS. 8B and 14A, and a second open position shown in FIGS. 9B and 14B. When the second shutter ST2 is positioned in the second closed position, the second shutter closes the outlet H22. When the second shutter ST2 is positioned in the second open position, the outlet H22 is opened. The second shutter ST2 is movable between the second closed position and the second open position on the condition that the development device 70 is attached to the main housing 2, the first cylindrical portion 74A is positioned in place relative to the pipe 60, and the inlet H21 is opposed to the pipe opening H26.

The third shutter ST3 is movable between a third open position shown in FIG. 8A and a third closed position shown in FIG. 9A. When the third shutter ST3 is positioned in the third open position, the return port H24 is opened. When the third shutter ST3 is positioned in the third closed position, the third shutter ST3 closes the return port H24. The third shutter ST3 is movable between the third closed position and the third open position on the condition that the development device 70 is attached to the main housing 2 and the first cylindrical portion 74A is positioned in place relative to the pipe 60.

As shown in FIGS. 14A and 14B, the main housing 2 further has a main housing passage H41. The main housing passage H41 is a passage for delivering toner discharged through the outlet H22 of the development device 70 to the waste toner box 90. The main housing passage H41 extends in the up-down direction.

As shown in FIG. 6A, the first auger 72 has a first end and a second end positioned apart from each other in the axial direction. The second auger 73 has a first end and a second end positioned apart from each other in the axial direction. The first gear G1 is positioned at the first end of the first auger 72. The first gear G1 is rotatable together with the first auger 72. The first gear G1 is engaged with the second gear G2. The outer diameter of the first gear G1 is smaller than the outer diameter of the second gear G2.

The second gear G2 is positioned at the first end of the second auger 73. The second gear G2 is rotatable together with the second auger 73.

As shown in FIG. 6B, the development roller shaft 71A has a first end and a second end positioned apart from each other in the axial direction. The development gear G3 is positioned at the second end of the development roller shaft 71A. The development gear G3 is rotatable together with the development roller 71.

Figure 11A:
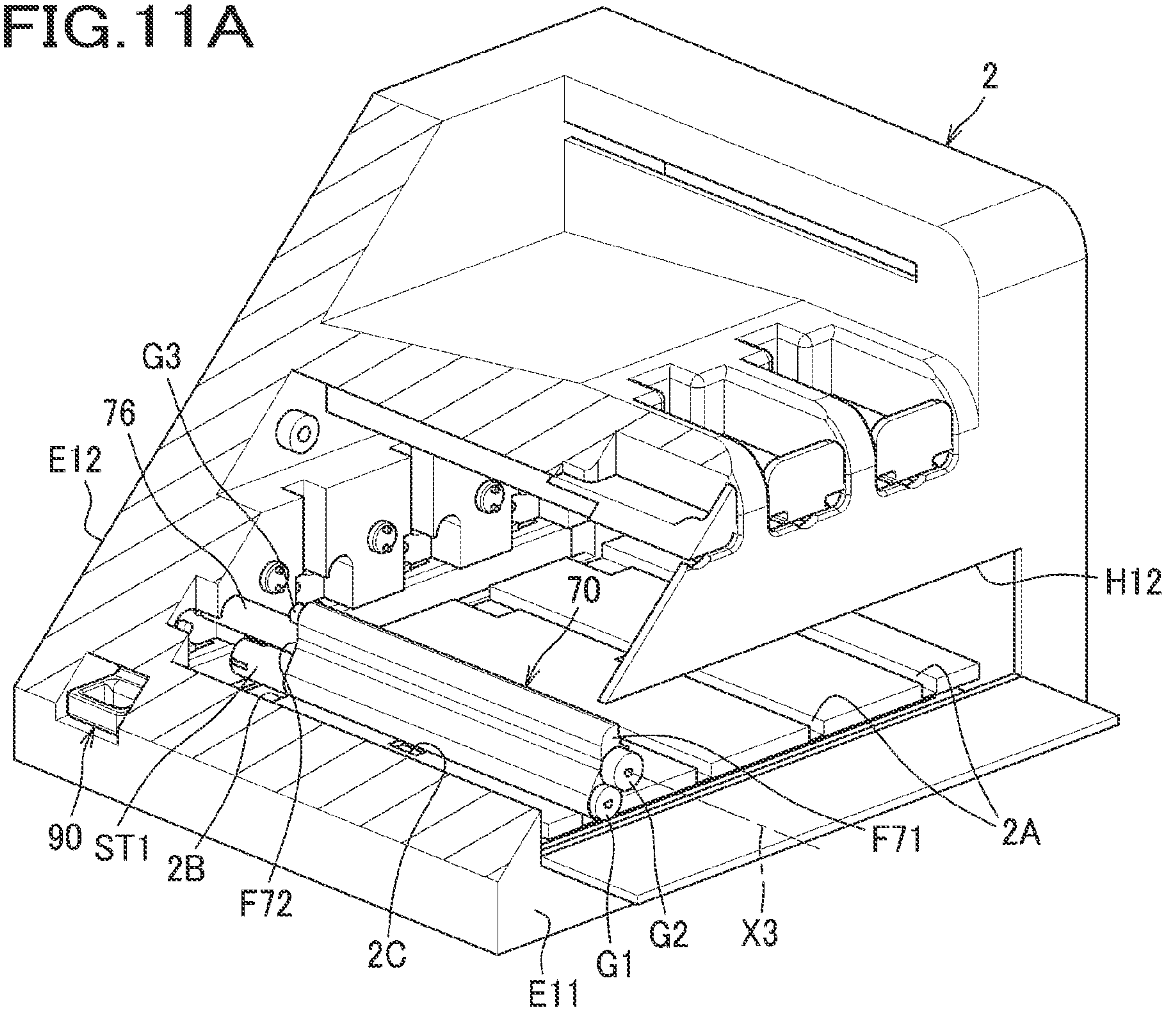
FIG. 11A is a perspective view showing the development device attached to the main housing.
Figure 11B:
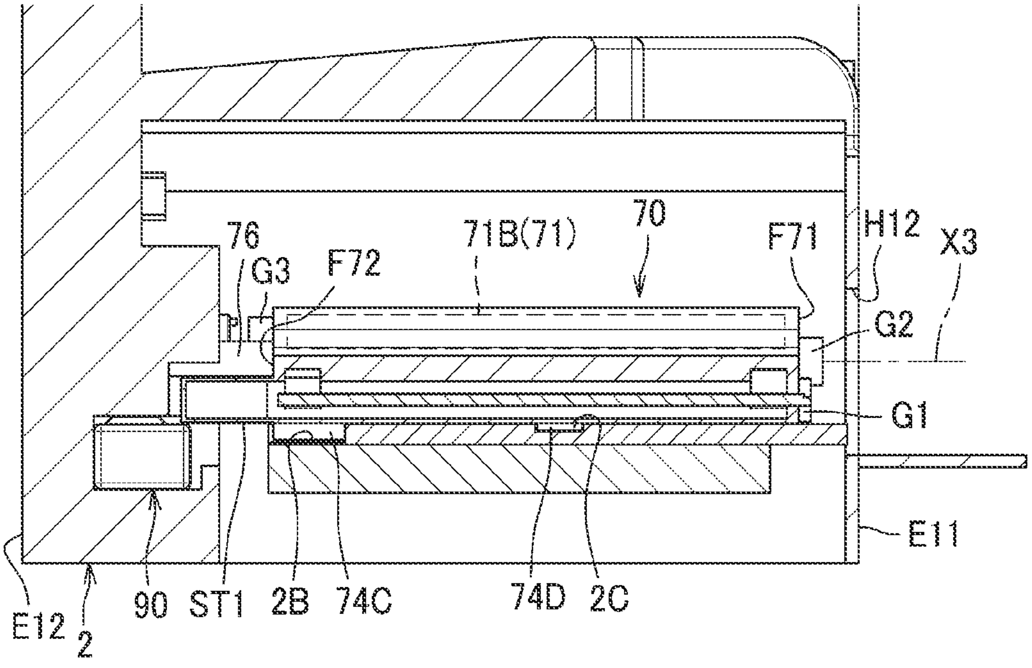
FIG. 11B is a cross-sectional view showing the development device attached to the main housing.

As shown in FIGS. 11A and 11B, the first gear G1 and the second gear G2 are positioned at the first end E11 of the main housing 2 when the development device 70 is attached to the main housing 2. The first gear G1 and the second gear G2 are positioned closer, than the roller body 71B of the development roller 71, to the second opening H12 in the axial direction when the development device 70 is attached to the main housing 2.

The development gear G3, the first shutter ST1, and the shutter unit 76 are positioned at the second end E12 of the main housing 2 when the development device 70 is attached to the main housing 2. The inlet H21 and the outlet H22 shown in FIG. 7 are thereby positioned at the second end E12 of the main housing 2 when the development device 70 is attached to the main housing 2. Further, the first gear G1 and the second gear G2 are positioned closer, than the inlet H21 and the outlet H22, to the second opening H12 when the development device 70 is attached to the main housing 2.

Figure 15A:
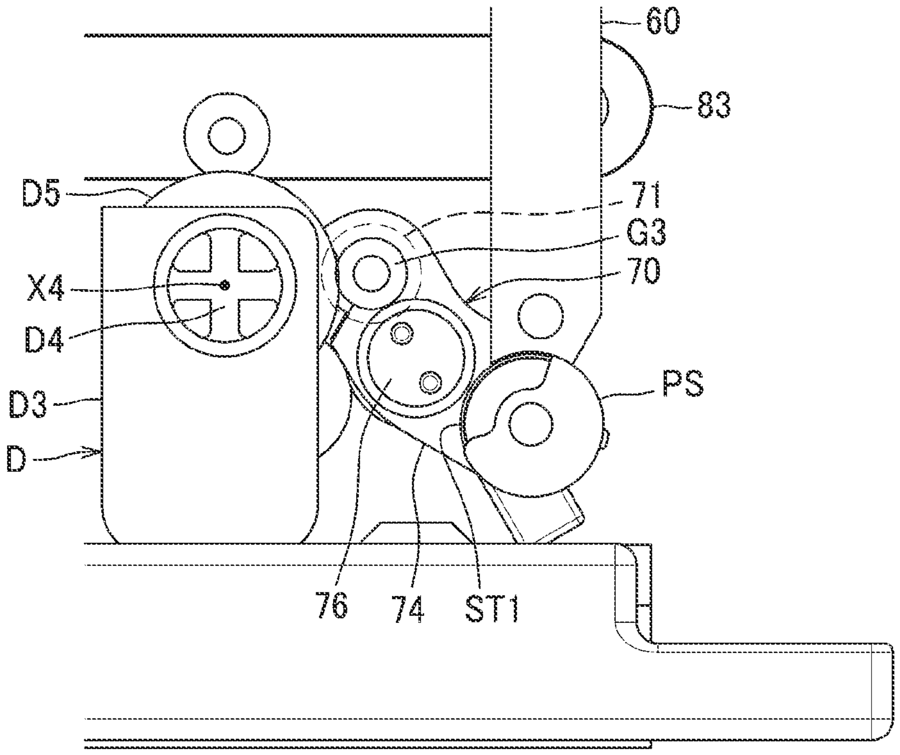
FIG. 15A is an illustration showing the structures of a drum unit and the development device at one of the ends thereof in an axial direction.
Figure 15B:
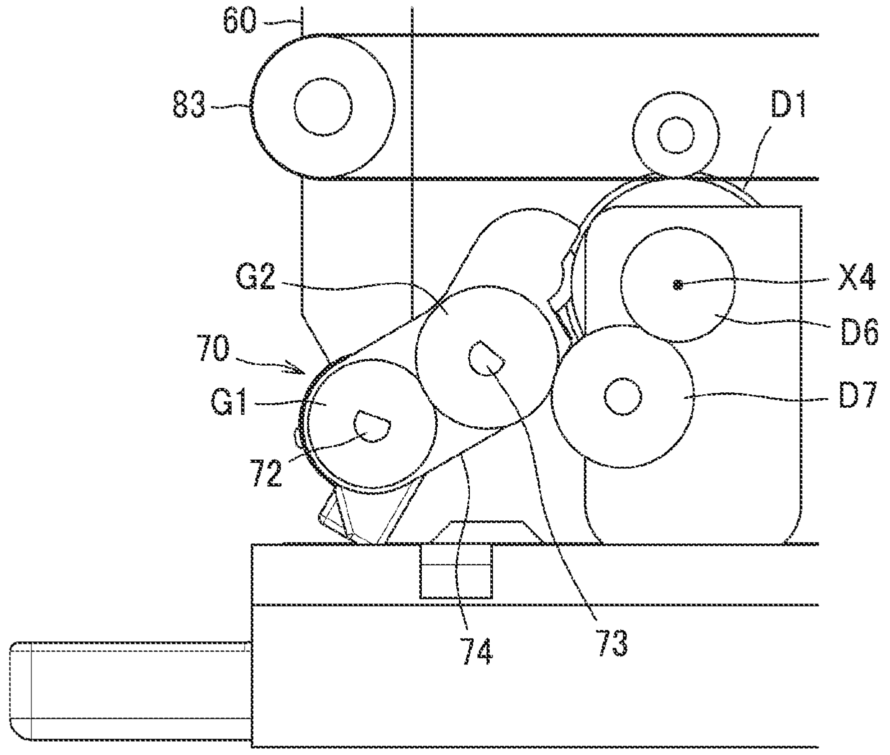
FIG. 15B is an illustration showing the structures of the drum unit and the development device at the other of the ends thereof in the axial direction.

As shown in FIGS. 15A and 15B, the drum unit D further includes a drum coupling D4, a second drum gear D5, a first drum gear D6, and an idle gear D7. The first drum gear D6 and the idle gear D7 are positioned at the first end E11 of the main housing 2 when the development device 70 and the drum unit D are attached to the main housing 2. The drum coupling D4 and the second drum gear D5 are positioned at the second end E12 of the main housing 2 when the development device 70 and the drum unit D are attached to the main housing 2.

The drum coupling D4, the second drum gear D5, and the first drum gear D6 are rotatable about the drum axis X4 together with the photosensitive drum D1. The photosensitive drum D1 has a first end and a second end positioned apart from each other in the axial direction. The first drum gear D6 is positioned at the first end of the photosensitive drum D1. The drum coupling D4 and the second drum gear D5 are positioned at the second end of the photosensitive drum D1. A drive force of a motor (not shown) mounted to the main housing 2 is transmitted to the drum coupling D4.

The second drum gear D5 is engaged with the development gear G3 when the development device 70 and the drum unit D are attached to the main housing 2. Specifically, the second drum gear D5 is engaged with the development gear G3 when the housing 74 of the development device 70 is positioned in the contact position. The development gear G3 is separated from the second drum gear D5 when the housing 74 of the development device 70 is positioned in the separated position.

The first drum gear D6 is engaged with the idle gear D7. The idle gear D7 is engaged with the second gear G2 when the development device 70 and the drum unit D are attached to the main housing 2. The idle gear D7 is always engaged with the second gear G2 regardless of whether the housing 74 of the development device 70 is positioned in the contact position or the separated position.

The drive force input to the drum coupling D4 is transmitted to the development gear G3 via the second drum gear D5. This causes the development roller 71 to rotate. The drive force transmitted to the second drum gear D5 is transmitted to the first drum gear D6 via the photosensitive drum D1. The drive force transmitted to the first drum gear D6 is transmitted to the first gear G1 via the idle gear D7 and the second gear G2. This causes the first auger 72 and the second auger 73 to rotate.

The controller 100 includes a central processing unit (CPU), a read-only memory (ROM), a random-access memory (RAM), etc. The controller 100 is configured to execute various processes according to prestored programs, in response to printing commands. The controller 100 has a function of moving the first shutter ST1 from the first closed position to the first open position on the condition that the second shutter ST2 is positioned in the second closed position and the third shutter ST3 is positioned in the third open position. Further, the controller 100 has a function of moving the second shutter ST2 from the second closed position to the second open position and the third shutter ST3 from the third open position to the third closed position on the condition that the first shutter ST1 is positioned in the first closed position.

The controller 100 is capable of executing a supplying process, a waste toner discharging process, and a printing process. Toner is supplied from the pipe 60 to the development device 70 in the supplying process. Deteriorated toner contained in the development device 70 is discharged to the waste toner box 90 in the waste toner discharging process. An image is formed on the sheet S in the printing process. In the supplying process and the printing process, the controller 100 positions the first shutter ST1 in the first open position, the second shutter ST2 in the second closed position, and the third shutter ST3 in the third open position. Toner can thereby be supplied from the pipe 60 to the development device 70. Further, since toner is allowed to pass through the return port H24, toner can be circulated inside the development device 70.

In the waste toner discharging process, the controller 100 positions the first shutter ST1 in the first closed position, the second shutter ST2 in the second open position, and the third shutter ST3 in the third closed position. Toner can thereby be discharged from the development device 70 to the waste toner box 90. Further, since passage of toner through the return port H24 is restricted by the third shutter ST3, toner contained in the development device 70 can be smoothly discharged.

The controller 100 is configured to move the first shutter ST1 and the second shutter ST2 so that the second shutter ST2 is not positioned in the second open position when the first shutter ST1 is positioned in the first open position. It is to be understood that the second shutter ST2 and the third shutter ST3 are formed integrally in one piece in this embodiment and thus move in conjunction with each other. Accordingly, movement of the second shutter ST2 will be described in the following description and description of movement of the third shutter ST3 will be omitted as appropriate.

When the controller 100 switches from the printing process to the waste toner discharging process, the controller 100 positions the first shutter ST1 in the first closed position, and then positions the second shutter ST2 in the second open position. New toner supplied from the pipe 60 to the development device 70 is thereby restrained from being accidentally discharged from the outlet H22.

When the controller 100 switches from the waste toner discharging process to the supplying process, the controller 100 positions the second shutter ST2 in the second closed position, and then positions the first shutter ST1 in the first open position. New toner supplied from the pipe 60 to the development device 70 is thereby restrained from being accidentally discharged from the outlet H22.

The multicolor printer 1 further includes a first shutter sensor and a second shutter sensor (not shown). The first shutter sensor detects a position of the first shutter ST1. The second shutter sensor detects a position of the shutter unit 76. The controller 100 is capable of determining the open/closed state of the first shutter ST1 based on a signal from the first shutter sensor. The controller 100 is capable of determining the open/closed state of the second shutter ST2 based on a signal from the second shutter sensor.

If power is turned off, or the second cover C2 or the third cover C3 is opened, causing a process to be aborted, while the first shutter ST1 or the second shutter ST2 is moving, the position of the first shutter ST1 or the second shutter ST2 may become unidentifiable. The controller 100 has a function of determining the open/closed state of the first shutter ST1 and the open/closed state of the second shutter ST2 when power is turned on, the second cover C2 has been closed, or the third cover C3 has been closed.

Next, operation of the controller 100 will be explained in detail. The controller 100 executes the process shown in FIG. 16 when power is turned on, the second cover C2 or the third cover C3 has been closed, or on other occasions. Determination of whether the second cover C2 or the third cover C3 has been closed may, for example, be made based on signals from sensors for detecting the open/close of the second cover C2 and the open/close of the third cover C3.

Figure 16:
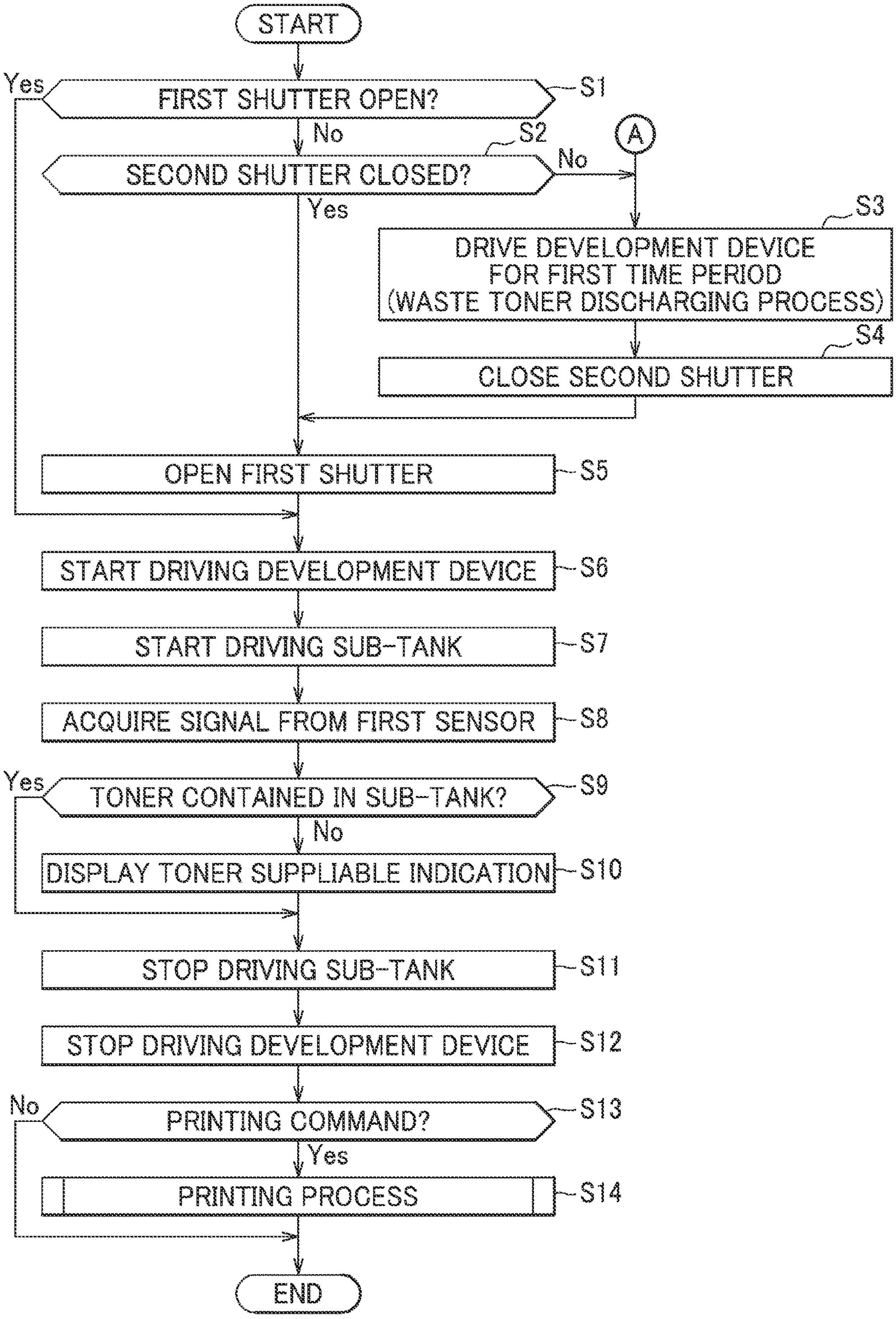
FIG. 16 is a flowchart showing the operation of a controller.

In the process shown in FIG. 16, the controller 100 first determines whether or not the first shutter ST1 is positioned in the first open position (S1). In other words, the controller 100 determines in step S1 whether or not the first shutter ST1 is open.

If it is determined in step S1 that the first shutter ST1 is not positioned in the first position (No), the controller 100 determines whether or not the second shutter ST2 is positioned in the second closed position (S2). In other words, the controller 100 determines in step S2 whether or not the second shutter ST2 is closed.

If the second shutter ST2 is not positioned in the second closed position in step S2 (No), the second shutter ST2 is positioned in the second open position with the first shutter ST1 positioned in the first closed position; thus, it is very likely that the waste toner discharging process has been interrupted. If it is determined in step S2 that the second shutter ST2 is not positioned in the second closed position (No), the controller 100 drives the development device 70 for a first time period to execute the waste toner discharging process (S3).

After step S3, the controller 100 moves the second shutter ST2 to the second closed position (S4), and then moves the first shutter ST1 from the first closed position to the first open position (S5). In other words, the controller 100 closes the second shutter ST2 in step S4, and opens the first shutter ST1 in step S5. After step S5, the controller 100 executes the supplying process shown in steps S6 to S12.

If it is determined in step S2 that the second shutter ST2 is positioned in the second closed position (Yes), the first shutter ST1 is positioned in the first closed position, and the second shutter ST2 is positioned in the second closed position; thus, the controller 100 moves the first shutter ST1 from the first closed position to the first open position (S5), and then executes the supplying process shown in steps S6 to S12.

If the first shutter ST1 is positioned in the first open position in step S1, the second shutter ST2 is not positioned in the second open position; thus, the second shutter ST2 is positioned in the second closed position with the first shutter ST1 positioned in the first open position. If it is determined in step S1 that the first shutter ST1 is positioned in the first open position (Yes), the controller 100 executes the supplying process shown in steps S6 to S12.

In step S6, the controller 100 starts driving the development device 70. Herein, driving the development device 70 refers to rotating at least the first auger 72 and the second auger 73 out of the development roller 71, the first auger 72 and the second auger 73.

After step S6, the controller 100 starts driving the sub-tank 50 (S7). Herein, driving the sub-tank 50 refers to rotating the first conveying member 51 and the second conveying member 52. After step S7, the controller 100 acquires a signal from the first sensor 210 (S8).

After step S8, the controller 100 determines, based on the signal from the first sensor 210, whether or not an amount of toner equal to or more than a first predetermined amount is contained in the sub-tank 50 (S9). In this embodiment, the first predetermined amount is an amount equal to toner containable in two toner boxes 40.

If it is determined in step S9 that the sub-tank 50 does not contain toner of an amount equal to or more than the first predetermined amount (No), the controller 100 shows a toner suppliable indication indicating that toner can be supplied to the sub-tank 50 on a display (not shown) (S10). Herein, the display is, for example, an operating panel attached to an outer surface of the main housing 2.

After step S10 or when it is determined yes in step S9, the controller 100 stops driving the sub-tank 50 after a predetermined time period has lapsed from the start of driving the sub-tank 50 (S11). After step S11, the controller 100 stops driving the development device 70 (S12).

After step S12, the controller 100 determines whether or not there is a printing command (S13). If it is determined in step S13 that there is a printing command (Yes), the controller 100 executes the printing process (S14). After the printing process is finished or it is determined no in step S13, the controller 100 ends the present process.

Figure 17:
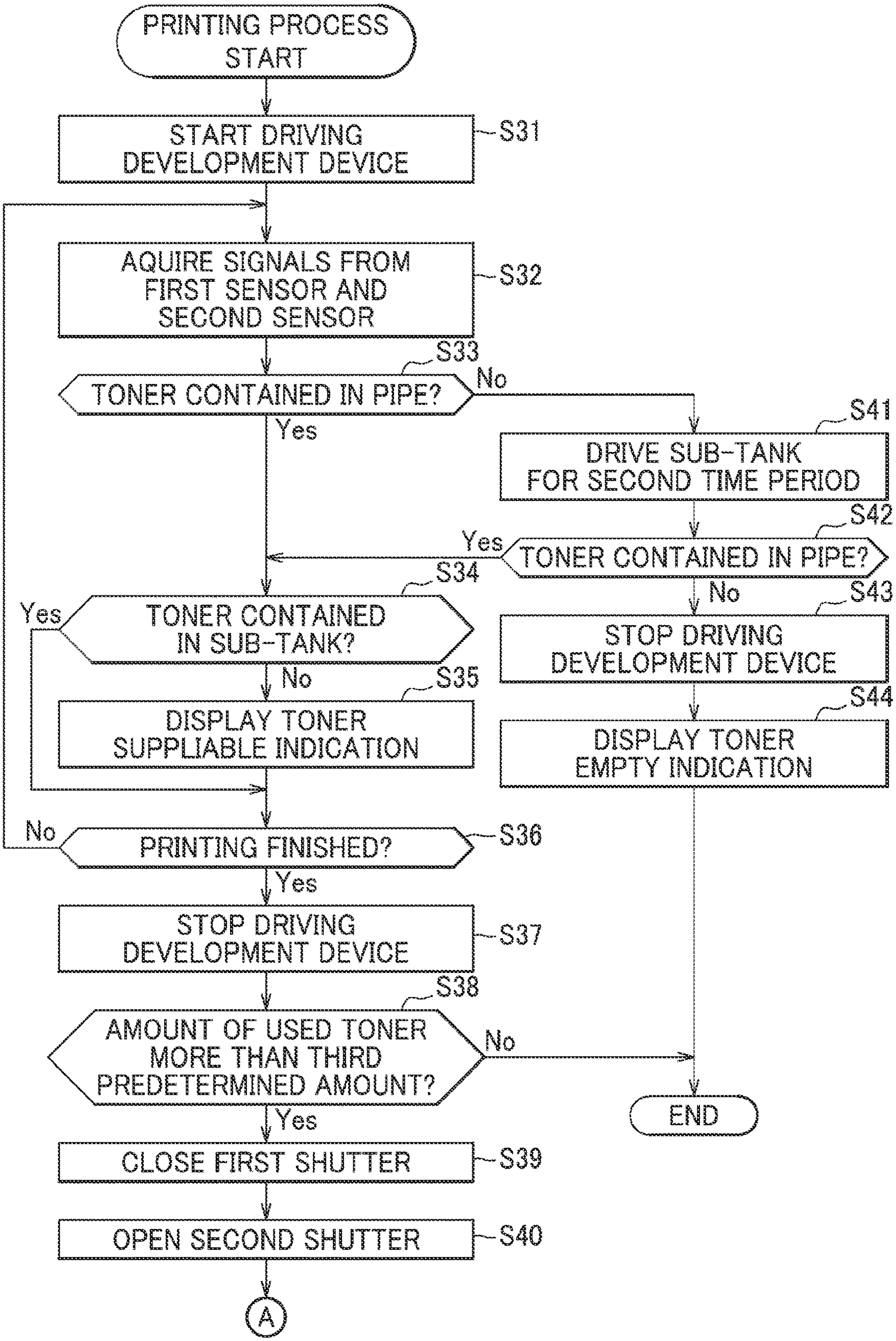
FIG. 17 is a flowchart showing a printing process.

As shown in FIG. 17, during the printing process, the controller 100 first starts driving the development device 70 and starts the printing process (S31). Description of the exposure process and the fixing process, included in the printing process, will be omitted.

After step S31, the controller acquires signals from the first sensor 210 and the second sensor 220 (S32). After step S32, the controller 100 determines, based on the signal from the second sensor 220, whether or not an amount of toner equal to or more than a second predetermined amount is contained in the pipe 60 (S33).

If it is determined in step S33 that an amount of toner equal to or more than the second predetermined amount is contained in the pipe 60 (Yes), the controller 100 determines whether or not an amount of toner equal to or more than the first predetermined amount is contained in the sub-tank 50 based on the signal from the first sensor 210 (S34). If it is determined in step S34 that an amount of toner equal to or more than the first predetermined amount is not contained in the sub-tank 50 (No), the controller 100 shows the toner suppliable indication on the display (S35).

After step S35 or if it is determined yes in step S34, the controller 100 determines whether or not printing has been finished (S36). If it is determined in step S36 that printing has not been finished (No), the controller 100 returns to the process of step S32.

If it is determined in step S36 that printing has been finished (Yes), the controller 100 stops driving the development device 70 (S37). After step S37, the controller 100 determines whether or not an amount of toner used for printing is more than a third predetermined amount (S38).

It is to be understood that the method for determining whether or not the amount of toner used for printing is more than the third predetermined amount may be any kind of method. Whether or not the amount of toner used for printing is more than the third predetermined amount may, for example, be determined based on a number of dots included in image data and counted during printing. The third predetermined amount may be set, for example, at an amount that may cause deterioration of toner in the development device 70.

If it is determined in step S38 that the amount of toner used for printing is more than the third predetermined amount (Yes), the controller 100 moves the first shutter ST1 from the first open position to the first closed position (S39), and then moves the second shutter ST2 from the second closed position to the second open position (S40) and executes the waste toner discharging process shown in FIG. 16 (S3). In other words, the controller 100 closes the first shutter ST1 in step S39, and opens the second shutter ST2 in step S40. If it is determined in step S38 that toner used for printing is not more than the third predetermined amount (No), the controller 100 ends the printing process.

If it is determined no in step S33, the controller 100 drives the sub-tank 50 for a second time period (S41). After step S41, the controller 100 determines, based on the signal from the second sensor 220, whether or not an amount of toner equal to or more than the second predetermined amount is contained in the pipe 60 (S42).

If it is determined in step S42 that an amount of toner equal to or more than the second predetermined amount is contained in the pipe 60 (Yes), the controller 100 proceeds to the process of step S34. If it is determined in step S42 that an amount of toner equal to or more than the second predetermined amount is not contained in the pipe 60 (No), the controller 100 stops driving the development device 70 (S43). After step S43, the controller 100 displays a toner empty indication indicating that toner contained in the development device 70 has become equal to or less than a predetermined value on the display (S44) and ends the present process.

According to the above-described embodiment, the following advantageous effects can be obtained.

Since the inlet H21 of the development device 70 is opposed to the pipe opening H26 of the pipe 60 when the development device 70 is attached to the main housing 2 in a configuration in which the development device 70 is installable into and removable from the main housing 2 in the axial direction, toner can be smoothly supplied from the pipe 60 to the development device 70.

By opening and closing the inlet H21 with the first shutter ST1, it is possible to supply toner from the pipe 60 to the development device 70 or to stop supplying toner from the pipe 60 to the development device 70.

By opening and closing the outlet H22 with the second shutter ST2, it is possible to discharge toner from the development device 70 to the waste toner box 90 or to stop discharging toner from the development device 70 to the waste toner box 90.

Since the inlet H21 faces upward and the outlet H22 faces downward, toner can be smoothly received in and discharged from the development device 70.

Since the movement of the first shutter ST1 and the second shutter ST2 is controlled by the controller 100 so that the second shutter ST2 is not positioned in the second open position when the first shutter ST1 is positioned in the first open position, fresh toner supplied from the pipe 60 to the development device 70 can be restrained from being discharged from the outlet H22.

Since the development device 70 is configured such that the first auger 72 conveys toner in one axial direction, the second auger 73 conveys toner in the other axial direction, and the partition wall 74A has a feed port H23 and a return port H24, toner can be circulated inside the development device 70.

Since the return port H24 is closed by the third shutter ST3 when deteriorated toner contained in the development device 70 is discharged, passage of deteriorated toner through the return port H24 can be restricted by the third shutter ST3. Thus, deteriorated toner can be smoothly discharged.

Since the presence or absence of toner in the pipe 60 is detected by the second sensor 220, the amount of toner in the development device 70 can be known indirectly.

Since the second sensor 220 is positioned above the lower end of the development roller 71, the second sensor 220 detecting toner indicates that toner contained in the development device 70 is in contact with the development roller 71. Thus, toner contained in the development device 70 can be reliably brought into contact with the development roller 71.

Since the protrusion 75B of the first shutter ST1 is fitted in the hole H27 of the pipe shutter PS, the first cylindrical portion 74A can be positioned in place relative to the pipe 60 via the first shutter ST1 and the pipe shutter PS.

Since the first auger 72 and the second auger 73 move in conjunction with each other, the structure of the development device 70 can be simplified compared to an alternative structure in which, for example, the first auger and the second auger are rotated individually. Further, since the first gear G1 and the second gear G2 are disposed on a side of the image forming apparatus opposite to the pipe 60 and the inlet H21 in the axial direction, it is possible, for example, to avoid disposing the pipe, the inlet, the first gear, and the second gear on one end of the image forming apparatus in the axial direction and to restrain upsizing of the one end of the image forming apparatus.

Since the first gear G1 and the second gear G2 are engaged with each other, the structure of the development device 70 can be simplified compared to, for example, an alternative structure in which another gear is interposed between the first gear and the second gear.

Since the handle 91 of the waste toner box 90 has the hole 91A, the user can easily pull out the waste toner box 90.

Since the development device 70 and the waste toner box 90 are connected via the main housing passage H41, the development device 70 and the waste toner box 90 can be easily installed and removed individually, compared to, for example, an alternative structure in which the development device and the waste toner box are connected directly.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the first gear G1 and the second gear G2 are engaged with each other in the above-described embodiment, an idle gear may, for example, be interposed between the first gear and the second gear.

Although the second shutter ST2 and the third shutter ST3 are formed integrally in one piece in the above-described embodiment, the second shutter ST2 and the third shutter ST3 may, for example, be formed separately. In this case, the second shutter and the third shutter may be connected by a gear or the like, and the second shutter and the third shutter may be moved in conjunction with each other such that the relation between the open/close state of the second shutter and the open/close state of the third shutter become similar to the above-described embodiment. Further, the second shutter and the third shutter may be individually operated by the controller.

The whole waste toner box may overlap the scanner as viewed in the axial direction.

Although the present disclosure is applied to the multicolor printer 1 in the above-described embodiment, the present disclosure may be applied to other image forming apparatuses such as copying machines, multifunctional devices, etc.

The elements described in the above embodiment and its modified examples may be implemented selectively and in combination.

Next, the second embodiment of the present disclosure will be described in detail referring to the drawings where appropriate.

Figure 18:
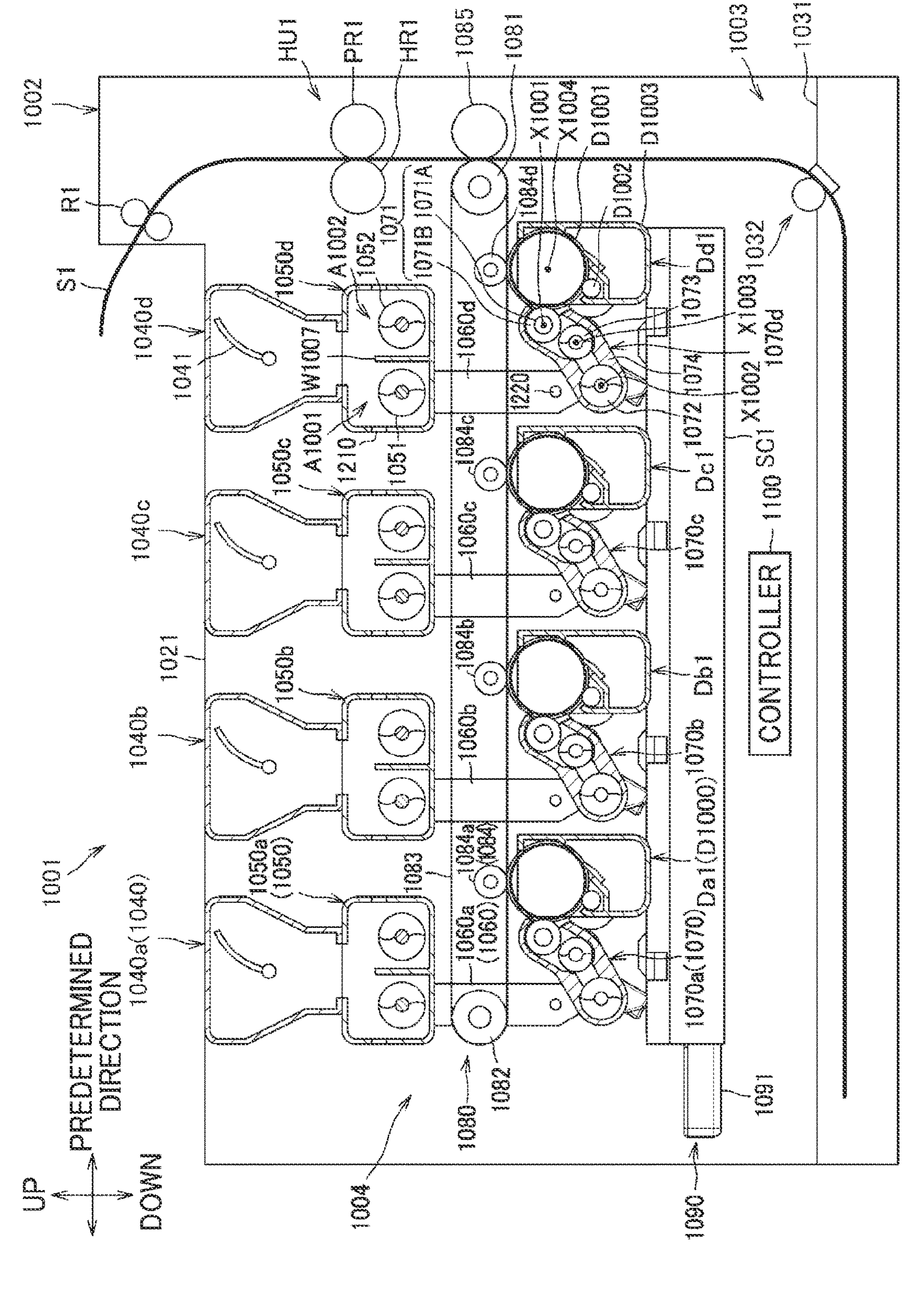
FIG. 18 is an illustration of a multicolor printer.

As shown in FIG. 18, a multicolor printer 1001 as an example of an image forming apparatus includes a main housing 1002, an image forming unit 1004, and a controller 1100. The image forming unit 1004 forms an image on a sheet S1.

The main housing 1002 includes an output tray 1021, a sheet feeder unit 1003, an ejection roller R1, and four sub-tanks 1050 (1050*a*, 1050*b*, 1050*c*, 1050*d*).

The output tray 1021 is positioned on top of the main housing 1002. The sheet S1 is ejected onto the output tray 1021.

The sheet feeder unit 1003 is positioned in a lower part of the main housing 1002. The sheet feeder unit 1003 includes a feed tray 1031 and a supply roller mechanism 1032. The feed tray 1031 is installable into and removable from the main housing 1002. The supply roller mechanism 1032 conveys the sheet S1 from the feed tray 1031 to the image forming unit 1004. The ejection roller R1 ejects the sheet S1 from the main housing 1002 onto the output tray 1021.

The image forming unit 1004 includes four toner boxes 1040 (1040*a*, 1040*b*, 1040*c*, 1040*d*), four pipes 1060 (1060*a*, 1060*b*, 1060*c*, 1060*d*), four development devices 1070 (1070*a*, 1070*b*, 1070*c*, 1070*d*), four drum units D1000 (Da1, Db1, Dc1, Dd1), a scanner SC1, a transfer unit 1080, a fixing unit HU1, and a waste toner box 1090.

The toner boxes 1040 are container-shaped members that contain toner. The four toner boxes 1040*a*, 1040*b*, 1040*c*, 1040*d* each contain toner of a different color. The toner boxes 1040 are positioned above an intermediate transfer belt 1083 which will be described later. Each toner box 1040 includes an agitation member 1041 for agitating toner. The agitation member 1041 is an agitator. The agitation member 1041 may also be an auger. The toner boxes 1040 are attachable to and removable from the main housing 1002 in an axial direction shown in FIG. 19. Specifically, each toner box 1040 is attachable to and removable from the corresponding sub-tank 1050 which is a part of the main housing 1002 in the axial direction.

The sub-tanks 1050 are container-shaped members to which toner is supplied from the toner boxes 1040. The sub-tanks 1050 are positioned between the toner boxes 1040 and the intermediate transfer belt 1083 in the up-down direction. The sub-tanks 1050 are positioned between the toner boxes 1040 and the pipes 1060. Each sub-tank 1050 has a first end and a second end positioned apart from each other in the axial direction. Each toner box 1040 is positioned at the first end of the corresponding sub-tank 1050 when the toner box 1040 is attached to the sub-tank 1050. The capacity of the sub-tank 1050 is greater than the capacity of the toner box 1040. The capacity of the sub-tank 1050 is greater than the capacity of the development device 1070. In this specification, capacity refers to an amount of toner (maximum amount of toner) containable in a container-shaped member such as the toner box 1040, the sub-tank 1050, and the development device 1070.

The dimension of the sub-tank 1050 in the axial direction is greater than the dimension of the toner box 1040 in the axial direction. Specifically, the dimension of the sub-tank 1050 in the axial direction is equal to or greater than three times the dimension of the toner box 1040 in the axial direction.

Each sub-tank 1050 has a supply port H1001 and a discharge port H1002. Toner is supplied from each toner box 1040 to the corresponding sub-tank 1050 through the supply port H1001 and is discharged from the sub-tank 1050 to the corresponding pipe 1060 through the discharge port H1002. The supply port H1001 faces upward. The supply port H1001 is positioned on the top surface of the sub-tank 1050. Herein, "upward" may be any direction with an upward component and may, for example, include an oblique upward direction.

The discharge port H1002 is spaced apart from the supply port H1001 in the axial direction. Specifically, the supply port H1001 is positioned at the first-end side of the sub-tank 1050. The discharge port H1002 is positioned at the second-end side of the sub-tank 1050. The discharge port H1002 faces downward. The discharge port H1002 is positioned on a bottom surface of the sub-tank 1050. Herein, "downward" may be any direction with a downward component and may, for example, include an oblique downward direction.

Each sub-tank 1050 includes a first sensor 1210 that detects the presence or absence of toner in the sub-tank 1050. The first sensor 1210 is an optical sensor including a light emitter and a light receiver. The light emitter emits light in a predetermined direction shown in the drawings. The light receiver receives light emitted from the light emitter. The predetermined direction is perpendicular to the axial direction and to the up-down direction. The first sensor 1210 is positioned between the supply port H1001 and the discharge port H1002 in the axial direction.

The distance from the first sensor 1210 to the discharge port H1002 is greater than the distance from the first sensor 1210 to the supply port H1001 in the axial direction. Specifically, a space inside the sub-tank 1050 on the supply-port-side of the first sensor 1210 is capable of containing toner of an amount equal to toner containable in one toner box 1040. A space inside the sub-tank 1050 on the discharge-port-side of the first sensor 1210 is capable of containing toner of an amount equal to toner containable in two toner boxes 1040.

Referring back to FIG. 18, each sub-tank 1050 includes a first conveying member 1051 and a second conveying member 1052. The first conveying member 1051 and the second conveying member 1052 are members that convey toner supplied from the corresponding toner box 1040 to the corresponding pipe 1060. The first conveying member 1051 and the second conveying member 1052 convey toner in the axial direction. The first conveying member 1051 and the second conveying member 1052 are arranged side-by-side in the predetermined direction.

In this embodiment, the first conveying member 1051 and the second conveying member 1052 are augers. The first conveying member 1051 and the second conveying member 1052 may also be agitators. Any number of conveying members may be provided, including, for example, one.

Each sub-tank 1050 further includes a partition wall W1007. The partition wall W1007 divides a space inside the sub-tank 1050 into a space A1001 including the first conveying member 1051 and a space A1002 including the second conveying member 1052. The partition wall W1007 is positioned between the first conveying member 1051 and the second conveying member 1052 in the predetermined direction. The spaces A1001, A1002 are connected in the vicinity of the discharge port H1002. Thus, toner in the space A1001 can be conveyed to the discharge port H1002 by the first conveying member 1051, and toner in the space A1002 can be conveyed to the discharge port H1002 by the second conveying member 1052. The first sensor 1210 is positioned above the upper end of the partition wall W1007.

The pipes 1060 are tubular members that deliver toner in the toner boxes 1040 to the development devices 1070. Specifically, each pipe 1060 delivers toner in the corresponding sub-tank 1050 to the corresponding development device 1070. Each pipe 1060 extends from the corresponding sub-tank 1050 to the corresponding development device 1070. Toner in each toner box 1040 is supplied to the corresponding development device 1070 via the sub-tank 1050 and the pipe 1060.

Figure 19:
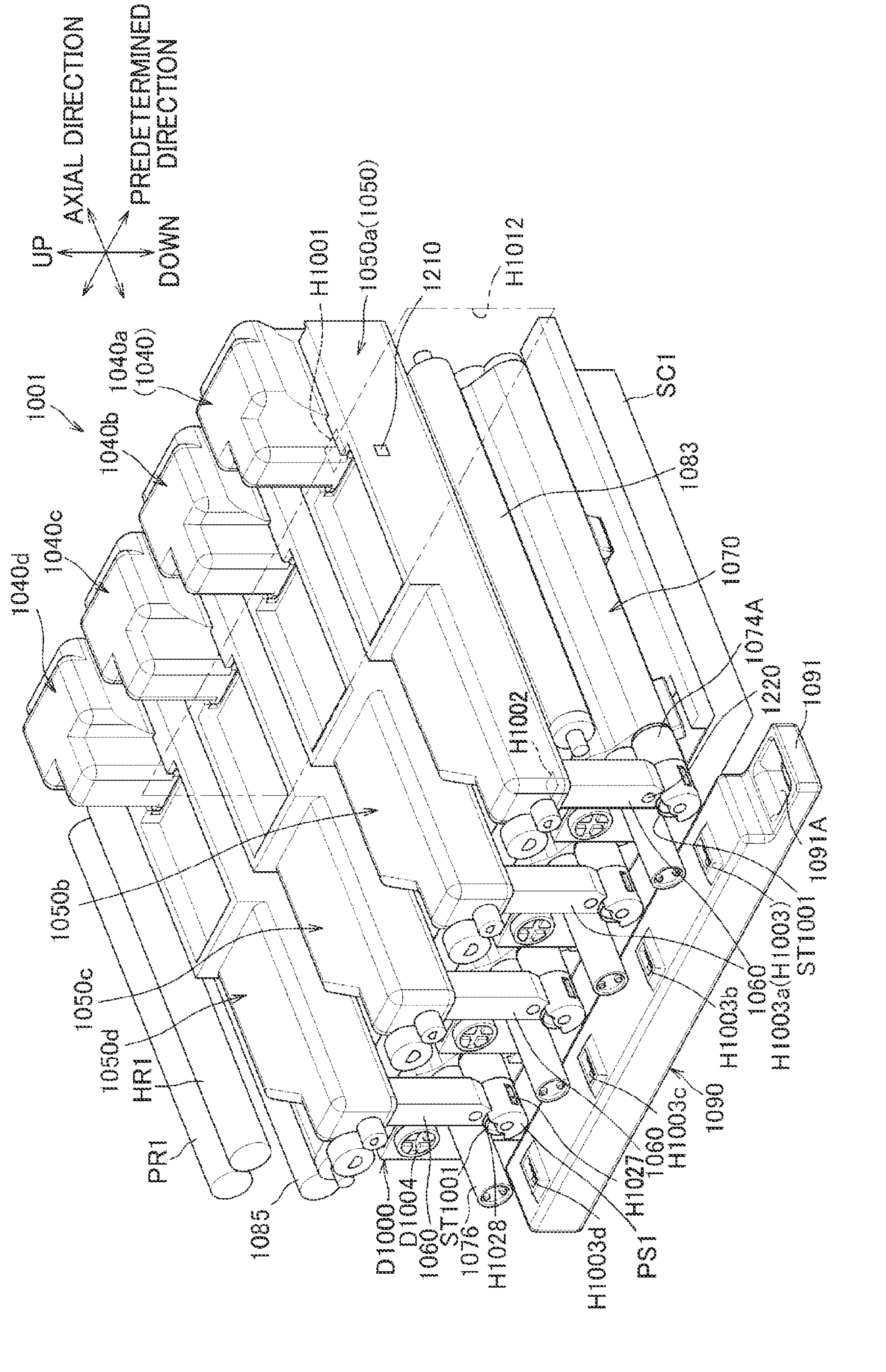
FIG. 19 is a perspective view of a structure inside a main housing of the multicolor printer.

Each pipe 1060 includes a second sensor 1220 that detects the presence or absence of toner in the pipe 1060. The second sensor 1220 is an optical sensor including a light emitter and a light receiver. The light emitter emits light in the axial direction. The light receiver receives light emitted from the light emitter. The second sensor 1220 is positioned above a lower end of a development roller 1071 and below an upper end of the development roller 1071. Specifically, light emitted from the light emitter passes through a position above the lower end and below the upper end of the development roller 1071. As shown in FIG. 19, each pipe 1060 is positioned farther than the intermediate transfer belt 1083 from a second opening H1012, in the axial direction. The second opening H1012 is an example of a development opening which will be described later. The intermediate transfer belt 1083 is positioned between the pipes 1060 and the second opening H1012 in the axial direction.

Figure 22:
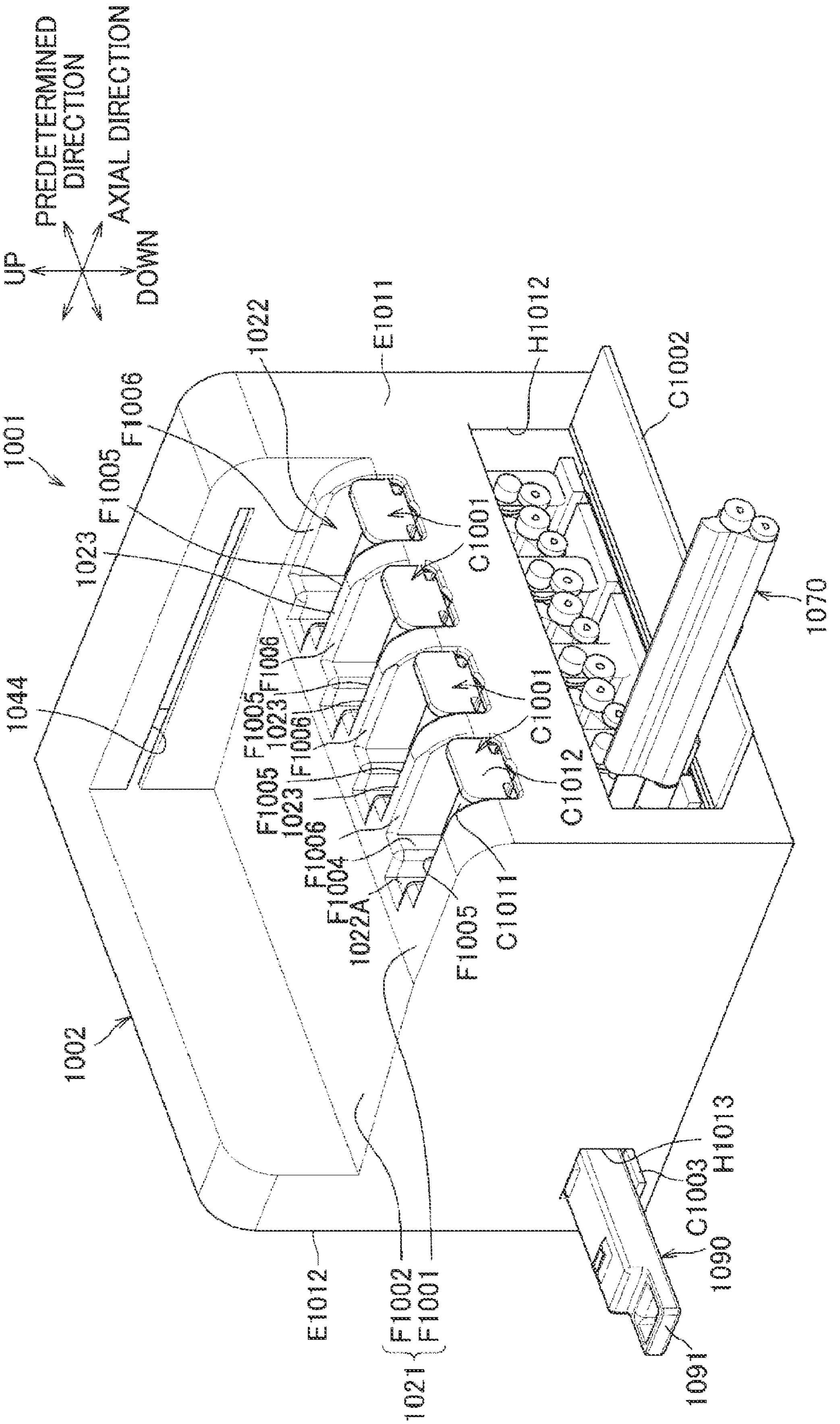
FIG. 22 is a perspective view showing a development device and a waste toner box being removed from the main housing.

The development devices 1070 are positioned under the intermediate transfer belt 1083. As shown in FIG. 22, the development devices 1070 are installable into and removable from the main housing 1002 in the axial direction through the second opening H1012. Referring back to FIG. 18, each development device 1070 includes a development roller 1071, a first auger 1072, a second auger 1073, and a housing 1074. The development roller 1071 includes a development roller shaft 1071A and a roller body 1071B covering a portion of an outer periphery of the development roller shaft 1071A.

The development method of the present embodiment is a two-component development method. The development roller shaft 1071A is, for example, a metal shaft including a magnet. The roller body 1071B is, for example, a metal raw pipe. The development method may also be a one-component development method. In this case, the development roller shaft 1071A is, for example, a metal shaft, and the roller body 1071B is, for example, a cylindrical part made of rubber.

Figures 23A, 23B:
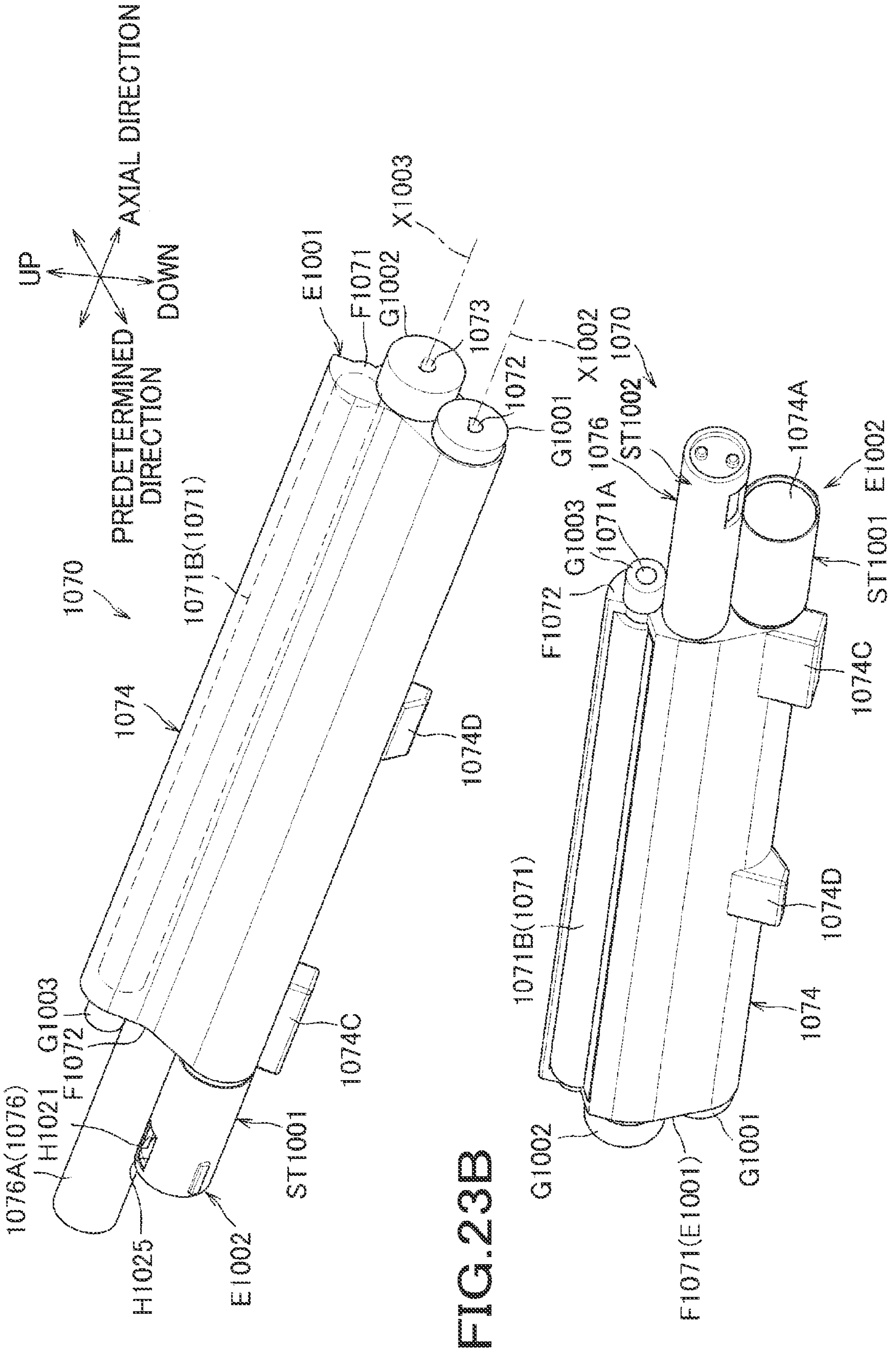
FIGS. 23A and 23B are perspective views of the development device.

The housing 1074 houses the roller body 1071B of the development roller 1071, the first auger 1072, the second auger 1073, and toner. The housing 1074 has a first end E1001 and a second end E1002 positioned apart from each other in the axial direction (FIG. 23A). The development roller 1071 is rotatable about a development axis X1001 extending in the axial direction. The first auger 1072 and the second auger 1073 are members that convey toner supplied from the pipe 1060 to the development roller 1071. The first auger 1072 is rotatable about a first auger axis X1002 extending in the axial direction. The second auger 1073 is rotatable about a second auger axis X1003 extending in the axial direction.

The drum units D1000 are positioned under the intermediate transfer belt 1083. Each drum unit D1000 is arranged side-by-side with the corresponding development device 1070 in the predetermined direction. The drum unit D1000 is installable into and removable from the main housing 1002 in the axial direction through the second opening H1012 which will be described later. The drum unit D1000 includes a photosensitive drum D1001, a charger roller D1002 that charges the photosensitive drum D1001, and a drum frame D1003 that houses a portion of the photosensitive drum D1001 and the charger roller D1002. The photosensitive drum D1001 is rotatable about a drum axis X1004 extending in the axial direction.

The scanner SC1 is positioned below the drum units D1000. The scanner SC1 emits laser light toward each of the photosensitive drums D1001.

The transfer unit 1080 is positioned between the sub-tanks 1050 and the development devices 1070 in the up-down direction. The transfer unit 1080 includes a drive roller 1081, a follower roller 1082, an intermediate transfer belt 1083, four primary transfer rollers 1084 (1084*a*, 1084*b*, 1084*c*, 1084*d*), and a secondary transfer roller 1085.

The intermediate transfer belt 1083 is an endless belt. The intermediate transfer belt 1083 overlaps the pipes 1060 as viewed in the axial direction. Specifically, the intermediate transfer belt 1083 overlaps the pipes 1060 when projected in the axial direction.

The primary transfer rollers 1084 are positioned to face an inner surface of the intermediate transfer belt 1083. The intermediate transfer belt 1083 is sandwiched between the primary transfer rollers 1084 and the photosensitive drums D1001.

The secondary transfer roller 1085 is positioned to face an outer surface of the intermediate transfer belt 1083. The intermediate transfer belt 1083 is sandwiched between the secondary transfer roller 1085 and the drive roller 1081.

The fixing unit Hill is positioned above the intermediate transfer belt 1083. The fixing unit HU1 includes a heating roller HR1 and a pressure roller PR1. The pressure roller PR1 is pressed against the heating roller HR1.

In the image forming unit 1004, first, a surface of each photosensitive drum D1001 is charged by the corresponding charger roller D1002. Then, the scanner SC1 projects light to expose the surface of each photosensitive drum D1001 and thereby form an electrostatic latent image thereon.

Subsequently, each development roller 1071 supplies toner to the electrostatic latent image formed on the corresponding photosensitive drum D1001 to thereby form a toner image on the photosensitive drum D1001. The toner image on the photosensitive drum D1001 is then transferred onto the intermediate transfer belt 1083.

The toner image on the intermediate transfer belt 1083 is transferred onto the sheet S1 when the sheet S1 passes through between the intermediate transfer belt 1083 and the secondary transfer roller 1085. Thereafter, the toner image on the sheet S1 is fixed on the sheet S1 at the fixing unit HU1. The sheet S1 is then ejected onto the output tray 1021 by the ejection roller R1.

As shown in FIG. 19, the waste toner box 1090 is a container-shaped member capable of containing toner. The development devices 1070 are capable of discharging deteriorated toner therein to the waste toner box 1090. Specifically, each development device 1070 has a discharge port (not shown) for discharging toner to the waste toner box 1090, and a shutter (not shown) for opening and closing the discharge port. The main housing 1002 has passages for discharging toner from the development devices 1070 to the waste toner box 1090.

As shown in FIG. 18, the waste toner box 1090 is positioned below the photosensitive drums D1001. Specifically, the waste toner box 1090 is positioned below the development devices 1070 and the drum units D1000. As shown in FIGS. 18 and 19, a part of the waste toner box 1090 overlaps a part of the scanner SC1 as viewed in the axial direction. The waste toner box 1090 has four openings H1003 (H1003*a*, H1003*b*, H1003*c*, H1003*d*) and a handle 1091. The openings H1003 are openings for receiving toner discharged from the development devices 1070.

The handle 1091 has a hole 1091A in which a user can hook his/her finger. The hole 1091A is a through hole extending in the up-down direction. The hole 1091A may also be a blind hole. As shown in FIG. 22, the waste toner box 1090 is installable into and removable from the main housing 1002 in the predetermined direction.

Figure 20:
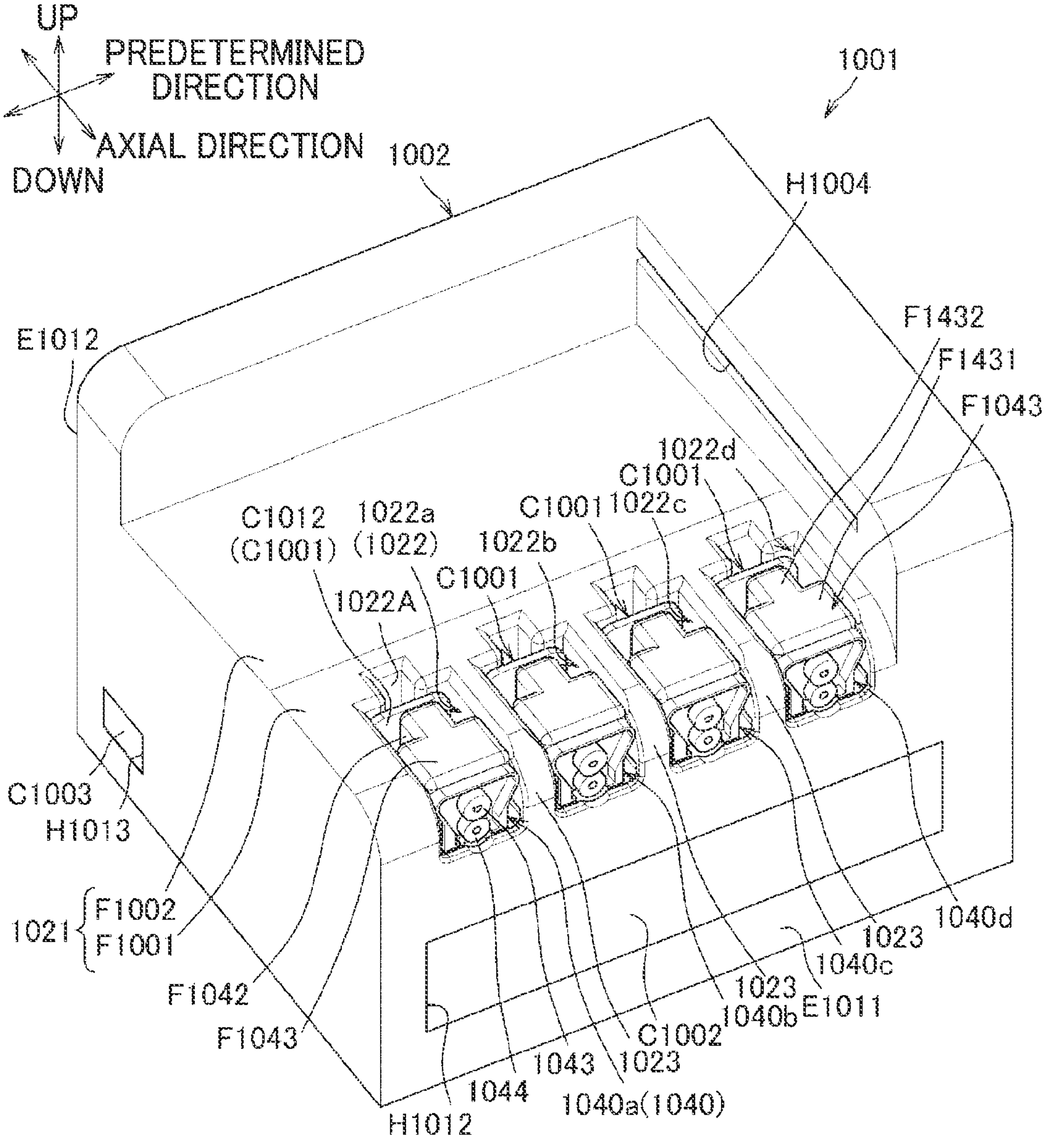
FIG. 20 is a perspective view of the multicolor printer with toner boxes attached to sub-tanks.

As shown in FIGS. 20 and 22, the main housing 1002 has a sheet ejection opening H1004, four box-housing recesses 1022 (1022*a*, 1022*b*, 1022*c*, 1022*d*), a second opening H1012 as an example of a development opening, and a third opening H1013. The sheet ejection opening H1004 is an opening for ejecting the sheet S1 outside the main housing 1002. Specifically, the sheet ejection opening H1004 is an opening for ejecting the sheet S1 onto the output tray 1021.

The sheet ejection opening H1004 is positioned above the output tray 1021. The sheet ejection opening H1004 extends in the axial direction and has a first end and a second end positioned apart from each other in the axial direction. Each box-housing recess 1022 has a first end and a second end positioned apart from each other in the axial direction, and a first side and a second side positioned apart from each other in the predetermined direction. The first end of the sheet ejection opening H1004 is positioned between the first ends and the second ends of the box-housing recesses 1022.

The output tray 1021 has a first supporting surface F1001 and a second supporting surface F1002. The first supporting surface F1001 and the second supporting surface F1002 are surfaces for supporting the sheet S1 ejected through the sheet ejection opening H1004. The first supporting surface F1001 is perpendicular to the up-down direction. The first supporting surface F1001 is positioned between the second supporting surface F1002 and the second opening H1012 in the axial direction. The second supporting surface F1002 is inclined relative to the first supporting surface F1001 such that the farther from the first supporting surface F1001 in the axial direction, the lower the second supporting surface F1002.

Figure 21:
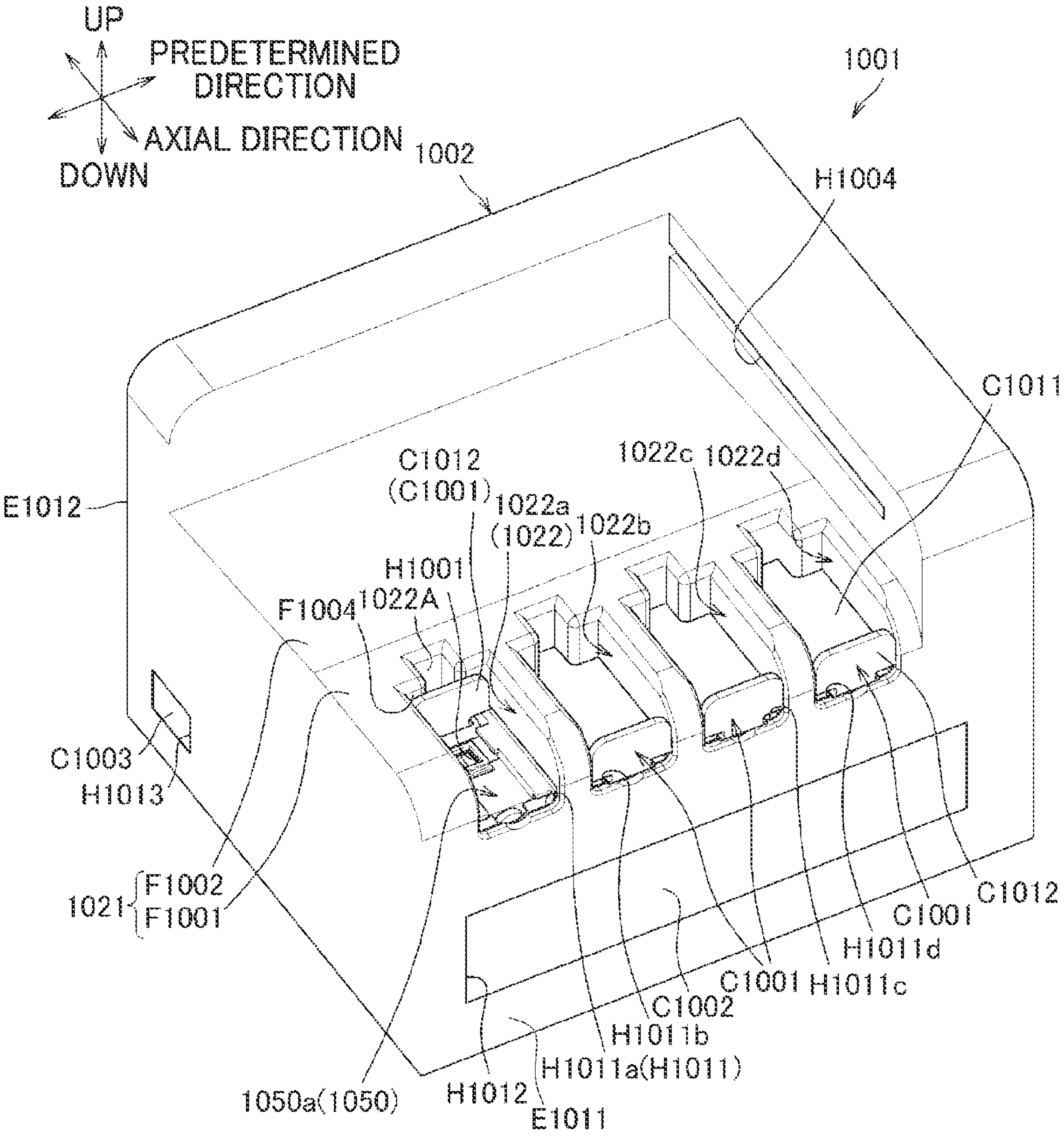
FIG. 21 is a perspective view of the multicolor printer without the toner boxes attached to the sub-tanks.

As shown in FIGS. 20 and 21, the box-housing recesses 1022 are recesses for housing the toner boxes 1040 attached to the sub-tanks 1050. The four box-housing recesses 1022*a*, 1022*b*, 1022*c*, 1022*d* are spaced apart and arranged side-by-side in the predetermined direction. Each box-housing recess 1022 is downwardly recessed from the first supporting surface F1001. As shown in FIG. 21, each box-housing recess 1022 has a first opening H1011. Specifically, the main housing 1002 has four first openings H1011 (H1011*a*, H1011*b*, H1011*c*, H1011*d*) positioned at positions corresponding to the bottoms of the four box-housing recesses 1022*a*, 1022*b*, 1022*c*, 1022*d*.

The first openings H1011 are openings for exposing supply ports H1001 to the outside of the main housing 1002. Each first opening H1011 allows a part of the corresponding toner box 1040 to pass therethrough. The toner box 1040 can be attached to the sub-tank 1050 through the first opening H1011.

As shown in FIG. 20, a top surface F1043 of each toner box 1040 attached to the corresponding sub-tank 1050 is positioned in a position corresponding to the first supporting surface F1001 in the up-down direction. Specifically, when the toner boxes 1040 are attached to the sub-tanks 1050, the top surfaces F1043 of the toner boxes 1040 are approximately flush with the first supporting surface F1001. Accordingly, when the toner boxes 1040 are attached to the sub-tanks 1050, the top surfaces F1043 of the toner boxes 1040 contact the sheet S1 ejected from the sheet ejection opening H1004.

As shown in FIG. 22, the second opening H1012 is an opening through which the development devices 1070 can pass. In other words, the second opening H1012 is an opening through which the development devices 1070 are allowed to pass. The second opening H1012 opens in the axial direction. The third opening H1013 is an opening through which the waste toner box 1090 can pass. In other words, the third opening H1013 is an opening through which the waste toner box 1090 is allowed to pass. The third opening H1013 opens in the predetermined direction.

The multicolor printer 1001 further includes a first cover C1001, a second cover C1002 as an example of a development cover, and a third cover C1003. The first cover C1001 is a cover for opening and closing the supply port H1001 and the first opening H1011. The first cover C1001 is provided for each of the four sub-tanks 1050*a*, 1050*b*, 1050*c*, 1050*d*.

The first cover C1001 is slidable in the axial direction relative to the main housing 1002, between a closed position shown in FIG. 22 and an open position shown in FIG. 20. When the first cover C1001 is positioned in the closed position, the first cover C1001 closes the supply port H1001 and the first opening H1011. When the first cover C1001 is positioned in the open position, the supply port H1001 and the first opening H1011 are opened. The first cover C1001 is attached to the main housing 1002. The first cover C1001 is positioned in an upper part of the main housing 1002.

The first cover C1001 includes a cover portion C1011 and a handle portion C1012. The cover portion C1011 covers the first opening H1011. The handle portion C1012 protrudes upward from the cover portion C1011. Each box-housing recess 1022 further has an opposing surface F1004 and a recess 1022A. The opposing surface F1004 is opposed to the handle portion C1012 in the axial direction. The recess 1022A is recessed from the opposing surface F1004. The recess 1022A opens upward and toward the handle portion C1012. The handle portion C1012 is positioned closer to the opposing surface F1004 when the first cover C1001 is positioned in the open position than when the first cover C1001 is positioned in the closed position.

The second cover C1002 is a cover for opening and closing the second opening H1012. The second cover C1002 is rotatable relative to the main housing 1002 about a lower end thereof. The main housing 1002 has a first end E1011 and a second end E1012 positioned apart from each other in the axial direction. The second cover C1002 is positioned at the first end E1011 of the main housing 1002.

The third cover C1003 is a cover for opening and closing the third opening H1013. The third cover C1003 is rotatable relative to the main housing 1002 about a lower end thereof.

As shown in FIG. 22, the main housing 1002 further has a first box-guiding surface F1005, a second box-guiding surface F1006, and three partitions 1023. The first box-guiding surface F1005 and the second box-guiding surface F1006 are surfaces for guiding the toner box 1040. The first box-guiding surface F1005 and the second box-guiding surface F1006 are provided in each of the four box-housing recesses 1022*a*, 1022*b*, 1022*c*, 1022*d*. The first box-guiding surface F1005 and the second box-guiding surface F1006 are positioned at upper ends of each box-housing recess 1022. The first box-guiding surface F1005 is positioned at the first side of the box-housing recess 1022. The second box-guiding surface F1006 is positioned at the second side of the box-housing recess 1022. The first box-guiding surface F1005 and the second box-guiding surface F1006 are inclined such that the surfaces F1005, F1006 come closer to each other as the surfaces F1005, F1006 extend downward.

As shown in FIG. 20, each partition 1023 is disposed between two toner boxes 1040 arranged side-by-side in the predetermined direction. The top surface of each partition 1023 forms a part of the first supporting surface F1001.

Figure 24:
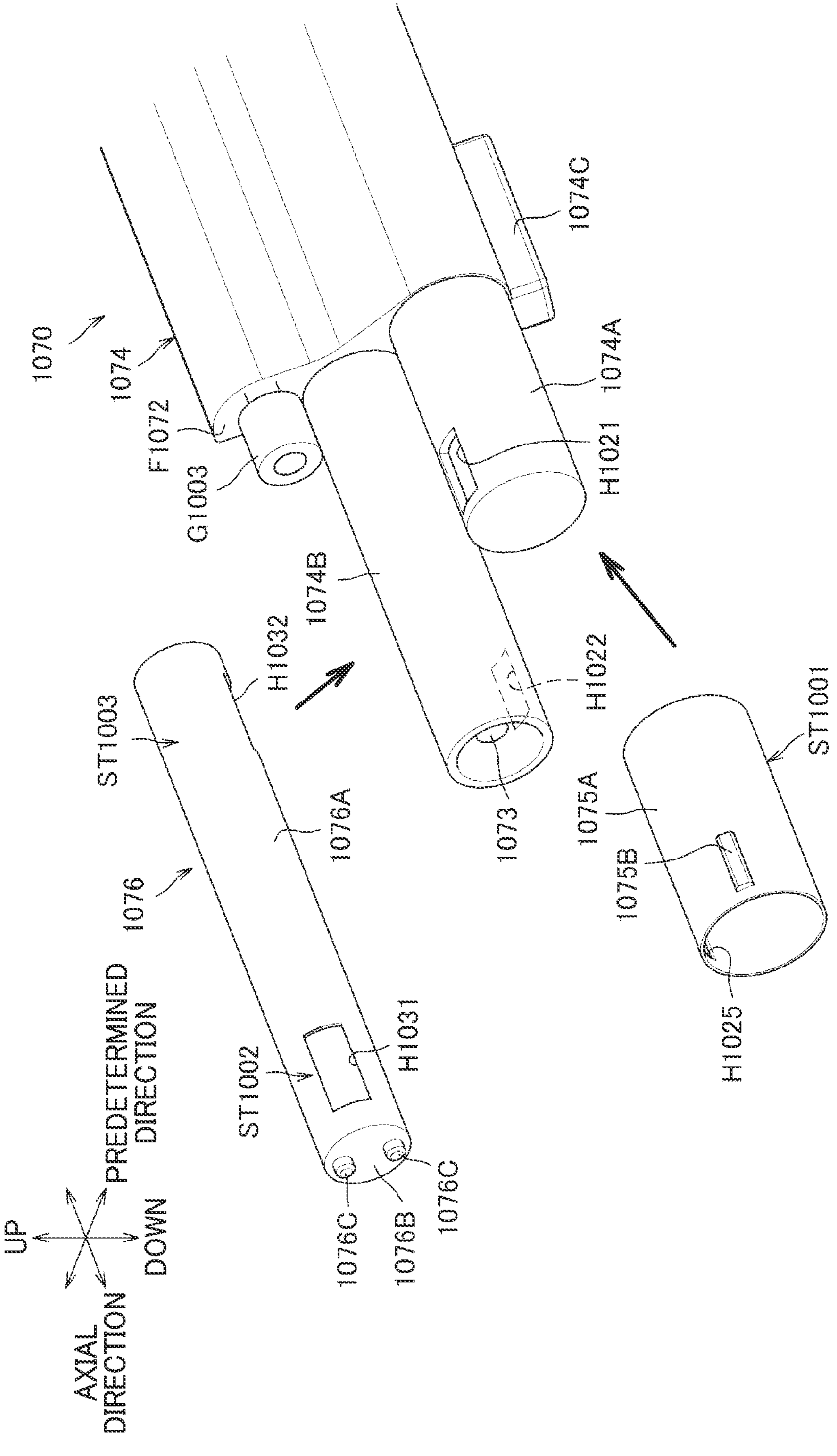
FIG. 24 is an exploded perspective view showing the relationship between a first shutter, a shutter unit and a housing of the development device.

As shown in FIGS. 23A and 23B, the development device 1070 further includes a first shutter ST1001, a shutter unit 1076, a first gear G1001, a second gear G1002, and a development gear G1003. As shown in FIG. 24, the housing 1074 has a first surface F1071 (FIGS. 23A and 23B), a second surface F1072, a first cylindrical portion 1074A, a second cylindrical portion 1074B, a first development protrusion 1074C, and a second development protrusion 1074D (FIGS. 23A and 23B).

The roller body 1071B of the development roller 1071 is positioned between the first surface F1071 and the second surface F1072 in the axial direction. As shown in FIG. 28B, when the development device 1070 is attached to the main housing 1002, the second surface F1072 is positioned farther, than the development roller 1071, from the second opening H1012. Referring back to FIGS. 23A and 23B, the first gear G1001 and the second gear G1002 are positioned at the first surface F1071. The first shutter ST1001, the shutter unit 1076, the development gear G1003, the first cylindrical portion 1074A, and the second cylindrical portion 1074B are positioned at the second surface F1072.

In this embodiment, the first surface F1071 corresponds to the first end E1001 of the housing 1074. The second surface F1072, the first cylindrical portion 1074A, and the second cylindrical portion 1074B correspond to the second end E1002 of the housing 1074.

As shown in FIG. 24, the first cylindrical portion 1074A and the second cylindrical portion 1074B protrude from the second surface F1072 in the axial direction. The dimension of the second cylindrical portion 1074B is greater than the dimension of the first cylindrical portion 1074A in the axial direction.

The first cylindrical portion 1074A has an inlet H1021. The inlet H1021 is an opening for receiving toner delivered from the pipe 1060 when the development device 1070 is attached to the main housing 1002. The inlet H1021 faces upward when the development device 1070 is attached to the main housing 1002. The first cylindrical portion 1074A is capable of containing toner therein. The inlet H1021 is positioned between an outlet H1022 which will be described later and the second surface F1072.

The second cylindrical portion 1074B has an outlet H1022. The outlet H1022 is an opening for discharging toner into the waste toner box 1090 when the development device 1070 is attached to the main housing 1002. The outlet H1022 faces downward when the development device 1070 is attached to the main housing 1002.

As shown in FIGS. 23A and 23B, the first development protrusion 1074C and the second development protrusion 1074D are spaced apart and arranged side-by-side in the axial direction. The first development protrusion 1074C is positioned between the second development protrusion 1074D and the first shutter ST1001 in the axial direction. The dimension of the first development protrusion 1074C is greater than the dimension of the second development protrusion 1074D in the axial direction. The development roller 1071 is positioned between the second opening H1012, and the pipe 1060 (FIG. 19) and the inlet H1021 (FIG. 19).

Figure 27A:
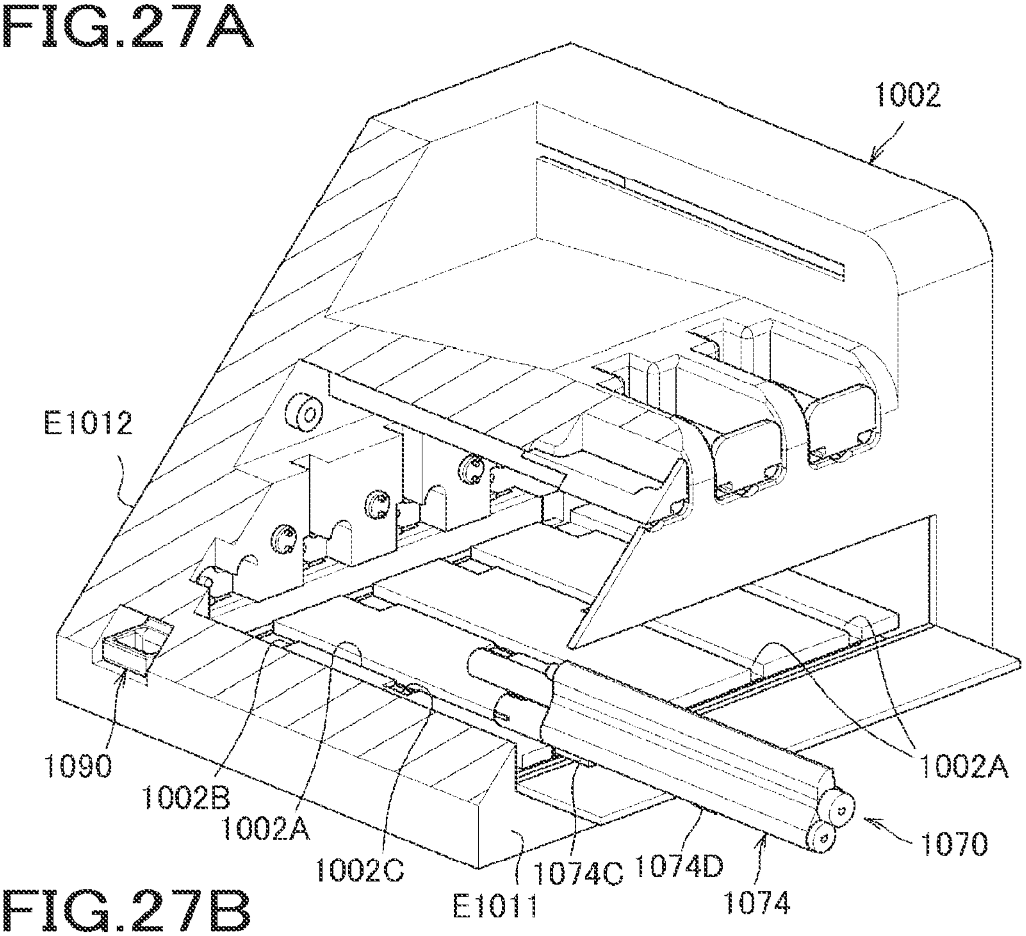
FIG. 27A is a perspective view showing the development device passing through a second opening of the main housing when the development device is being installed.

As shown in FIG. 27A, the main housing 1002 has a guide groove 1002A for guiding the development device 1070 in the axial direction. One guide groove 1002A is provided for each of the four development devices 1070*a*, 1070*b*, 1070*c*, 1070*d*. The guide grooves 1002A open upward. The first development protrusion 1074C and the second development protrusion 1074D can enter the corresponding guide groove 1002A.

Figure 27B:
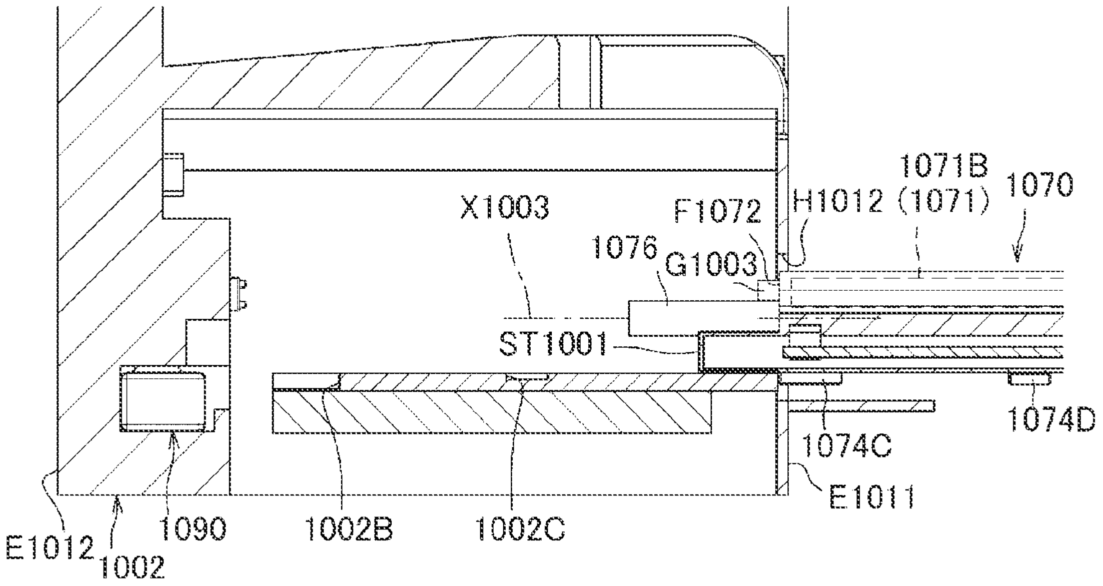
FIG. 27B is a cross-sectional view showing the development device passing through the second opening of the main housing when the development device is being installed.

Each guide groove 1002A has a first recess 1002B and a second recess 1002C on a side (one side in the predetermined direction) thereof. The first recess 1002B and the second recess 1002C open upward and into the guide groove 1002A. As shown in FIG. 27B, the second recess 1002C is positioned between the first recess 1002B and the second opening H1012 in the axial direction. The dimension of the first recess 1002B is greater than the dimension of the second recess 1002C in the axial direction.

The dimension of the first recess 1002B is greater than the dimension of the first development protrusion 1074C in the axial direction. The dimension of the second recess 1002C in the axial direction is smaller than the dimension of the first development protrusion 1074C in the axial direction, and greater than the dimension of the second development protrusion 1074D in the axial direction. Since the dimension of the second recess 1002C is smaller than the dimension of the first development protrusion 1074C in the axial direction, the first development protrusion 1074C is restrained from getting caught in the second recess 1002C when the development device 1070 is moved along the guide groove 1002A in the axial direction.

As shown in FIG. 28B, when the development device 1070 is attached to the main housing 1002, the first development protrusion 1074C is positioned within the boundaries of the first recess 1002B in the axial direction. When the development device 1070 is attached to the main housing 1002, the second development protrusion 1074D is positioned within the boundaries of the second recess 1002C in the axial direction. Herein, "when the development device 1070 is attached to the main housing 1002" refers to the development device 1070 being positioned in an installed position in the axial direction, as shown in FIG. 28B. Further, "installed position" refers to the axial position of the development device 1070 during an image forming process.

Figure 29A:
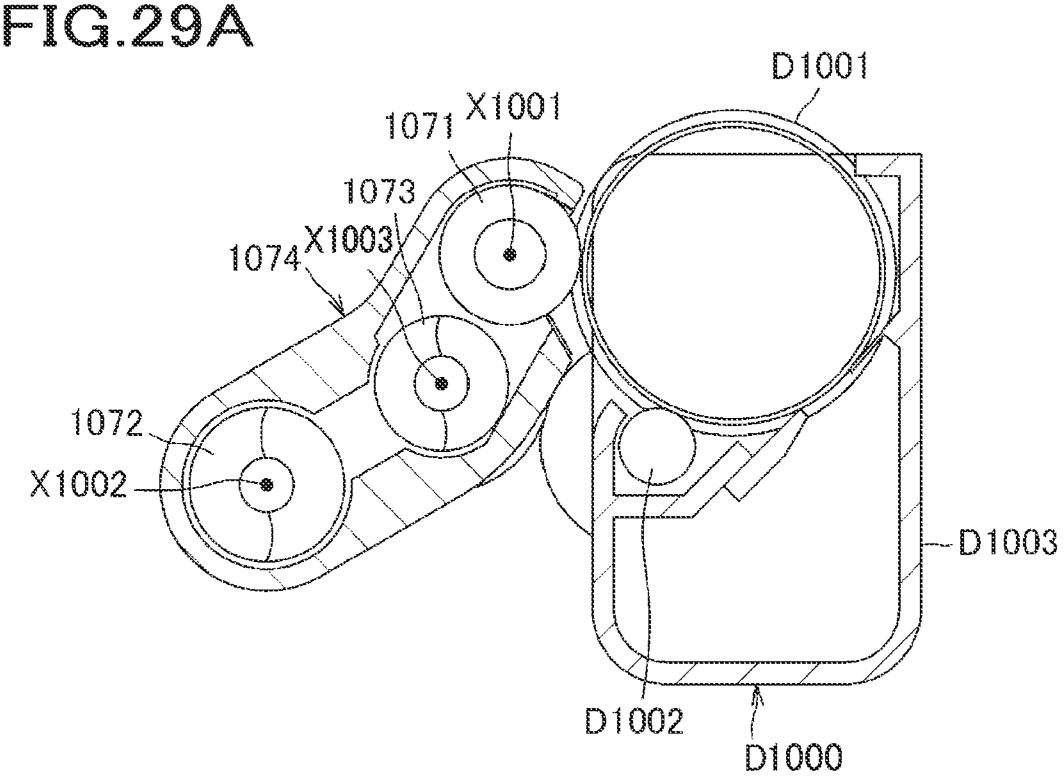
FIG. 29A is an illustration showing the housing positioned in a contact position.
Figure 29B:
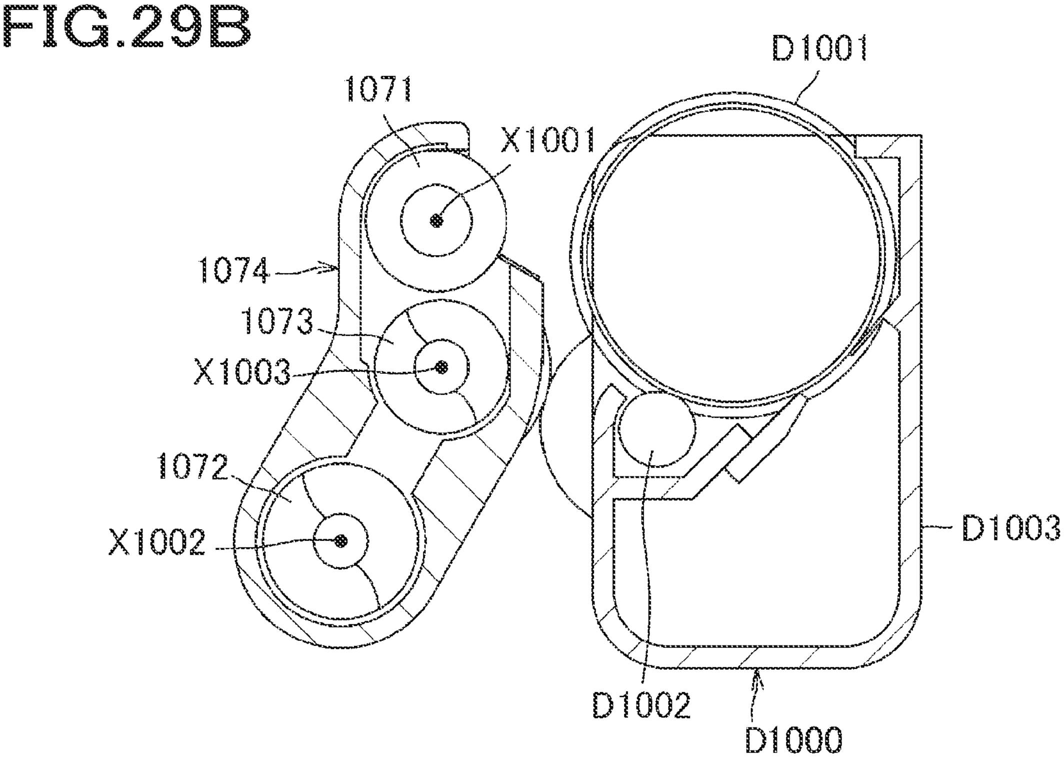
FIG. 29B is an illustration showing the housing positioned in a separated position.

The housing 1074 is rotatable about the second auger axis X1003 when the development device 1070 is attached to the main housing 1002. Specifically, the housing 1074 is rotatable between a contact position shown in FIG. 29A and a separated position shown in FIG. 29B. When the housing 1074 is positioned in the contact position, the development roller 1071 is in contact with the photosensitive drum D1001. When the housing 1074 is positioned in the separated position, the development roller 1071 is separated from the photosensitive drum D1001.

Figure 30A:
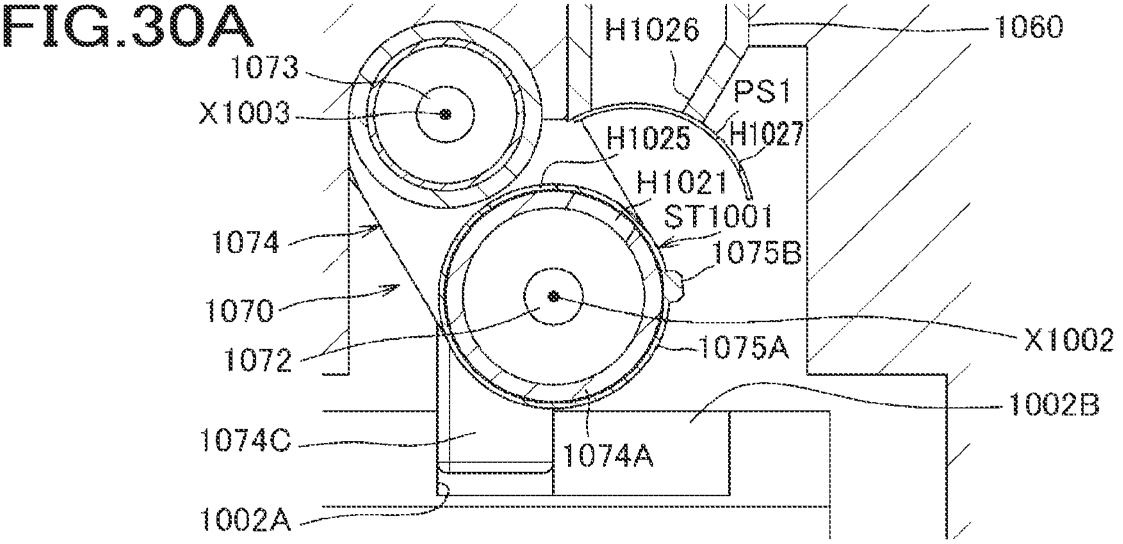
FIG. 30A is an illustration showing the relationship between the first shutter and a pipe shutter where the housing is positioned in the separated position and the first shutter and the pipe shutter are both closed.
Figure 30B:
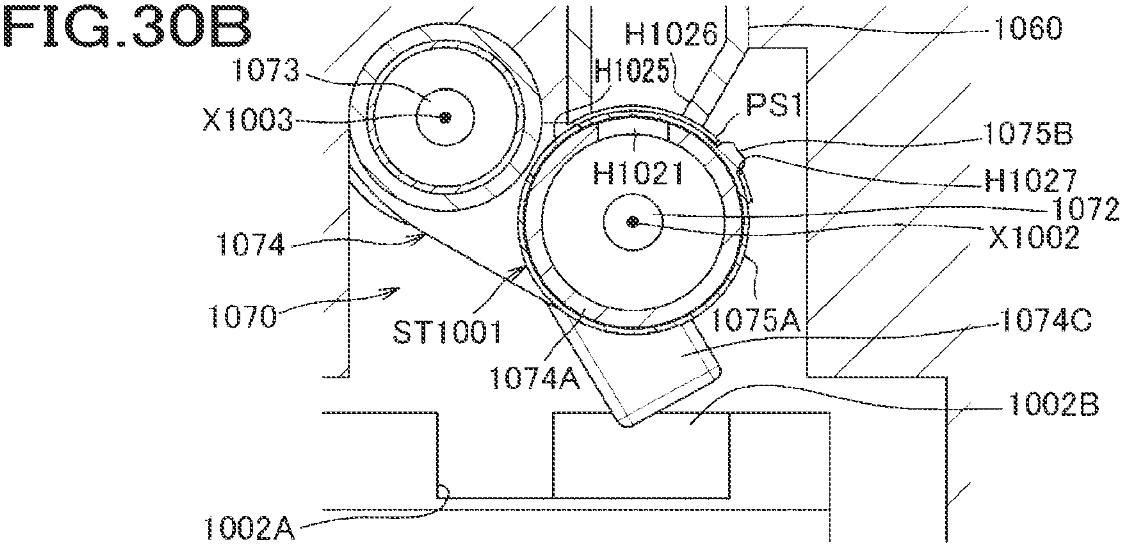
FIG. 30B is an illustration showing the relationship between the first shutter and the pipe shutter where the housing is positioned in the contact position and the first shutter and the pipe shutter are both closed.
Figure 30C:
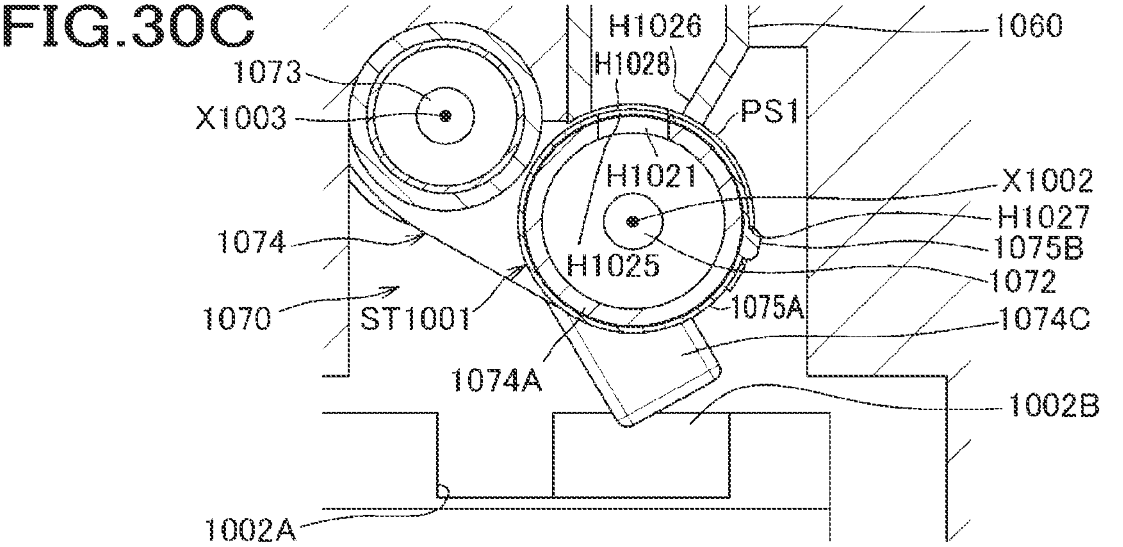
FIG. 30C is an illustration showing the relationship between the first shutter and the pipe shutter where the housing is positioned in the contact position and the first shutter and the pipe shutter are both open.

As shown in FIGS. 30A to 30C, the first development protrusion 1074C is allowed to move in the first recess 1002B when the housing 1074 rotates. Further, although not shown in the drawings, the second development protrusion 1074D is allowed to move in the second recess 1002C when the housing 1074 rotates. The development device 1070 is thereby allowed to rotate without interfering with the main housing 1002.

Figure 25A:
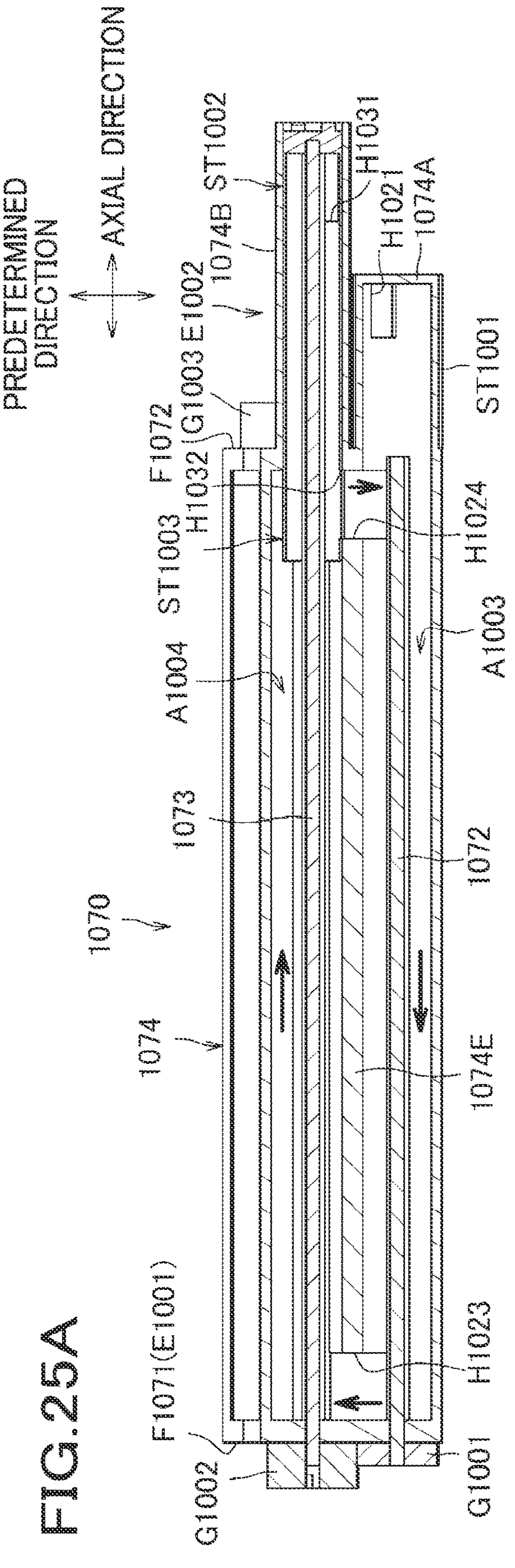
FIGS. 25A and 25B are cross-sectional views of the development device with a second shutter closed and a third shutter open.
Figure 25B:
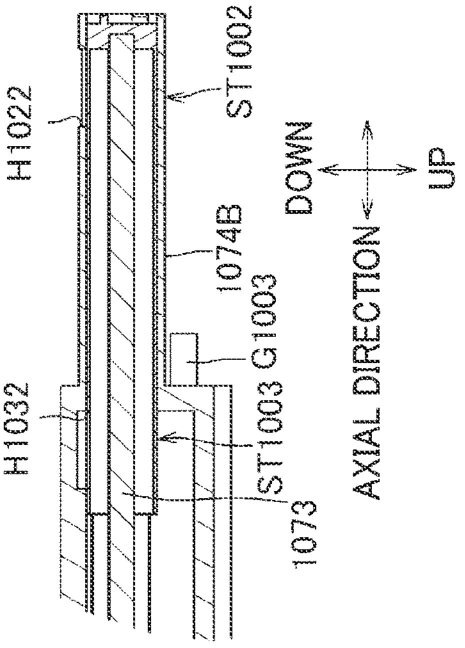

As shown in FIGS. 25A and 25B, the housing 1074 further includes a partition wall 1074E. The partition wall 1074E is a wall that divides a space inside the housing 1074 into a first space A1003 including the first auger 1072 and a second space A1004 including the second auger 1073. Herein, only the rotation axis of the first auger 1072 and the rotation axis of the second auger 1073 are shown in the drawings and helical blades are omitted.

The first auger 1072 conveys toner in the axial direction from the second end E1002 of the housing 1074 toward the first end E1001 of the housing 1074. The second auger 1073 conveys toner in the axial direction from the first end E1001 of the housing 1074 toward the second end E1002 of the housing 1074. In other words, the first auger 1072 conveys toner in the axial direction toward the second opening H1012 (see FIG. 19) when the development device 1070 is attached to the main housing 1002. The second auger 1073 conveys toner in the axial direction away from the second opening H1012 when the development device 1070 is attached to the main housing 1002.

The partition wall 1074E is positioned between the first auger 1072 and the second auger 1073. The partition wall 1074E has a feed port H1023 and a return port H1024. The feed port H1023 is an opening through which toner conveyed by the first auger 1072 is allowed to pass. The return port H1024 is an opening through which toner conveyed by the second auger 1073 is allowed to pass.

The feed port H1023 and the return port H1024 are connected to the first space A1003 and to the second space A1004. The feed port H1023 is positioned at an end of the partition wall 1074E closer to the first surface F1071 in the axial direction. The return port H1024 is positioned at an end of the partition wall 1074E closer to the second surface F1072 in the axial direction.

As shown in FIGS. 23A, 23B and 24, the first shutter ST1001 is a shutter for opening and closing the inlet H1021. The first shutter ST1001 is movable between a first open position to open the inlet H1021 and a first closed position to close the inlet H1021.

The first shutter ST1001 includes a base portion 1075A and a protrusion 1075B. The base portion 1075A is shaped as a cylinder. The base portion 1075A is fitted on the outer periphery of the first cylindrical portion 1074A. The base portion 1075A is rotatable relative to the first cylindrical portion 1074A. The base portion 1075A is rotatable about the first auger axis X1002. The base portion 1075A has a hole H1025.

As shown in FIG. 30C, when the first shutter ST1001 is positioned in the first open position, the hole H1025 is aligned with the inlet H1021. As shown in FIG. 30B, when the first shutter ST1001 is positioned in the first closed position, the hole H1025 is positioned away from the inlet H1021 in the circumferential direction of the first cylindrical portion 1074A.

As shown in FIG. 30A, the pipe 1060 has a pipe opening H1026 for delivering toner to the development device 1070. As shown in FIG. 30C, the inlet H1021 is opposed to the pipe opening H1026 when the development device 1070 is attached to the main housing 1002 and the housing 1074 is positioned in place in the contact position relative to the main housing 1002.

The multicolor printer 1001 further includes a pipe shutter PS1 for opening and closing the pipe opening H1026. The pipe shutter PS1 is movable between a fourth open position shown in FIG. 30C and a fourth closed position shown in FIG. 30B. When the pipe shutter PS1 is positioned in the fourth open position, the pipe opening H1026 is opened. When the pipe shutter PS1 is positioned in the fourth closed position, the pipe shutter PS1 closes the pipe opening H1026. A drive force from a motor (not shown) mounted to the main housing 1002 causes the pipe shutter PS1 to rotate.

The pipe shutter PS1 is shaped as an arc that follows the outer peripheral surface of the first shutter ST1001. As shown in FIG. 30C, the pipe shutter PS1 has a hole H1027 and an opening H1028.

The hole H1027 is a hole in which the projection 1075B of the first shutter ST1001 is fitted. When the projection 1075B is fitted in the hole H1027, the pipe shutter PS1 is rotatable about the first auger axis X1002 together with the first shutter ST1001.

When the projection 1075B is fitted in the hole H1027, the first cylindrical portion 1074A is positioned in place relative to the pipe 1060 via the first shutter ST1001 and the pipe shutter PS1. Thus, the first shutter ST1001 is movable between the first closed position and the first open position on the condition that the development device 1070 is attached to the main housing 1002, the first cylindrical portion 1074A is positioned in place relative to the pipe 1060, and the inlet H1021 is opposed to the pipe opening H1026.

The opening H1028 is an opening that opens the pipe opening H1026 (refer also to FIG. 19). The opening H1028 is aligned with the hole H1025 of the first shutter ST1001 when the projection 1075B is fitted in the hole H1027. Thus, the opening H1028 is aligned with the hole H1025 regardless of the position of the pipe shutter PS1.

As shown in FIG. 24, the shutter unit 1076 includes a base portion 1076A, a bottom wall 1076B, and two protrusions 1076C. The base portion 1076A is a cylindrical part. The base portion 1076A is fitted into the second cylindrical portion 1074B and is in contact with an inner circumferential surface of the second cylindrical portion 1074B. The base portion 1076A is rotatable relative to the second cylindrical portion 1074B. The base portion 1076A is rotatable about the second auger axis X1003.

The bottom wall 1076B is positioned at an end (one end in the axial direction) of the cylindrical base portion 1076A. The bottom wall 1076B covers an opening of the second cylindrical portion 1074B. The protrusions 1076C protrude from a side of the bottom wall 1076B opposite to the base portion 1076A. A drive force from a motor (not shown) mounted to the main housing 1002 is transmitted to the protrusions 1076C. The drive force from the motor thereby causes the shutter unit 1076 to rotate.

Herein, the motor of the shutter unit 1076 may be a motor different from the motor of the pipe shutter PS1. Alternatively, the shutter unit 1076 and the pipe shutter PS1 may be driven individually by a common motor using a clutch.

The base portion 1076A has a first hole H1031 and a second hole H1032. The first hole H1031 is a hole that opens the outlet H1022 of the housing 1074. The second hole H1032 is a hole that opens the return port H1024 (see FIGS. 25A and 25B) of the housing 1074. The cylindrical part of the base portion 1076A including the first hole H1031 is the second shutter ST1002. The cylindrical part of the base portion 1076A including the second hole H1032 is the third shutter ST1003. That is, in this embodiment, the second shutter ST1002 and the third shutter ST1003 are formed integrally in one piece.

Figure 26A:
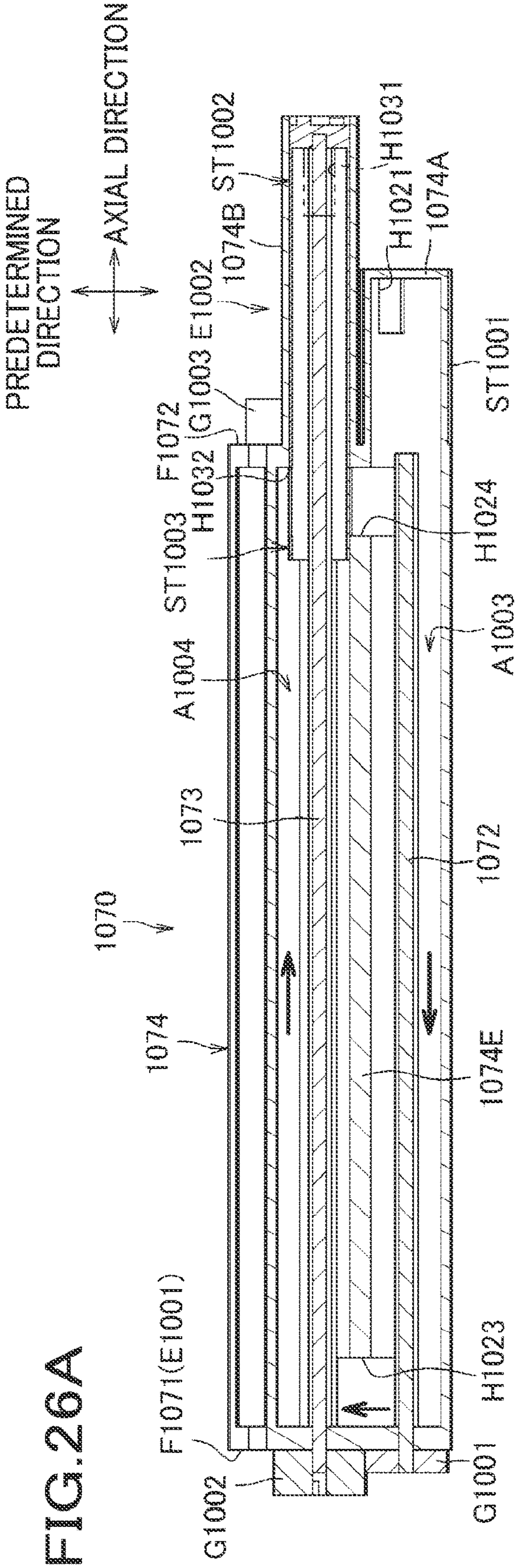
FIGS. 26A and 26B are cross-sectional views of the development device with the second shutter open and the third shutter closed.
Figure 26B:
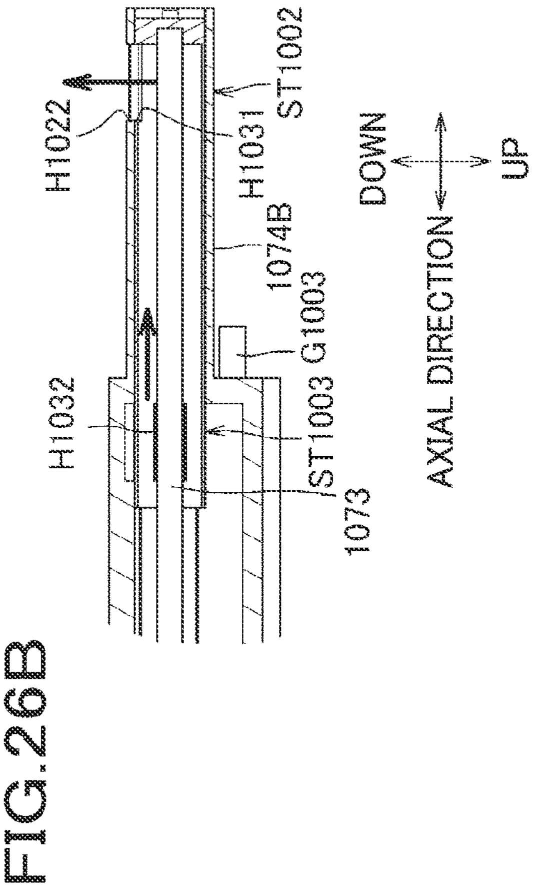
Figure 31A:
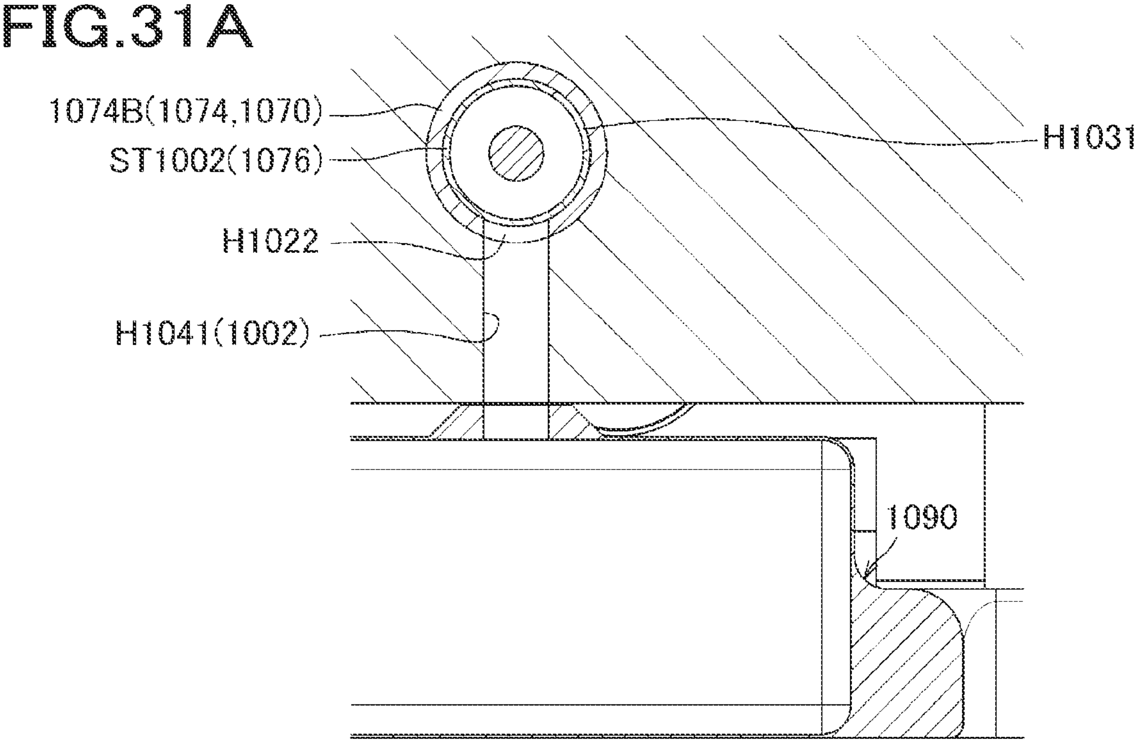
FIG. 31A is an illustration showing the second shutter in a closed state.
Figure 31B:
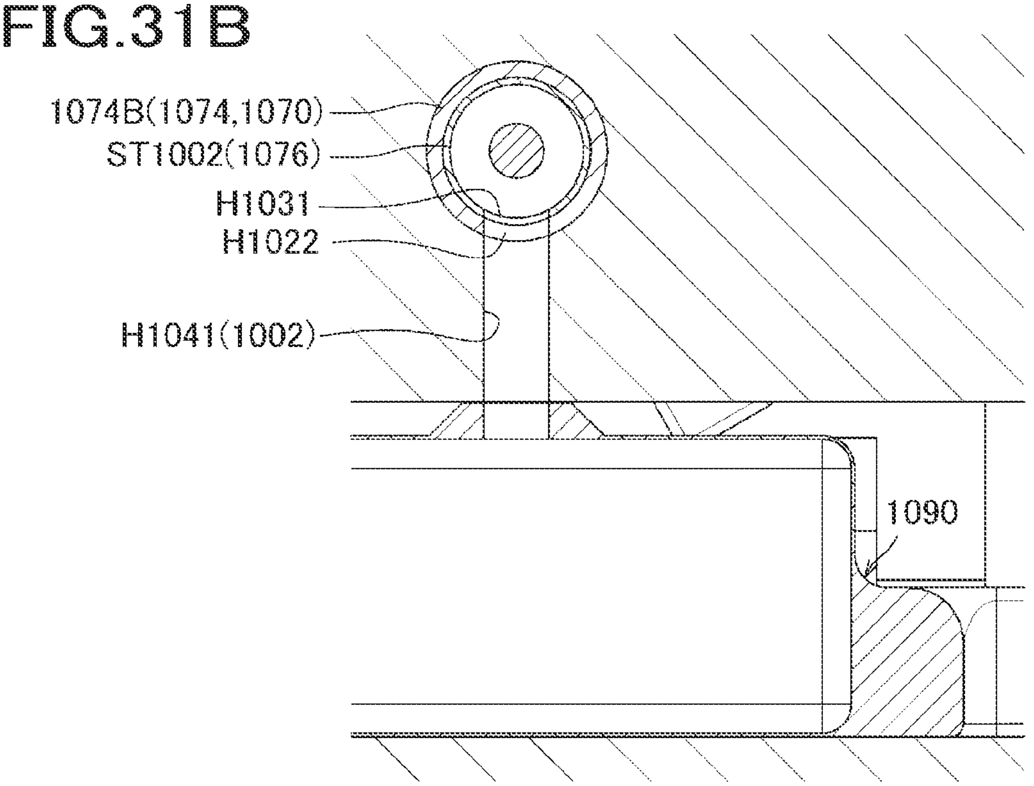
FIG. 31B is an illustration showing the second shutter in an open state.

The second shutter ST1002 is movable between a second closed position shown in FIGS. 25B and 31A, and a second open position shown in FIGS. 26B and 31B. When the second shutter ST1002 is positioned in the second closed position, the outlet H1022 is opened. When the second shutter ST1002 is positioned in the second open position, the outlet H1022 is opened. The second shutter ST1002 is movable between the second closed position and the second open position on the condition that the development device 1070 is attached to the main housing 1002, the first cylindrical portion 1074A is positioned in place relative to the pipe 1060, and the inlet H1021 is opposed to the pipe opening H1026.

The third shutter ST1003 is movable between a third open position shown in FIG. 25A and a third closed position shown in FIG. 26A. When the third shutter ST1003 is positioned in the third open position, the return port H1024 is opened. When the third shutter ST1003 is positioned in the third closed position, the third shutter ST1003 closes the return port H1024. The third shutter ST1003 is movable between the third closed position and the third open position on the condition that the development device 1070 is attached to the main housing 1002 and the first cylindrical portion 1074A is positioned in place relative to the pipe 1060.

As shown in FIGS. 31A and 31B, the main housing 1002 further has a main housing passage H1041. The main housing passage H1041 is a passage for delivering toner discharged through the outlet H1022 of the development device 1070 to the waste toner box 1090. The main housing passage H1041 extends in the up-down direction.

As shown in FIG. 23A, the first auger 1072 has a first end and a second end positioned apart from each other in the axial direction. The second auger 1073 has a first end and a second end positioned apart from each other in the axial direction. The first gear G1001 is positioned at the first end of the first auger 1072. The first gear G1001 is rotatable together with the first auger 1072. The first gear G1001 is engaged with the second gear G1002. The outer diameter of the first gear G1001 is smaller than the outer diameter of the second gear G1002.

The second gear G1002 is positioned at the first end of the second auger 1073. The second gear G1002 is rotatable together with the second auger 1073.

As shown in FIG. 23B, the development roller shaft 1071A has a first end and a second end positioned apart from each other in the axial direction. The development gear G1003 is positioned at the second end of the development roller shaft 1071A. The development gear G1003 is rotatable together with the development roller 1071.

Figure 28A:
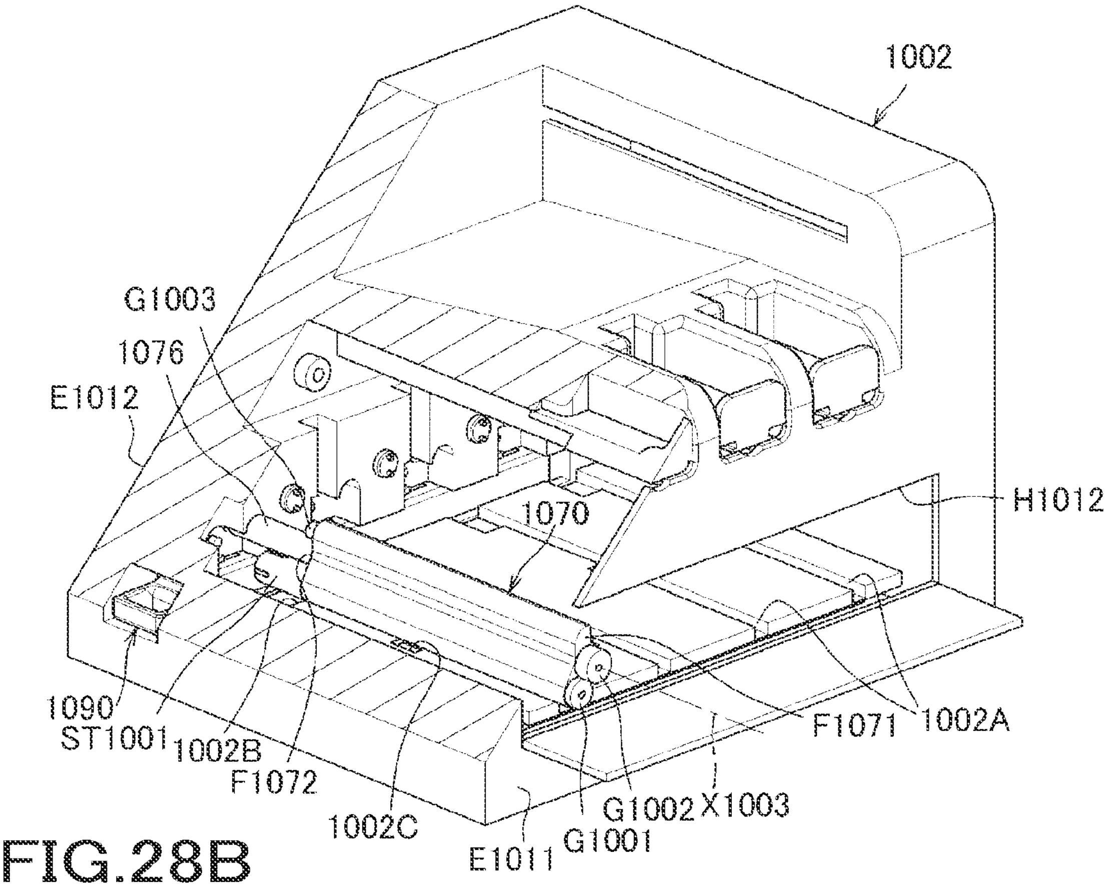
FIG. 28A is a perspective view showing the development device attached to the main housing.
Figure 28B:
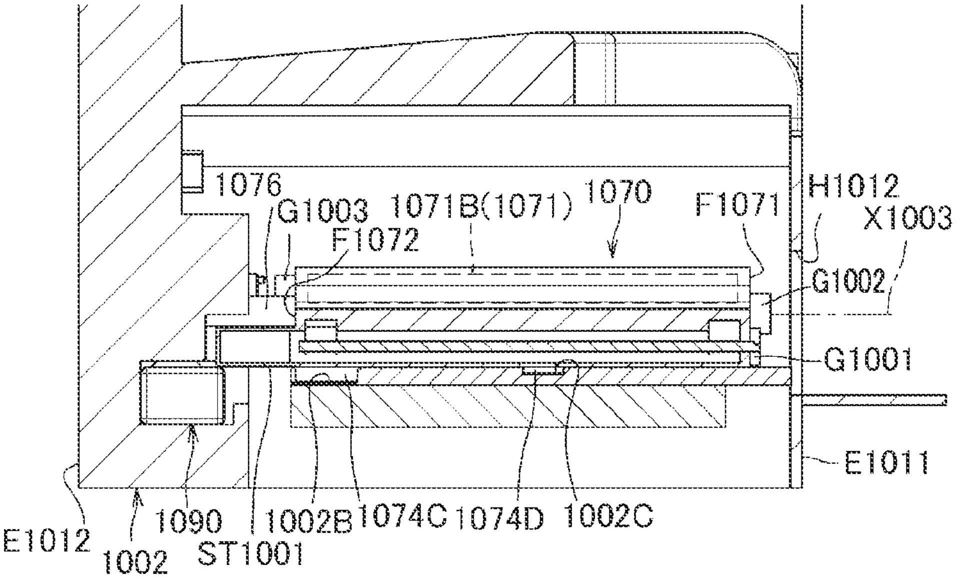
FIG. 28B is a cross-sectional view showing the development device attached to the main housing.

As shown in FIGS. 28A and 28B, the first gear G1001 and the second gear G1002 are positioned at the first end E1011 of the main housing 1002 when the development device 1070 is attached to the main housing 1002. The first gear G1001 and the second gear G1002 are positioned closer, than the roller body 1071B of the development roller 1071, to the second opening H1012 in the axial direction when the development device 1070 is attached to the main housing 1002.

The development gear G1003, the first shutter ST1001, and the shutter unit 1076 are positioned at the second end E1012 of the main housing 1002 when the development device 1070 is attached to the main housing 1002. The inlet H1021 and the outlet H1022 shown in FIG. 24 are thereby positioned at the second end E1012 of the main housing 1002 when the development device 1070 is attached to the main housing 1002. Further, the first gear G1001 and the second gear G1002 are positioned closer, than the inlet H1021 and the outlet H1022, to the second opening H1012 when the development device 1070 is attached to the main housing 1002.

Figure 32A:
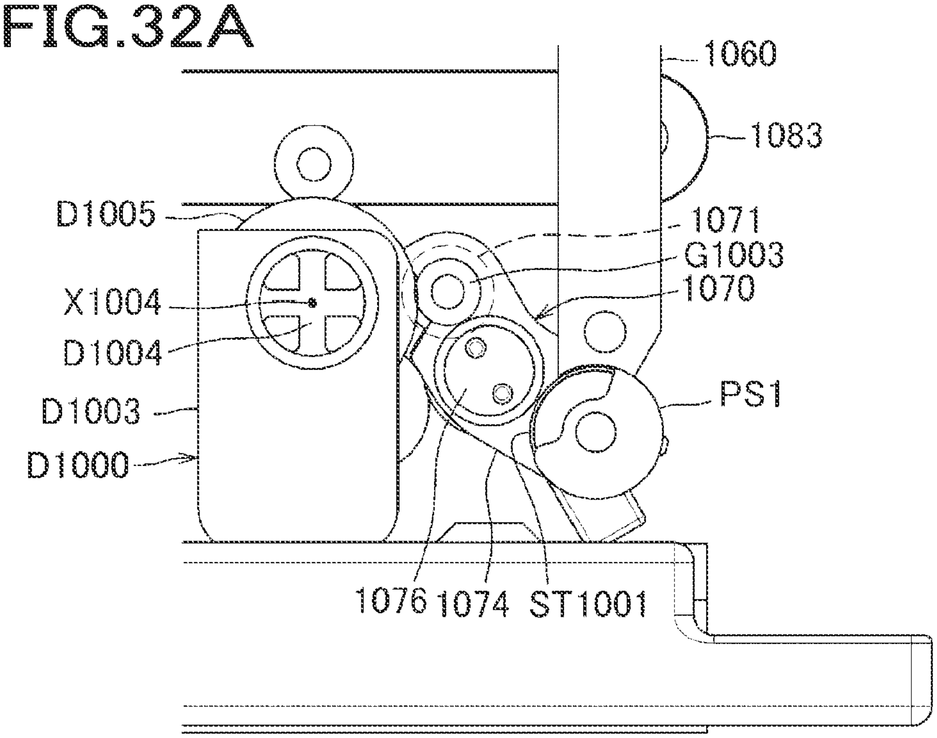
FIG. 32A is an illustration showing the structures of a drum unit and the development device at one of the ends thereof in an axial direction.
Figure 32B:
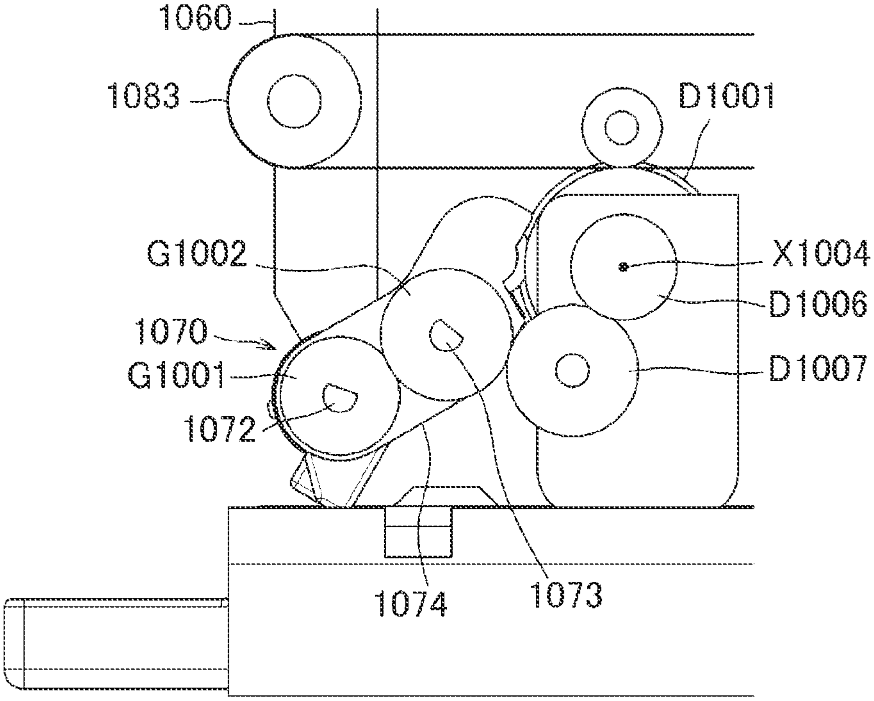
FIG. 32B is an illustration showing the structures of the drum unit and the development device at the other of the ends thereof in the axial direction.

As shown in FIGS. 32A and 32B, the drum unit D1000 further includes a drum coupling D1004, a second drum gear D1005, a first drum gear D1006, and an idle gear D1007. The first drum gear D1006 and the idle gear D1007 are positioned at the first end E1011 of the main housing 1002 when the development device 1070 and the drum unit D1000 are attached to the main housing 1002. The drum coupling D1004 and the second drum gear D1005 are positioned at the second end E1012 of the main housing 1002 when the development device 1070 and the drum unit D1000 are attached to the main housing 1002.

The drum coupling D1004, the second drum gear D1005, and the first drum gear D1006 are rotatable about the drum axis X1004 together with the photosensitive drum D1001. The photosensitive drum D1001 has a first end and a second end positioned apart from each other in the axial direction. The first drum gear D1006 is positioned at the first end of the photosensitive drum D1001. The drum coupling D1004 and the second drum gear D1005 are positioned at the second end of the photosensitive drum D1001. A drive force of a motor (not shown) mounted to the main housing 1002 is transmitted to the drum coupling D1004.

The second drum gear D1005 is engaged with the development gear G1003 when the development device 1070 and the drum unit D1000 are attached to the main housing 1002. Specifically, the second drum gear D1005 is engaged with the development gear G1003 when the housing 1074 of the development device 1070 is positioned in the contact position. The development gear G1003 is separated from the second drum gear D1005 when the housing 1074 of the development device 1070 is positioned in the separated position.

The first drum gear D1006 is engaged with the idle gear D1007. The idle gear D1007 is engaged with the second gear G1002 when the development device 1070 and the drum unit D1000 are attached to the main housing 1002. The idle gear D1007 is always engaged with the second gear G1002 regardless of whether the housing 1074 of the development device 1070 is positioned in the contact position or the separated position.

The drive force input to the drum coupling D1004 is transmitted to the development gear G1003 via the second drum gear D1005. This causes the development roller 1071 to rotate. The drive force transmitted to the second drum gear D1005 is transmitted to the first drum gear D1006 via the photosensitive drum D1001. The drive force transmitted to the first drum gear D1006 is transmitted to the first gear G1001 via the idle gear D1007 and the second gear G1002. This causes the first auger 1072 and the second auger 1073 to rotate.

The controller 1100 includes a central processing unit (CPU), a read-only memory (ROM), a random-access memory (RAM), etc. The controller 1100 is configured to execute various processes according to prestored programs, in response to printing commands. The controller 1100 has a function of moving the first shutter ST1001 from the first closed position to the first open position on the condition that the second shutter ST1002 is positioned in the second closed position and the third shutter ST1003 is positioned in the third open position. Further, the controller 1100 has a function of moving the second shutter ST1002 from the second closed position to the second open position and the third shutter ST1003 from the third open position to the third closed position on the condition that the first shutter ST1001 is positioned in the first closed position.

The controller 1100 is capable of executing a supplying process, a waste toner discharging process, and a printing process. Toner is supplied from the pipe 1060 to the development device 1070 in the supplying process. Deteriorated toner contained in the development device 1070 is discharged to the waste toner box 1090 in the waste toner discharging process. An image is formed on the sheet S1 in the printing process. In the supplying process and the printing process, the controller 1100 positions the first shutter ST1001 in the first open position, the second shutter ST1002 in the second closed position, and the third shutter ST1003 in the third open position. Toner can thereby be supplied from the pipe 1060 to the development device 1070. Further, since toner is allowed to pass through the return port H1024, toner can be circulated inside the development device 1070.

In the waste toner discharging process, the controller 1100 positions the first shutter ST1001 in the first closed position, the second shutter ST1002 in the second open position, and the third shutter ST1003 in the third closed position. Toner can thereby be discharged from the development device 1070 to the waste toner box 1090. Further, since passage of toner through the return port H1024 is restricted by the third shutter ST1003, toner contained in the development device 1070 can be smoothly discharged.

The controller 1100 is configured to move the first shutter ST1001 and the second shutter ST1002 so that the second shutter ST1002 is not positioned in the second open position when the first shutter ST1001 is positioned in the first open position. It is to be understood that the second shutter ST1002 and the third shutter ST1003 are formed integrally in one piece in this embodiment and thus move in conjunction with each other. Accordingly, movement of the second shutter ST1002 will be described in the following description and description of movement of the third shutter ST1003 will be omitted as appropriate.

When the controller 1100 switches from the printing process to the waste toner discharging process, the controller 1100 positions the first shutter ST1001 in the first closed position, and then positions the second shutter ST1002 in the second open position. New toner supplied from the pipe 1060 to the development device 1070 is thereby restrained from being accidentally discharged from the outlet H1022.

When the controller 1100 switches from the waste toner discharging process to the supplying process, the controller 1100 positions the second shutter ST1002 in the second closed position, and then positions the first shutter ST1001 in the first open position. New toner supplied from the pipe 1060 to the development device 1070 is thereby restrained from being accidentally discharged from the outlet H1022.

The multicolor printer 1001 further includes a first shutter sensor and a second shutter sensor (not shown). The first shutter sensor detects a position of the first shutter ST1001. The second shutter sensor detects a position of the shutter unit 1076. The controller 1100 is capable of determining the open/closed state of the first shutter ST1001 based on a signal from the first shutter sensor. The controller 1100 is capable of determining the open/closed state of the second shutter ST1002 based on a signal from the second shutter sensor.

If power is turned off, or the second cover C1002 or the third cover C1003 is opened, causing a process to be aborted, while the first shutter ST1001 or the second shutter ST1002 is moving, the position of the first shutter ST1001 or the second shutter ST1002 may become unidentifiable. The controller 1100 has a function of determining the open/closed state of the first shutter ST1001 and the open/closed state of the second shutter ST1002 when power is turned on, the second cover C1002 has been closed, or the third cover C1003 has been closed.

Next, operation of the controller 1100 will be explained in detail. The controller 1100 executes the process shown in FIG. 33 when power is turned on, the second cover C1002 or the third cover C1003 has been closed, or on other occasions. Determination of whether the second cover C1002 or the third cover C1003 has been closed may, for example, be made based on signals from sensors for detecting the open/close of the second cover C1002 and the open/close of the third cover C1003.

Figure 33:
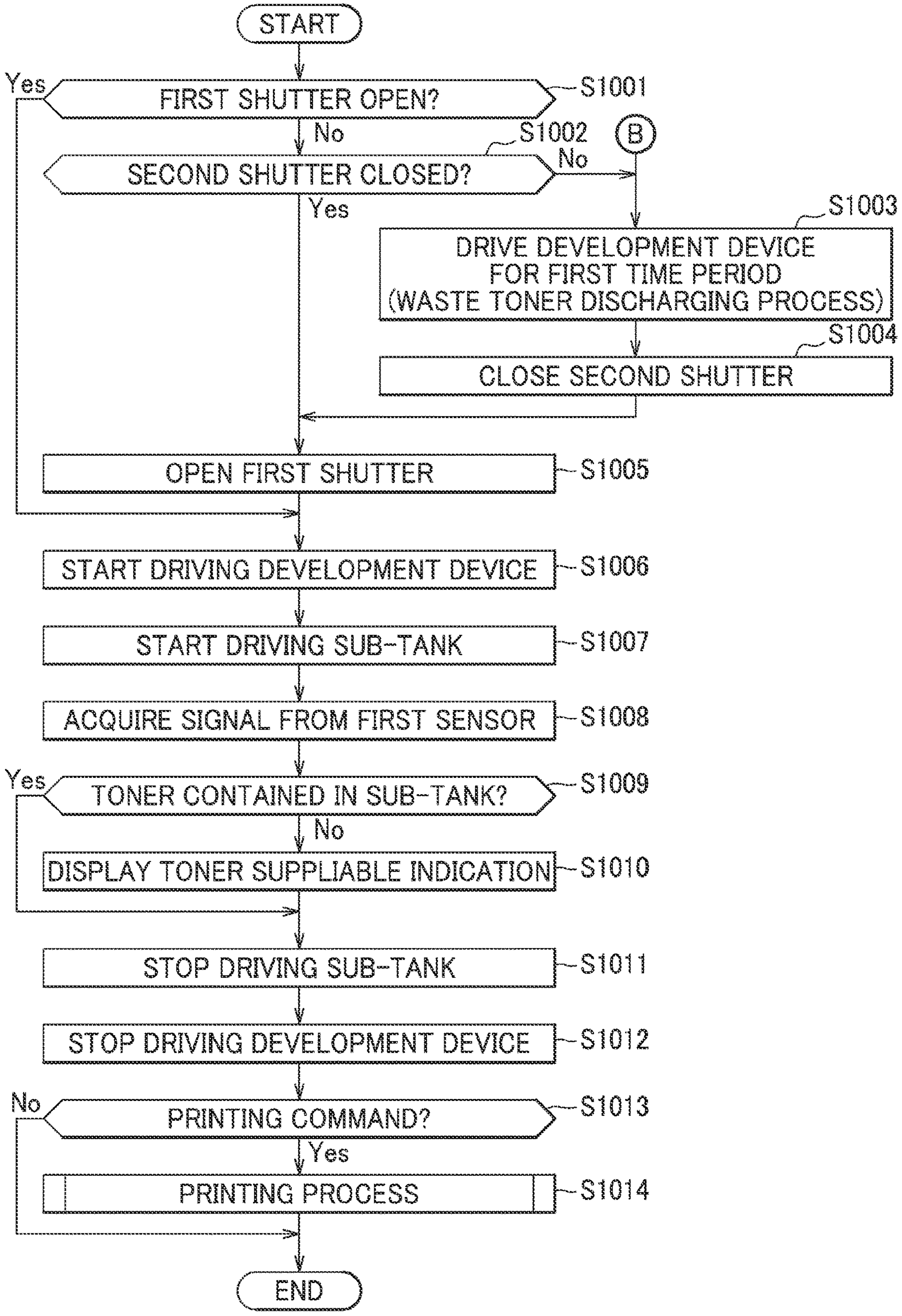
FIG. 33 is a flowchart showing the operation of a controller.

In the process shown in FIG. 33, the controller 1100 first determines whether or not the first shutter ST1001 is positioned in the first open position (S1001). In other words, the controller 1100 determines in step S1001 whether or not the first shutter ST1001 is open.

If it is determined in step S1001 that the first shutter ST1001 is not positioned in the first position (No), the controller 1100 determines whether or not the second shutter ST1002 is positioned in the second closed position (S1002). In other words, the controller 1100 determines in step S1002 whether or not the second shutter ST1002 is closed.

If the second shutter ST1002 is not positioned in the second closed position in step S1002 (No), the second shutter ST1002 is positioned in the second open position with the first shutter ST1001 positioned in the first closed position; thus, it is very likely that the waste toner discharging process has been interrupted. If it is determined in step S1002 that the second shutter ST1002 is not positioned in the second closed position (No), the controller 1100 drives the development device 1070 for a first time period to execute the waste toner discharging process (S1003).

After step S1003, the controller 1100 moves the second shutter ST1002 to the second closed position (S1004), and then moves the first shutter ST1001 from the first closed position to the first open position (S1005). In other words, the controller 1100 closes the second shutter ST1002 in step S1004, and opens the first shutter ST1001 in step S1005. After step S1005, the controller 1100 executes the supplying process shown in steps S1006 to S1012.

If it is determined in step S1002 that the second shutter ST1002 is positioned in the second closed position (Yes), the first shutter ST1001 is positioned in the first closed position, and the second shutter ST1002 is positioned in the second closed position; thus, the controller 1100 moves the first shutter ST1001 from the first closed position to the first open position (S1005), and then executes the supplying process shown in steps S1006 to S1012.

If the first shutter ST1001 is positioned in the first open position in step S1001, the second shutter ST1002 is not positioned in the second open position; thus, the second shutter ST1002 is positioned in the second closed position with the first shutter ST1001 positioned in the first open position. If it is determined in step S1001 that the first shutter ST1001 is positioned in the first open position (Yes), the controller 1100 executes the supplying process shown in steps S1006 to S1012.

In step S1006, the controller 1100 starts driving the development device 1070. Herein, driving the development device 1070 refers to rotating at least the first auger 1072 and the second auger 1073 out of the development roller 1071, the first auger 1072 and the second auger 1073.

After step S1006, the controller 1100 starts driving the sub-tank 1050 (S1007). Herein, driving the sub-tank 1050 refers to rotating the first conveying member 1051 and the second conveying member 1052. After step S1007, the controller 1100 acquires a signal from the first sensor 1210 (S1008).

After step S1008, the controller 1100 determines, based on the signal from the first sensor 1210, whether or not an amount of toner equal to or more than a first predetermined amount is contained in the sub-tank 1050 (S1009). In this embodiment, the first predetermined amount is an amount equal to toner containable in two toner boxes 1040.

If it is determined in step S1009 that the sub-tank 1050 does not contain toner of an amount equal to or more than the first predetermined amount (No), the controller 1100 shows a toner suppliable indication indicating that toner can be supplied to the sub-tank 1050 on a display (not shown) (S1010). Herein, the display is, for example, an operating panel attached to an outer surface of the main housing 1002.

After step S1010 or when it is determined yes in step S1009, the controller 1100 stops driving the sub-tank 1050 after a predetermined time period has lapsed from the start of driving the sub-tank 1050 (S1011). After step S1011, the controller 1100 stops driving the development device 1070 (S1012).

After step S1012, the controller 1100 determines whether or not there is a printing command (S1013). If it is determined in step S1013 that there is a printing command (Yes), the controller 1100 executes the printing process (S1014). After the printing process is finished or it is determined no in step S1013, the controller 1100 ends the present process.

Figure 34:
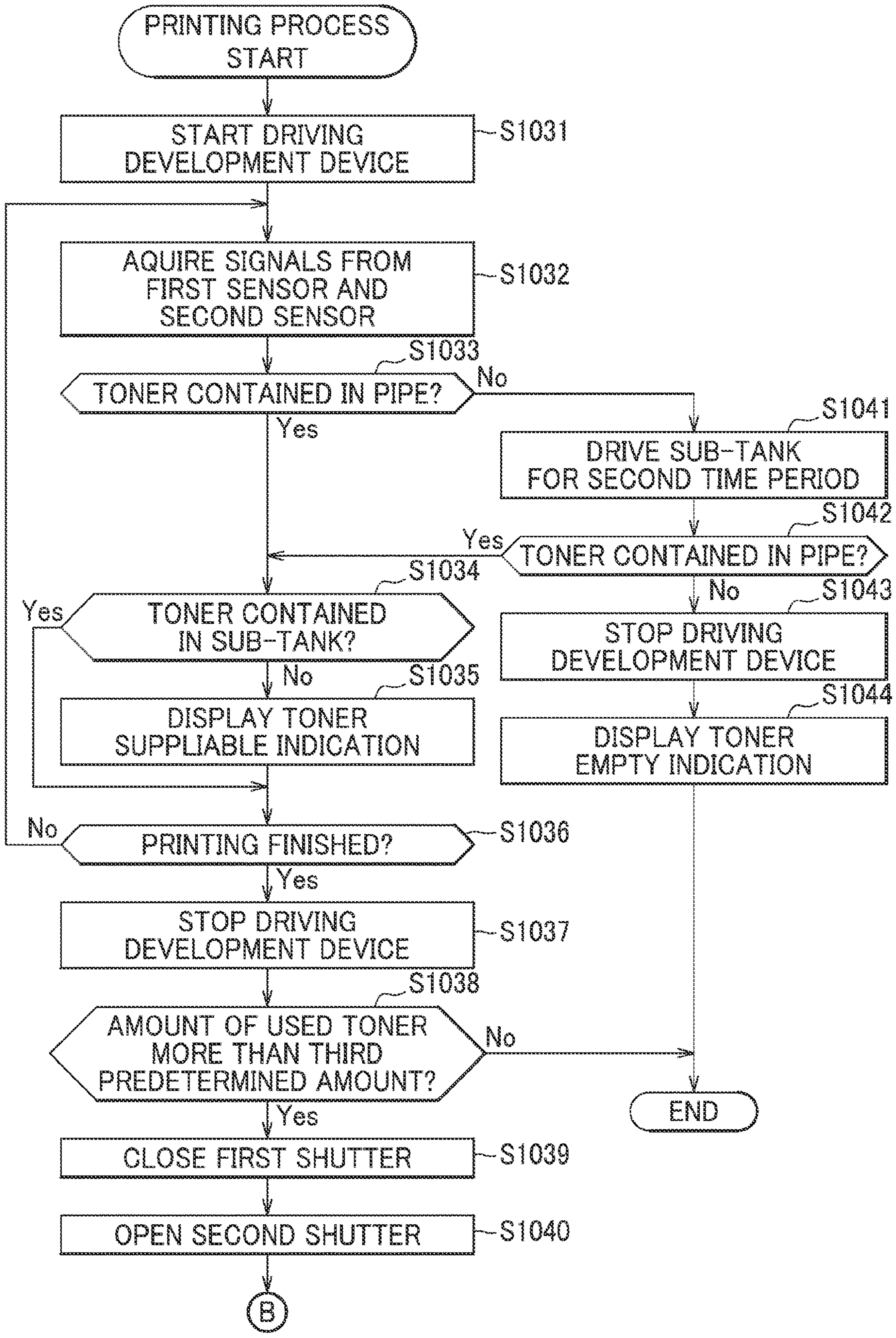
FIG. 34 is a flowchart showing a printing process.

As shown in FIG. 34, during the printing process, the controller 1100 first starts driving the development device 1070 and starts the printing process (S1031). Description of the exposure process and the fixing process, included in the printing process, will be omitted.

After step S1031, the controller acquires signals from the first sensor 1210 and the second sensor 1220 (S1032). After step S1032, the controller 1100 determines, based on the signal from the second sensor 1220, whether or not an amount of toner equal to or more than a second predetermined amount is contained in the pipe 1060 (S1033).

If it is determined in step S1033 that an amount of toner equal to or more than the second predetermined amount is contained in the pipe 1060 (Yes), the controller 1100 determines whether or not an amount of toner equal to or more than the first predetermined amount is contained in the sub-tank 1050 based on the signal from the first sensor 1210 (S1034). If it is determined in step S1034 that an amount of toner equal to or more than the first predetermined amount is not contained in the sub-tank 1050 (No), the controller 1100 shows the toner suppliable indication on the display (S1035).

After step S1035 or if it is determined yes in step S1034, the controller 1100 determines whether or not printing has been finished (S1036). If it is determined in step S1036 that printing has not been finished (No), the controller 1100 returns to the process of step S1032.

If it is determined in step S1036 that printing has been finished (Yes), the controller 1100 stops driving the development device 1070 (S1037). After step S1037, the controller 1100 determines whether or not an amount of toner used for printing is more than a third predetermined amount (S1038).

It is to be understood that the method for determining whether or not the amount of toner used for printing is more than the third predetermined amount may be any kind of method. Whether or not the amount of toner used for printing is more than the third predetermined amount may, for example, be determined based on a number of dots included in image data and counted during printing. The third predetermined amount may be set, for example, at an amount that may cause deterioration of toner in the development device 1070.

If it is determined in step S1038 that the amount of toner used for printing is more than the third predetermined amount (Yes), the controller 1100 moves the first shutter ST1001 from the first open position to the first closed position (S1039), and then moves the second shutter ST1002 from the second closed position to the second open position (S1040) and executes the waste toner discharging process shown in FIG. 33 (S1003). In other words, the controller 1100 closes the first shutter ST1001 in step S1039, and opens the second shutter ST1002 in step S1040. If it is determined in step S1038 that toner used for printing is not more than the third predetermined amount (No), the controller 1100 ends the printing process.

If it is determined no in step S1033, the controller 1100 drives the sub-tank 1050 for a second time period (S1041). After step S1041, the controller 1100 determines, based on the signal from the second sensor 1220, whether or not an amount of toner equal to or more than the second predetermined amount is contained in the pipe 1060 (S1042).

If it is determined in step S1042 that an amount of toner equal to or more than the second predetermined amount is contained in the pipe 1060 (Yes), the controller 1100 proceeds to the process of step S1034. If it is determined in step S1042 that an amount of toner equal to or more than the second predetermined amount is not contained in the pipe 1060 (No), the controller 1100 stops driving the development device 1070 (S1043). After step S1043, the controller 1100 displays a toner empty indication indicating that toner contained in the development device 1070 has become equal to or less than a predetermined value on the display (S1044) and ends the present process.

According to the above-described embodiment, the following advantageous effects can be obtained.

A multicolor printer 1001 can be provided in which the inlet H1021 of the development device 1070 and the pipe opening H1026 of the pipe 1060 are opposed to each other when the development device 1070 is attached to the main housing 1002 in a configuration in which the development device 1070 is installable into and removable from the main housing 1002 in the axial direction.

By opening and closing the inlet H1021 with the first shutter ST1001, it is possible to supply toner from the pipe 1060 to the development device 1070 or to stop supplying toner from the pipe 1060 to the development device 1070.

By opening and closing the outlet H1022 with the second shutter ST1002, it is possible to discharge toner from the development device 1070 to the waste toner box 1090 or to stop discharging toner from the development device 1070 to the waste toner box 1090.

Since the inlet H1021 faces upward and the outlet H1022 faces downward, toner can be smoothly received in and discharged from the development device 1070.

Since the movement of the first shutter ST1001 and the second shutter ST1002 is controlled by the controller 1100 so that the second shutter ST1002 is not positioned in the second open position when the first shutter ST1001 is positioned in the first open position, fresh toner supplied from the pipe 1060 to the development device 1070 can be restrained from being discharged from the outlet H1022.

Since the development device 1070 is configured such that the first auger 1072 conveys toner in one axial direction, the second auger 1073 conveys toner in the other axial direction, and the partition wall 74A has a feed port H1023 and a return port H1024, toner can be circulated inside the development device 1070.

Since the return port H1024 is closed by the third shutter ST1003 when deteriorated toner contained in the development device 1070 is discharged, passage of deteriorated toner through the return port H1024 can be restricted by the third shutter ST1003. Thus, deteriorated toner can be smoothly discharged.

Since the presence or absence of toner in the pipe 1060 is detected by the second sensor 1220, the amount of toner in the development device 1070 can be known indirectly.

Since the second sensor 1220 is positioned above the lower end of the development roller 1071, the second sensor 1220 detecting toner indicates that toner contained in the development device 1070 is in contact with the development roller 1071. Thus, toner contained in the development device 1070 can be reliably brought into contact with the development roller 1071.

Since the protrusion 1075B of the first shutter ST1001 is fitted in the hole H1027 of the pipe shutter PS1, the first cylindrical portion 1074A can be positioned in place relative to the pipe 1060 via the first shutter ST1001 and the pipe shutter PS1.

Since the first auger 1072 and the second auger 1073 move in conjunction with each other, the structure of the development device 1070 can be simplified compared to an alternative structure in which, for example, the first auger and the second auger are rotated individually. Further, since the first gear G1001 and the second gear G1002 are disposed on a side of the image forming apparatus opposite to the pipe 1060 and the inlet H1021 in the axial direction, it is possible, for example, to avoid disposing the pipe, the inlet, the first gear, and the second gear on one end of the image forming apparatus in the axial direction and to restrain upsizing of the one end of the image forming apparatus.

Since the first gear G1001 and the second gear G1002 are engaged with each other, the structure of the development device 1070 can be simplified compared to, for example, an alternative structure in which another gear is interposed between the first gear and the second gear.

Since the handle 1091 of the waste toner box 1090 has the hole 1091A, the user can easily pull out the waste toner box 1090.

Since the development device 1070 and the waste toner box 1090 are connected via the main housing passage H1041, the development device 1070 and the waste toner box 1090 can be easily installed and removed individually, compared to, for example, an alternative structure in which the development device and the waste toner box are connected directly.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the first gear G1001 and the second gear G1002 are engaged with each other in the second embodiment, an idle gear may, for example, be interposed between the first gear and the second gear.

Although the second shutter ST1002 and the third shutter ST1003 are formed integrally in one piece in the second embodiment, the second shutter ST1002 and the third shutter ST1003 may, for example, be formed separately. In this case, the second shutter and the third shutter may be connected by a gear or the like, and the second shutter and the third shutter may be moved in conjunction with each other such that the relation between the open/close state of the second shutter and the open/close state of the third shutter become similar to the second embodiment. Further, the second shutter and the third shutter may be individually operated by the controller.

The whole waste toner box may overlap the scanner as viewed in the axial direction.

Although the present disclosure is applied to the multicolor printer 1001 in the second embodiment, the present disclosure may be applied to other image forming apparatuses such as copying machines, multifunctional devices, etc.

The elements described in the second embodiment and its modified examples may be implemented selectively and in combination.

Next, the third embodiment of the present disclosure will be described in detail referring to the drawings where appropriate.

Figure 35:
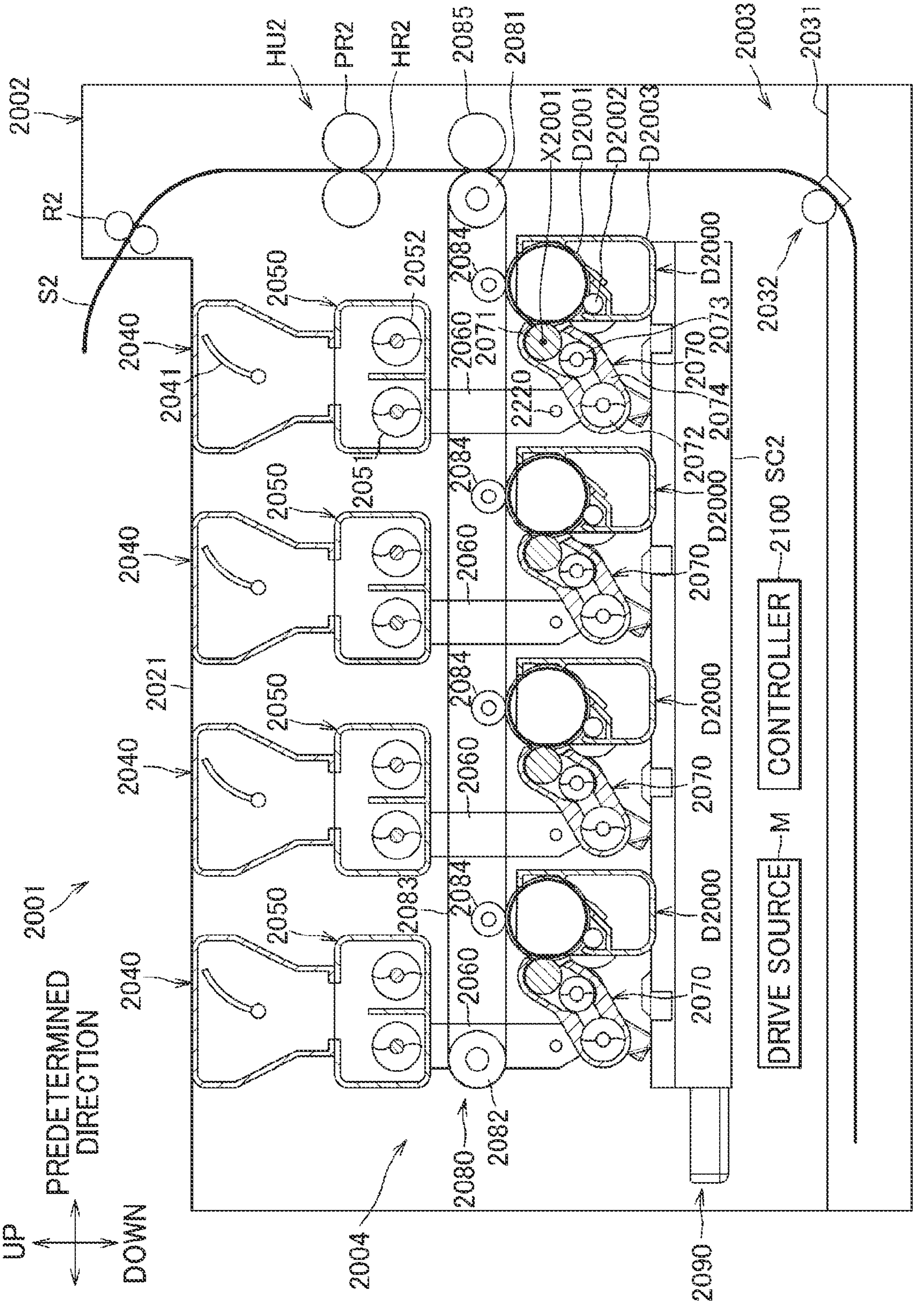
FIG. 35 is an illustration of a multicolor printer.

As shown in FIG. 35, a multicolor printer 2001 as an example of an image forming apparatus includes a main housing 2002, a sheet feeder unit 2003, an image forming unit 2004, an ejection roller R2, and a controller 2100. The sheet feeding unit 2003 feeds a sheet S2 to the image forming unit 2004. The image forming unit 2004 forms an image on the sheet S2.

The main housing 2002 includes an output tray 2021 positioned on top thereof. The ejection roller R2 ejects the sheet S2 onto the output tray 2021. A drive source M such as a motor is provided at the main housing 2002.

The sheet feeder unit 2003 is positioned in a lower part of the main housing 2002. The sheet feeder unit 2003 includes a feed tray 2031 and a supply mechanism 2032. The feed tray 2031 is installable into and removable from the main housing 2002. The supply mechanism 2032 conveys the sheet S2 from the feed tray 2031 to the image forming unit 2004.

The image forming unit 2004 includes four toner boxes 2040, four sub-tanks 2050, four pipes 2060, four development devices 2070, four drum units D2000, a scanner SC2, a transfer unit 2080, a fixing unit HU2, and a waste toner box 2090.

Figure 36:
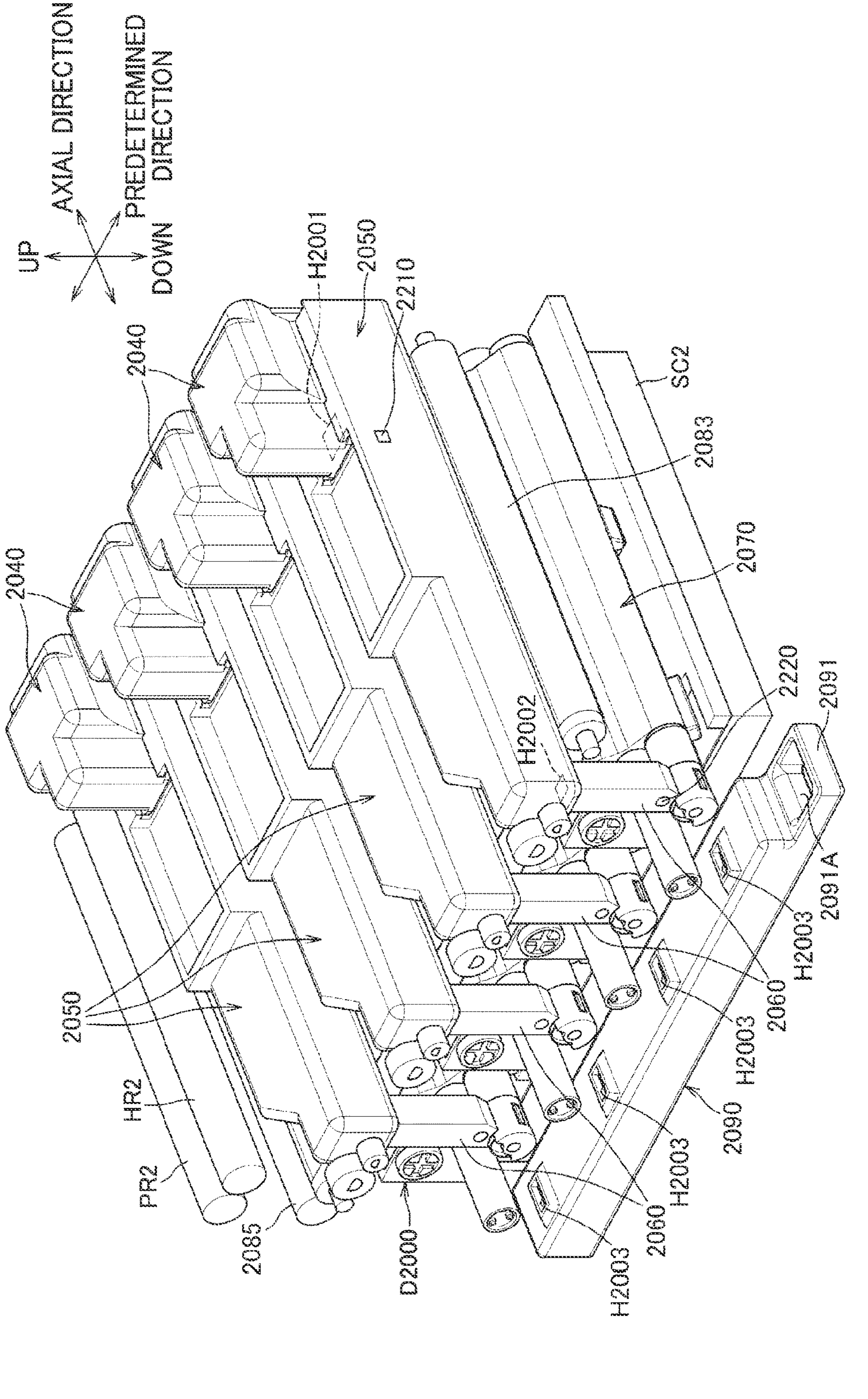
FIG. 36 is a perspective view of a structure inside a main housing.

The toner boxes 2040 are container-shaped members that contain toner. The four toner boxes 2040 each contain toner of a different color. The toner boxes 2040 are positioned above an intermediate transfer belt 2083 which will be described later. Each toner box 2040 includes an agitation member 2041 for agitating toner. As shown in FIG. 36, the toner boxes 2040 are attachable to and removable from the sub-tanks 2050 in an axial direction shown in the drawings.

The sub-tanks 2050 are container-shaped members to which toner is supplied from the toner boxes 2040. The sub-tanks 2050 are positioned between the toner boxes 2040 and the intermediate transfer belt 2083 in the up-down direction. Each sub-tank 2050 has a first end and a second end positioned apart from each other in the axial direction. Each toner box 2040 is positioned at the first end of the corresponding sub-tank 2050 when the toner box 2040 is attached to the sub-tank 2050. The capacity of the sub-tank 2050 is greater than the capacity of the toner box 2040. The capacity of the sub-tank 2050 is greater than the capacity of the development device 2070. In this specification, capacity refers to an amount of toner (maximum amount of toner) containable in a container-shaped member such as the sub-tank 2050.

The dimension of the sub-tank 2050 in the axial direction is greater than the dimension of the toner box 2040 in the axial direction. Specifically, the dimension of the sub-tank 2050 in the axial direction is equal to or greater than three times the dimension of the toner box 2040 in the axial direction.

Each sub-tank 2050 has a supply port H2001 and a discharge port H2002. Toner is supplied from each toner box 2040 to the corresponding sub-tank 2050 through the supply port H2001 and is discharged from the sub-tank 2050 to the corresponding pipe 2060 through the discharge port H2002. The supply port H2001 faces upward. The supply port H2001 is positioned on the top surface of the sub-tank 2050. Herein, "upward" may be any direction with an upward component and may, for example, include an oblique upward direction.

The discharge port H2002 is spaced apart from the supply port H2001 in the axial direction. Specifically, the supply port H2001 is positioned at the first-end side of the sub-tank 2050. The discharge port H2002 is positioned at the second-end side of the sub-tank 2050. The discharge port H2002 faces downward. The discharge port H2002 is positioned on a bottom surface of the sub-tank 2050. Herein, "downward" may be any direction with a downward component and may, for example, include an oblique downward direction.

Figures 43A, 43B:
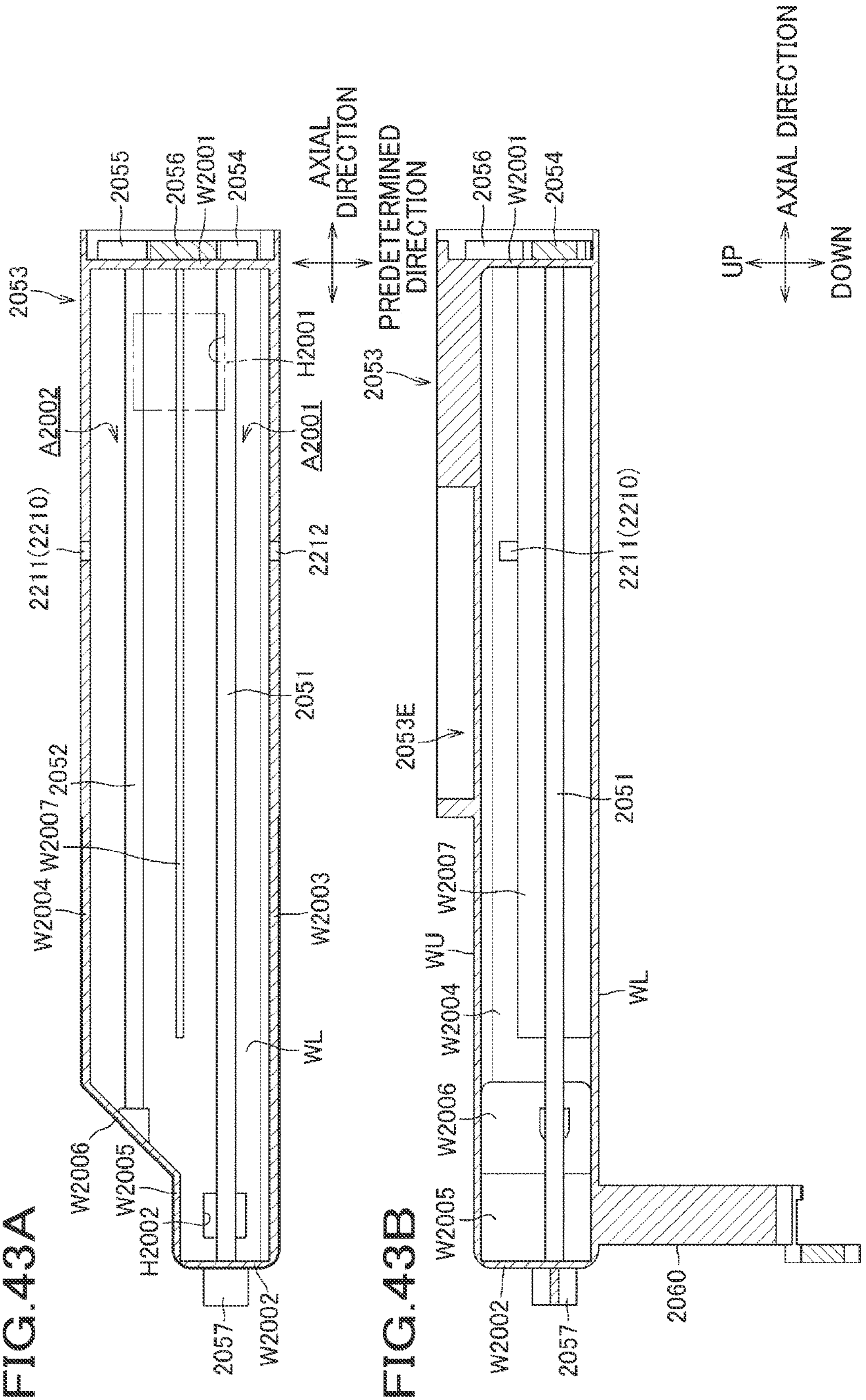
FIG. 43A is a cross-sectional view of the sub-tank along a horizontal plane.
FIG. 43B is a cross-sectional view of the sub-tank along a vertical plane.

Each sub-tank 2050 includes a first sensor 2210 as an example of a toner sensor that detects the presence or absence of toner in the sub-tank 2050. As shown in FIG. 43A, the first sensor 2210 is an optical sensor including a light emitter 2211 and a light receiver 2212. The light emitter 2211 emits light in a predetermined direction shown in the drawings. The light receiver 2212 receives light emitted from the light emitter 2211. The predetermined direction is perpendicular to the axial direction and to the up-down direction. The first sensor 2210 is positioned between the supply port H2001 and the discharge port H2002 in the axial direction.

The distance from the first sensor 2210 to the discharge port H2002 is greater than the distance from the first sensor 2210 to the supply port H2001 in the axial direction. Specifically, a space inside the sub-tank 2050 on the supply-port-side of the first sensor 2210 is capable of containing toner of an amount equal to toner containable in one toner box 2040. A space inside the sub-tank 2050 on the discharge-port-side of the first sensor 2210 is capable of containing toner of an amount equal to toner containable in two toner boxes 2040.

Referring back to FIG. 35, each sub-tank 2050 includes a first auger 2051 and a second auger 2052. The first auger 2051 and the second auger 2052 are members that convey toner supplied from the corresponding toner box 2040 to the corresponding pipe 2060. The first auger 2051 and the second auger 2052 convey toner in the axial direction. The second auger 2052 is arranged side-by-side with the first auger 2051 in the predetermined direction.

The pipes 2060 are tubular members that deliver toner in the sub-tanks 2050 to the development devices 2070. Each pipe 2060 extends from the corresponding sub-tank 2050 to the corresponding development device 2070. Toner in each toner box 2040 is supplied to the corresponding development device 2070 via the sub-tank 2050 and the pipe 2060.

Each pipe 2060 includes a second sensor 2220 that detects the presence or absence of toner in the pipe 2060. The second sensor 2220 is an optical sensor including a light emitter and a light receiver. The light emitter emits light in the axial direction. The light receiver receives light emitted from the light emitter. The second sensor 2220 is positioned above a lower end of a development roller 2071. Specifically, light emitted from the light emitter of the second sensor 2220 passes through a position above the lower end of the development roller 2071.

Figure 39:
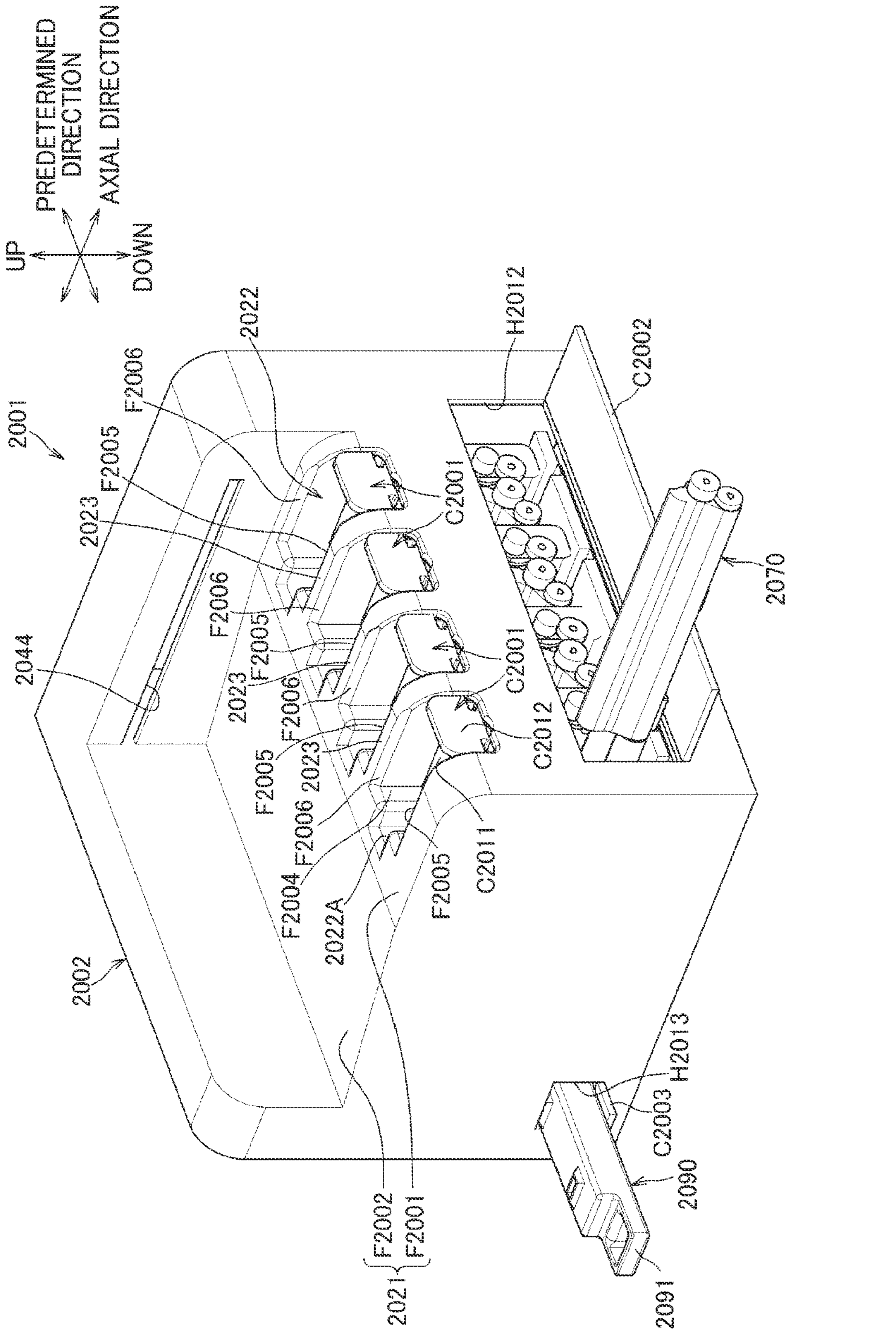
FIG. 39 is a perspective view showing a development device and a waste toner box being removed from the main housing.

The development devices 2070 are positioned below the intermediate transfer belt 2083. As shown in FIG. 39, the development devices 2070 are installable into and removable from the main housing 2002 in the axial direction. Referring back to FIG. 35, each development device 2070 includes a development roller 2071, two augers 2072, 2073, and a housing 2074. The housing 2074 houses a part of the development roller 2071, the two augers 2072, 2073, and toner. The development roller 2071 is rotatable about a development axis X2001 extending in the axial direction. The two augers 2072, 2073 are members that convey toner supplied from the pipe 2060 to the development roller 2071. The auger 2072 conveys toner in the axial direction toward one end of the development device 2070. The auger 2073 conveys toner in the axial direction toward the other end of the development device 2070. Toner is thereby conveyed and circulated in the housing 2074.

The drum units D2000 are positioned below the intermediate transfer belt 2083. Each drum unit D2000 is arranged side-by-side with the corresponding development device 2070 in the predetermined direction. The drum unit D2000 includes a photosensitive drum D2001, a charger roller D2002 that charges the photosensitive drum D2001, and a drum frame D2003 that houses a portion of the photosensitive drum D2001 and the charger roller D2002.

The scanner SC2 is positioned below the drum units D2000. The scanner SC2 emits laser light toward each of the photosensitive drums D2001.

The transfer unit 2080 is positioned between the sub-tanks 2050 and the development devices 2070 in the up-down direction. The transfer unit 2080 includes a drive roller 2081, a follower roller 2082, an intermediate transfer belt 2083, four primary transfer rollers 2084, and a secondary transfer roller 2085.

The intermediate transfer belt 2083 is an endless belt. The intermediate transfer belt 2083 is wrapped around and stretched between the drive roller 2081 and the follower roller 2082. The intermediate transfer belt 2083 overlaps the pipes 2060 as viewed in the axial direction. Specifically, the intermediate transfer belt 2083 overlaps the pipes 2060 when projected in the axial direction.

The primary transfer rollers 2084 are positioned to face an inner surface of the intermediate transfer belt 2083. The intermediate transfer belt 2083 is sandwiched between the primary transfer rollers 2084 and the photosensitive drums D2001.

The secondary transfer roller 2085 is positioned to face an outer surface of the intermediate transfer belt 2083. The intermediate transfer belt 2083 is sandwiched between the secondary transfer roller 2085 and the drive roller 2081.

The fixing unit HU2 is positioned above the intermediate transfer belt 2083. The fixing unit HU2 includes a heating roller HR2 and a pressure roller PR2. The pressure roller PR2 is pressed against the heating roller HR2.

In the image forming unit 2004, first, a surface of each photosensitive drum D2001 is charged by the corresponding charger roller D2002. Then, the scanner SC2 projects light to expose the surface of each photosensitive drum D2001 and thereby form an electrostatic latent image thereon.

Subsequently, each development roller 2071 supplies toner to the electrostatic latent image formed on the corresponding photosensitive drum D2001 to thereby form a toner image on the photosensitive drum D2001. The toner image on the photosensitive drum D2001 is then transferred onto the intermediate transfer belt 2083.

The toner image on the intermediate transfer belt 2083 is transferred onto the sheet S2 when the sheet S2 passes through between the intermediate transfer belt 2083 and the secondary transfer roller 2085. Thereafter, the toner image on the sheet S2 is fixed on the sheet S2 at the fixing unit HU2. The sheet S2 is then ejected onto the output tray 2021 by the ejection roller R2.

As shown in FIG. 36, the waste toner box 2090 is a container-shaped member capable of containing toner. The development devices 2070 are capable of discharging deteriorated toner therein to the waste toner box 2090. Specifically, each development device 2070 has a discharge port (not shown) for discharging toner to the waste toner box 2090, and a shutter (not shown) for opening and closing the discharge port. The main housing 2002 has passages for discharging toner from the development devices 2070 to the waste toner box 2090.

The waste toner box 2090 is positioned below the development devices 2070 and the drum units D2000. The waste toner box 2090 overlaps the scanner SC2 as viewed in the axial direction. The waste toner box 2090 has four openings H2003 and a handle 2091. The openings H2003 are openings for receiving toner discharged from the development devices 2070.

The handle 2091 has a hole 2091A in which a user can hook his/her finger. The hole 2091A is a through hole extending in the up-down direction. The hole 2091A may also be a blind hole. As shown in FIG. 39, the waste toner box 2090 is installable into and removable from the main housing 2002 in the predetermined direction.

Figure 37:
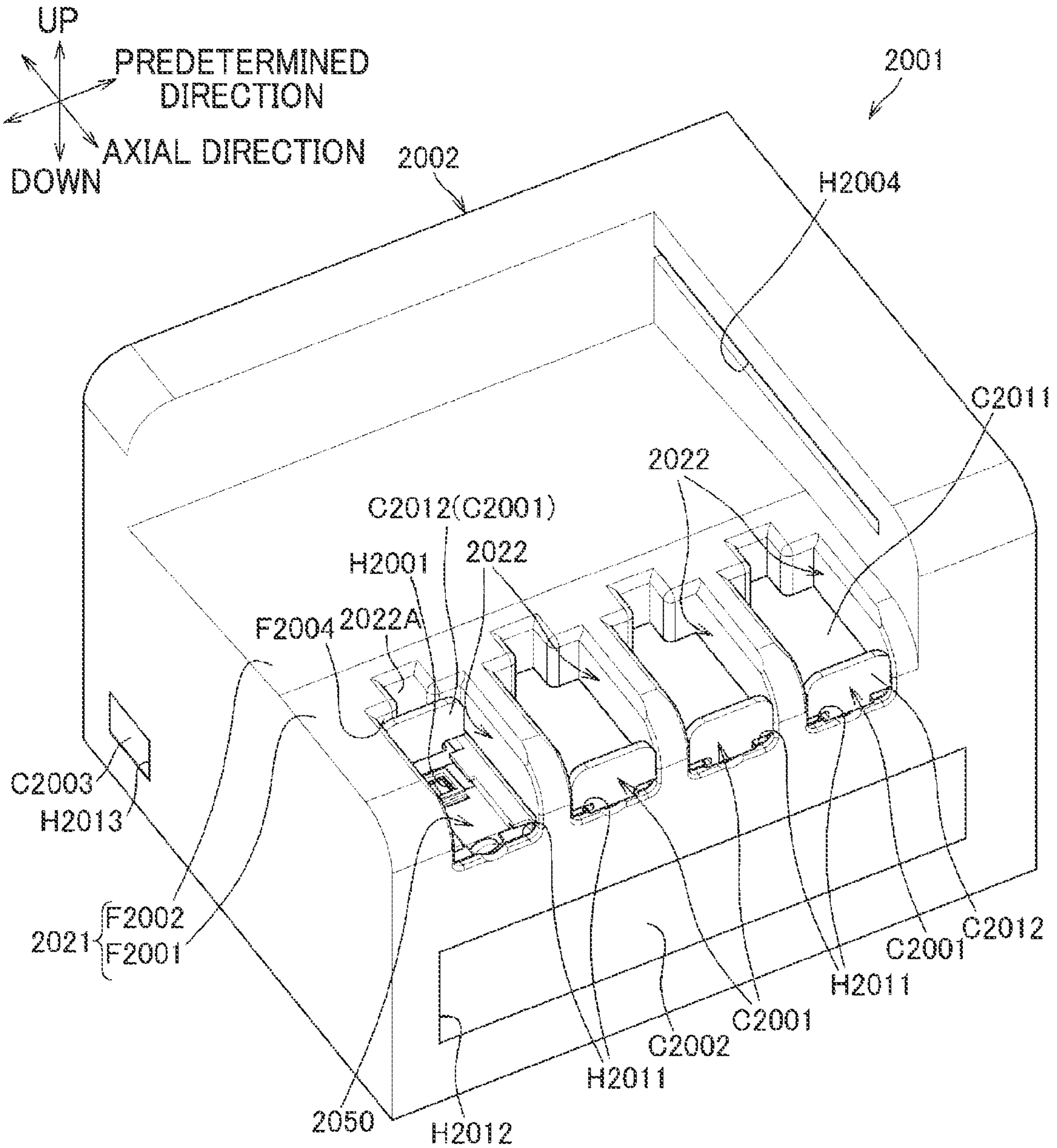
FIG. 37 is a perspective view of the multicolor printer without toner boxes attached to sub-tanks.

As shown in FIGS. 37 and 39, the main housing 2002 has a sheet ejection opening H2004, four box-housing recesses 2022, four first openings H2011, a second opening H2012, and a third opening H2013. The sheet ejection opening H2004 is an opening for ejecting the sheet S2 outside the main housing 2002. Specifically, the sheet ejection opening H2004 is an opening for ejecting the sheet S2 onto the output tray 2021.

The sheet ejection opening H2004 is positioned above the output tray 2021. The sheet ejection opening H2004 extends in the axial direction and has a first end and a second end positioned apart from each other in the axial direction. Each box-housing recess 2022 has a first end and a second end positioned apart from each other in the axial direction, and a first side and a second side positioned apart from each other in the predetermined direction. The first end of the sheet ejection opening H2004 is positioned between the first ends and the second ends of the box-housing recesses 2022.

The output tray 2021 has a first supporting surface F2001 and a second supporting surface F2002. The first supporting surface F2001 and the second supporting surface F2002 are surfaces for supporting the sheet S2 ejected through the sheet ejection opening H2004. The first supporting surface F2001 is perpendicular to the up-down direction. The first supporting surface F2001 is positioned between the second supporting surface F2002 and the second opening H2012 in the axial direction. The second supporting surface F2002 is inclined relative to the first supporting surface F2001 such that the farther from the first supporting surface F2001 in the axial direction, the lower the second supporting surface F2002.

Figure 38:
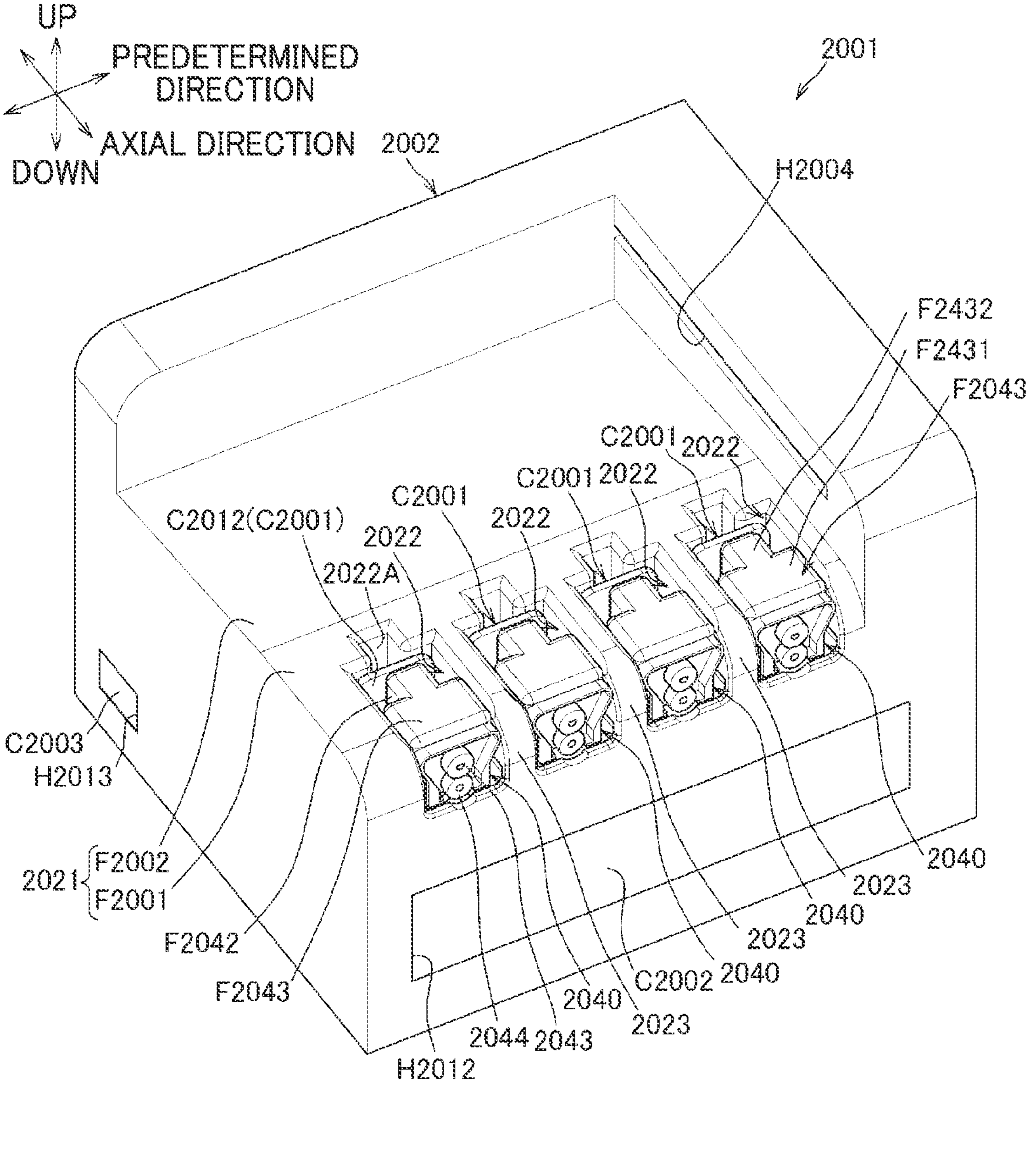
FIG. 38 is a perspective view of the multicolor printer with the toner boxes attached to the sub-tanks.

As shown in FIGS. 37 and 38, the box-housing recesses 2022 are recesses for housing the toner boxes 2040 attached to the sub-tanks 2050. The four box-housing recesses 2022 are spaced apart and arranged side-by-side in the predetermined direction. Each box-housing recess 2022 is downwardly recessed from the first supporting surface F2001. As shown in FIG. 37, each box-housing recess 2022 has a first opening H2011.

The first openings H2011 are openings for exposing supply ports H2001 to the outside of the main housing 2002. Each first opening H2011 allows a part of the corresponding toner box 2040 to pass therethrough. The toner box 2040 can be attached to the sub-tank 2050 through the first opening H2011.

As shown in FIG. 38, a top surface F2043 of each toner box 2040 attached to the corresponding sub-tank 2050 is positioned in a position corresponding to the first supporting surface F2001 in the up-down direction. Specifically, when the toner boxes 2040 are attached to the sub-tanks 2050, the top surfaces F2043 of the toner boxes 2040 are approximately flush with the first supporting surface F2001. Accordingly, when the toner boxes 2040 are attached to the sub-tanks 2050, the top surfaces F2043 of the toner boxes 2040 contact the sheet S2 ejected from the sheet ejection opening H2004.

As shown in FIG. 39, the second opening H2012 is an opening through which the development devices 2070 are allowed to pass. The second opening H2012 opens in the axial direction. The third opening H2013 is an opening through which the waste toner box 2090 is allowed to pass. The third opening H2013 opens in the predetermined direction.

The multicolor printer 2001 further includes a first cover C2001, a second cover C2002, and a third cover C2003. The first cover C2001 is a cover for opening and closing the supply port H2001 and the first opening H2011. The first cover C2001 is provided for each of the four sub-tanks 2050.

The first cover C2001 is slidable in the axial direction relative to the main housing 2002, between a closed position shown in FIG. 39 and an open position shown in FIG. 38. When the first cover C2001 is positioned in the closed position, the first cover C2001 closes the supply port H2001 and the first opening H2011. When the first cover C2001 is positioned in the open position, the supply port H2001 and the first opening H2011 are opened. The first cover C2001 is attached to the main housing 2002. The first cover C2001 is positioned in an upper part of the main housing 2002.

The first cover C2001 includes a cover portion C2011 and a handle portion C2012. The cover portion C2011 covers the first opening H2011. The handle portion C2012 protrudes upward from the cover portion C2011. Each box-housing recess 2022 further has an opposing surface F2004 and a recess 2022A. The opposing surface F2004 is opposed to the handle portion C2012 in the axial direction. The recess 2022A is recessed from the opposing surface F2004. The recess 2022A opens upward and toward the handle portion C2012. The handle portion C2012 is positioned closer to the opposing surface F2004 when the first cover C2001 is positioned in the open position than when the first cover C2001 is positioned in the closed position.

The second cover C2002 is a cover for opening and closing the second opening H2012. The second cover C2002 is rotatable relative to the main housing 2002 about a lower end thereof.

The third cover C2003 is a cover for opening and closing the third opening H2013. The third cover C2003 is rotatable relative to the main housing 2002 about a lower end thereof.

As shown in FIG. 39, the main housing 2002 further has a first box-guiding surface F2005, a second box-guiding surface F2006, and three partitions 2023. The first box-guiding surface F2005 and the second box-guiding surface F2006 are surfaces for guiding the toner box 2040. The first box-guiding surface F2005 and the second box-guiding surface F2006 are provided in each of the four box-housing recesses 2022. The first box-guiding surface F2005 and the second box-guiding surface F2006 are positioned at upper ends of each box-housing recess 2022. The first box-guiding surface F2005 is positioned at the first side of the box-housing recess 2022. The second box-guiding surface F2006 is positioned at the second side of the box-housing recess 2022. The first box-guiding surface F2005 and the second box-guiding surface F2006 are inclined such that the surfaces F2005, F2006 come closer to each other as the surfaces F2005, F2006 extend downward.

As shown in FIG. 38, each partition 2023 is disposed between two toner boxes 2040 arranged side-by-side in the predetermined direction. The top surface of each partition 2023 forms a part of the first supporting surface F2001.

Figure 40:
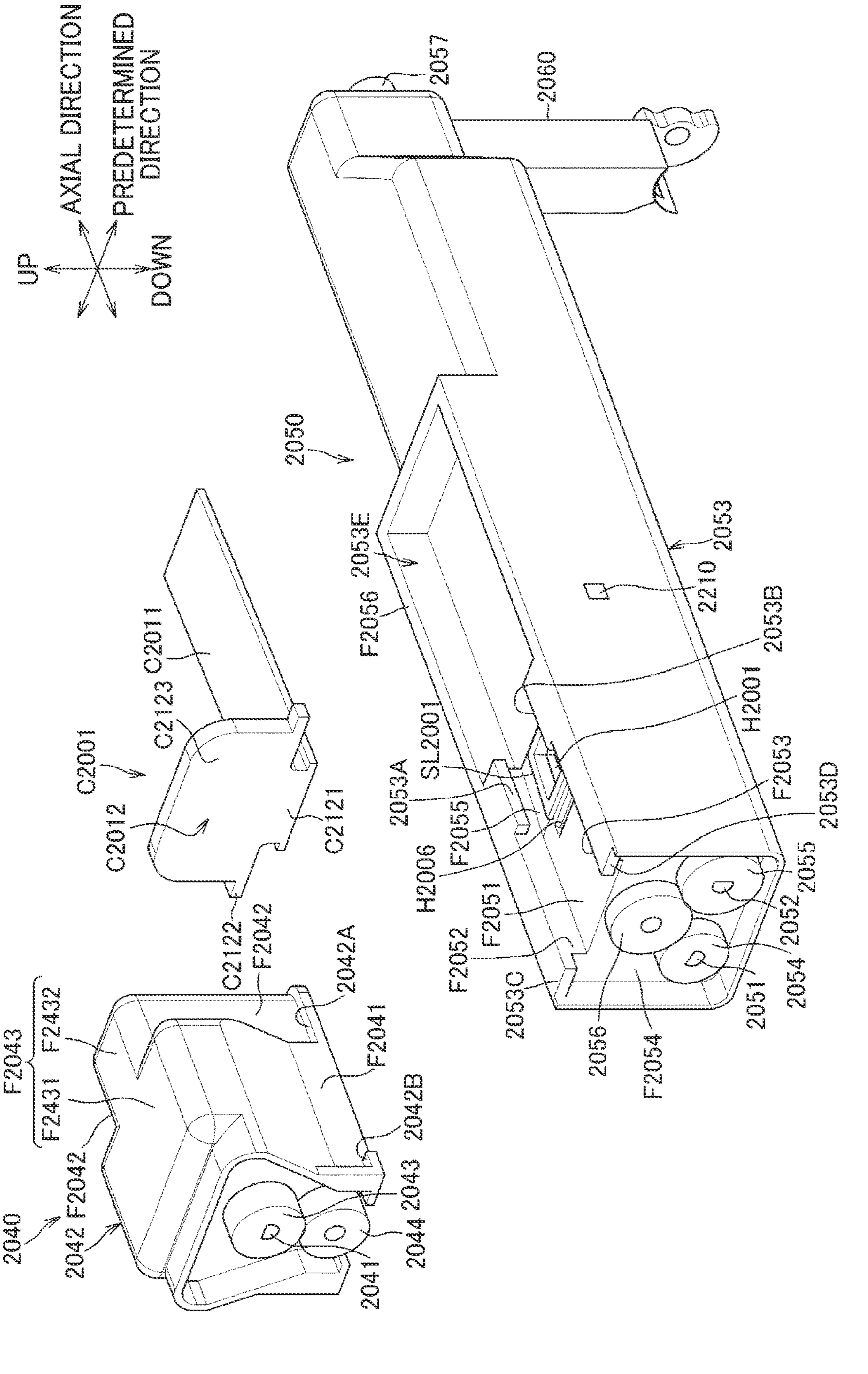
FIG. 40 is a perspective view showing the relationship between the toner box, the first cover, and the sub-tank.

As shown in FIG. 40, each toner box 2040 further includes a toner housing 2042, an agitation member gear 2043, and a first idle gear 2044.

The toner housing 2042 has a first side and a second side positioned apart from each other in the predetermined direction. The toner housing 2042 contains toner and the above-described agitation member 2041. The toner housing 2042 has a first surface F2041, a second surface F2042, a top surface F2043, a first toner protrusion 2042A, and a second toner protrusion 2042B. The first surface F2041 and the second surface F2042 are perpendicular to the predetermined direction.

The first surface F2041 is positioned on the first side and the second side of the toner housing 2042. The second surface F2042 is positioned on a side of the first surfaces F2041 opposite to a side on which the agitation member gear 2043 is positioned in the axial direction. The second surface F2042 is positioned on the first side and the second side of the toner housing 2042. The two second surfaces F2042 are positioned between the two first surfaces F2041 in the predetermined direction.

The top surface F2043 is T-shaped. The top surface F2043 has a wide portion F2431 and a narrow portion F2432. The wide portion F2431 and the narrow portion F2432 are aligned in the axial direction. The narrow portion F2432 is positioned at a central portion of the wide portion F2431 in the predetermined direction. As shown in FIG. 38, the narrow portion F2432 is positioned between the first cover C2001 and the wide portion F2431 when the toner box 2040 is attached to the sub-tank 2050. The narrow portion F2432 is positioned apart from the two side surfaces of the box-housing recess 2022 in the predetermined direction when the toner box 2040 is attached to the sub-tank 2050.

The first toner protrusion 2042A is provided on each of the two second surfaces F2042. The first toner protrusions 2042A protrude from the second surfaces F2042. A surface of each of the first toner protrusions 2042A facing in the predetermined direction forms a part of the corresponding first surface F2041.

The second toner protrusion 2042B is provided on each of the two first surfaces F2041. The second toner protrusions 2042B protrude from the first surfaces F2041.

The agitation member gear 2043 is positioned on one end of the agitation member 2041. The agitation member gear 2043 rotates together with the agitation member 2041. The first idle gear 2044 is positioned below the agitation member gear 2043. The first idle gear 2044 is engaged with the agitation member gear 2043. The agitation member gear 2043 and the first idle gear 2044 are positioned on a side of the wide portion F2431 opposite to the narrow portion F2432 in the axial direction. As shown in FIG. 38, the agitation member gear 2043 and the first idle gear 2044 are positioned closer, than the first cover C2001, to the second opening H2012 in the axial direction, when the toner box 2040 is attached to the sub-tank 2050.

As shown in FIG. 40, the sub-tank 2050 further includes a tank housing 2053, a first auger gear 2054, a second auger gear 2055, a second idle gear 2056, an input gear 2057, and a first seal SL2001. The tank housing 2053 has a first surface F2051, a second surface F2052, a third surface F2053, a fourth surface F2054, a fifth surface F2055, a top surface F2056, two first protrusions 2053A, 2053B, two second protrusions 2053C, 2053D, and a toner-containing recess 2053E.

The first surface F2051, the second surface F2052, and the third surface F2053 are surfaces for guiding the toner box 2040 in the axial direction. The first surface F2051 guides the bottom surface of the toner box 2040. The second surface F2052 guides one of the first surfaces F2041 of the toner box 2040. The third surface F2053 guides the other of the first surfaces F2041 of the toner box 2040.

The first surface F2051 is perpendicular to the up-down direction. The first surface F2051 faces upward. The first surface F2051 has a first end and a second end positioned apart from each other in the axial direction, and a first edge and a second edge positioned apart from each other in the predetermined direction. The second surface F2052 and the third surface F2053 are perpendicular to the predetermined direction. The second surface F2052 faces the third surface F2053 in the predetermined direction.

The second surface F2052 extends upward from the first edge of the first surface F2051. The second surface F2052 has a first end and a second end positioned apart from each other in the axial direction. The third surface F2053 extends upward from the second edge of the first surface F2051. The third surface F2053 has a first end and a second end positioned apart from each other in the axial direction.

The toner box 2040 is attached to the sub-tank 2050 by inserting the toner box 2040 between the second surface F2052 and the third surface F2053, and then sliding the toner box 2040 in the axial direction toward the first cover C2001. As shown in FIG. 42B, the first surface F2051 is in contact with the bottom surface of the toner housing 2042 when the toner box 2040 is attached to the sub-tank 2050. The toner housing 2042 further has a toner outlet H2005 for letting out toner contained in the toner housing 2042. The toner box 2040 further includes a toner shutter 2045 for opening and closing the toner outlet H2005.

The toner shutter 2045 is slidable relative to the toner housing 2042 in the axial direction. The toner shutter 2045 includes a shutter protrusion 2045A. The shutter protrusion 2045A protrudes downward. The first surface F2051 has a fitting hole H2006 in which the shutter protrusion 2045A is fitted. Thus, the toner shutter 2045 can be opened and closed as the toner box 2040 is installed and removed.

Figure 42A:
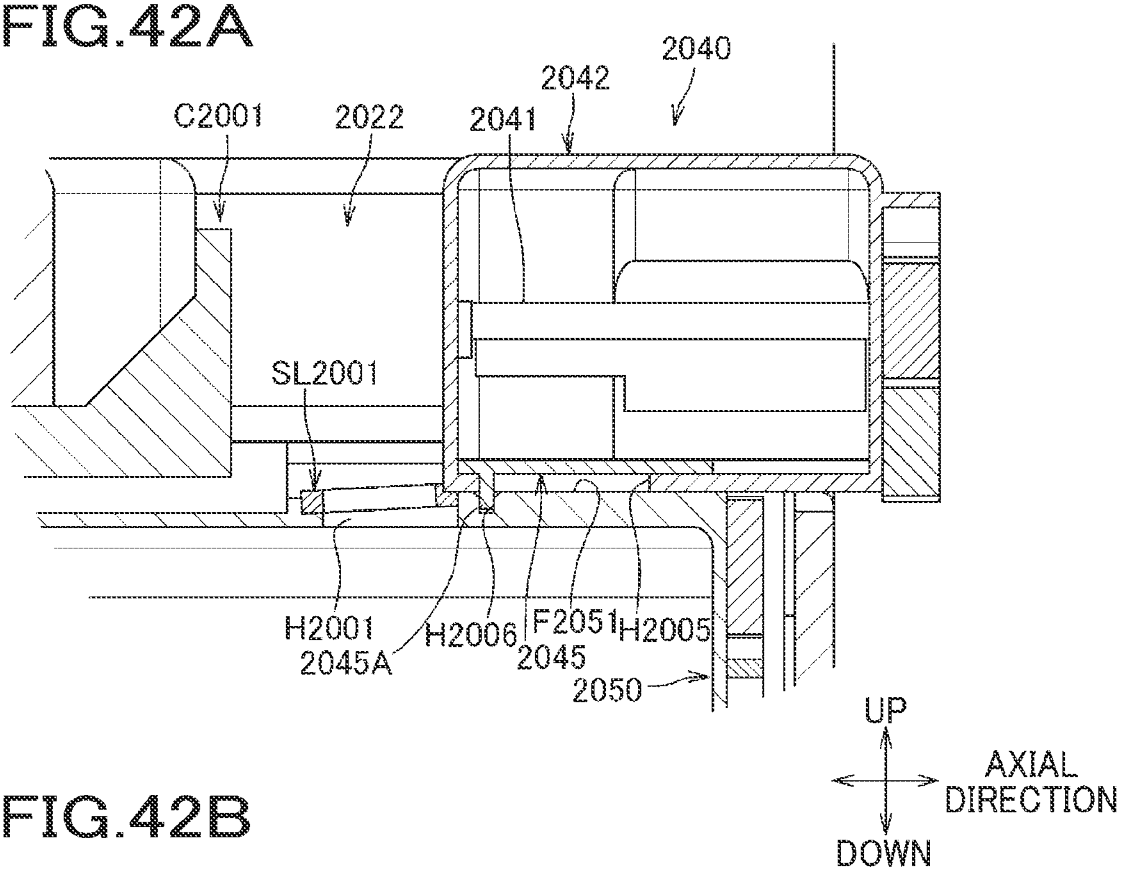
FIG. 42A is a cross-sectional view showing a toner shutter of the toner box in a closed state.
Figure 42B:
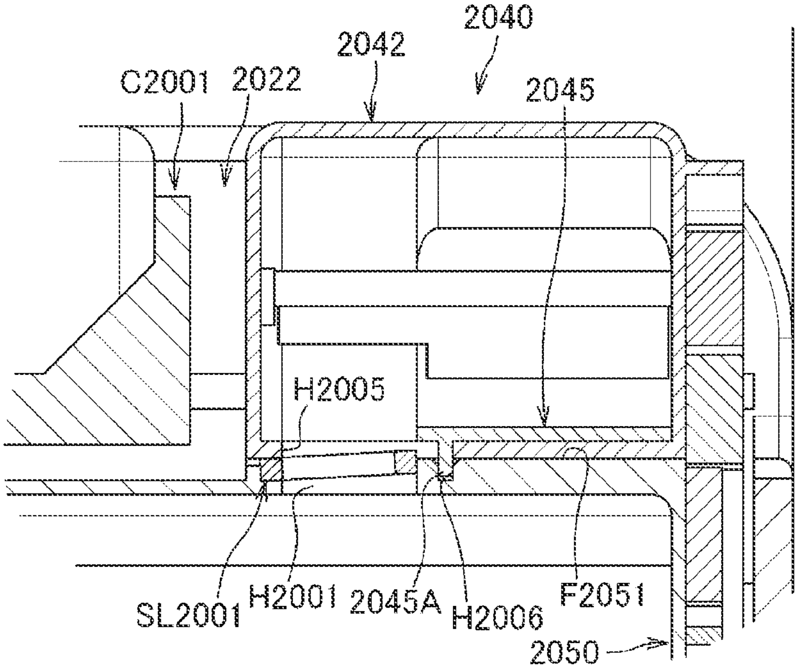
FIG. 42B is a cross-sectional view showing the toner shutter in an open state.

Specifically, as shown in FIG. 40, when the toner box 2040 is inserted between the second surface F2052 and the third surface F2053 from above, the shutter protrusion 2045A fits into the fitting hole H2006 as shown in FIG. 42A. Then, as the toner housing 2042 is slid in the axial direction toward the first cover C2001, the toner housing 2042 moves relative to the toner shutter 45 and opens the toner outlet H2005 as shown in FIG. 42B. The opened toner outlet H2005 is connected to the supply port H2001 via the first seal SL2001. The procedure to remove the toner box 2040 is the reverse of the above procedure; thus, description thereof will be omitted.

As shown in FIG. 40, the handle portion C2012 of the first cover C2001 includes a first part C2121, a second part C2122, and a third part C2123. The dimension of the first part C2121 is smaller than the dimension of the cover portion C2011 in the predetermined direction. The first part C2121 extends upward from the cover portion C2011.

The second part C2122 is positioned above the first part C2121. The dimension of the second part C2122 is greater than the dimension of the cover portion C2011 in the predetermined direction.

The third part C2123 is positioned above the second part C2122. The dimension of the third part C2123 in the predetermined direction is smaller than the dimension of the second part C2122 in the predetermined direction and greater than the dimension of the cover portion C2011 in the predetermined direction.

The second surface F2052 and the third surface F2053 of the sub-tank 2050 is contactable with the cover portion C2011 of the first cover C2001. The top surface F2056 of the sub-tank 2050 is contactable with the second part C2122 of the first cover C2001. The first cover C2001 is thereby guided in the axial direction by the second surface F2052, the third surface F2053, and the top surface F2056 of the sub-tank 2050. Particularly, since the second surface F2052 and the third surface F2053 of the sub-tank 2050 have the functions of guiding the toner box 2040 as described above, the second surface F2052 and the third surface F2053 serve as a guide for both of the first cover C2001 and the toner box 2040.

The fourth surface F2054 is positioned at the first end of the first surface F2051. The fifth surface F2055 is positioned at the second end of the first surface F2051. The fourth surface F2054 is perpendicular to the axial direction. The fourth surface F2054 is connected to the first end of the first surface F2051, the first end of the second surface F2052, and the first end of the third surface F2053.

The first auger gear 2054, the second auger gear 2055, and the second idle gear 2056 are positioned at the fourth surface F2054. The first auger gear 2054 is positioned at one end of the first auger 2051. The first auger gear 2054 rotates together with the first auger 2051.

The input gear 2057 is positioned at the other end of the first auger 2051 (also refer to FIG. 43). The input gear 2057 rotates together with the first auger 2051. The input gear 2057 receives a drive force from the drive source M and rotates. Specifically, as shown in FIG. 44B, a main housing gear 2024 which receives the drive force from the drive source M is provided at the main housing 2002. The main housing gear 2024 is engaged with the input gear 2057. The first auger gear 2054 thereby receives the drive force from the input gear 2057 via the first auger 2051, as shown in FIG. 40.

The second auger gear 2055 is positioned at one end of the second auger 2052. The second auger gear 2055 rotates together with the second auger 2052. The second auger gear 2055 is spaced apart from and arranged side-by-side with the first auger gear 2054 in the predetermined direction. The diameter of the second auger gear 2055 is larger than the diameter of the first auger gear 2054.

The second idle gear 2056 is positioned above the first auger gear 2054 and the second auger gear 2055. The second idle gear 2056 is engaged with the first auger gear 2054 and the second auger gear 2055. The second auger gear 2055 thereby receives the drive force from the first auger gear 2054 via the second idle gear 2056. That is, the second auger gear 2055 rotates in conjunction with the first auger gear 2054.

Figure 44A:
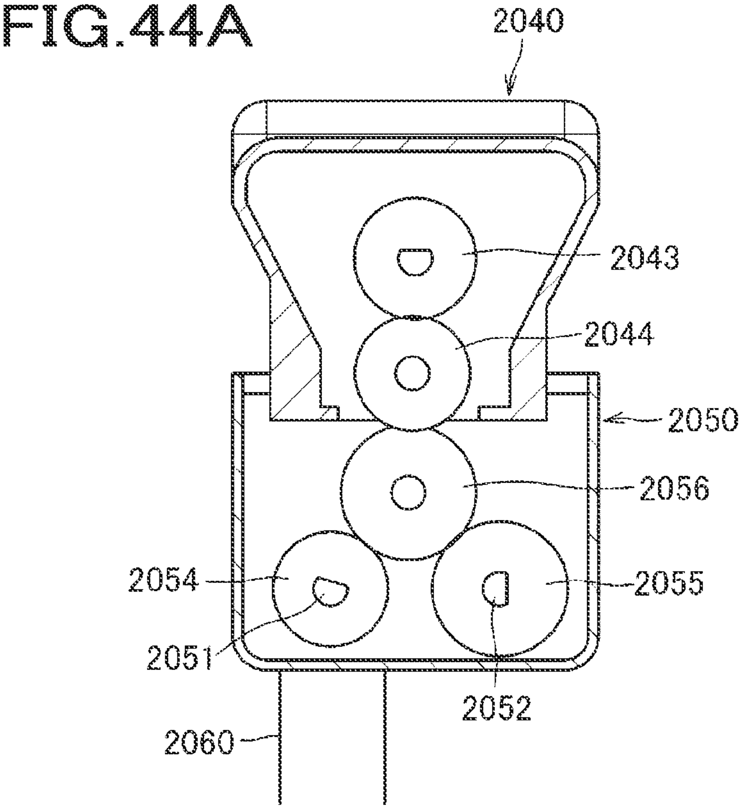
FIG. 44A is an illustration showing structures of the toner box and the sub-tank at one of the ends thereof in the axial direction.
Figure 44B:
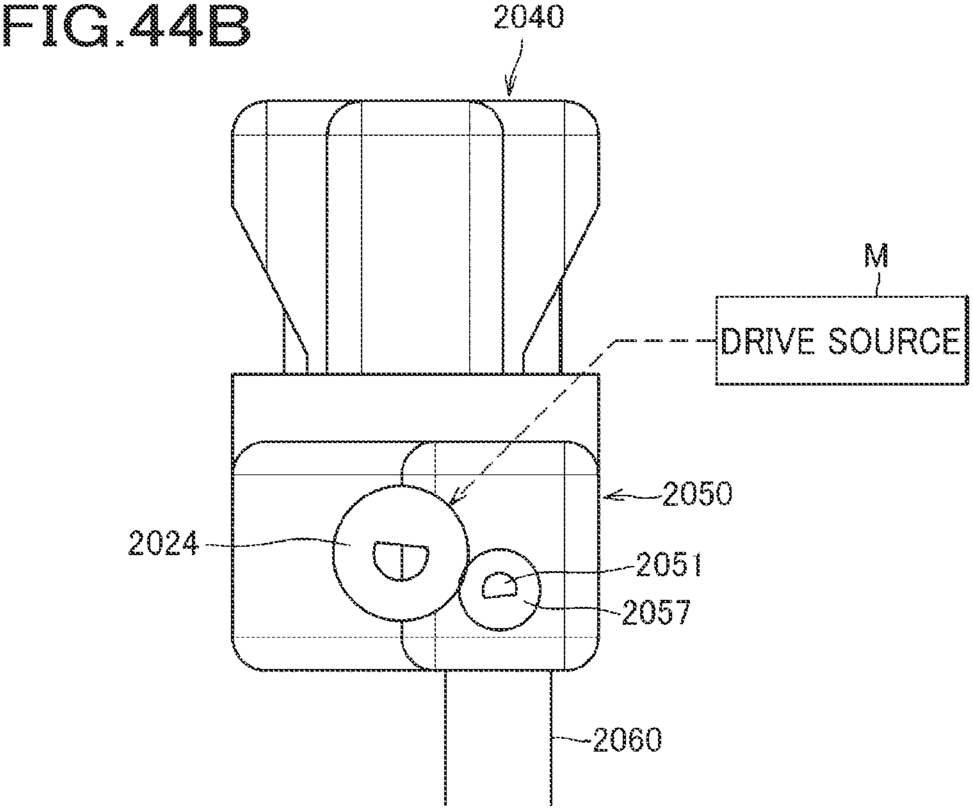
FIG. 44B is an illustration showing structures of the toner box and the sub-tank at the other of the ends thereof in the axial direction.

As shown in FIG. 44A, the second idle gear 2056 of the sub-tank 2050 is engaged with the first idle gear 2044 of the toner box 2040 when the toner box 2040 is attached to the sub-tank 2050. The agitation member gear 2043 thereby receives the drive force from the first auger gear 2054 via the second idle gear 2056 and the first idle gear 2044 when the toner box 2040 is attached to the sub-tank 2050.

As shown in FIG. 40, the fifth surface F2055 is inclined such that the farther from the first surface F2051 in the axial direction, the lower the fifth surface F2055. The fifth surface F2055 includes the supply port H2001. The first seal SL2001 is positioned at the fifth surface F2055.

The first seal SL2001 is a seal for restricting leakage of toner from between the supply port H2001 and the first cover C2001. The first seal SL2001 is made of an elastic body such as rubber. The first seal SL 2001 surrounds the supply port H2001.

Figure 41A:
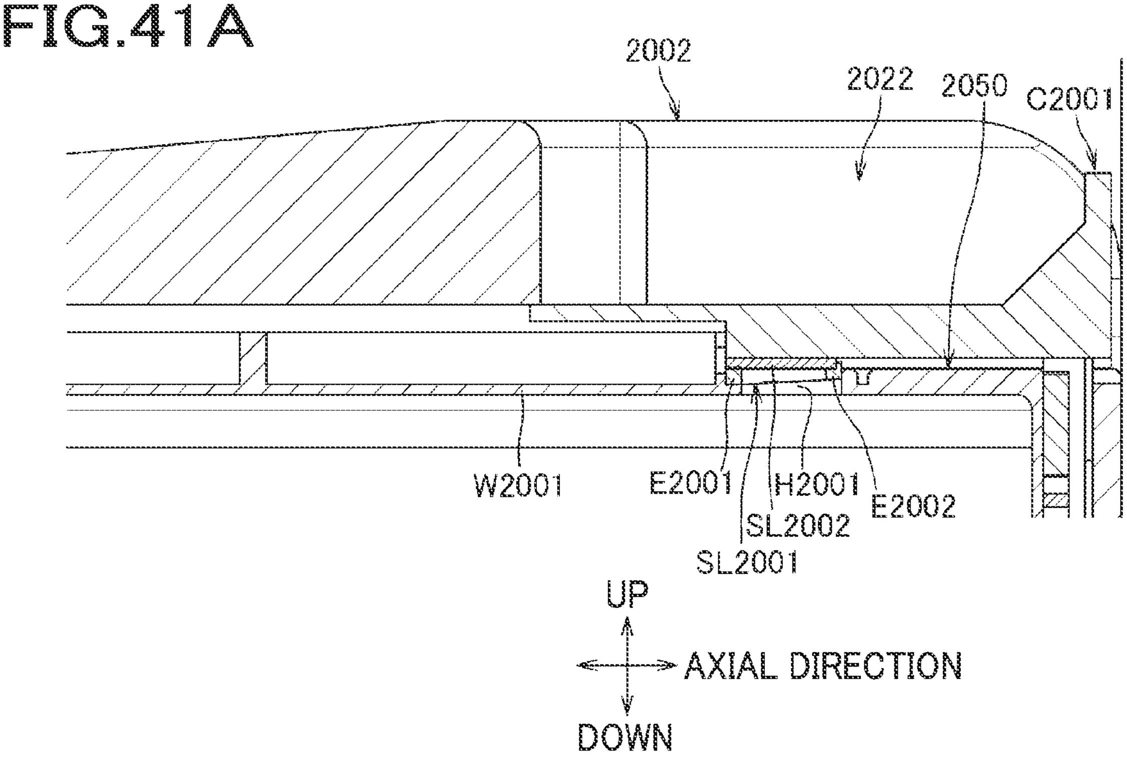
FIG. 41A is a cross-sectional view showing the first cover positioned in a closed position.
Figure 41B:
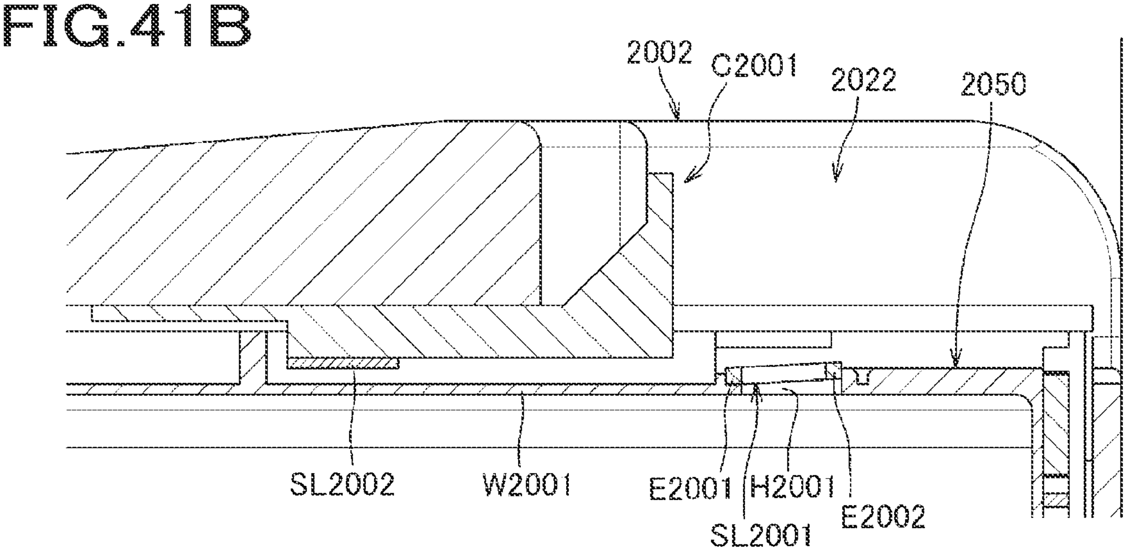
FIG. 41B is a cross-sectional view showing the first cover positioned in an open position.

As shown in FIG. 41B, the first seal SL2001 has a first end E2001 and a second end E2002 positioned apart from each other in the axial direction. The first end E2001 of the first seal SL2001 is positioned closer, than the second end E2002 of the first seal SL2001, to the first cover C2001 in the axial direction, and is positioned below the second end E2002 of the first seal SL2001 in the up-down direction, when the first cover C2001 is positioned in the open position.

The first cover C2001 includes a second seal SL2002 for restricting leakage of toner from between the first seal SL2001 and the first cover C2001. The second seal SL2002 is made of an elastic body such as rubber. As shown in FIG. 41A, the second seal SL2002 contacts the first seal SL2001 when the first cover C2001 is positioned in the closed position. Specifically, the second seal SL2002 contacts the first seal SL2001 and covers the opening of the tubular first seal SL2001.

As shown in FIG. 40, the first protrusions 2053A, 2053B are protrusions for restricting the first cover C2001 and the toner box 2040 from being separated from the supply port H2001 in the up-down direction. The first protrusions 2053A, 2053B face the fifth surface F2055 in the up-down direction with a space formed between the first protrusions 2053A, 2053B and the fifth surface F2055. The top surface of the first protrusions 2053A, 2053B form parts of the top surface F2056 of the tank housing 2053. The first protrusion 2053A protrudes from the second surface F2052. The first protrusion 2053B protrudes from the third surface F2053.

The cover portion C2011 of the first cover C2001 is allowed to pass through between the first protrusions 2053A, 2053B and the fifth surface F2055. Specifically, when the first cover C2001 is positioned in the closed position, the cover portion C2011 of the first cover C2001 is positioned between the first protrusions 2053A, 2053B and the fifth surface F2055. When the first cover C2001 is positioned in the open position, the cover portion C2011 of the first cover C2001 is positioned in a position different from the first protrusions 2053A, 2053B and the fifth surface F2055 in the axial direction. When the first cover C2001 is positioned in the closed position, the first protrusions 2053A, 2053B restrict the separation of the first cover C2001 from the supply port H2001 in the up-down direction.

The first toner protrusions 2042A of the toner box 2040 are insertable between the first protrusions 2053A, 2053B and the fifth surface F2055. Specifically, when the toner box 2040 is attached to the sub-tank 2050, the first toner protrusions 2042A of the toner box 2040 are positioned between the first protrusions 2053A, 2053B and the fifth surface F2055. Thus, when the first cover C2001 is positioned in the open position and the toner box 2040 is attached to the sub-tank 2050, the first protrusions 2053A, 2053B restrict the toner box 2040 from being separated from the supply port H2001 in the up-down direction.

The second protrusions 2053C, 2053D are protrusions for restricting the first idle gear 2044 from being separated from the second idle gear 2056. The second protrusions 2053C, 2053D protrude from the fourth surface F2054. The second protrusions 2053C, 2053D contact the second toner protrusions 2042B of the toner box 2040 attached to the sub-tank 2050. The top surface of the second protrusions 2053C, 2053D form parts of the top surface F2056 of the tank housing 2053.

The toner-containing recess 2053E is a recess capable of containing toner leaking out from the supply port H2001. The toner-containing recess 2053E is recessed downward from the top surface F2056 of the sub-tank. The base surface of the toner-containing recess 2053E is connected to an end of the fifth surface F2055 opposite to the first surface F2051. In other words, the toner-containing recess 2053E is positioned downstream with respect to the supply port H2001 in a direction in which the toner box 2040 is attached to the sub-tank 2050. Thus, toner that spills out through the first seal SL2001 when the toner box is attached to the sub-tank 2050 or when the first cover C2001 is opened or closed can be collected in the toner-containing recess 2053E.

As shown in FIGS. 43A and 43B, the tank housing 2053 further includes a top wall WU, a bottom wall WL, a first side wall W2001, a second side wall W2002, a third side wall W2003, a fourth side wall W2004, a fifth side wall W2005, a slanted wall W2006, and a partition wall W2007. As shown in FIG. 36, the top wall WU has the supply port H2001. The supply port H2001 has a first side and a second side positioned apart from the first side in the predetermined direction (FIG. 43A).

As shown in FIG. 43B, the bottom wall WL is spaced apart from and arranged side-by-side with the top wall WU in the up-down direction. The bottom wall WL has a first end and a second end positioned apart from each other in the axial direction. As shown in FIG. 43A, the bottom wall WL has the discharge port H2002.

The first side wall W2001, the second side wall W2002, the third side wall W2003, the fourth side wall W2004, the fifth side wall W2005, and the slanted wall W2006 are side walls connecting the peripheral edges of the top wall WU and the bottom wall WL.

The first side wall W2001 is positioned at the first end of the bottom wall WL. The first side wall W2001 has a first side and a second side positioned apart from each other in the predetermined direction. The second side wall W2002 is positioned at the second end of the bottom wall WL. The second side wall W2002 has a first side and a second side positioned apart from each other in the predetermined direction. The dimension of the first side wall W2001 is larger than the dimension of the second side wall W2002 in the predetermined direction.

The third side wall W2003 is positioned at the first side of the first side wall W2001. The third side wall W2003 is connected to the first side wall W2001 and the second side wall W2002.

The fourth side wall W2004 is positioned at the second side of the first side wall W2001. The fourth side wall W2004 is connected to the second side of the first side wall W2001.

The fifth side wall W2005 is positioned at the second side of the second side wall W2002. The fifth side wall W2005 is connected to the second side of the second side wall W2002.

The slanted wall W2006 is a wall that connects the fourth side wall W2004 and the fifth side wall W2005. The slanted wall W2006 is inclined such that the closer to the fifth side wall W2005 in the axial direction, the closer to the third side wall W2003 in the predetermined direction. The slanted wall W2006 is closer to the input gear 2057 than to a central part of the tank housing 2053 in the axial direction.

The partition wall W2007 extends in the axial direction from a central portion of the first side wall W2001 in the predetermined direction. The partition wall W2007 is a wall for dividing a space inside the tank housing 2053 into a first space A2001 in which the first auger 2051 is contained, and a second space A2002 in which the second auger 2052 is contained. The partition wall W2007 is positioned between the first auger 2051 and the second auger 2052 in the predetermined direction.

The partition wall W2007 is positioned apart from the fifth side wall W2005 in the axial direction. Thus, the space between the fifth side wall W2005 and the partition wall W2007 forms a passage connecting the first space A2001 and the second space A2002.

As shown in FIG. 43B, the upper end of the partition wall W2007 is positioned above the first auger 2051. Herein, although only the rotation axis of the first auger 2051 is shown and helical blades are omitted in the drawings, the upper end of the partition wall W2007 is positioned above the helical blades.

The partition wall W2007 is positioned apart from the top wall WU. The first sensor 2210 is positioned above the partition wall W2007. The partition wall W2007 is positioned between the first side and the second side of the supply port H2001 in the predetermined direction.

The partition wall W2007 may have a first slanted surface and a second slanted surface. The first slanted surface may guide toner supplied through the supply port H2001 to the first space A2001, and the second slanted surface may guide toner supplied through the supply port H2001 to the second space A2002.

The first auger 2051 extends from the first side wall W2001 to the second side wall W2002. The second auger 2052 extends from the first side wall W2001 to the slanted wall W2006. The discharge port H2002 is positioned within the range of the fifth side wall W2005 in the axial direction. The first auger 2051 partially overlaps the discharge port H2002 as viewed from the up-down direction.

As shown in FIG. 35, the controller 2100 includes a central processing unit (CPU), a read-only memory (ROM), a random-access memory (RAM), etc. The controller 2100 is configured to execute various processes according to prestored programs in response to receiving a printing command or other commands. The controller 2100 is capable of executing an image forming process for forming an image on the sheet S2 regardless of whether the toner box is installed or removed. The controller 2100 is capable of executing an image forming process for forming an image on the sheet S2 regardless of the open/closed state of the first cover C2001.

The multicolor printer 2001 does not include a sensor for detecting the installment or removal of the toner box 2040. The multicolor printer 2001 does not include a sensor for detecting the open/close of the first cover C2001.

Next, the method of attaching and removing the toner box 2040 to and from the sub-tank 2050 will be described.

To attach the toner box 2040 to the sub-tank 2050, the user first moves the first cover C2001 from the closed position to the open position, as shown in FIGS. 41A and 41B. At this point, since the first end E2001 of the first seal SL2001 is positioned below the second end E2002 of the first seal SL2001, a frictional force between the second seal SL2002 of the first cover C2001 and the first end E2001 of the first seal SL2001 is less likely to cause resistance when the first cover C2001 is moved; thus, the first cover C2001 can be moved smoothly.

When the first cover C2001 is moved to the open position, the supply port H2001 of the sub-tank 2050 is exposed to the outside. Then, the user inserts the toner box 2040 into the box-housing recess 2022 from above, as shown in FIG. 42A, and fits the shutter protrusion 2045A of the toner shutter 2045 in the fitting hole H2006 of the sub-tank 2050. Subsequently, the user slides the toner housing 2042 of the toner box 2040, as shown in FIG. 42B, toward the first cover C2001 in the axial direction. The toner shutter 2045 is thereby opened and a portion of the toner in the toner box 2040 is supplied to the sub-tank 2050. When the toner housing 2042 is slid, the first idle gear 2044 of the toner box 2040 is engaged with the second idle gear 2056 of the sub-tank 2050, as shown in FIGS. 40 and 44A. At this point, the first toner protrusions 2042A enter the spaces under the first protrusions 2053A, 2053B of the tank housing 2053, and the second toner protrusions 2042B of the toner housing 2042 enter the spaces under the second protrusions 2053C, 2053D of the tank housing 2053. As a result, the toner housing 2042 and the first seal SL2001 can be brought into close contact, and the first idle gear 2044 and the second idle gear 2056 can be kept in engagement.

In order to supply the toner remaining in the toner box 2040 to the sub-tank 2050, the controller 2100 drives the drive source M shown in FIG. 44B. The drive force of the drive source M is transmitted to the input gear 2057 via the main housing gear 2024.

The drive force transmitted to the input gear 2057 is transmitted to the first auger gear 2054 shown in FIG. 44A via the first auger 2051. The drive force transmitted to the first auger gear 2054 is transmitted to the second auger gear 2055 via the second idle gear 2056. Further, the drive force transmitted to the first auger gear 2054 is transmitted to the agitation member gear 2043 via the second idle gear 2056 and the first idle gear 2044.

When the drive force is transmitted to the second auger gear 2055, the first auger 2051 and the second auger 2052 rotate together. As shown in FIG. 43A, the first auger 2051 and the second auger 2052 both deliver toner from the supply port H2001 toward the discharge port H2002 in the axial direction. At this point, since the rotation speed of the first auger 2051 is greater than the rotation speed of the second auger 2052, toner conveyed by the second auger 2052 can be restrained from being clogged in the vicinity of the passage between the fifth side wall W2005 and the partition wall W2007; thus, toner can be smoothly conveyed to the discharge port H2002.

Further, when the drive force is transmitted to the agitation member gear 2043, the agitation member 2041 shown in FIG. 35 rotates. The toner remaining in the toner box 2040 can thereby be supplied to the sub-tank 2050.

To remove the toner box 2040 from the sub-tank 2050, the user inserts his/her finger(s) between the second surface(s) F2042 of the toner box 2040 and a side(s) of the box-housing recess 2022 shown in FIG. 38, and slides the toner box 2040 in the axial direction away from the first cover C2001. The toner housing 2042 is thereby moved, as shown in FIG. 42A, relative to the toner shutter 2045 to close the toner shutter 45.

Further, the first toner protrusions 2042A of the toner housing 2042 shown in FIG. 40 are disengaged from the first protrusions 2053A, 2053B of the tank housing 2053, and the second toner protrusions 2042B of the toner housing 2042 shown in FIG. 40 are disengaged from the second protrusions 2053C, 2053D of the tank housing 2053. Thus, the user can lift up the toner box 2040.

Subsequently, the user inserts his/her finger in the recess 2022A of the main housing 2002 shown in FIG. 37, and slides the first cover C2001 from the open position to the closed position. The first opening H2011 and the supply port H2001 are thereby closed by the first cover C2001. Further, at this point, the cover portion C2011 of the first cover C2001 enters the space under the first protrusions 2053A, 2053B of the tank housing 2053 shown in FIG. 40. As a result, as shown in FIG. 41A, the first seal SL2001 and the second seal SL2002 can be brought into close contact.

According to the above-described embodiment, the following advantageous effects can be obtained.

Since the capacity of the sub-tank 2050 is greater than the capacity of the toner box 2040, the time period from when the toner box 2040 becomes empty to when printing becomes impossible can be extended.

Since the supply port H2001 faces upward, toner in the toner box 2040 can be supplied to the sub-tank by gravity.

Since the discharge port H2002 faces downward, toner in the sub-tank 2050 can be discharged to the pipe 2060 by gravity.

Since the diameter of the first auger gear 2054 is smaller than the diameter of the second auger gear 2055, the rotation speed of the first auger 2051 can be made faster than the rotation speed of the second auger 2052 to thereby allow toner to be smoothly conveyed to the discharge port H2002.

Since the partition wall W2007 is positioned between the first side and the second side of the supply port H2001, toner supplied from the toner box 2040 to the sub-tank 2050 is distributed by the partition wall W2007 to the first space A2001 on the first-auger 2051 side and to the second space A2002 on the second-auger 2052 side.

Since the controller 2100 can execute the image forming process regardless of whether the toner boxes 2040 are installed or removed, the image forming process can be executed even if the toner boxes 2040 are removed from the sub-tank 2050.

Since the first protrusions 2053A, 2053B restrict the first cover C2001 from being separated from the supply port H2001 in the up-down direction when the first cover C2001 is positioned in the closed position, foreign matter such as dust can be restrained from entering the supply port H2001. Further, since the first protrusions 2053A, 2053B restrict the toner box 2040 from being separated from the supply port H2001 in the up-down direction when the first cover C2001 is positioned in the open position and the toner box 2040 is attached to the sub-tank 2050, toner leakage from between the toner box 2040 and the sub-tank 2050 can be restrained when toner is being supplied. Since the movement of the first cover C2001 and the movement of the toner box 2040 in directions away from the supply port H2001 are both restricted by the first protrusions 2053A, 2053B, the structure of the multicolor printer 2001 can be simplified.

Since the first cover C2001 is slidable relative to the main housing 2002, toner adhering to the first cover C2001 can be kept from being exposed when the first cover C2001 is opened, as compared to, for example, an alternative apparatus described below in which a first cover rotates.

Since the sub-tank 2050 includes a first seal SL 2001 surrounding the supply port H2001, toner leakage from between the sub-tank 2050 and the first cover C2001 can be restrained.

When the first cover C2001 is in the open position, the first end E2001 of the first seal SL2001 is positioned closer, than the second end E2002 of the first seal SL2001, to the first cover C2001 in the axial direction, and positioned below the second end E2002 of the first seal SL2001 in the up-down direction. Thus, the frictional force between the first cover C2001 and the first seal SL2001 during movement of the first cover C2001 can be made smaller to thereby allow the first cover C2001 to move smoothly. Further, when the first cover C2001 is being closed, the second end E2002 of the first seal SL2001 can be squeezed by the first cover C2001. Thus, sealability can be improved. Specifically, since the second end E2002 of the first seal SL2001 is positioned closer, than the first end E2001, to the user replacing the toner box 2040, sealability of the second end E2002 of the first seal SL2001, on the side closer to the user, can be improved.

Since the first cover C2001 includes a second seal SL2002 that contacts the first seal SL2001, toner leakage from between the sub-tank 2050 and the first cover C2001 can be restrained.

Since the sub-tank 2050 includes second protrusions 2053C, 2053D that restrain separation of the first idle gear 2044 from the second idle gear 2056, the first idle gear 2044 can be restrained from being disengaged from the second idle gear 2056.

As shown in FIG. 37, since the first end of the sheet ejection opening H2004 is positioned between the first ends and the second ends of the box-housing recesses 2022, the sheet S2 ejected on the output tray 2021 can be picked up from below by inserting one's finger into one of the box-housing recesses 2022 when the toner boxes 2040 are removed from the sub-tanks 2050. Thus, the sheet S2 can be easily picked up from the output tray 2021.

Since the upper surfaces F2043 of the toner boxes 2040 contact the sheet S2 ejected from the sheet ejection opening H2004 when the toner boxes 2040 are attached to the sub-tanks 2050, the toner boxes 2040 housed in the box-housing recesses 2022 can be used to support the sheet S2.

When the first cover C2001 is positioned in the open position, the handle portion C2012 is positioned near the opposing surface F2004. However, since the opposing surface F2004 has the recess 2022A, the user can insert his/her finger in the recess 2022A and easily operate the handle portion C2012.

Since the controller 2100 can execute the image forming process regardless of the open/closed state of the first covers C2001, the image forming process can be executed with the first covers C2001 open.

Since the multicolor printer 2001 does not include sensors for detecting the open/close of the first covers C2001, costs can be reduced.

Figure 45:
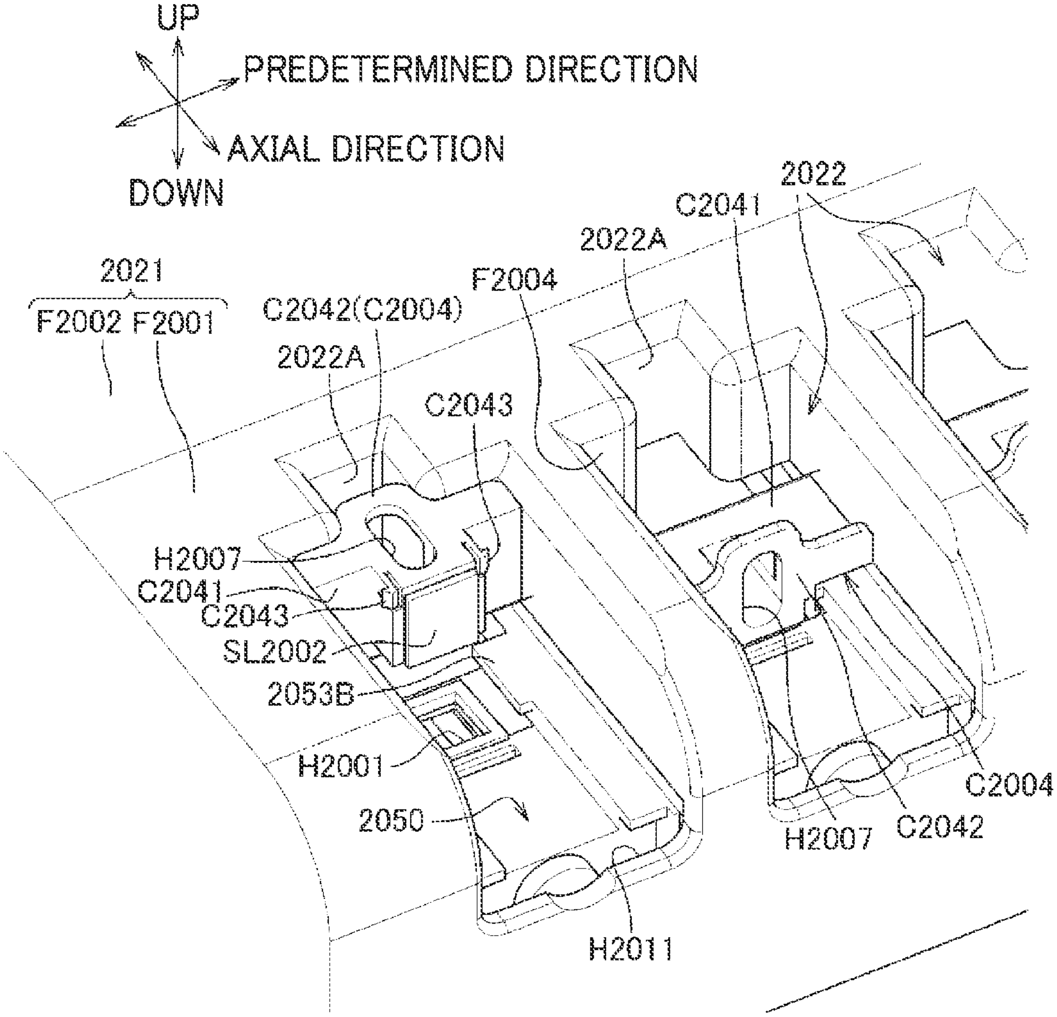
FIG. 45 is a perspective view showing a modification of the first cover.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below wherein members having the approximately same structures to the above-described examples are identified by the same reference character and description thereof is omitted:

As shown in FIG. 45, a first cover C2004 may be rotatable relative to the main housing 2002 between a closed position to close the supply port H2001 and an open position to open the supply port H2001. Specifically, the first cover C2004 includes a cover portion C2041 for covering the supply port H2001, a handle portion C2042 protruding upward from the cover portion C2041, and a second seal SL2002 similar to the above-described embodiment.

The cover portion C2041 has a first end positioned closer to the recess 2022A and a second end positioned farther from the recess 2022A in the axial direction. The cover portion C2041 is rotatable about the first end. The second seal SL2002 is positioned at a bottom surface of the cover portion C2041. When the first cover C2004 is positioned at a closed position, the second seal SL2002 covers the supply port H2001. When the first cover C2004 is positioned at the closed position, the cover portion C2041 covers a part of the first opening H2011.

Further, the cover portion C2041 includes two cover protrusions C2043. When the first cover C2004 is positioned in the closed position, the cover protrusions C2043 enter the spaces under the first protrusions 2053A, 2053B of the sub-tank 2050. The first protrusions 2053A, 2053B thereby restrict the first cover C2004 from being separated from the supply port H2001 in the up-down direction, when the first cover C2004 is positioned in the closed position.

The handle portion C2042 is positioned at the second end of the cover portion C2041. The handle C2042 has a hole H2007. A user's finger can be inserted in the hole H2007.

According to this configuration, when the first cover C2004 is moved from the closed position to the open position, the second seal SL2002 moves upward away from the first seal SL2001. As a result, almost no frictional force is generated between the second seal SL2002 and the first seal SL2001 when the first cover C2004 is opened, and operability of the first cover C2004 can thereby be improved.

Although the second idle gear 2056 is provided between the first auger gear 2054 and the second auger gear 2055 in the third embodiment, an alternative structure in which the first auger and the second auger are engaged with each other may also be possible. In this case, the vanes of the first auger and the second auger may be oriented in opposite directions so that the direction in which the first auger conveys toner and the direction in which the second auger conveys toner is the same.

Although the present disclosure is applied to the multicolor printer 2001 in the third embodiment, the present disclosure may be applied to other image forming apparatuses such as copying machines, multifunctional devices, etc.

The elements described in the third embodiment and its modified examples may be implemented selectively and in combination.

Next, the fourth embodiment of the present disclosure will be described in detail referring to the drawings where appropriate.

Figure 46:
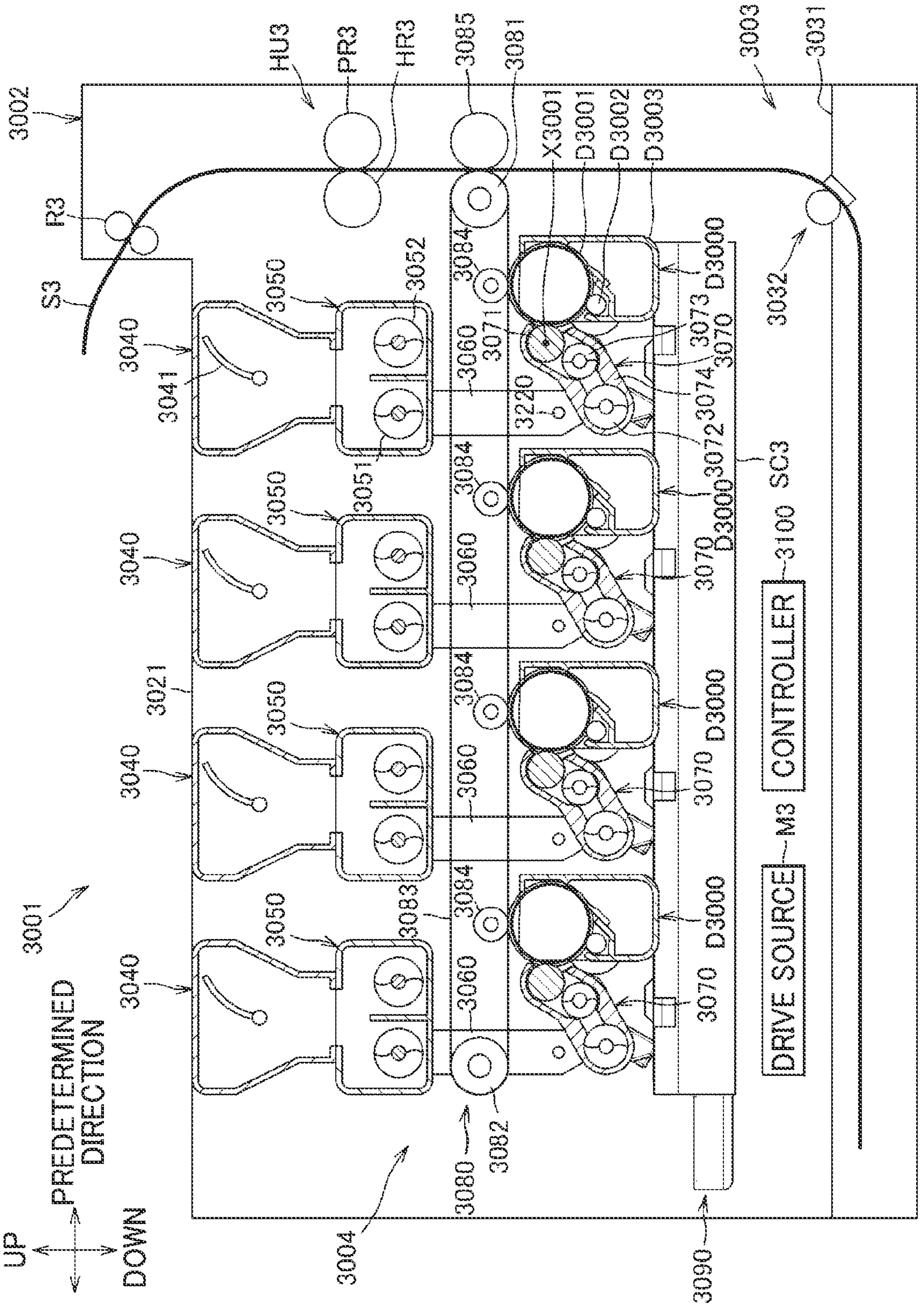
FIG. 46 is an illustration of a multicolor printer.

As shown in FIG. 46, a multicolor printer 3001 as an example of an image forming apparatus includes a main housing 3002, a sheet feeder unit 3003, an image forming unit 3004, an ejection roller R3, and a controller 3100. The sheet feeding unit 2003 feeds a sheet S3 to the image forming unit 3004. The image forming unit 3004 forms an image on the sheet S3.

The main housing 3002 includes an output tray 3021 positioned on top thereof. The ejection roller R3 ejects the sheet S3 onto the output tray 3021. A drive source M3 such as a motor is provided at the main housing 3002.

The sheet feeder unit 3003 is positioned in a lower part of the main housing 3002. The sheet feeder unit 3003 includes a feed tray 3031 and a supply mechanism 3032. The feed tray 3031 is installable into and removable from the main housing 3002. The supply mechanism 3032 conveys the sheet S3 from the feed tray 3031 to the image forming unit 3004.

The image forming unit 3004 includes four toner boxes 3040, four sub-tanks 3050, four pipes 3060, four development devices 3070, four drum units D3000, a scanner SC3, a transfer unit 3080, a fixing unit HU3, and a waste toner box 3090.

Figure 47:
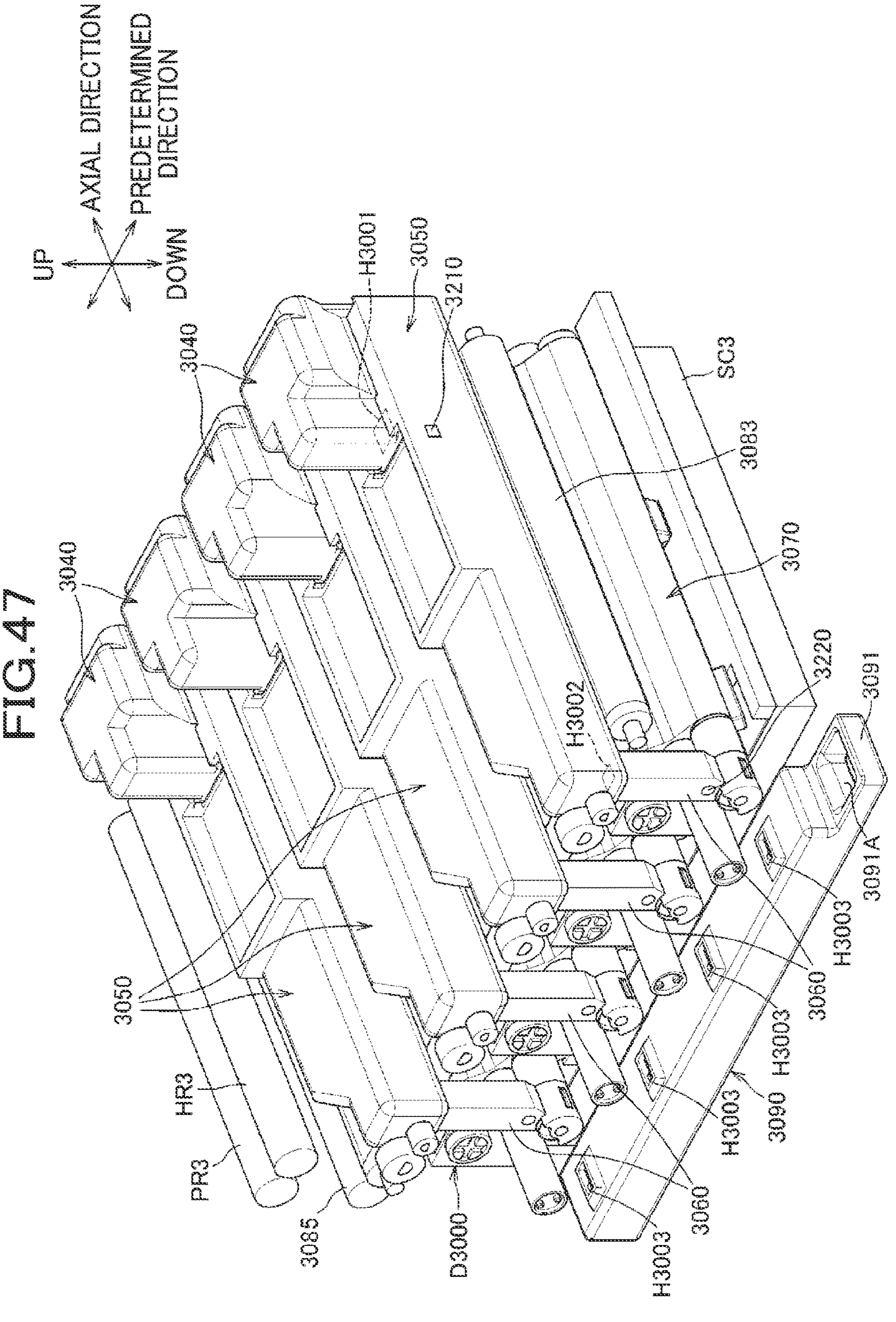
FIG. 47 is a perspective view of a structure inside a main housing.

The toner boxes 3040 are container-shaped members that contain toner. The four toner boxes 3040 each contain toner of a different color. The toner boxes 3040 are positioned above an intermediate transfer belt 3083 which will be described later. Each toner box 3040 includes an agitation member 3041 for agitating toner. As shown in FIG. 47, the toner boxes 3040 are attachable to and removable from the sub-tanks 3050 in an axial direction shown in the drawings.

The sub-tanks 3050 are container-shaped members to which toner is supplied from the toner boxes 3040. The sub-tanks 3050 are positioned between the toner boxes 3040 and the intermediate transfer belt 3083 in the up-down direction. Each sub-tank 3050 has a first end and a second end positioned apart from each other in the axial direction. Each toner box 3040 is positioned at the first end of the corresponding sub-tank 3050 when the toner box 3040 is attached to the sub-tank 3050. The capacity of the sub-tank 3050 is greater than the capacity of the toner box 3040. The capacity of the sub-tank 3050 is greater than the capacity of the development device 3070. In this specification, capacity refers to an amount of toner (maximum amount of toner) containable in a container-shaped member such as the sub-tank 3050.

The dimension of the sub-tank 3050 in the axial direction is greater than the dimension of the toner box 3040 in the axial direction. Specifically, the dimension of the sub-tank 3050 in the axial direction is equal to or greater than three times the dimension of the toner box 3040 in the axial direction.

Each sub-tank 3050 has a supply port H3001 and a discharge port H3002. Toner is supplied from each toner box 3040 to the corresponding sub-tank 3050 through the supply port H3001 and is discharged from the sub-tank 3050 to the corresponding pipe 3060 through the discharge port H3002. The supply port H3001 faces upward. The supply port H3001 is positioned on the top surface of the sub-tank 3050. Herein, "upward" may be any direction with an upward component and may, for example, include an oblique upward direction.

The discharge port H3002 is spaced apart from the supply port H3001 in the axial direction. Specifically, the supply port H3001 is positioned at the first-end side of the sub-tank 3050. The discharge port H3002 is positioned at the second-end side of the sub-tank 3050. The discharge port H3002 faces downward. The discharge port H3002 is positioned on a bottom surface of the sub-tank 3050. Herein, "downward" may be any direction with a downward component and may, for example, include an oblique downward direction.

Figures 54A, 54B:
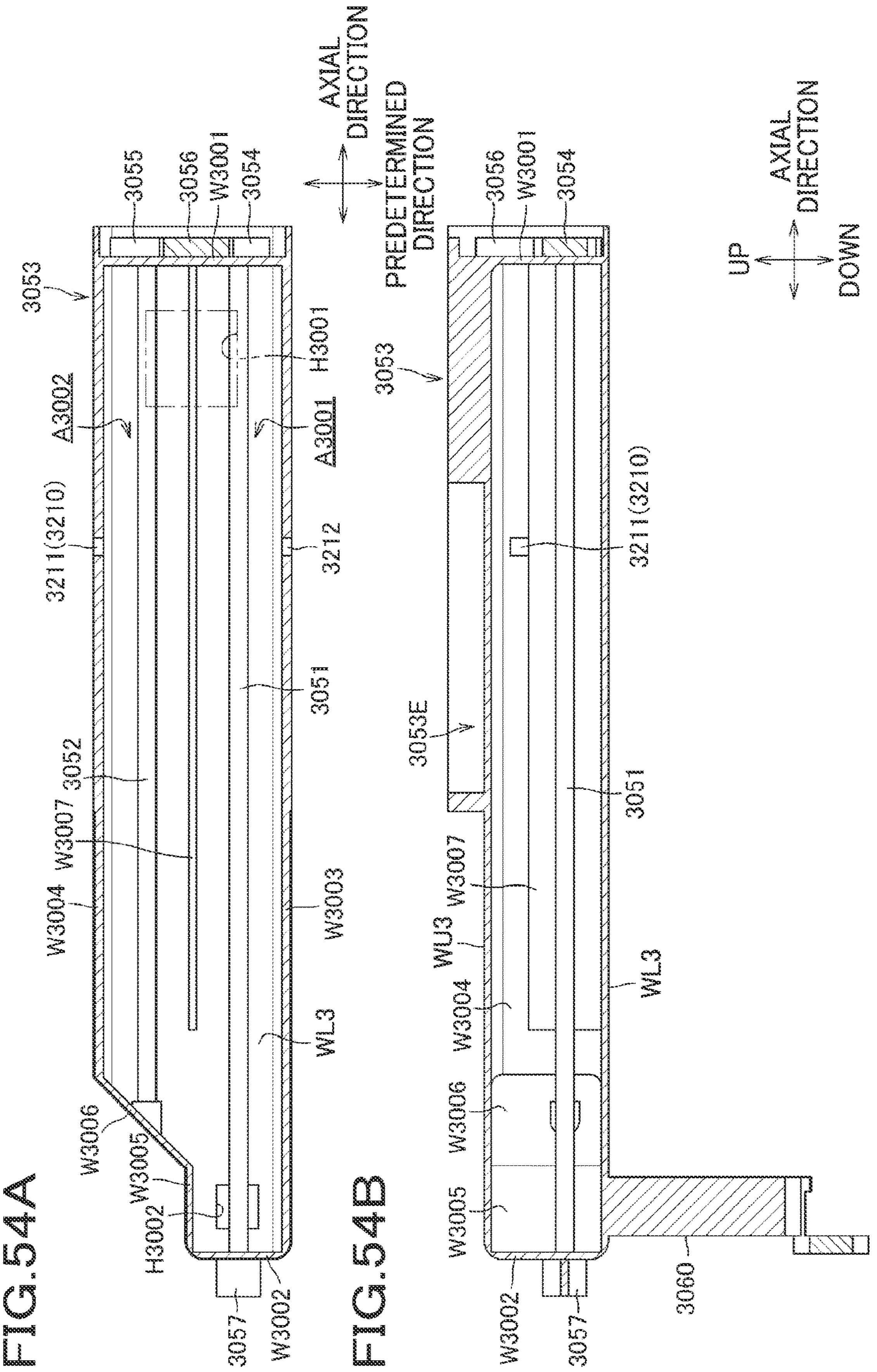
FIG. 54A is a cross-sectional view of the sub-tank along a horizontal plane.
FIG. 54B is a cross-sectional view of the sub-tank along a vertical plane.

Each sub-tank 3050 includes a first sensor 3210 as an example of a toner sensor that detects the presence or absence of toner in the sub-tank 3050. As shown in FIG. 54A, the first sensor 3210 is an optical sensor including a light emitter 3211 and a light receiver 3212. The light emitter 3211 emits light in a predetermined direction shown in the drawings. The light receiver 3212 receives light emitted from the light emitter 3211. The predetermined direction is perpendicular to the axial direction and to the up-down direction. The first sensor 3210 is positioned between the supply port H3001 and the discharge port H3002 in the axial direction.

The distance from the first sensor 3210 to the discharge port H3002 is greater than the distance from the first sensor 3210 to the supply port H3001 in the axial direction. Specifically, a space inside the sub-tank 3050 on the supply-port-side of the first sensor 3210 is capable of containing toner of an amount equal to toner containable in one toner box 3040. A space inside the sub-tank 3050 on the discharge-port-side of the first sensor 3210 is capable of containing toner of an amount equal to toner containable in two toner boxes 3040.

Referring back to FIG. 46, each sub-tank 3050 includes a first auger 3051 and a second auger 3052. The first auger 3051 and the second auger 3052 are members that convey toner supplied from the corresponding toner box 3040 to the corresponding pipe 3060. The first auger 3051 and the second auger 3052 convey toner in the axial direction. The second auger 3052 is arranged side-by-side with the first auger 3051 in the predetermined direction.

The pipes 3060 are tubular members that deliver toner in the sub-tanks 3050 to the development devices 3070. Each pipe 3060 extends from the corresponding sub-tank 3050 to the corresponding development device 3070. Toner in each toner box 3040 is supplied to the corresponding development device 3070 via the sub-tank 3050 and the pipe 3060.

Each pipe 3060 includes a second sensor 3220 that detects the presence or absence of toner in the pipe 3060. The second sensor 3220 is an optical sensor including a light emitter and a light receiver. The light emitter emits light in the axial direction. The light receiver receives light emitted from the light emitter. The second sensor 3220 is positioned above a lower end of a development roller 3071. Specifically, light emitted from the light emitter of the second sensor 3220 passes through a position above the lower end of the development roller 3071.

Figure 50:
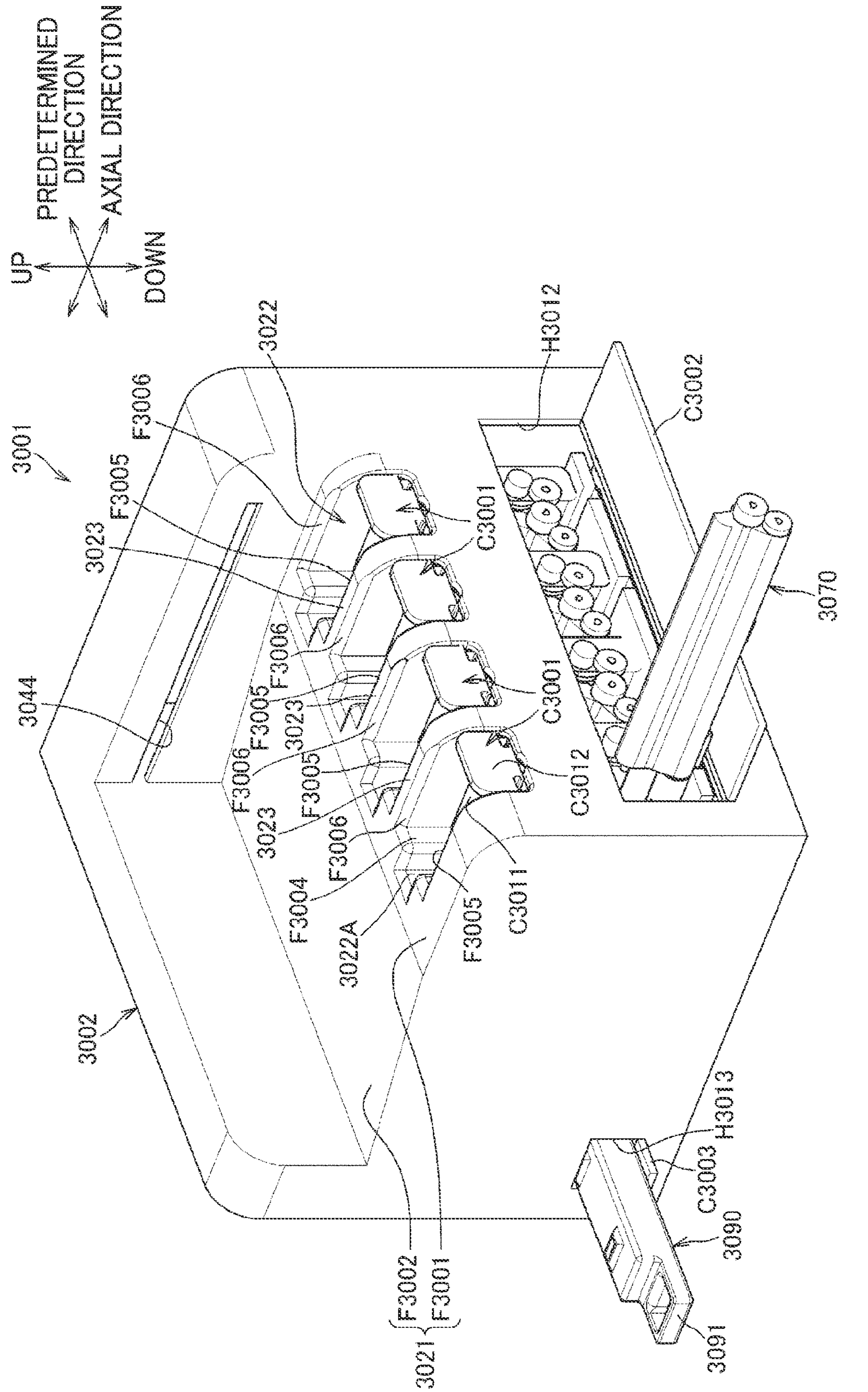
FIG. 50 is a perspective view showing a development device and a waste toner box being removed from the main housing.

The development devices 3070 are positioned below the intermediate transfer belt 3083. As shown in FIG. 50, the development devices 3070 are installable into and removable from the main housing 3002 in the axial direction. Referring back to FIG. 46, each development device 3070 includes a development roller 3071, two augers 3072, 3073, and a housing 3074. The housing 3074 houses a part of the development roller 3071, the two augers 3072, 3073, and toner. The development roller 3071 is rotatable about a development axis X3001 extending in the axial direction. The two augers 3072, 3073 are members that convey toner supplied from the pipe 3060 to the development roller 3071. The auger 3072 conveys toner in the axial direction toward one end of the development device 3070. The auger 3073 conveys toner in the axial direction toward the other end of the development device 3070. Toner is thereby conveyed and circulated in the housing 3074.

The drum units D3000 are positioned below the intermediate transfer belt 3083. Each drum unit D3000 is arranged side-by-side with the corresponding development device 3070 in the predetermined direction. The drum unit D3000 includes a photosensitive drum D3001, a charger roller D3002 that charges the photosensitive drum D3001, and a drum frame D3003 that houses a portion of the photosensitive drum D3001 and the charger roller D3002.

The scanner SC3 is positioned below the drum units D3000. The scanner SC3 emits laser light toward each of the photosensitive drums D3001.

The transfer unit 3080 is positioned between the sub-tanks 3050 and the development devices 3070 in the up-down direction. The transfer unit 3080 includes a drive roller 3081, a follower roller 3082, an intermediate transfer belt 3083, four primary transfer rollers 3084, and a secondary transfer roller 3085.

The intermediate transfer belt 3083 is an endless belt. The intermediate transfer belt 3083 is wrapped around and stretched between the drive roller 3081 and the follower roller 3082. The intermediate transfer belt 3083 overlaps the pipes 3060 as viewed in the axial direction. Specifically, the intermediate transfer belt 3083 overlaps the pipes 3060 when projected in the axial direction.

The primary transfer rollers 3084 are positioned to face an inner surface of the intermediate transfer belt 3083. The intermediate transfer belt 3083 is sandwiched between the primary transfer rollers 3084 and the photosensitive drums D3001.

The secondary transfer roller 3085 is positioned to face an outer surface of the intermediate transfer belt 3083. The intermediate transfer belt 3083 is sandwiched between the secondary transfer roller 3085 and the drive roller 3081.

The fixing unit HU3 is positioned above the intermediate transfer belt 3083. The fixing unit HU3 includes a heating roller HR3 and a pressure roller PR3. The pressure roller PR3 is pressed against the heating roller HR3.

In the image forming unit 3004, first, a surface of the photosensitive drum D3001 is charged by the charger roller D3002. Then, the scanner SC3 projects light to expose the surface of the photosensitive drum D3001 and thereby form an electrostatic latent image thereon.

Subsequently, the development roller 3071 supplies toner to the electrostatic latent image formed on the photosensitive drum D3001 to thereby form a toner image on the photosensitive drum D3001. The toner image on the photosensitive drum D3001 is then transferred onto the intermediate transfer belt 3083.

The toner image on the intermediate transfer belt 3083 is transferred onto the sheet S3 when the sheet S3 passes through between the intermediate transfer belt 3083 and the secondary transfer roller 3085. Thereafter, the toner image on the sheet S3 is fixed on the sheet S3 at the fixing unit HU3. The sheet S3 is then ejected onto the output tray 3021 by the ejection roller R3.

As shown in FIG. 47, the waste toner box 3090 is a container-shaped member capable of containing toner. The development devices 3070 can discharge deteriorated toner therein to the waste toner box 3090. Specifically, each development device 3070 has a discharge port (not shown) for discharging toner to the waste toner box 3090, and a shutter (not shown) for opening and closing the discharge port. The main housing 3002 has passages for discharging toner from the development devices 3070 to the waste toner box 3090.

The waste toner box 3090 is positioned below the development devices 3070 and the drum units D3000. The waste toner box 3090 overlaps the scanner SC3 as viewed in the axial direction. The waste toner box 3090 has four openings H3003 and a handle 3091. The openings H3003 are openings for receiving toner discharged from the development devices 3070.

The handle 3091 has a hole 3091A in which a user can hook his/her finger. The hole 3091A is a through hole extending in the up-down direction. The hole 3091A may also be a blind hole. As shown in FIG. 50, the waste toner box 3090 is installable into and removable from the main housing 3002 in the predetermined direction.

Figure 48:
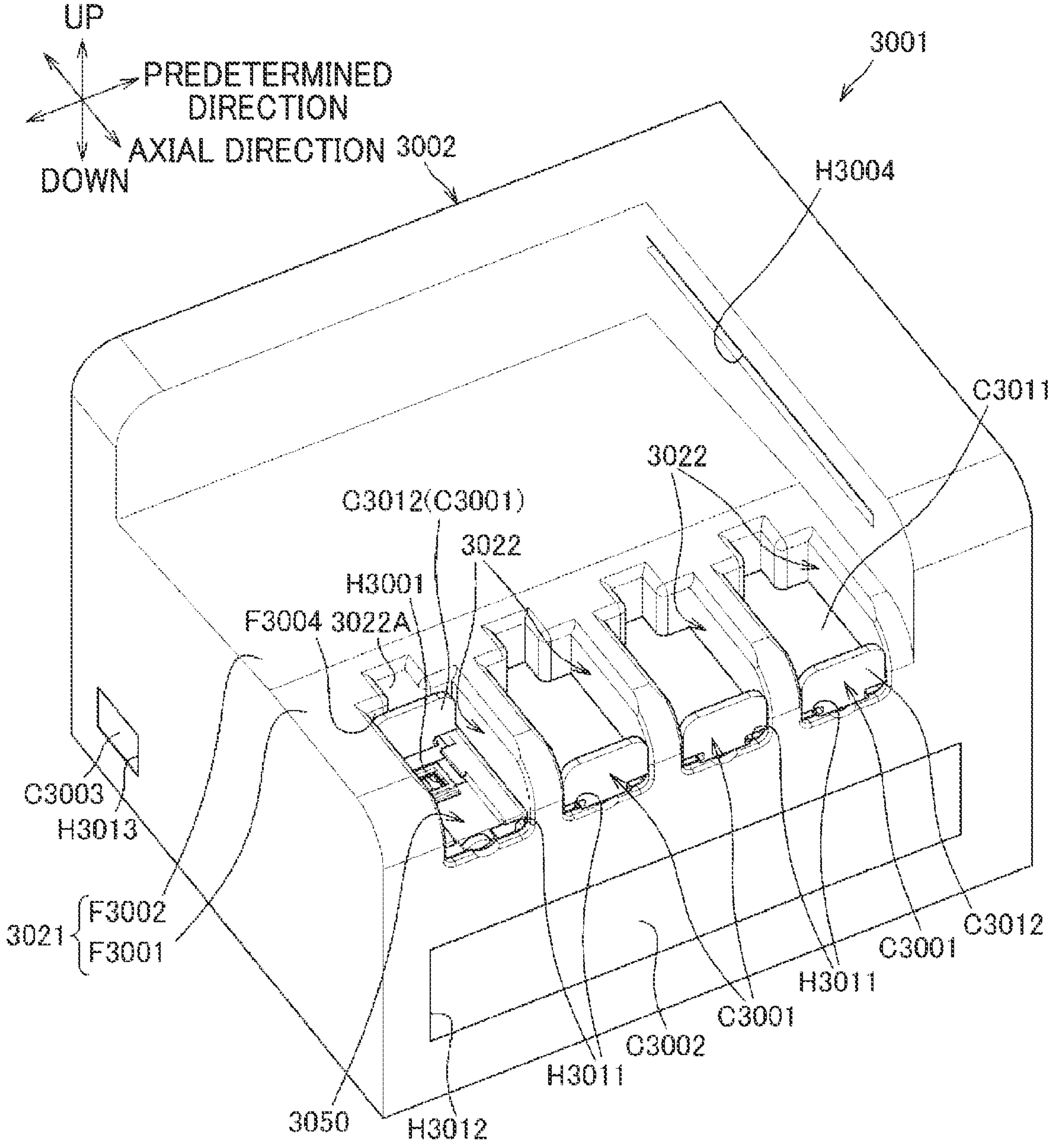
FIG. 48 is a perspective view of the multicolor printer without toner boxes attached to sub-tanks.

As shown in FIGS. 48 and 50, the main housing 3002 has a sheet ejection opening H3004, four box-housing recesses 3022, four first openings H3011, a second opening H3012, and a third opening H3013. The sheet ejection opening H3004 is an opening for ejecting the sheet S3 outside the main housing 3002. Specifically, the sheet ejection opening H3004 is an opening for ejecting the sheet S3 onto the output tray 3021.

The sheet ejection opening H3004 is positioned above the output tray 3021. The sheet ejection opening H3004 extends in the axial direction and has a first end and a second end positioned apart from each other in the axial direction. Each box-housing recess 3022 has a first end and a second end positioned apart from each other in the axial direction, and a first side and a second side positioned apart from each other in the predetermined direction. The first end of the sheet ejection opening H3004 is positioned between the first ends and the second ends of the box-housing recesses 3022.

The output tray 3021 has a first supporting surface F3001 and a second supporting surface F3002. The first supporting surface F3001 and the second supporting surface F3002 are surfaces for supporting the sheet S3 ejected through the sheet ejection opening H3004. The first supporting surface F3001 is perpendicular to the up-down direction. The first supporting surface F3001 is positioned between the second supporting surface F3002 and the second opening H3012 in the axial direction. The second supporting surface F3002 is inclined relative to the first supporting surface F3001 such that the farther from the first supporting surface F3001 in the axial direction, the lower the second supporting surface F3002.

Figure 49:
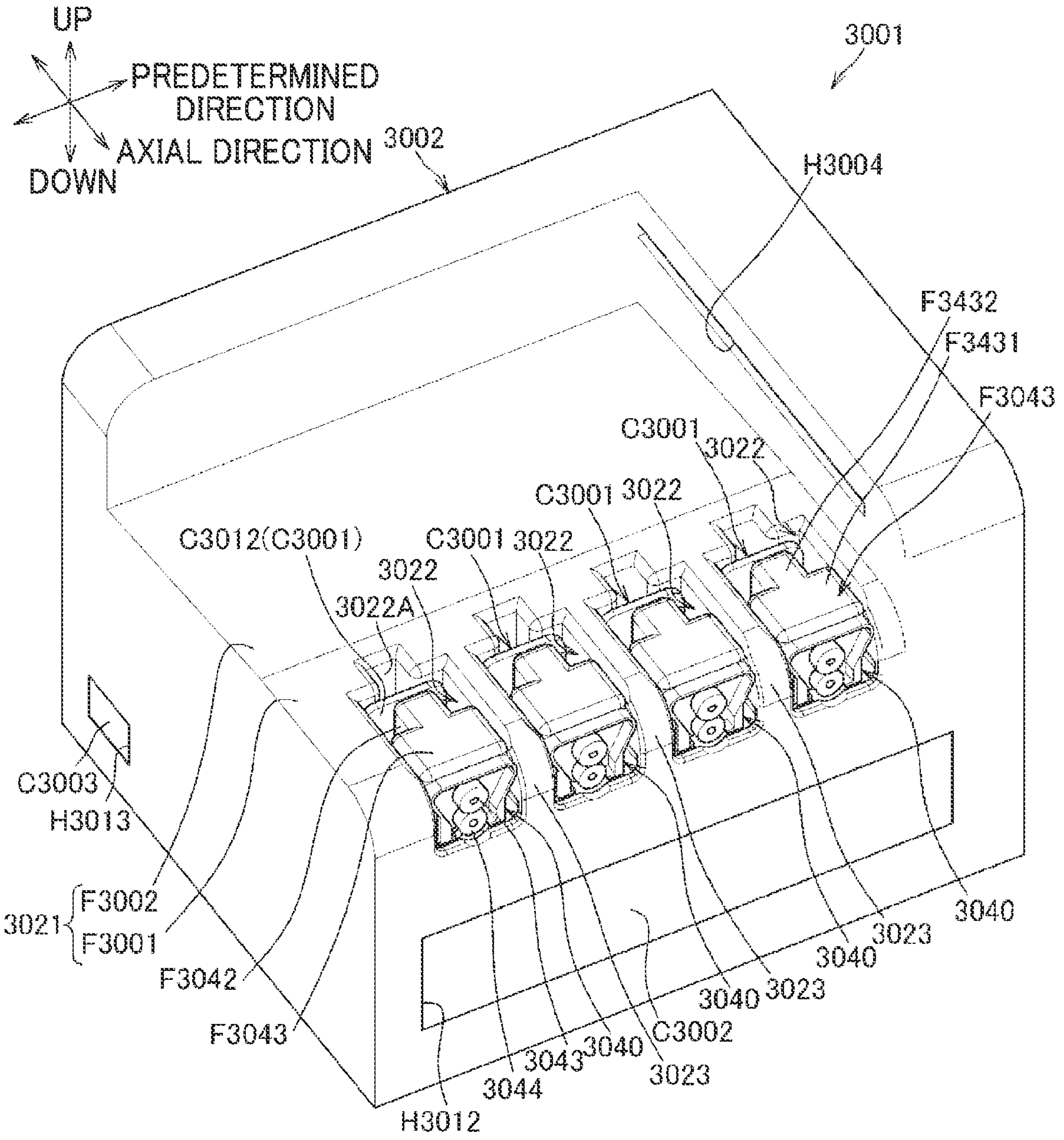
FIG. 49 is a perspective view of the multicolor printer with the toner boxes attached to the sub-tanks.

As shown in FIGS. 48 and 49, the box-housing recesses 3022 are recesses for housing the toner boxes 3040 attached to the sub-tanks 3050. The four box-housing recesses 3022 are spaced apart and arranged side-by-side in the predetermined direction. Each box-housing recess 3022 is downwardly recessed from the first supporting surface F3001. As shown in FIG. 48, each box-housing recess 3022 has a first opening H3011.

The first openings H3011 are openings for exposing supply ports H3001 to the outside of the main housing 3002. Each first opening H3011 allows a part of the corresponding toner box 3040 to pass therethrough. The toner box 3040 can be attached to the sub-tank 3050 through the first opening H3011.

As shown in FIG. 49, a top surface F3043 of each toner box 3040 attached to the corresponding sub-tank 3050 is positioned in a position corresponding to the first supporting surface F3001 in the up-down direction. Specifically, when the toner boxes 3040 are attached to the sub-tanks 3050, the top surfaces F3043 of the toner boxes 3040 are approximately flush with the first supporting surface F3001. Accordingly, when the toner boxes 3040 are attached to the sub-tanks 3050, the top surfaces F3043 of the toner boxes 3040 contact the sheet S3 ejected from the sheet ejection opening H3004.

As shown in FIG. 50, the second opening H3012 is an opening through which the development devices 3070 is allowed to pass. The second opening H3012 opens in the axial direction. The third opening H3013 is an opening through which the waste toner box 3090 is allowed to pass. The third opening H3013 opens in the predetermined direction.

The multicolor printer 3001 further includes a first cover C3001, a second cover C3002, and a third cover C3003. The first cover C3001 is a cover for opening and closing the supply port H3001 and the first opening H3011. The first cover C3001 is provided for each of the four sub-tanks 3050.

The first cover C3001 is slidable in the axial direction relative to the main housing 3002, between a closed position shown in FIG. 50 and an open position shown in FIG. 49. When the first cover C3001 is positioned in the closed position, the first cover C3001 closes the supply port H3001 and the first opening H3011. When the first cover C3001 is positioned in the open position, the supply port H3001 and the first opening H3011 are opened. The first cover C3001 is attached to the main housing 3002. The first cover C3001 is positioned in an upper part of the main housing 3002.

The first cover C3001 includes a cover portion C3011 and a handle portion C3012. The cover portion C3011 covers the first opening H3011. The handle portion C3012 protrudes upward from the cover portion C3011. Each box-housing recess 3022 further has an opposing surface F3004 and a recess 3022A. The opposing surface F3004 is opposed to the handle portion C3012 in the axial direction. The recess 3022A is recessed from the opposing surface F3004. The recess 3022A opens upward and toward the handle portion C3012. The handle portion C3012 is positioned closer to the opposing surface F3004 when the first cover C3001 is positioned in the open position than when the first cover C3001 is positioned in the closed position.

The second cover C3002 is a cover for opening and closing the second opening H3012. The second cover C3002 is rotatable relative to the main housing 3002 about a lower end thereof.

The third cover C3003 is a cover for opening and closing the third opening H3013. The third cover C3003 is rotatable relative to the main housing 3002 about a lower end thereof.

As shown in FIG. 50, the main housing 3002 further has a first box-guiding surface F3005, a second box-guiding surface F3006, and three partitions 3023. The first box-guiding surface F3005 and the second box-guiding surface F3006 are surfaces for guiding the toner box 3040. The first box-guiding surface F3005 and the second box-guiding surface F3006 are provided in each of the four box-housing recesses 3022. The first box-guiding surface F3005 and the second box-guiding surface F3006 are positioned at upper ends of each box-housing recess 3022. The first box-guiding surface F3005 is positioned at the first side of the box-housing recess 3022. The second box-guiding surface F3006 is positioned at the second side of the box-housing recess 3022. The first box-guiding surface F3005 and the second box-guiding surface F3006 are inclined such that the surfaces F3005, F3006 come closer to each other as the surfaces F3005, F3006 extend downward.

As shown in FIG. 49, each partition 3023 is disposed between two toner boxes 3040 arranged side-by-side in the predetermined direction. The top surface of each partition 3023 forms a part of the first supporting surface F3001.

Figure 51:
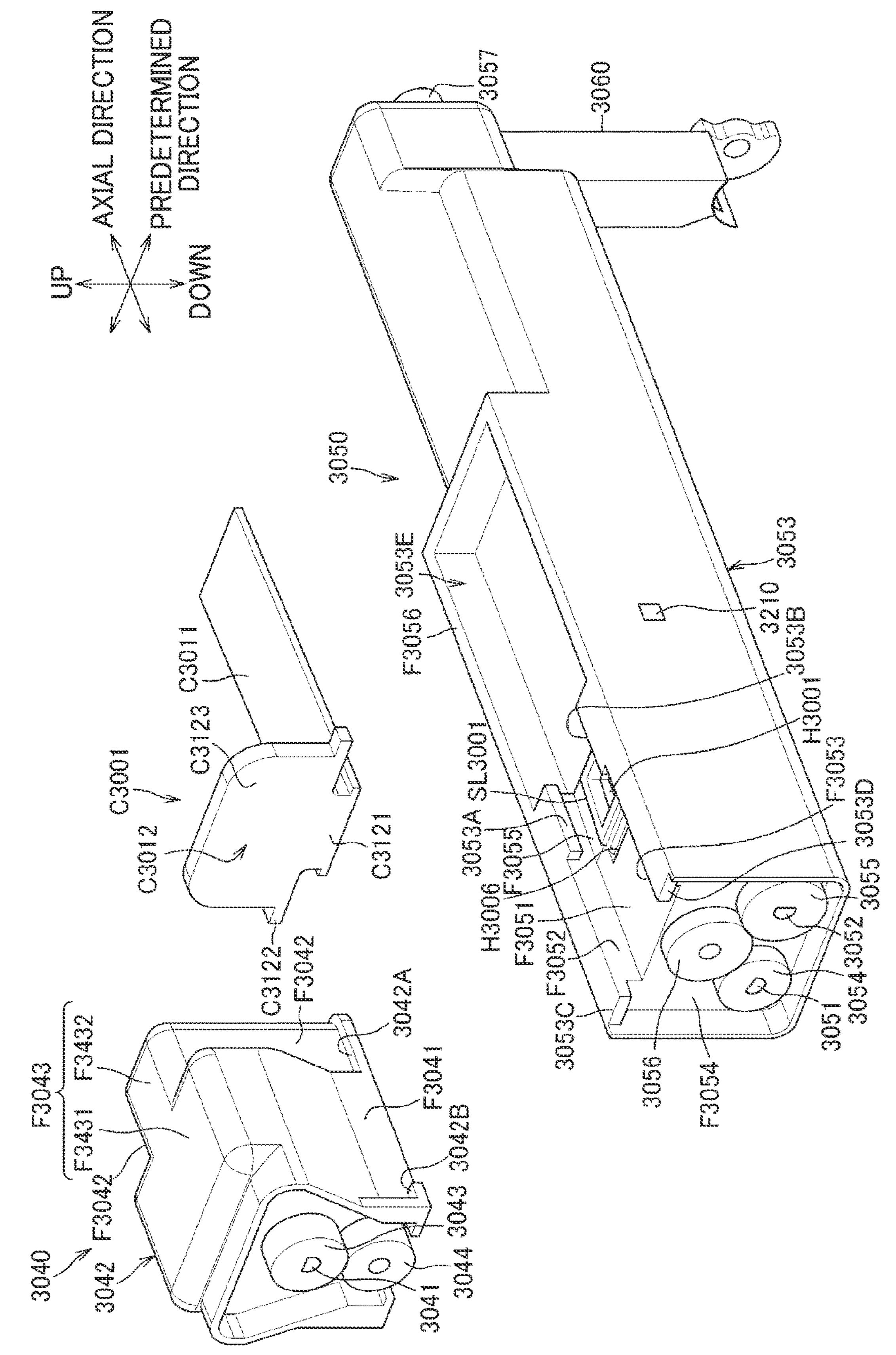
FIG. 51 is a perspective view showing the relationship between the toner box, the first cover, and the sub-tank.

As shown in FIG. 51, each toner box 3040 further includes a toner housing 3042, an agitation member gear 3043, and a first idle gear 3044.

The toner housing 3042 has a first side and a second side positioned apart from each other in the predetermined direction. The toner housing 3042 contains toner and the above-described agitation member 3041. The toner housing 3042 has a first surface F3041, a second surface F3042, a top surface F3043, a first toner protrusion 3042A, and a second toner protrusion 3042B. The first surface F3041 and the second surface F3042 are perpendicular to the predetermined direction.

The first surface F3041 is positioned on the first side and the second side of the toner housing 3042. The second surface F3042 is positioned on a side of the first surfaces F3041 opposite to a side on which the agitation member gear 3043 is positioned in the axial direction. The second surface F3042 is positioned on the first side and the second side of the toner housing 3042. The two second surfaces F3042 are positioned between the two first surfaces F3041 in the predetermined direction.

The top surface F3043 is T-shaped. The top surface F3043 has a wide portion F3431 and a narrow portion F3432. The wide portion F3431 and the narrow portion F3432 are aligned in the axial direction. The narrow portion F3432 is positioned at a central portion of the wide portion F3431 in the predetermined direction. As shown in FIG. 49, the narrow portion F3432 is positioned between the first cover C3001 and the wide portion F3431 when the toner box 3040 is attached to the sub-tank 3050. The narrow portion F3432 is positioned apart from the two side surfaces of the box-housing recess 3022 in the predetermined direction when the toner box 3040 is attached to the sub-tank 3050.

The first toner protrusion 3042A is provided on each of the two second surfaces F3042. The first toner protrusions 3042A protrude from the second surfaces F3042. A surface of each of the first toner protrusions 3042A facing in the predetermined direction forms a part of the corresponding first surface F3041.

The second toner protrusion 3042B is provided on each of the two first surfaces F3041. The second toner protrusions 3042B protrude from the first surfaces F3041.

The agitation member gear 3043 is positioned on one end of the agitation member 3041. The agitation member gear 3043 rotates together with the agitation member 3041. The first idle gear 3044 is positioned below the agitation member gear 3043. The first idle gear 3044 is engaged with the agitation member gear 3043. The agitation member gear 3043 and the first idle gear 3044 are positioned on a side of the wide portion F3431 opposite to the narrow portion F3432 in the axial direction. As shown in FIG. 49, the agitation member gear 3043 and the first idle gear 3044 are positioned closer, than the first cover C3001, to the second opening H3012 in the axial direction, when the toner box 3040 is attached to the sub-tank 3050.

As shown in FIG. 51, the sub-tank 3050 further includes a tank housing 3053, a first auger gear 3054, a second auger gear 3055, a second idle gear 3056, an input gear 3057, and a first seal SL3001. The tank housing 3053 has a first surface F3051, a second surface F3052, a third surface F3053, a fourth surface F3054, a fifth surface F3055, a top surface F3056, two first protrusions 3053A, 3053B, two second protrusions 3053C, 3053D, and a toner-containing recess 3053E.

The first surface F3051, the second surface F3052, and the third surface F3053 are surfaces for guiding the toner box 3040 in the axial direction. The first surface F3051 guides the bottom surface of the toner box 3040. The second surface F3052 guides one of the first surfaces F3041 of the toner box 3040. The third surface F3053 guides the other of the first surfaces F3041 of the toner box 3040.

The first surface F3051 is perpendicular to the up-down direction. The first surface F3051 faces upward. The first surface F3051 has a first end and a second end positioned apart from each other in the axial direction, and a first edge and a second edge positioned apart from each other in the predetermined direction. The second surface F3052 and the third surface F3053 are perpendicular to the predetermined direction. The second surface F3052 faces the third surface F3053 in the predetermined direction.

The second surface F3052 extends upward from the first edge of the first surface F3051. The second surface F3052 has a first end and a second end positioned apart from each other in the axial direction. The third surface F3053 extends upward from the second edge of the first surface F3051. The third surface F3053 has a first end and a second end positioned apart from each other in the axial direction.

The toner box 3040 is attached to the sub-tank 3050 by inserting the toner box 3040 between the second surface F3052 and the third surface F3053, and then sliding the toner box 3040 in the axial direction toward the first cover C3001. As shown in FIG. 53B, the first surface F3051 is in contact with the bottom surface of the toner housing 3042 when the toner box 3040 is attached to the sub-tank 3050. The toner housing 3042 further has a toner outlet H3005 for letting out toner contained in the toner housing 3042. The toner box 3040 further includes a toner shutter 3045 for opening and closing the toner outlet H3005.

The toner shutter 3045 is slidable relative to the toner housing 3042 in the axial direction. The toner shutter 3045 includes a shutter protrusion 3045A. The shutter protrusion 3045A protrudes downward. The first surface F3051 has a fitting hole H3006 in which the shutter protrusion 3045A is fitted. Thus, the toner shutter 3045 can be opened and closed as the toner box 3040 is installed and removed.

Figure 53A:
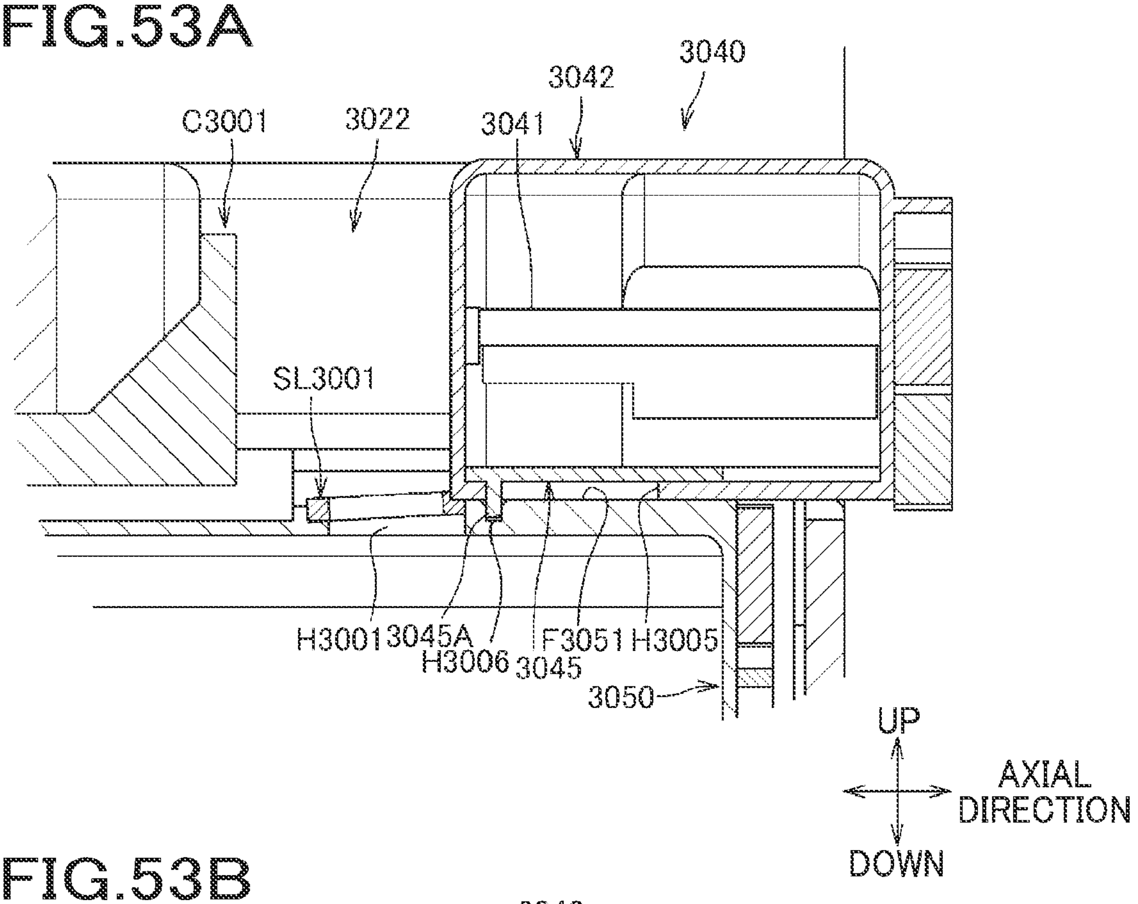
FIG. 53A is a cross-sectional view showing a toner shutter of the toner box in a closed state.
Figure 53B:
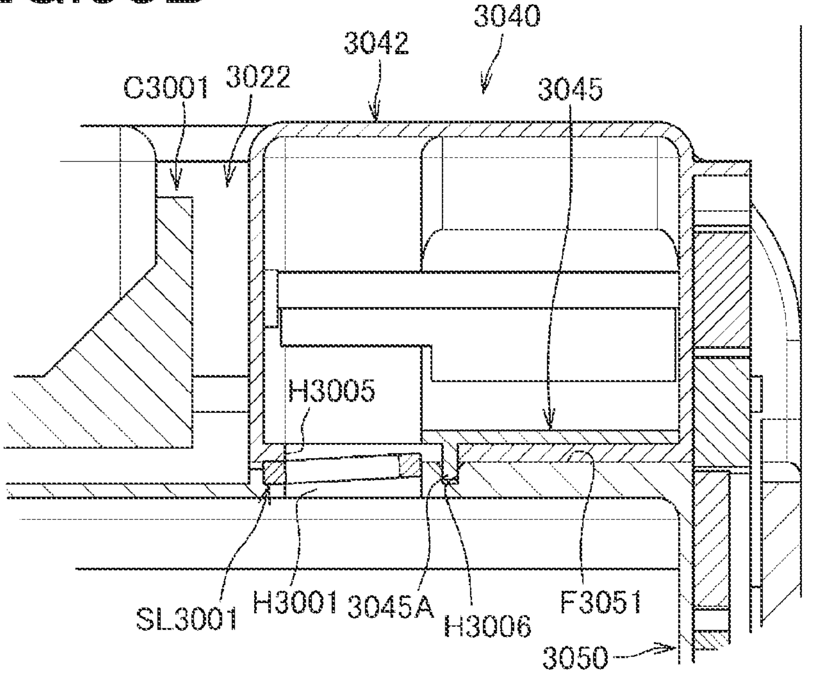
FIG. 53B is a cross-sectional view showing the toner shutter in an open state.

Specifically, as shown in FIG. 51, when the toner box 3040 is inserted between the second surface F3052 and the third surface F3053 from above, the shutter protrusion 3045A fits into the fitting hole H3006 as shown in FIG. 53A. Then, as the toner housing 3042 is slid in the axial direction toward the first cover C3001, the toner housing 3042 moves relative to the toner shutter 45 and opens the toner outlet H3005 as shown in FIG. 53B. The opened toner outlet H3005 is connected to the supply port H3001 via the first seal SL3001. The procedure to remove the toner box 3040 is the reverse of the above procedure; thus, description thereof will be omitted.

As shown in FIG. 51, the handle portion C3012 of the first cover C3001 includes a first part C3121, a second part C3122, and a third part C3123. The dimension of the first part C3121 is smaller than the dimension of the cover portion C3011 in the predetermined direction. The first part C3121 extends upward from the cover portion C3011.

The second part C3122 is positioned above the first part C3121. The dimension of the second part C3122 is greater than the dimension of the cover portion C3011 in the predetermined direction.

The third part C3123 is positioned above the second part C3122. The dimension of the third part C3123 in the predetermined direction is smaller than the dimension of the second part C3122 in the predetermined direction and greater than the dimension of the cover portion C3011 in the predetermined direction.

The second surface F3052 and the third surface F3053 of the sub-tank 3050 is contactable with the cover portion C3011 of the first cover C3001. The top surface F3056 of the sub-tank 3050 is contactable with the second part C3122 of the first cover C3001. The first cover C3001 is thereby guided in the axial direction by the second surface F3052, the third surface F3053, and the top surface F3056 of the sub-tank 3050. Particularly, since the second surface F3052 and the third surface F3053 of the sub-tank 3050 have the functions of guiding the toner box 3040 as described above, the second surface F3052 and the third surface F3053 serve as a guide for both of the first cover C3001 and the toner box 3040.

The fourth surface F3054 is positioned at the first end of the first surface F3051. The fifth surface F3055 is positioned at the second end of the first surface F3051. The fourth surface F3054 is perpendicular to the axial direction. The fourth surface F3054 is connected to the first end of the first surface F3051, the first end of the second surface F3052, and the first end of the third surface F3053.

The first auger gear 3054, the second auger gear 3055, and the second idle gear 3056 are positioned at the fourth surface F3054. The first auger gear 3054 is positioned at one end of the first auger 3051. The first auger gear 3054 rotates together with the first auger 3051.

The input gear 3057 is positioned at the other end of the first auger 3051 (also refer to FIG. 54). The input gear 3057 rotates together with the first auger 3051. The input gear 3057 receives a drive force from the drive source M3 and rotates. Specifically, as shown in FIG. 55B, a main housing gear 3024 which receives the drive force from the drive source M3 is provided at the main housing 3002. The main housing gear 3024 is engaged with the input gear 3057. The first auger gear 3054 thereby receives the drive force from the input gear 3057 via the first auger 3051, as shown in FIG. 51.

The second auger gear 3055 is positioned at one end of the second auger 3052. The second auger gear 3055 rotates together with the second auger 3052. The second auger gear 3055 is spaced apart from and arranged side-by-side with the first auger gear 3054 in the predetermined direction. The diameter of the second auger gear 3055 is larger than the diameter of the first auger gear 3054.

The second idle gear 3056 is positioned above the first auger gear 3054 and the second auger gear 3055. The second idle gear 3056 is engaged with the first auger gear 3054 and the second auger gear 3055. The second auger gear 3055 thereby receives the drive force from the first auger gear 3054 via the second idle gear 3056. That is, the second auger gear 3055 rotates in conjunction with the first auger gear 3054.

Figure 55A:
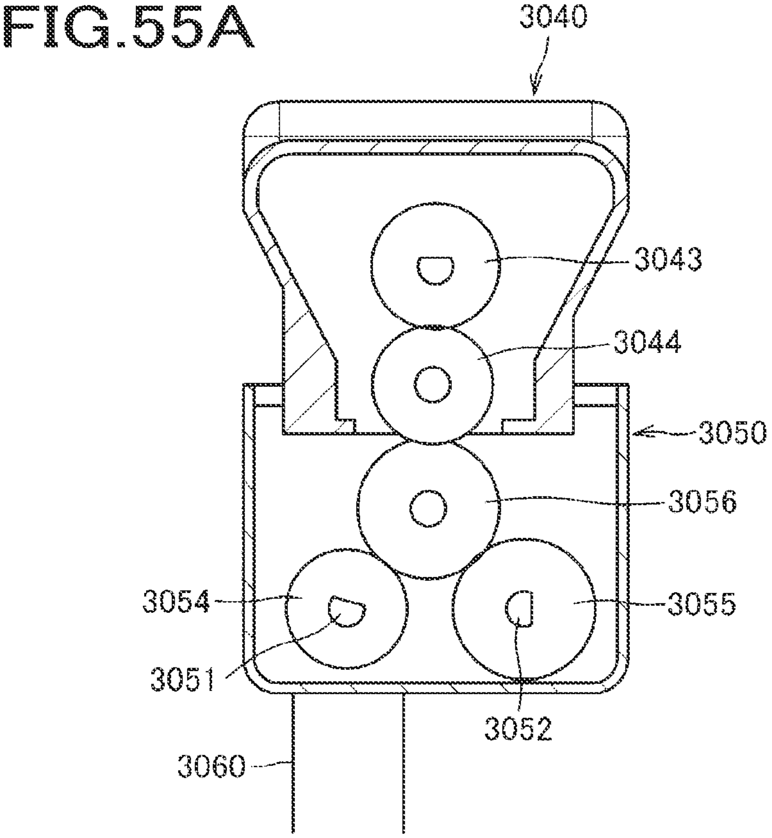
FIG. 55A is an illustration showing structures of the toner box and the sub-tank on one end thereof in the axial direction.
Figure 55B:
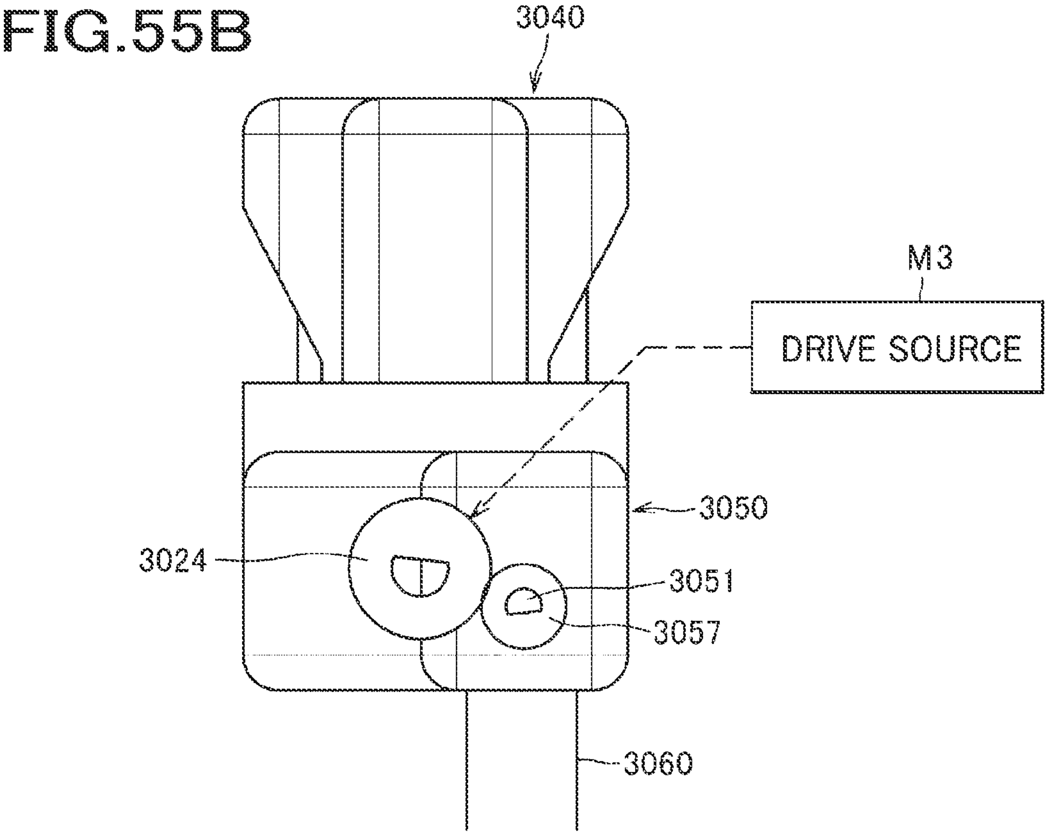
FIG. 55B is an illustration showing structures of the toner box and the sub-tank on the other end thereof in the axial direction.

As shown in FIG. 55A, the second idle gear 3056 of the sub-tank 3050 is engaged with the first idle gear 3044 of the toner box 3040 when the toner box 3040 is attached to the sub-tank 3050. The agitation member gear 3043 thereby receives the drive force from the first auger gear 3054 via the second idle gear 3056 and the first idle gear 3044 when the toner box 3040 is attached to the sub-tank 3050.

As shown in FIG. 51, the fifth surface F3055 is inclined such that the farther from the first surface F3051 in the axial direction, the lower the fifth surface F3055. The fifth surface F3055 includes the supply port H3001. The first seal SL3001 is positioned at the fifth surface F3055.

The first seal SL3001 is a seal for restricting leakage of toner from between the supply port H3001 and the first cover C3001. The first seal SL3001 is made of an elastic body such as rubber. The first seal SL3001 surrounds the supply port H3001.

Figure 52A:
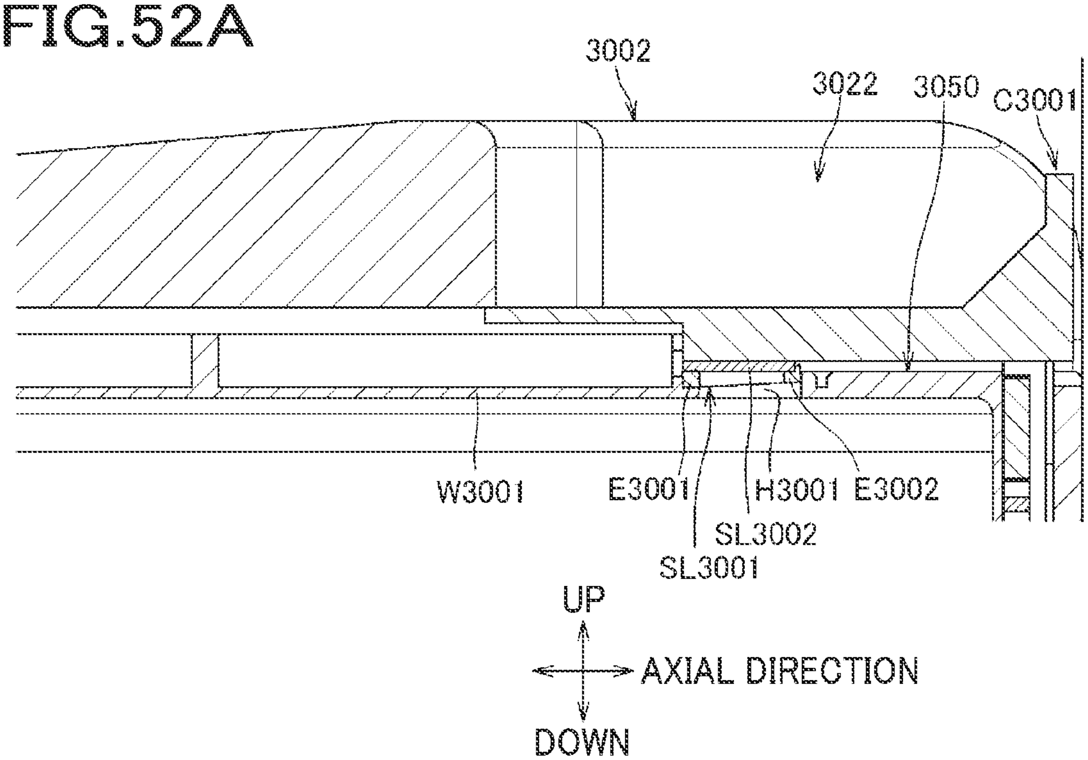
FIG. 52A is a cross-sectional view showing the first cover positioned in a closed position.
Figure 52B:
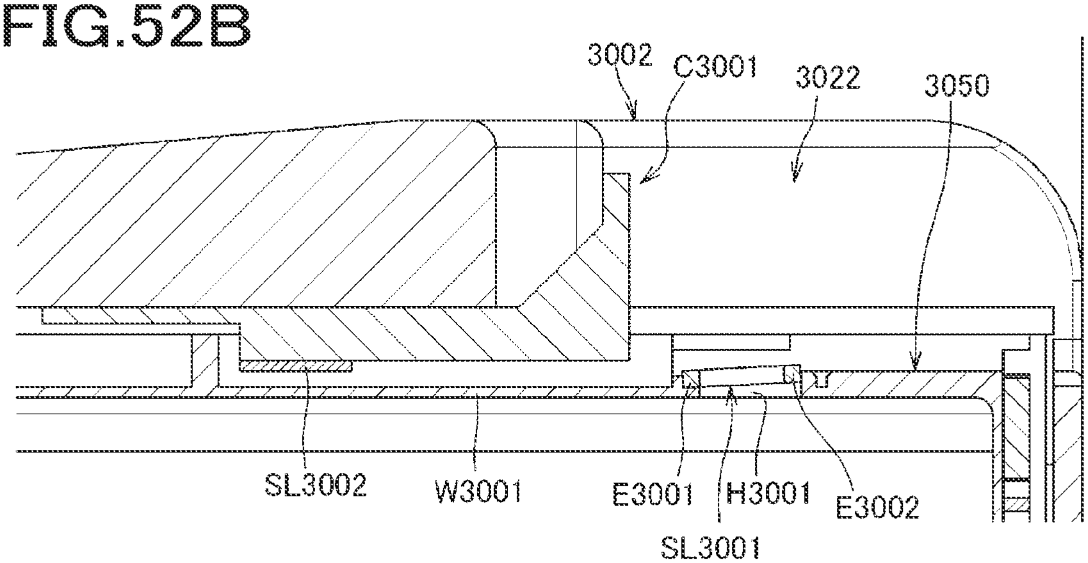
FIG. 52B is a cross-sectional view showing the first cover positioned in an open position.

As shown in FIG. 52B, the first seal SL3001 has a first end E3001 and a second end E3002 positioned apart from each other in the axial direction. The first end E3001 of the first seal SL3001 is positioned closer, than the second end E3002 of the first seal SL3001, to the first cover C3001 in the axial direction, and is positioned below the second end E3002 of the first seal SL3001 in the up-down direction, when the first cover C3001 is positioned in the open position.

The first cover C3001 includes a second seal SL3002 for restricting leakage of toner from between the first seal SL3001 and the first cover C3001. The second seal SL3002 is made of an elastic body such as rubber. As shown in FIG. 52A, the second seal SL3002 contacts the first seal SL3001 when the first cover C3001 is positioned in the closed position. Specifically, the second seal SL3002 contacts the first seal SL3001 and covers the opening of the tubular first seal SL3001.

As shown in FIG. 51, the first protrusions 3053A, 3053B are protrusions for restricting the first cover C3001 and the toner box 3040 from being separated from the supply port H3001 in the up-down direction. The first protrusions 3053A, 3053B are face the fifth surface F3055 in the up-down direction with a space formed between first protrusions 3053A, 3053B and the fifth surface F3055. The top surface of the first protrusions 3053A, 2053B form parts of the top surface F3056 of the tank housing 3053. The first protrusion 3053A protrudes from the second surface F3052. The first protrusion 3053B protrudes from the third surface F3053.

The cover portion C3011 of the first cover C3001 is allowed to pass through between the first protrusions 3053A, 3053B and the fifth surface F3055. Specifically, when the first cover C3001 is positioned in the closed position, the cover portion C3011 of the first cover C3001 is positioned between the first protrusions 3053A, 3053B and the fifth surface F3055. When the first cover C3001 is positioned in the open position, the cover portion C3011 of the first cover C3001 is positioned in a position different from the first protrusions 3053A, 3053B and the fifth surface F3055 in the axial direction. When the first cover C3001 is positioned in the closed position, the first protrusions 3053A, 3053B restrict the separation of the first cover C3001 from the supply port H3001 in the up-down direction.

The first toner protrusions 3042A of the toner box 3040 are insertable between the first protrusions 3053A, 3053B and the fifth surface F3055. Specifically, when the toner box 3040 is attached to the sub-tank 3050, the first toner protrusions 3042A of the toner box 3040 are positioned between the first protrusions 3053A, 3053B and the fifth surface F3055. Thus, when the first cover C3001 is positioned in the open position and the toner box 3040 is attached to the sub-tank 3050, the first protrusions 3053A, 3053B restrict the toner box 3040 from being separated from the supply port H3001 in the up-down direction.

The second protrusions 3053C, 3053D are protrusions for restricting the first idle gear 3044 from being separated from the second idle gear 3056. The second protrusions 3053C, 3053D protrude from the fourth surface F3054. The second protrusions 3053C, 3053D contact the second toner protrusions 3042B of the toner box 3040 attached to the sub-tank 3050. The top surface of the second protrusions 3053C, 3053D form parts of the top surface F3056 of the tank housing 3053.

The toner-containing recess 3053E is a recess capable of containing toner leaking out from the supply port H3001. The toner-containing recess 3053E is recessed downward from the top surface F3056 of the sub-tank. The base surface of the toner-containing recess 3053E is connected to an end of the fifth surface F3055 opposite to the first surface F3051. In other words, the toner-containing recess 3053E is positioned downstream with respect to the supply port H3001 in a direction in which the toner box 3040 is attached to the sub-tank 3050. Thus, toner that spills out through the first seal SL3001 when the toner box is attached to the sub-tank 3050 or when the first cover C3001 is opened or closed can be collected in the toner-containing recess 3053E.

As shown in FIGS. 54A and 54B, the tank housing 3053 further includes a top wall WU, a bottom wall WL, a first side wall W3001, a second side wall W3002, a third side wall W3003, a fourth side wall W3004, a fifth side wall W3005, a slanted wall W3006, and a partition wall W3007. As shown in FIG. 47, the top wall WU has the supply port H3001. The supply port H3001 has a first side and a second side positioned apart from the first side in the predetermined direction (FIG. 54A).

As shown in FIG. 54B, the bottom wall WL is spaced apart from and arranged side-by-side with the top wall WU in the up-down direction. The bottom wall WL has a first end and a second end positioned apart from each other in the axial direction. As shown in FIG. 54A, the bottom wall WL has the discharge port H3002.

The first side wall W3001, the second side wall W3002, the third side wall W3003, the fourth side wall W3004, the fifth side wall W3005, and the slanted wall W3006 are side walls connecting the peripheral edges of the top wall WU and the bottom wall WL.

The first side wall W3001 is positioned at the first end of the bottom wall WL. The first side wall W3001 has a first side and a second side positioned apart from each other in the predetermined direction. The second side wall W3002 is positioned at the second end of the bottom wall WL. The second side wall W3002 has a first side and a second side positioned apart from each other in the predetermined direction. The dimension of the first side wall W3001 is larger than the dimension of the second side wall W3002 in the predetermined direction.

The third side wall W3003 is positioned at the first side of the first side wall W3001. The third side wall W3003 is connected to the first side wall W3001 and the second side wall W3002.

The fourth side wall W3004 is positioned at the second side of the first side wall W3001. The fourth side wall W3004 is connected to the second side of the first side wall W3001.

The fifth side wall W3005 is positioned at the second side of the second side wall W3002. The fifth side wall W3005 is connected to the second side of the second side wall W3002.

The slanted wall W3006 is a wall that connects the fourth side wall W3004 and the fifth side wall W3005. The slanted wall W3006 is inclined such that the closer to the fifth side wall W3005 in the axial direction, the closer to the third side wall W3003 in the predetermined direction. The slanted wall W3006 is closer to the input gear 3057 than to a central part of the tank housing 3053 in the axial direction.

The partition wall W3007 extends in the axial direction from a central portion of the first side wall W3001 in the predetermined direction. The partition wall W3007 is a wall for dividing a space inside the tank housing 3053 into a first space A3001 in which the first auger 3051 is contained, and a second space A3002 in which the second auger 3052 is contained. The partition wall W3007 is positioned between the first auger 3051 and the second auger 3052 in the predetermined direction.

The partition wall W3007 is positioned apart from the fifth side wall W3005 in the axial direction. Thus, the space between the fifth side wall W3005 and the partition wall W3007 forms a passage connecting the first space A3001 and the second space A3002.

As shown in FIG. 54B, the upper end of the partition wall W3007 is positioned above the first auger 3051. Herein, although only the rotation axis of the first auger 3051 is shown and helical blades are omitted in the drawings, the upper end of the partition wall W3007 is positioned above the helical blades.

The partition wall W3007 is positioned apart from the top wall WU. The first sensor 3210 is positioned above the partition wall W3007. The partition wall W3007 is positioned between the first side and the second side of the supply port H3001 in the predetermined direction.

The partition wall W3007 may have a first slanted surface and a second slanted surface. The first slanted surface may guide toner supplied through the supply port H3001 to the first space A3001, and the second slanted surface may guide toner supplied through the supply port H3001 to the second space A3002.

The first auger 3051 extends from the first side wall W3001 to the second side wall W3002. The second auger 3052 extends from the first side wall W3001 to the slanted wall W3006. The discharge port H3002 is positioned within the range of the fifth side wall W3005 in the axial direction. The first auger 3051 partially overlaps the discharge port H3002 as viewed from the up-down direction.

As shown in FIG. 46, the controller 3100 includes a central processing unit (CPU), a read-only memory (ROM), a random-access memory (RAM), etc. The controller 3100 is configured to execute various processes according to prestored programs in response to receiving a printing command or other commands. The controller 3100 is capable of executing an image forming process for forming an image on the sheet S3 regardless of whether the toner box is installed or removed. The controller 3100 is capable of executing an image forming process for forming an image on the sheet S3 regardless of the open/closed state of the first cover C3001.

The multicolor printer 3001 does not include a sensor for detecting the installment or removal of the toner box 3040. The multicolor printer 3001 does not include a sensor for detecting the open/close of the first cover C3001.

Next, the method of attaching and removing the toner box 3040 to and from the sub-tank 3050 will be described.

To attach the toner box 3040 to the sub-tank 3050, the user first moves the first cover C3001 from the closed position to the open position, as shown in FIGS. 52A and 52B. At this point, since the first end E3001 of the first seal SL3001 is positioned below the second end E3002 of the first seal SL3001, a frictional force between the second seal SL3002 of the first cover C3001 and the first end E3001 of the first seal SL3001 is less likely to cause resistance when the first cover C3001 is moved; thus, the first cover C3001 can be moved smoothly.

When the first cover C3001 is moved to the open position, the supply port H3001 of the sub-tank 3050 is exposed to the outside. Then, the user inserts the toner box 3040 into the box-housing recess 3022 from above, as shown in FIG. 53A, and fits the shutter protrusion 3045A of the toner shutter 3045 in the fitting hole H3006 of the sub-tank 3050.

Subsequently, the user slides the toner housing 3042 of the toner box 3040, as shown in FIG. 53B, toward the first cover C3001 in the axial direction. The toner shutter 3045 is thereby opened and a portion of the toner in the toner box 3040 is supplied to the sub-tank 3050. When the toner housing 3042 is slid, the first idle gear 3044 of the toner box 3040 is engaged with the second idle gear 3056 of the sub-tank 3050, as shown in FIGS. 51 and 55A. At this point, the first toner protrusions 3042A enter the spaces under the first protrusions 3053A, 3053B of the tank housing 3053, and the second toner protrusions 3042B of the toner housing 3042 enter the spaces under the second protrusions 3053C, 3053D of the tank housing 3053. As a result, the toner housing 3042 and the first seal SL3001 can be brought into close contact, and the first idle gear 3044 and the second idle gear 3056 can be kept in engagement.

In order to supply the toner remaining in the toner box 3040 to the sub-tank 3050, the controller 3100 drives the drive source M3 shown in FIG. 55B. The drive force of the drive source M3 is transmitted to the input gear 3057 via the main housing gear 3024.

The drive force transmitted to the input gear 3057 is transmitted to the first auger gear 3054 shown in FIG. 55A via the first auger 3051. The drive force transmitted to the first auger gear 3054 is transmitted to the second auger gear 3055 via the second idle gear 3056. Further, the drive force transmitted to the first auger gear 3054 is transmitted to the agitation member gear 3043 via the second idle gear 3056 and the first idle gear 3044.

When the drive force is transmitted to the second auger gear 3055, the first auger 3051 and the second auger 3052 rotate together. As shown in FIG. 54A, the first auger 3051 and the second auger 3052 both deliver toner from the supply port H3001 toward the discharge port H3002 in the axial direction. At this point, since the rotation speed of the first auger 3051 is greater than the rotation speed of the second auger 3052, toner conveyed by the second auger 3052 can be restrained from being clogged in the vicinity of the passage between the fifth side wall W3005 and the partition wall W3007; thus, toner can be smoothly conveyed to the discharge port H3002.

Further, when the drive force is transmitted to the agitation member gear 3043, the agitation member 3041 shown in FIG. 46 rotates. The toner remaining in the toner box 3040 can thereby be supplied to the sub-tank 3050.

To remove the toner box 3040 from the sub-tank 3050, the user inserts his/her finger(s) between the second surface(s) F3042 of the toner box 3040 and a side(s) of the box-housing recess 3022 shown in FIG. 49, and slides the toner box 3040 in the axial direction away from the first cover C3001. The toner housing 3042 is thereby moved, as shown in FIG. 53A, relative to the toner shutter 3045 to close the toner shutter 45.

Further, the first toner protrusions 3042A of the toner housing 3042 shown in FIG. 51 are disengaged from the first protrusions 3053A, 3053B of the tank housing 3053, and the second toner protrusions 3042B of the toner housing 3042 shown in FIG. 51 are disengaged from the second protrusions 3053C, 3053D of the tank housing 3053. Thus, the user can lift up the toner box 3040.

Subsequently, the user inserts his/her finger in the recess 3022A of the main housing 3002 shown in FIG. 48, and slides the first cover C3001 from the open position to the closed position. The first opening H3011 and the supply port H3001 are thereby closed by the first cover C3001. Further, at this point, the cover portion C3011 of the first cover C3001 enters the space under the first protrusions 3053A, 3053B of the tank housing 3053 shown in FIG. 51. As a result, as shown in FIG. 52A, the first seal SL3001 and the second seal SL3002 can be brought into close contact.

According to the above-described embodiment, the following advantageous effects can be obtained.

Since the capacity of the sub-tank 3050 is greater than the capacity of the toner box 3040, the time period from when the toner box 3040 becomes empty to when printing becomes impossible can be extended.

Since the supply port H3001 faces upward, toner in the toner box 3040 can be supplied to the sub-tank by gravity.

Since the discharge port H3002 faces downward, toner in the sub-tank 3050 can be discharged to the pipe 3060 by gravity.

Since the diameter of the first auger gear 3054 is smaller than the diameter of the second auger gear 3055, the rotation speed of the first auger 3051 can be made faster than the rotation speed of the second auger 3052 to thereby allow toner to be smoothly conveyed to the discharge port H3002.

Since the partition wall W3007 is positioned between the first side and the second side of the supply port H3001, toner supplied from the toner box 3040 to the sub-tank 3050 is distributed by the partition wall W3007 to the first space A3001 on the first auger 3051 side and to the second space A3002 on the second auger 3052 side.

Since the controller 3100 can execute the image forming process regardless of whether the toner boxes 3040 are installed or removed, the image forming process can be executed even if the toner boxes 3040 are removed from the sub-tank 3050.

Since the first protrusions 3053A, 3053B restrict the first cover C3001 from being separated from the supply port H3001 in the up-down direction when the first cover C3001 is positioned in the closed position, foreign matter such as dust can be restrained from entering the supply port H3001. Further, since the first protrusions 3053A, 3053B restrict the toner box 3040 from being separated from the supply port H3001 in the up-down direction when the first cover C3001 is positioned in the open position and the toner box 3040 is attached to the sub-tank 3050, toner leakage from between the toner box 3040 and the sub-tank 3050 can be restrained when toner is being supplied. Since the movement of the first cover C3001 and the movement of the toner box 3040 in directions away from the supply port H3001 are both restricted by the first protrusions 3053A, 3053B, the structure of the multicolor printer 3001 can be simplified.

Since the first cover C3001 is slidable relative to the main housing 3002, toner adhering to the first cover C3001 can be kept from being exposed when the first cover C3001 is opened, as compared to, for example, an alternative apparatus described below in which a first cover rotates.

Since the sub-tank 3050 includes a first seal SL3001 surrounding the supply port H3001, toner leakage from between the sub-tank 3050 and the first cover C3001 can be restrained.

When the first cover C3001 is in the open position, the first end E3001 of the first seal SL3001 is positioned closer, than the second end E3002 of the first seal SL3001, to the first cover C3001 in the axial direction, and positioned below the second end E3002 of the first seal SL3001 in the up-down direction. Thus, the frictional force between the first cover C3001 and the first seal SL3001 during movement of the first cover C3001 can be made smaller to thereby allow the first cover C3001 to move smoothly. Further, when the first cover C3001 is being closed, the second end E3002 of the first seal SL3001 can be squeezed by the first cover C3001. Thus, sealability can be improved. Specifically, since the second end E3002 of the first seal SL3001 is positioned closer, than the first end E3001, to the user replacing the toner box 3040, sealability of the second end E3002 of the first seal SL3001, on the side closer to the user, can be improved.

Since the first cover C3001 includes the second seal SL3002 that contacts the first seal SL3001, toner leakage from between the sub-tank 3050 and the first cover C3001 can be restrained.

Since the sub-tank 3050 includes second protrusions 3053C, 3053D that restrain separation of the first idle gear 3044 from the second idle gear 3056, the first idle gear 3044 can be restrained from being disengaged from the second idle gear 3056.

As shown in FIG. 48, since the first end of the sheet ejection opening H3004 is positioned between the first ends and the second ends of the box-housing recesses 3022, the sheet S3 ejected on the output tray 3021 can be picked up from below by inserting one's finger into one of the box-housing recesses 3022 when the toner boxes 3040 are removed from the sub-tanks 3050. Thus, the sheet S3 can be easily picked up from the output tray 3021.

Since the upper surfaces F3043 of the toner boxes 3040 contact the sheet S3 ejected from the sheet ejection opening H3004 when the toner boxes 3040 are attached to the sub-tanks 3050, the toner boxes 3040 housed in the box-housing recesses 3022 can be used to support the sheet S3.

When the first cover C3001 is positioned in the open position, the handle portion C3012 is positioned near the opposing surface F3004. However, since the opposing surface F3004 has the recess 3022A, the user can insert his/her finger in the recess 3022A and easily operate the handle portion C3012.

Since the controller 3100 can execute the image forming process regardless of the open/closed state of the first covers C3001, the image forming process can be executed with the first covers C3001 open.

Since the multicolor printer 3001 does not include sensors for detecting the open/close of the first covers C3001, costs can be reduced.

Figure 56:
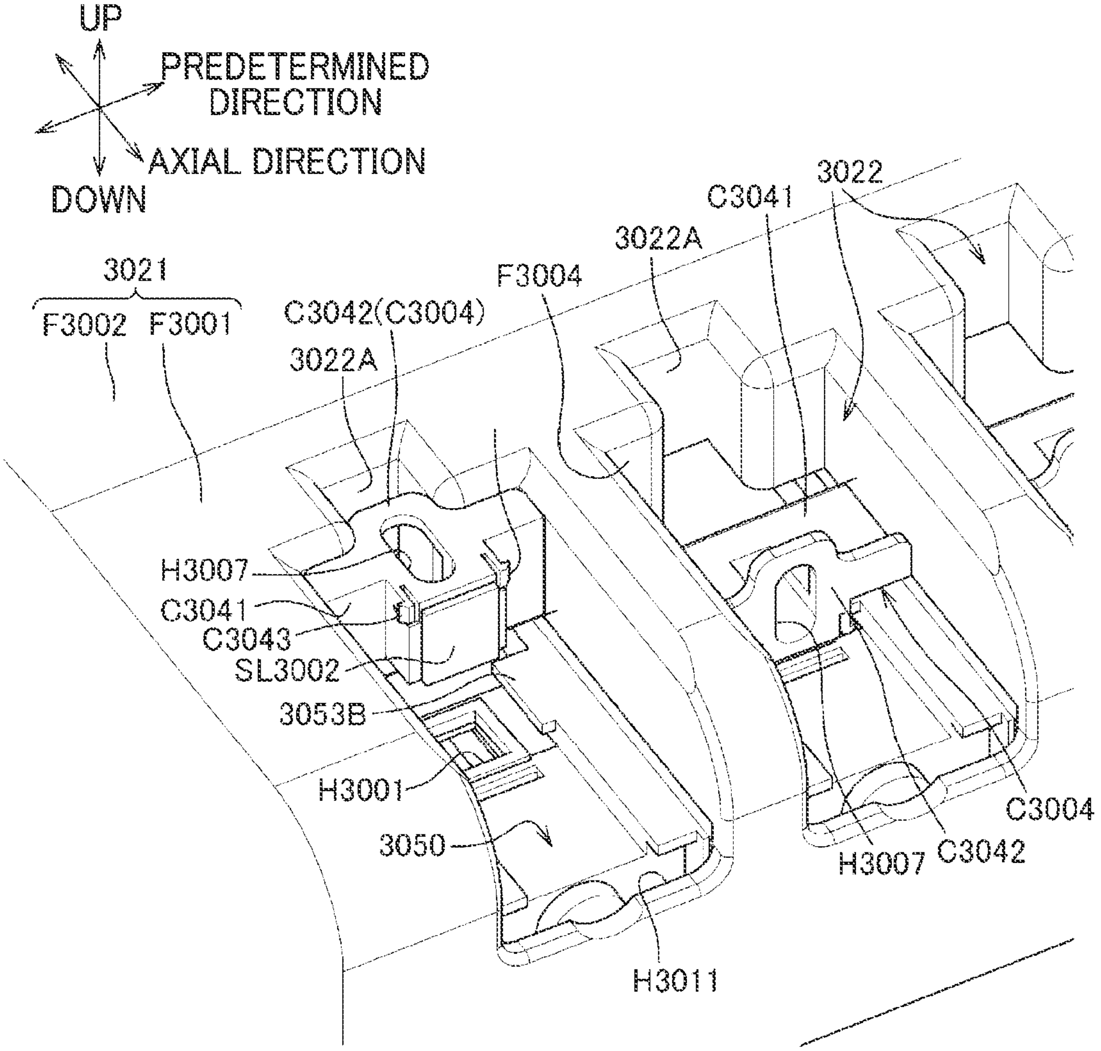
FIG. 56 is a perspective view showing a modification of the first cover.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below wherein members having the approximately same structures to the above-described examples are identified by the same reference character and description thereof is omitted:

As shown in FIG. 56, a first cover C3004 may be rotatable relative to the main housing 3002 between a closed position to close the supply port H3001 and an open position to open the supply port H3001. Specifically, the first cover C3004 includes a cover portion C3041 for covering the supply port H3001, a handle portion C3042 protruding upward from the cover portion C3041, and a second seal SL3002 similar to the above-described embodiment.

The cover portion C3041 has a first end positioned closer to the recess 3022A and a second end positioned farther from the recess 3022A in the axial direction. The cover portion C3041 is rotatable about the first end. The second seal SL3002 is positioned at a bottom surface of the cover portion C3041. When the first cover C3004 is positioned at a closed position, the second seal SL3002 covers the supply port H3001. When the first cover C3004 is positioned at the closed position, the cover portion C3041 covers a part of the first opening H3011.

Further, the cover portion C3041 includes two cover protrusions C3043. When the first cover C3004 is positioned in the closed position, the cover protrusions C3043 enter the spaces under the first protrusions 3053A, 3053B of the sub-tank 3050. The first protrusions 3053A, 3053B thereby restrict the first cover C3004 from being separated from the supply port H3001 in the up-down direction, when the first cover C3004 is positioned in the closed position.

The handle portion C3042 is positioned at the second end of the cover portion C3041. The handle C3042 has a hole H3007. A user's finger can be inserted in the hole H3007.

According to this configuration, when the first cover C3004 is moved from the closed position to the open position, the second seal SL3002 moves upward away from the first seal SL3001. As a result, almost no frictional force is generated between the second seal SL3002 and the first seal SL3001 when the first cover C3004 is opened, and operability of the first cover C3004 can thereby be improved.

Although the second idle gear 3056 is provided between the first auger gear 3054 and the second auger gear 3055 in the fourth embodiment, an alternative structure in which the first auger and the second auger are engaged with each other may also be possible. In this case, the vanes of the first auger and the second auger may be oriented in opposite directions so that the direction in which the first auger conveys toner and the direction in which the second auger conveys toner is the same.

Although the present disclosure is applied to the multi-color printer 3001 in the fourth embodiment, the present disclosure may be applied to other image forming apparatuses such as copying machines, multifunctional devices, etc.

The elements described in the fourth embodiment and its modified examples may be implemented selectively and in combination.

What is claimed is:

1. An image forming apparatus, comprising:
- a main housing;
- an intermediate transfer belt;
- a development device including:
  - a development housing having an inlet through which toner is received and an outlet through with toner is discharged;
  - a development roller rotatable about a development axis extending in an axial direction, the development device detachably attachable to the main housing in the axial direction;
  - a first shutter moveable between a first open position to open the inlet and a first closed position to the close the inlet; and
  - a second shutter moveable between a second open position to open the outlet and a second closed position to close the outlet;
- a toner box detachably attachable to the main housing in the axial direction, the toner box containing toner therein;
- a pipe having a pipe opening through which toner is provided to the development device;
- a waste toner box configured to receive toner discharged from the development device in a state where the development device is attached to the main housing; and
- a controller,
- wherein the development device is positioned below the intermediate transfer belt, and the toner box is positioned above the intermediate transfer belt,
- wherein the inlet of the development housing is opposed to the pipe opening, and the inlet of the development housing is configured to receive toner delivered by the pipe in a state where the development device is attached to the main housing, and
- wherein the controller is configured to:
  - move the first shutter from the first closed position to the first open position in a state where the development device is attached to the main housing and the inlet is opposed to the pipe opening, and in a state where the second shutter is positioned in the second closed position, and
  - move the second shutter from the second closed position to the second open position in a state where the development device is attached to the main housing and the inlet is opposed to the pipe opening, and in a state where the first shutter is positioned in the first closed position.

2. The image forming apparatus according to claim 1, wherein
- the main housing has a development opening through which the development device is allowed to pass, and
- when the development device is attached to the main housing, the first shutter is positioned farther, than the development roller, from the development opening in the axial direction.

3. The image forming apparatus according to claim 1, wherein
- the inlet faces upward, and
- the outlet faces downward.

4. The image forming apparatus according to claim 1, wherein
- the main housing has a development opening through which the development device is allowed to pass, and
- when the development device is attached to the main housing, the second shutter is positioned farther, than the development roller, from the development opening in the axial direction.

5. The image forming apparatus according to claim 1, wherein
- the main housing has a development opening through which the development device is allowed to pass, and
- the development device further includes:
  - a first auger configured to convey toner in the development housing in the axial direction toward the development opening in a state where the development device is attached to the main housing; and
  - a second auger configured to convey toner in the development housing in the axial direction away from the development opening in a state where the development device is attached to the main housing.

6. The image forming apparatus according to claim 5, wherein the development housing further includes a partition wall positioned between the first auger and the second auger, the partition wall including:

a feed port through which toner conveyed by the first auger is allowed to pass; and a return port through which toner conveyed by the second auger is allowed to pass.

7. The image forming apparatus according to claim 6, wherein the development device further includes a third shutter movable between a third open position to open the return port and a third closed position to close the return port.

8. The image forming apparatus according to claim 7, wherein the controller is further configured to:

move the first shutter from the first closed position to the first open position on the condition that the second shutter is positioned in the second closed position and the third shutter is positioned in the third open position, and move the second shutter from the second closed position to the second open position and the third shutter from the third open position to the third closed position on the condition that the first shutter is positioned in the first closed position.

9. The image forming apparatus according to claim 1, further comprising a photosensitive drum positioned under the intermediate transfer belt, wherein the waste toner box is positioned below the photosensitive drum.

10. The image forming apparatus according to claim 9, further comprising a scanner configured to project light to expose a surface of the photosensitive drum, wherein at least a part of the waste toner box overlaps at least a part of the scanner as viewed in the axial direction.

11. The image forming apparatus according to claim 1, wherein the first shutter includes a protrusion, and the image forming apparatus further includes a pipe shutter movable between a fourth open position to open the pipe opening and a fourth closed position to close the pipe opening, the pipe shutter having a hole in which the protrusion is fitted.

12. The image forming apparatus according to claim 1, further comprising a sub-tank positioned between the toner box and the pipe, wherein the sub-tank includes a conveyance member for conveying toner supplied from the toner box to the pipe.

13. The image forming apparatus according to claim 12, further comprising a first-sensor configured to detect presence or absence of toner in the sub-tank.

14. The image forming apparatus according to claim 1, further comprising a second sensor configured to detect presence or absence of toner in the pipe.

15. The image forming apparatus according to claim 14, wherein the second-sensor is positioned above a lower end of the development roller.

16. The image forming apparatus according to claim 1, wherein the main housing has a development opening through which the development device is allowed to pass, and the pipe is positioned farther, than the intermediate transfer belt, from the development opening in the axial direction.

17. The image forming apparatus according to claim 16, wherein the intermediate transfer belt overlaps the pipe as viewed in the axial direction.

18. The image forming apparatus according to claim 1, wherein the inlet is opposed to the pipe opening in a state where the development device is attached to the main housing and the development housing is positioned in place relative to the main housing.

* * * * *